(12) United States Patent
Takahara et al.

(10) Patent No.: US 6,545,653 B1
(45) Date of Patent: *Apr. 8, 2003

(54) METHOD AND DEVICE FOR DISPLAYING IMAGE SIGNALS AND VIEWFINDER

(75) Inventors: Hiroshi Takahara, Osaka (JP);
Tsutomu Muraji, Nara (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/502,180

(22) Filed: Jul. 13, 1995

(30) Foreign Application Priority Data

| Jul. 14, 1994 | (JP) | 6-162068 |
| Aug. 26, 1994 | (JP) | 6-202215 |
| Dec. 27, 1994 | (JP) | 6-324945 |

(51) Int. Cl.$^7$ .................. H04N 7/01; H04N 11/20; G09G 3/36
(52) U.S. Cl. .................. 345/87; 345/90; 345/100; 345/103; 348/446; 348/448; 348/793; 348/453
(58) Field of Search ............... 348/446, 448, 348/453, 433, 792, 793, 744, 749, 750, 751; 345/87, 90, 103, 100; H04N 7/01, 11/20; G09G 3/36

(56) References Cited

U.S. PATENT DOCUMENTS

| 4,298,888 A | * 11/1981 | Colles et al. ............. 348/446 |
| 4,434,472 A | * 2/1984 | Kachun ..................... 364/900 |
| 4,435,047 A | 3/1984 | Fergason |
| 4,499,459 A | * 2/1985 | Sasaki et al. |
| 4,556,289 A | 12/1985 | Fergason |
| 4,596,445 A | 6/1986 | Fergason |
| 4,635,127 A | * 1/1987 | Togashi ..................... 348/792 |

(List continued on next page.)

FOREIGN PATENT DOCUMENTS

| EP | 0 465 171 | 1/1992 |
| EP | 0 518 362 | 12/1992 |

(List continued on next page.)

*Primary Examiner*—Andrew Faile
*Assistant Examiner*—Vivek Srivastava
(74) *Attorney, Agent, or Firm*—Wenderoth, Lind & Ponack, L.L.P.

(57) ABSTRACT

Signals of odd lines in progressive scanning image signals in a first frame are extracted and displayed along odd lines on a matrix-type display device such as a liquid crystal display panel. Further, signals of even lines in progressive scanning image signals in a second frame successive to the first frame are extracted and displayed along even lines on the display device. Thus, one image of a frame is displayed on the display device in two frame periods so that one of the first and second steps is performed after the other thereof is performed. Alternatively, one of the signals of odd lines are displayed along two successive odd and even lines, while one of the signals of even lines are displayed along two successive even and odd lines. The display methods can be applied to a display panel having a larger number of scanning lines than a number of signal lines. Light leakage in a liquid crystal panel including polymer dispersion liquid crystal due to lateral electric field near pixel electrodes is prevented by providing light-shielding films on the pixel electrodes. Light leakage is also prevented by providing a polarizer above one of the two sides of the panel.

14 Claims, 87 Drawing Sheets

U.S. PATENT DOCUMENTS

| | | | | |
|---|---|---|---|---|
| 5,018,007 A | * | 5/1991 | Lang et al. | 358/60 |
| 5,036,386 A | * | 7/1991 | Yasumoto et al. | 358/12 |
| 5,056,912 A | * | 10/1991 | Hamada et al. | 353/38 |
| 5,301,031 A | * | 4/1994 | Eto et al. | |
| 5,386,217 A | * | 1/1995 | Liu et al. | 348/550 |
| 5,422,658 A | * | 6/1995 | Kawaguchi et al. | 348/448 |
| 5,428,398 A | * | 6/1995 | Faroudja | 348/452 |
| 5,430,489 A | * | 7/1995 | Richards et al. | 348/446 |
| 5,432,527 A | * | 7/1995 | Yanai et al. | 345/92 |
| 5,504,597 A | * | 4/1996 | Sprague et al. | 359/40 |
| 5,506,601 A | * | 4/1996 | Mihara et al. | 345/103 |
| 5,537,258 A | * | 7/1996 | Yamazaki et al. | 348/761 |
| 5,557,432 A | * | 9/1996 | Yokota | 359/41 |
| 5,583,669 A | | 12/1996 | Fushimi et al. | |
| 5,610,735 A | * | 3/1997 | Ohmae et al. | 349/10 |
| 5,689,315 A | | 11/1997 | Fushimi et al. | |

FOREIGN PATENT DOCUMENTS

| | | |
|---|---|---|
| EP | 0 572 996 | 12/1993 |
| EP | 0 583 150 | 2/1994 |
| JP | 62-150317 | 7/1987 |
| JP | 62-180343 | 8/1987 |
| JP | 63-10128 | 1/1988 |
| JP | 2-262185 | 10/1990 |
| JP | 3-46620 | 2/1991 |
| JP | 4-60538 | 2/1992 |
| JP | 4-366917 | 12/1992 |
| JP | 5-80321 | 4/1993 |
| JP | 5-113558 | 5/1993 |
| JP | 5-173117 | 7/1993 |
| JP | 5-341269 | 12/1993 |
| JP | 6-34963 | 2/1994 |
| JP | 6-43416 | 2/1994 |
| JP | 6-118368 | 4/1994 |
| JP | 6-202085 | 7/1994 |
| JP | 6-202094 | 7/1994 |
| JP | 6-208126 | 7/1994 |
| JP | 6-230384 | 8/1994 |
| JP | 7-20823 | 1/1995 |
| JP | 7-92443 | 4/1995 |
| WO | 85/04262 | 9/1985 |

* cited by examiner

Fig.1A

Line 1_1
Line 1_2
Line 1_3
Line 1_4
⋮
Line 1_(2n−1)
Line 1_(2n)
Line 1_(2n+1)
Line 1_(2n+2)
⋮

Fig.1B

Line 2_1
Line 2_2
Line 2_3
Line 2_4
⋮
Line 2_(2n−1)
Line 2_(2n)
Line 2_(2n+1)
Line 2_(2n+2)
⋮

Fig.1C

Line 1_1
Line 2_2
Line 1_3
Line 2_4
⋮
Line 1_(2n−1)
Line 2_(2n)
Line 1_(2n+1)
Line 2_(2n+2)
⋮

| 101 | 1F | 2F | 3F | 4F | 5F | 6F | 7F | 8F | 9F |
|---|---|---|---|---|---|---|---|---|---|
| Line 1 | $+a_1$ | $+a_1$ | $-c_1$ | $-c_1$ | $+e_1$ | $+e_1$ | $-g_1$ | $-g_1$ | $+i_1$ |
| Line 2 (101c) | $+a_1$ | $-b_2$ | $-c_1$ | $+d_2$ | $+e_1$ | $-f_2$ | $-g_1$ | $+h_2$ | $+i_1$ |
| Line 3 (101a) | $-a_3$ | $-b_2$ | $+c_3$ | $+d_2$ | $-e_3$ | $-f_2$ | $+g_3$ | $+h_2$ | $-i_3$ |
| Line 4 (101b) | $-a_3$ | $+b_4$ | $+c_3$ | $-d_4$ | $-e_3$ | $+f_4$ | $+g_3$ | $-h_4$ | $-i_3$ |
| Line 5 | $+a_5$ | $+b_4$ | $-c_5$ | $-d_4$ | $+e_5$ | $+f_4$ | $-g_5$ | $-h_4$ | $+i_5$ |
| Line 6 | $+a_5$ | $-b_6$ | $-c_5$ | $+d_6$ | $+e_5$ | $-f_6$ | $-g_5$ | $+h_6$ | $+i_5$ |
| Line 7 | $-a_7$ | $-b_6$ | $+c_7$ | $+d_6$ | $-e_7$ | $-f_6$ | $+g_7$ | $+h_6$ | $-i_7$ |
| ⋮ | ⋮ | ⋮ | ⋮ | ⋮ | ⋮ | ⋮ | ⋮ | ⋮ | ⋮ |
| Line 2n−1 | $+a_{2n-1}$ | $+b_{2n-2}$ | $-c_{2n-1}$ | $-d_{2n-2}$ | $+e_{2n-1}$ | $+f_{2n-2}$ | $-g_{2n-1}$ | $-h_{2n-2}$ | $+i_{2n-1}$ |
| Line 2n | $+a_{2n-1}$ | $-b_{2n}$ | $-c_{2n-1}$ | $+d_{2n}$ | $+e_{2n-1}$ | $-f_{2n}$ | $-g_{2n-1}$ | $+h_{2n}$ | $+i_{2n-1}$ |
| Line 2n+1 | $-a_{2n+1}$ | $-b_{2n}$ | $+c_{2n+1}$ | $+d_{2n}$ | $-e_{2n+1}$ | $-f_{2n}$ | $+g_{2n+1}$ | $+h_{2n}$ | $-i_{2n+1}$ |
| Line 2n+2 | $-a_{2n+1}$ | $+b_{2n+2}$ | $+c_{2n+1}$ | $-d_{2n+2}$ | $-e_{2n+1}$ | $+f_{2n+2}$ | $+g_{2n+1}$ | $-h_{2n+2}$ | $-i_{2n+1}$ |
| Line 2n+3 | $+a_{2n+3}$ | $+b_{2n+2}$ | $-c_{2n+3}$ | $-d_{2n+2}$ | $+e_{2n+3}$ | $+f_{2n+2}$ | $-g_{2n+3}$ | $-h_{2n+2}$ | $+i_{2n+3}$ |
| ⋮ | ⋮ | ⋮ | ⋮ | ⋮ | ⋮ | ⋮ | ⋮ | ⋮ | ⋮ |

Fig.18

| | 1F | 2F | 3F | 4F | 5F | 6F | 7F | 8F | 9F |
|---|---|---|---|---|---|---|---|---|---|
| Line 1 | $+a_1$ | $+a_1$ | $-c_1$ | $-c_1$ | $+e_1$ | $+e_1$ | $-g_1$ | $-g_1$ | $+i_1$ |
| Line 2 | $+x_2$ | $-b_2$ | $-b_2$ | $+d_2$ | $+d_2$ | $-f_2$ | $-f_2$ | $+h_2$ | $+h_2$ |
| Line 3 | $-a_3$ | $-a_3$ | $+c_3$ | $+c_3$ | $-e_3$ | $-e_3$ | $+g_3$ | $+g_3$ | $-i_3$ |
| Line 4 | $-x_4$ | $+b_4$ | $+b_4$ | $-d_4$ | $-d_4$ | $+f_4$ | $+f_4$ | $-h_4$ | $-h_4$ |
| Line 5 | $+a_5$ | $+a_5$ | $-c_5$ | $-c_5$ | $+e_5$ | $+e_5$ | $-g_5$ | $-g_5$ | $+i_5$ |
| Line 6 | $+x_6$ | $-b_6$ | $-b_6$ | $+d_6$ | $+d_6$ | $-f_6$ | $-f_6$ | $+h_6$ | $+h_6$ |
| Line 7 | $-a_7$ | $-a_7$ | $+c_7$ | $+c_7$ | $-e_7$ | $-e_7$ | $+g_7$ | $+g_7$ | $-i_7$ |
| ⋮ | ⋮ | ⋮ | ⋮ | ⋮ | ⋮ | ⋮ | ⋮ | ⋮ | ⋮ |
| Line 2n−1 | $+a_{2n-1}$ | $+a_{2n-1}$ | $-c_{2n-1}$ | $-c_{2n-1}$ | $+e_{2n-1}$ | $+e_{2n-1}$ | $-g_{2n-1}$ | $-g_{2n-1}$ | $+i_{2n-1}$ |
| Line 2n | $+x_{2n}$ | $-b_{2n}$ | $-b_{2n}$ | $+d_{2n}$ | $+d_{2n}$ | $-f_{2n}$ | $-f_{2n}$ | $+h_{2n}$ | $+i_{2n}$ |
| Line 2n+1 | $-a_{2n+1}$ | $-a_{2n+1}$ | $+c_{2n+1}$ | $+c_{2n+1}$ | $-e_{2n+1}$ | $-e_{2n+1}$ | $+g_{2n+1}$ | $+g_{2n+1}$ | $-i_{2n+1}$ |
| Line 2n+2 | $-x_{2n+1}$ | $+b_{2n+2}$ | $+b_{2n+2}$ | $-d_{2n+2}$ | $-d_{2n+2}$ | $+f_{2n+2}$ | $+f_{2n+2}$ | $-h_{2n+2}$ | $-h_{2n+2}$ |
| Line 2n+3 | $+a_{2n+3}$ | $+a_{2n+3}$ | $-c_{2n+3}$ | $-c_{2n+3}$ | $+e_{2n+3}$ | $+e_{2n+3}$ | $-g_{2n+3}$ | $-g_{2n+3}$ | $+i_{2n+3}$ |
| ⋮ | ⋮ | ⋮ | ⋮ | ⋮ | ⋮ | ⋮ | ⋮ | ⋮ | ⋮ |

Fig.19

|  | 1F | 2F | 3F | 4F | 5F | 6F | 7F | 8F | 9F |
|---|---|---|---|---|---|---|---|---|---|
| 101 — Line 1 | $+a_1$ | $+a_1$ | $-c_1$ | $-c_1$ | $+e_1$ | $+e_1$ | $-g_1$ | $-g_1$ | $+i_1$ |
| 101c — Line 2 | $+a_1$ | $+a_1$ | $-c_1$ | $-c_1$ | $+e_1$ | $+e_1$ | $-g_1$ | $-g_1$ | $+i_1$ |
| 101a — Line 3 | $+a_1$ | $-b_2$ | $-c_1$ | $+d_2$ | $+e_1$ | $-f_2$ | $-g_1$ | $+h_2$ | $+i_1$ |
| 101b — Line 4 | $+a_1$ | $-b_2$ | $-c_1$ | $+d_2$ | $+e_1$ | $-f_2$ | $-g_1$ | $+h_2$ | $+i_1$ |
| Line 5 | $-a_3$ | $-b_2$ | $+c_3$ | $+d_2$ | $-e_3$ | $-f_2$ | $+g_3$ | $+h_2$ | $-i_3$ |
| Line 6 | $-a_3$ | $-b_2$ | $+c_3$ | $+d_2$ | $-e_3$ | $-f_2$ | $+g_3$ | $+h_2$ | $-i_3$ |
| Line 7 | $-a_3$ | $+b_4$ | $+c_3$ | $-d_4$ | $-e_3$ | $+f_4$ | $+g_3$ | $-h_4$ | $-i_3$ |
| Line 8 | $-a_3$ | $+b_4$ | $+c_3$ | $-d_4$ | $-e_3$ | $+f_4$ | $+g_3$ | $-h_4$ | $-i_3$ |
| Line 9 | $+a_5$ | $+b_4$ | $-c_5$ | $-d_4$ | $+e_5$ | $+f_4$ | $-g_5$ | $-h_4$ | $+i_5$ |
| ⋮ | ⋮ | ⋮ | ⋮ | ⋮ | ⋮ | ⋮ | ⋮ | ⋮ | ⋮ |

Fig.20

| 101 | 1F | 2F | 3F | 4F | 5F | 6F | 7F | 8F | 9F |
|---|---|---|---|---|---|---|---|---|---|
| Line 1 | $+a_1$ | $-a_1$ | $+c_1$ | $-c_1$ | $+e_1$ | $-e_1$ | $+g_1$ | $-g_1$ | $+i_1$ |
| Line 2 (101c) | $+a_1$ | $-a_1$ | $+c_1$ | $-c_1$ | $+e_1$ | $-e_1$ | $+g_1$ | $-g_1$ | $+i_1$ |
| Line 3 (101a) | $-a_1$ | $+b_2$ | $-c_1$ | $+d_2$ | $-e_1$ | $+f_2$ | $-g_1$ | $+h_2$ | $-i_1$ |
| Line 4 (101b) | $-a_1$ | $+b_2$ | $-c_1$ | $+d_2$ | $-e_1$ | $+f_2$ | $-g_1$ | $+h_2$ | $-i_1$ |
| Line 5 | $+a_3$ | $-b_2$ | $+c_3$ | $-d_2$ | $+e_3$ | $-f_2$ | $+g_3$ | $-h_2$ | $+i_3$ |
| Line 6 | $+a_3$ | $-b_2$ | $+c_3$ | $-d_2$ | $+e_3$ | $-f_2$ | $+g_3$ | $-h_2$ | $+i_3$ |
| Line 7 | $-a_3$ | $+b_4$ | $-c_3$ | $+d_4$ | $-e_3$ | $+f_4$ | $-g_3$ | $+h_4$ | $-i_3$ |
| Line 8 | $-a_3$ | $+b_4$ | $-c_3$ | $+d_4$ | $-e_3$ | $+f_4$ | $-g_3$ | $+h_4$ | $-i_3$ |
| Line 9 | $+a_5$ | $-b_4$ | $+c_5$ | $-d_4$ | $+e_5$ | $-f_4$ | $+g_5$ | $-h_4$ | $+i_5$ |
| ⋮ | ⋮ | ⋮ | ⋮ | ⋮ | ⋮ | ⋮ | ⋮ | ⋮ | ⋮ |

Fig.21

| | 1F | 2F | 3F | 4F | 5F | 6F | 7F | 8F | 9F |
|---|---|---|---|---|---|---|---|---|---|
| Line 1 (101) | $+a_1$ | $-a_1$ | $+c_1$ | $-c_1$ | $+e_1$ | $-e_1$ | $+g_1$ | $-g_1$ | $+i_1$ |
| Line 2 (101c) | $+a_1$ | $-a_1$ | $+c_1$ | $-c_1$ | $+e_1$ | $-e_1$ | $+g_1$ | $-g_1$ | $+i_1$ |
| Line 3 (101a) | $-a_2$ | $+b_2$ | $-c_2$ | $+d_2$ | $-e_2$ | $+f_2$ | $-g_2$ | $+h_2$ | $-i_2$ |
| Line 4 (101b) | $-a_2$ | $+b_2$ | $-c_2$ | $+d_2$ | $-e_2$ | $+f_2$ | $-g_2$ | $+h_2$ | $-i_2$ |
| Line 5 | $+a_3$ | $-b_3$ | $+c_3$ | $-d_3$ | $+e_3$ | $-f_3$ | $+g_3$ | $-h_3$ | $+i_3$ |
| Line 6 | $+a_3$ | $-b_3$ | $+c_3$ | $-d_3$ | $+e_3$ | $-f_3$ | $+g_3$ | $-h_3$ | $+i_3$ |
| Line 7 | $-a_4$ | $+b_4$ | $-c_4$ | $+d_4$ | $-e_4$ | $+f_4$ | $-g_4$ | $+h_4$ | $-i_4$ |
| Line 8 | $-a_4$ | $+b_4$ | $-c_4$ | $+d_4$ | $-e_4$ | $+f_4$ | $-g_4$ | $+h_4$ | $-i_4$ |
| Line 9 | $+a_5$ | $-b_5$ | $+c_5$ | $-d_5$ | $+e_5$ | $-f_5$ | $+g_5$ | $-h_5$ | $+i_5$ |
| ⋮ | ⋮ | ⋮ | ⋮ | ⋮ | ⋮ | ⋮ | ⋮ | ⋮ | ⋮ |

OFF state

ON state

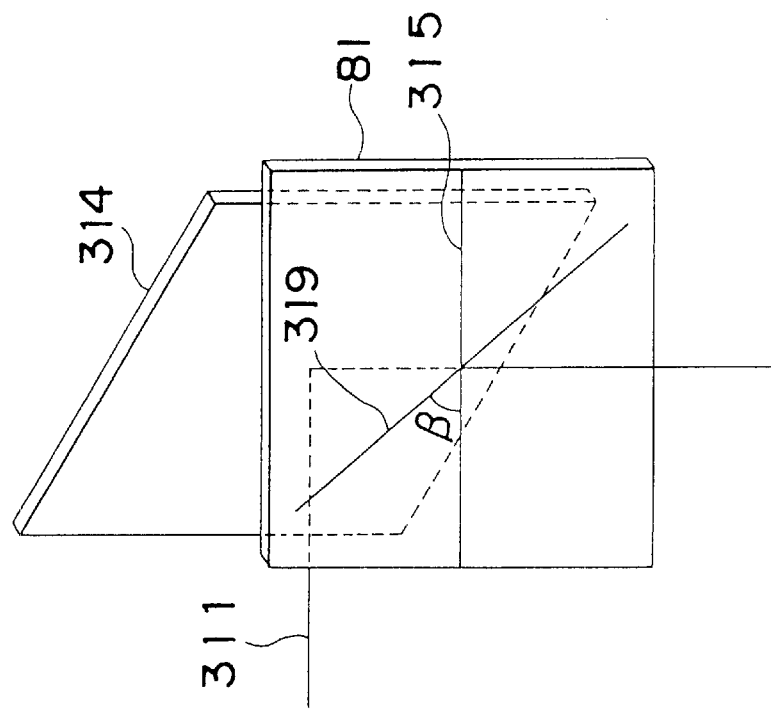
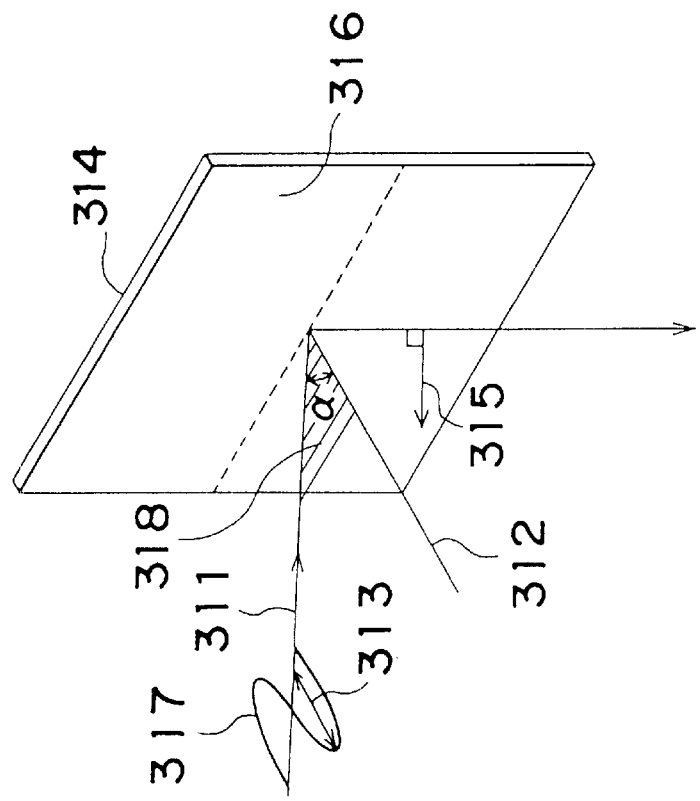

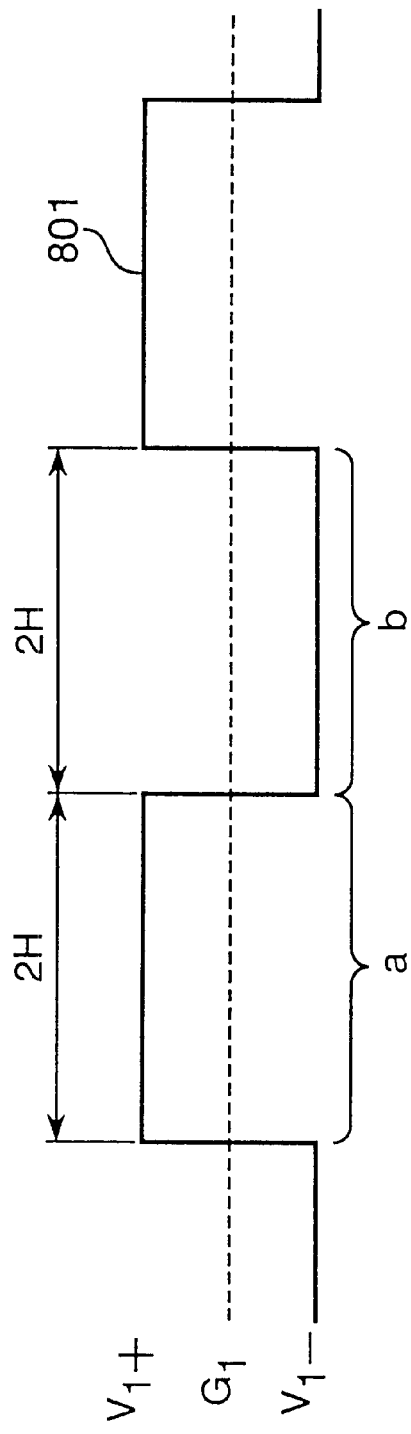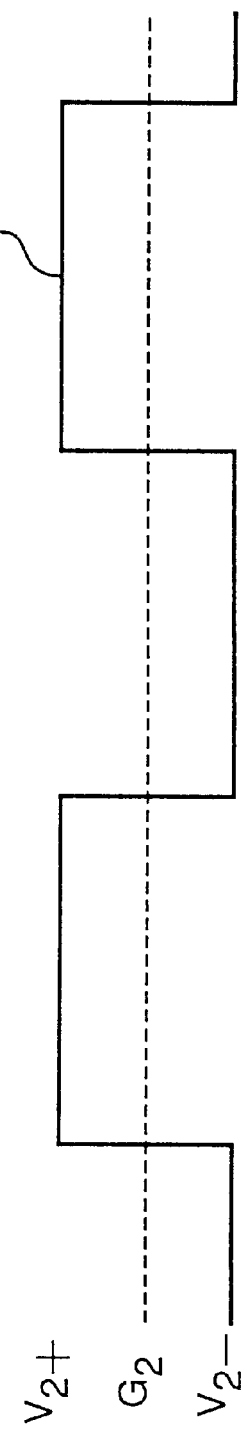
Fig.46A
Fig.46B

Fig.60
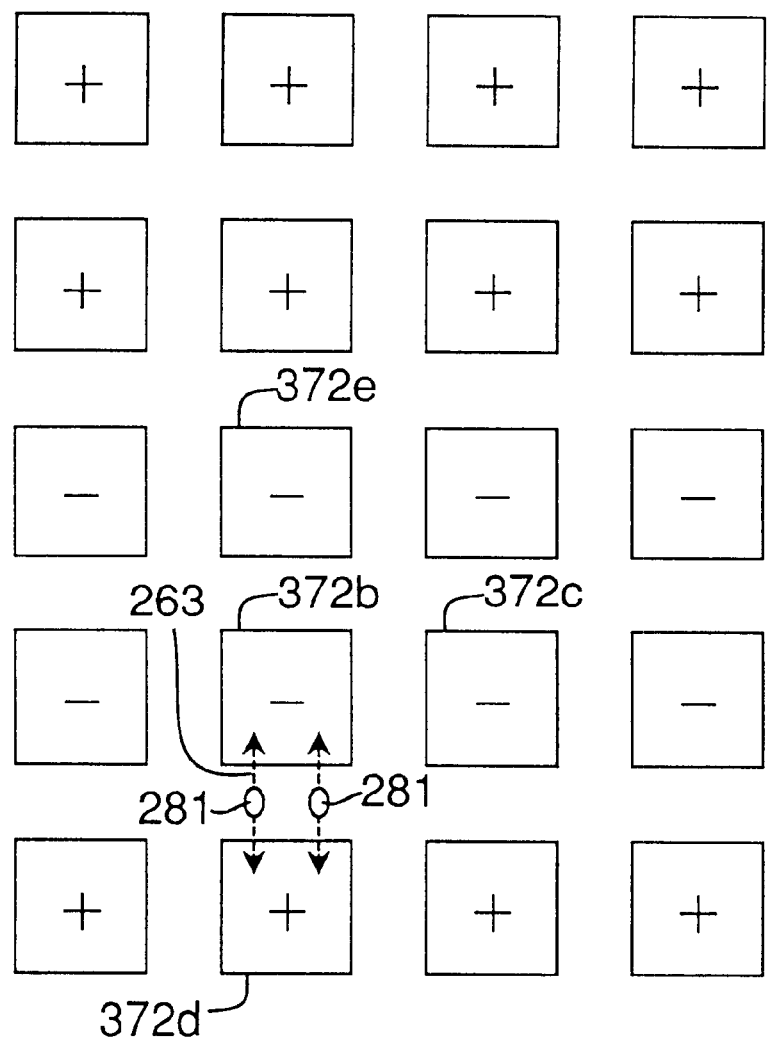
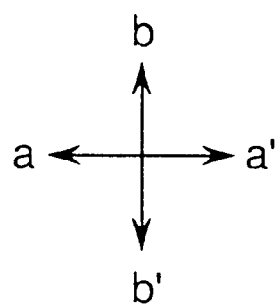

METHOD AND DEVICE FOR DISPLAYING IMAGE SIGNALS AND VIEWFINDER

BACKGROUND OF THE INVENTION

1. Field of the Invention

The present invention relates to a method for displaying an image signal that is suited for such matrix type display devices in which pixels are arranged into a matrix form in lines and columns. The present invention further relates to a display device for magnifying and projecting onto a screen, an image that has been displayed on a small-size liquid crystal display device, to a display device to be used as a monitor for a video camera, and to a display device to be used as a light valve of the aforementioned various display devices.

2. Description of the Prior Art

LCDs (Liquid Crystal Displays) have been aggressively researched and developed because of their many features such as being light weight and having a small thickness. However, they have a few drawbacks including a difficulty in increasing their size into large screens. Therefore, in recent years, much attention has been rapidly and increasingly focused on projection type display devices which magnify and project an image displayed by a small LCD by means of a projection lens or the like to obtain a large-screen display image. A display device for magnifying and projecting onto a screen an image that has been displayed on a small-size liquid crystal display device (hereinafter, referred to as projection type display device) commercially available at present uses a twist nematic (hereinafter, referred to as TN) LCD that takes advantage of the rotary polarization characteristic of liquid crystals.

Active-matrix type LCDs have been advanced to higher densities and increased numbers of pixels so that they are utilized as data display use displays for personal computers and workstations, and also as audio-visual displays of the standard system (NTSC) and HDTV system. Further, as the active-matrix type LCD has been increased in the number of pixels, a demand has also grown for higher speeds of the operating clock of source drive (data line drive) ICs. As a result, source drive ICs of high-speed operating clocks are under development, while proposed are methods in which a plurality of source drive ICs are operated in parallel and source lines of plurally divided screen areas are driven at the same time.

Twisted nematic liquid crystal devices are known as one of such display devices. Thin film transistors as active elements are driven by a source driver IC and a gate driver IC. If necessary, a plurality of source driver ICs are used. However, at joints of adjacent source driver ICs there occurs brightness differences due to variations in components for signal processing, resulting in deterioration of the image quality. In order to solve the above problem, a correction circuit may be added for correcting the brightness differences, or the source driver ICs have digital inputs. However, such measures would involve increases in cost, circuit scale, and mounting area around the LCD panel.

Recently, high temperature polysilicon techniques and low temperature polysilicon techniques have been developed, and by using such techniques, the gate driver IC and the source driver ICs can be formed at the same time as the TFTs. An LCD panel involves high cost and difficulties to have a large-area display area, and it is put into practical use as display devices to be used as an image pickup monitor for video cameras (hereinafter, referred to as viewfinder) and the like. A common feature of LCD panels fabricated by the high-temperature polysilicon technique and the low-temperature polysilicon technique is that the gate driver IC and the source driver ICs can be formed on the same substrate as well as the TFTs simultaneously. Therefore, there is no need of mounting the gate driver IC and the source driver IC on the LCD panel after the LCD panel is fabricated. It is also unnecessary to additionally fabricate the source driver IC or the like. Thus, the cost of the LCD panel can be reduced.

However, there still remains a problem of low upper-limit operating speed of the source driver circuit and the like formed directly on the LCD panel. The range of operating frequency in which the source driver circuit and the like operate stably is generally from 1 to 3 MHz. This requires a shift register and the like in the source driver circuit to be provided in a multi-stage arrangement. If the operating frequency of the shift register is 2 MHz while the LCD panel needs to be operated at 40 MHz, then a frequency division by 40/2=20 is required. This means that the shift register needs to be provided in 20 lines. The larger the number of shift registers, the larger the area occupied by the shift registers and the larger the number of defects that occur in the fabricating process. Therefore, this is not favorable.

As described above, LCD panels fabricated by the polysilicon technique, particularly by the low-temperature polysilicon technique, have an advantage of high feasibility of low prices, thus promising as display monitors for future personal computers and workstations. On the contrary, they are difficult to realize higher-speed driving (higher data rate or wider band). Therefore, it is desirable that wideband (high data rate) progressive scanning image signals of personal computers, workstations, and the like, can be displayed onto a display such as matrix type LCD panels which is poor at high-speed scanning, as mentioned above, but has advantages of simplicity and a low price, without causing any deterioration of image quality.

SUMMARY OF THE INVENTION

An object of the present invention is to provide a method for displaying image signals and a device therefor, which method and device can display wideband (high data rate) progressive scanning image signals onto a display which is poor at high-speed scanning, such as matrix type LCD panels, without causing any deterioration of image quality.

Another object of the present invention is to provide a projection type display apparatus or the like using the above-mentioned method and device.

In one aspect of the invention, first, odd-line signals are extracted from progressive scanning image signals in a first frame, and the extracted,signals are displayed onto odd lines in a display panel with a dot matrix. Subsequently, even-line signals are extracted from progressive scanning image signals in a second frame consecutive to the foregoing first frame, and the extracted signals are displayed onto even lines in the display panel. Thus, an image of one frame is displayed in the display panel in two frame periods. If one frame is provided each 1/60 second, an image is displayed each 1/30 second.

In a second aspect of the invention, first, odd-line signals are extracted from progressive scanning image signals in a first frame, and each of the extracted signals are displayed onto an odd line and an even, line adjacent to the odd line in the display panel at the same time. Thus, an odd-line signal is displayed along two adjacent lines. Subsequently, even-line signals are extracted from progressive scanning image signals in the second frame consecutive to the foregoing first frame, and each of the extracted signals are displayed onto an even line and an odd lines adjacent to the even line in the display panel at the same time. Thus, an odd-line signal is also displayed along two adjacent lines. Then, for example, first and second line signals are displayed in a second line in the display panel, and second and third line signals are displayed in a third line in the display panel. Thus, an image of one frame is displayed in the display panel in two frame periods.

In a third aspect of the invention, signals of odd-lines $(2n-1)$ are extracted from progressive scanning image signals in a first frame, and pixels in lines $(4n-3)$ of a display panel hold the image signals of a first polarity with, respect to a potential of a counter electrode in a display panel, while pixels in lines $(4n-1)$ hold the image signals of a second polarity, where "n" denotes an integer and the first polarity is positive polarity or negative polarity while the second polarity is a polarity opposite to the first polarity. Subsequently, signals of even-lines $2n$ are extracted from progressive scanning image signals in a second frame consecutive to the first frame, and pixels in lines $(4n-2)$ of the display panel hold the image signals of the first polarity, while pixels of lines $4n$ hold the image signals of the second polarity. Thus, an image of one frame is displayed in two frame periods. Further, in a third frame consecutive to the second frame, the pixels in-lines $(4n-3)$ and lines $(4n-1)$ of the display panel hold the image signals in such a way that the image signals have polarities opposite to those of the image signals held in the first frame. Subsequently, in a fourth frame consecutive to the third frame, pixels in lines $(4n-2)$ and lines $4n$ hold the image signals in such a way that the image signals have polarities opposite to those of the image signals held in the second frame. Then, for example, signals of 480 horizontal scan lines can be displayed in a display panel having 960 lines.

In a fourth aspect of the invention, wherein a period consists of four fields, image signals are extracted from interlace scanning image signals in a first field, and pixels of lines $(4n-3)$ and $(4n-2)$ in the display panel hold image signals of the first polarity, while pixels of lines $(4n-1)$ and $(4n)$ hold image signals of the second polarity. Subsequently, image signals are extracted from interlace scanning image signals in a second field consecutive to the first field, and pixels of lines $(4n-2)$ and $(4n-1)$ hold image signals of the first polarity, while pixels of lines $(4n)$ and $(4n+1)$ hold image signals of the second polarity. Further, in a third field consecutive to the second field, the pixels of the display panel hold image signals in such a way that the image signals have polarities opposite to those of the image signals held in the first field. Subsequently, in a fourth field consecutive to the third field, the pixels hold image signals in such a way that the image signals have polarities opposite to those of the image signals held in the second field.

In a fifth aspect of the invention, it is assumed that if "n" denotes an integer, then a first polarity is positive polarity or negative polarity while a second polarity is a polarity opposite to the first polarity. First, image signals are extracted from progressive scanning image signals in a first frame, and pixels of lines $(4n-3)$ and $(4n-2)$ of the display panel hold first image signals of the first polarity, while pixels of lines $(4n-1)$ and $(4n)$ hold second image signals of the second polarity. Subsequently, image signals are extracted from progressive scanning image signals in a second frame consecutive to the first frame, and pixels of lines $(4n-3)$ and $(4n-2)$ hold third image signals of the second polarity, while pixels of lines $(4n-1)$ and $(4n)$ hold fourth image signals of the first polarity. By the above two frame periods, one-frame image information is displayed in the display panel.

In a sixth aspect of the present invention, it is assumed that if "n" denotes an integer, then a first polarity is positive polarity or negative polarity while a second polarity is a polarity opposite to the first polarity. First, image signals are extracted from interlace scanning image signals in a first field, and pixels of lines $(8n-7)$ and $(8n-6)$ on the display means hold first image signals of the first polarity, while pixels of lines $(8n-5)$ and $(8n-4)$ hold the first image signal of the second polarity, and pixels of $(8n-3)$ and $(8n-2)$ hold second image signals of the first polarity, while pixels of lines $(8n-1)$ and $(8n)$ hold the second image signals of the second polarity. Subsequently, image signals are extracted from interlace scanning image signals in a second field consecutive to the first field, and pixels of lines $(8n-5)$ and $(8n-4)$ hold third image signals of the first polarity, while pixels of lines $(8n-3)$ and $(8n-2)$ hold the third image signals of the first polarity, and in which pixels of lines $(8n-1)$ and $(8n)$ holds fourth image signals of the second polarity, while pixels of lines $(8n+1)$ and $(8n+2)$ hold the fourth image signals of the first polarity. Thus, an image of one frame is displayed in two field periods.

In a seventh aspect of the invention, a projection type display apparatus uses, as a light valve, a display device (display panel or the like) to which an image display device according to the present invention or an image signal display method according to the present invention is applied. Preferably the image display device or the display device is arranged each one for three optical paths of red (R), green (G), and blue (B). Among these three image display devices, the phase of a signal applied to an arbitrary line of one display device is opposite to the phase of a signal applied to the same line of another display device.

A display device according to a first aspect of the present invention comprises pixel electrodes arranged in a matrix form and a polarization plate placed on at least one of an incident surface or an outgoing surface of light. The display device further comprises, for the pixel electrodes, a drive means for applying a signal to the pixel electrodes in such a way that the pixel electrodes arranged in a matrix form are brought into either a first state that their polarities are different alternately in the unit of one line or a plurality of lines, or a second state that their polarities are different alternately in the unit of one column or a plurality of columns.

The polarization axis of the polarizing plate is so oriented as to be generally coincident with the direction of the columns for the first state, or with the direction of the lines for the second state. Also, when no polarizing plate is used, the signal lines are coated with a low dielectric film or a resin light-shielding film.

The display device according to a second aspect of the present invention comprises a color filter corresponding to the pixel electrodes, and a dielectric thin film formed on the opposite electrode or the pixel electrode in correspondence to the colors of the color filters. The dielectric thin film absorbs light of the ultraviolet region. The absorbency of each dielectric thin film for ultraviolet rays is varied by varying the thickness of the dielectric thin films depending on the color of the color filters. When a color filter is blue, the dielectric thin film is relatively thin, and when a color filter is red, the dielectric thin film is relatively thick. As a result of this, in manufacturing processes of the display device, the differences in film thickness among the dielectric thin films allow the quantity of ultraviolet rays incident on the liquid crystal layer to be varied, so that liquid crystal droplets can be provided in such sizes as to correspond to the individual color filters and offer an optimum scattering characteristic.

A display device according to a third aspect of the present invention comprises transparent electrodes arranged in a matrix form, and light-absorbing films of black or the like formed at a lower layer under the transparent electrodes. When the liquid crystal layer is in a transparent state, the light-absorbing films are recognized via the liquid crystal layer and the transparent electrodes (black display). When the liquid crystal layer is in a scattering state, only the scattering state of the liquid crystal layer is recognized (white display). Preferably, switching devices such as TFTs are formed under the transparent electrodes. The light-absorbing films are patterned opposite to the pixel configuration, and the TFTs have insulating films formed thereon.

An advantage of the image display method of the present invention is that progressive scanning image signals can be displayed at a half of a speed of the as-received signals.

Another advantage of the image display method of the present invention is that interlace scanning image signals can be displayed at a half of a speed of the as-received signals.

A further advantage of the image display method of the present invention is that a structure of a driving circuit can be simplified.

A different advantage of the image display method of the present invention is that image signals can be displayed in a display device having a larger number of horizontal scan lines than that of the signals.

An advantage of a liquid crystal display of the present invention is that light leakage near pixel electrodes due to a lateral electric field can be prevented.

BRIEF DESCRIPTION OF THE DRAWINGS

These and other objects and features of the present invention will become clear from the following description taken in conjunction with the preferred embodiments thereof with reference to the accompanying drawings, and in which:

FIG. 1A is a diagram of a displayed image on the display of progressive scanning image signals in a first field, FIG. 1B is a diagram of a-displayed image on the display of progressive scanning image signals in a second field, and FIG. 1C is a diagram of an displayed image according to a first image signal display method of the present invention;

FIG. 14 is a diagram in a first frame in column inversion drive;

FIG. 15 is a diagram in a second frame in column inversion drive;

FIG. 17 is a diagram for explaining a fifth image signal display method;

FIG. 18 is a diagram for explaining a fifth image signal display method for workstations and the like;

FIG. 19 is a diagram for explaining a fifth image signal display method for NTSC standard;

FIG. 20 is a diagram for explaining an image signal display method having the same data transfer rate as that shown in FIG. 17;

FIG. 21 is a diagram for explaining a seventh image signal display method;

FIG. 31A and FIG. 31B are diagrams for defining P-polarized light and S-polarized light;

FIGS. 46A and 46B are timing charts of an image signal processing system;

FIG. 60 is a diagram of pixel electrodes for explaining alignment of molecules along a lateral electric field;

DETAILED DESCRIPTION OF THE PREFERRED EMBODIMENTS

Figure 2A:
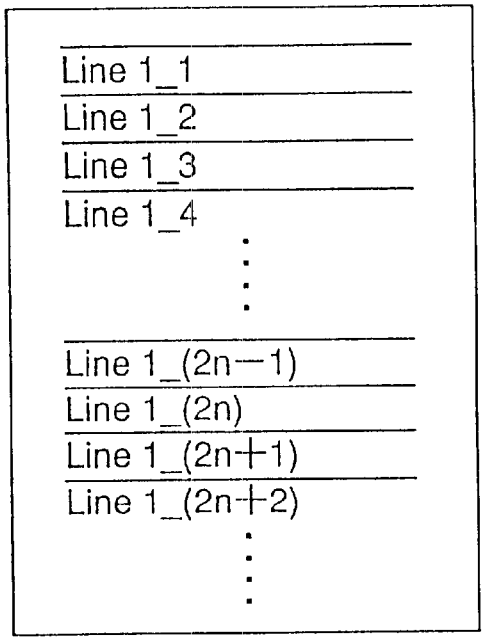
FIG. 2A is a diagram of a displayed image on the display of progressive scanning image signals in a first field.

Referring now to the drawings, wherein like reference characters designate like or corresponding parts throughout the accompanying views, first, image display methods are explained with reference to accompanying drawings.

Figure 2B:
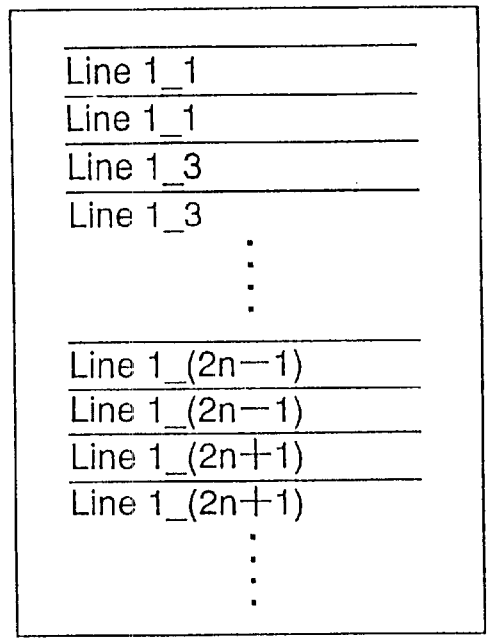
FIG. 2B is a diagram of a displayed image according to a first image signal display method of the present invention.
Figure 2C:
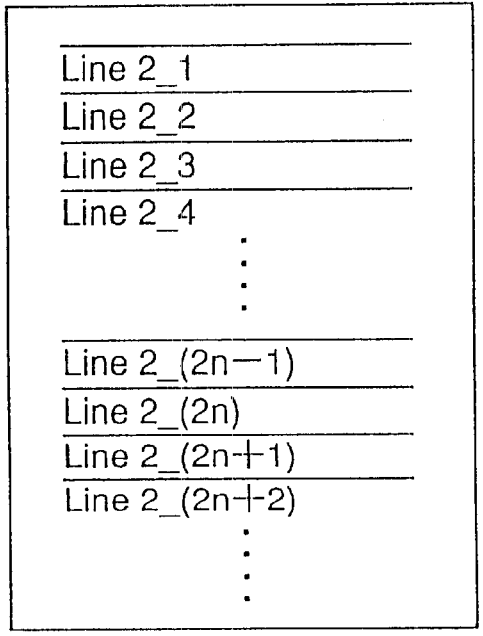
FIG. 2C is a diagram of a displayed image on the display of progressive scanning image signals in a second field.

In the present invention, three kinds of image display methods are used to display an image in a display device having dots or pixels arranged in a matrix form. A first display method and a second display method are different from each other, and one of them is adopted. In a third display method, either of them can be selected in correspondence to input signals or with a key-input for selecting a display method. FIGS. 1A–1C show the first display method, while FIGS. 2A–2C show the second display method. It is noted that progressive scanning image signals form one frame by one field, meaning that 1 field=1 frame. Meanwhile, the interlace signals form one frame by two fields, meaning that 2 fields=1 frame. Hereinbelow, the terms of field and frame are used basically in different senses but treated as synonyms of each other depending on the context of description.

First, the first display method is explained. FIG. 1A shows an image obtained when a first frame of input progressive scanning image signals are displayed onto a display, while FIG. 1B shows an image obtained when a second frame of input progressive scanning image signals are displayed onto a display. It is noted that the first and second frames are consecutive frames. A first line of the first frame (line 1_1) of the input progressive scanning image signals is first selected, and expanded twofold on time base, so that it is displayed onto a first line on the display as shown in FIG. 1C. Next, a third line of the first frame (line 1_3) is selected and expanded twofold on time base, so that it is displayed onto a third line on the display, as shown in FIG. 1C. Similarly, only odd lines of the first frame as a fifth line, a seventh line, and so forth are selected one after another, and expanded twofold on time base so that they are displayed onto the odd lines on the display.

Meanwhile, in a second frame consecutive to the first frame, only even lines are selected and expanded twofold on time base so that they are displayed onto even lines on the display. For example, a second line of the first frame (line 2_2) of the input progressive scanning image signals is first selected, and expanded twofold on time base, so that it is displayed onto a second line on the display as shown in FIG. 1C. As a result, one frame consisting of the odd lines of the first frame and the even lines of the second frame is displayed on the display as shown in FIG. 1C. The steps as described above are effected also on third and fourth frames, and repeated thereafter.

As described above, only two frame periods of an input progressive scanning image signal are required to display one frame consisting of the odd lines of the first frame and the even lines of the second frame. This enables an image to be displayed at a half of a speed when the input progressive scanning image signals are displayed continuously as shown in FIGS. 1A and 1B.

This means that it is no longer necessary to drive the LCD panel by using parallel drivers in contrast to the prior art. Accordingly, brightness differences due to division of drivers can be prevented. Further, when the source drivers or the like are formed directly on an LCD panel by using a polysilicon technique, the clock frequency of the shift registers and the like can be reduced by a factor of ½. This means that the number of shift registers provided in parallel can be reduced by a factor of ½. In addition, if the number of shift registers provided in parallel can be reduced by a factor of ½, the 40 MHz image signal can be sample-and-held by ten parallel shift registers for example by using a frequency of an image signal of 40 MHz and an operation frequency of the shift registers of 4 MHz. Therefore, by applying the present display method, five parallel shift registers will suffice if the clock rate of the shift registers can be reduced to ½. If the number of shift registers provided in parallel can be reduced by a factor of ½, occurrence of defects in the shift registers and the like can be reduced so that the production yield of display panels is improved. Besides, operations at a half speed become possible, so that the power consumption can be reduced to a large extent.

In the above-mentioned example, odd lines in the LCD panel are displayed in the first frame, while even lines in the LCD panel are displayed in the second frame. However, this is for convenience of explanation. If the first frame of progressive scanning image signals provide data of even lines, the even lines are displayed in the even lines in the LCD panel naturally. Also, although the first frame has been displayed from the first line, this is not limitative. The first line is used for easy understanding of the explanation. For example, the display may be started form the seventh line. In the above-described case, the first to sixth lines result in black display. The above description up to this point also applies to the image display methods and display devices described herein and in claims for the present invention.

Further, the display methods of the invention relate to display methods and the like, and they are not limited to any display device. Therefore, hereinafter, the terms of source driver circuit and gate driver circuit will be used as a concept that includes driver circuits formed by the polysilicon technique.

Figure 2D:
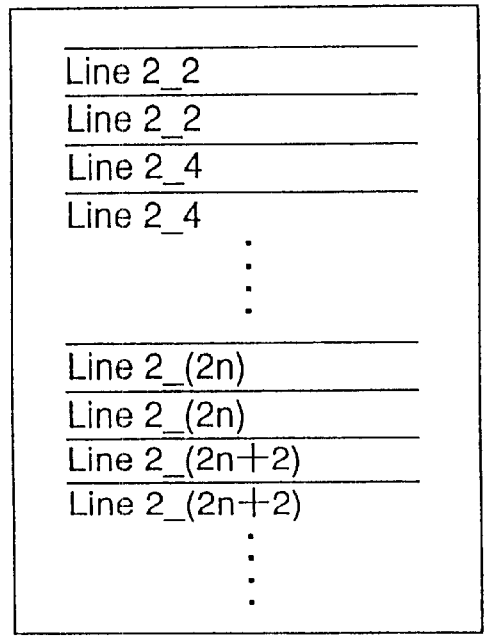
FIG. 2D is a diagram of a displayed image according to a second image signal display method of the present invention.

Next, the second display method is explained. FIG. 2A shows an image obtained when the first frame of input progressive scanning image signals is displayed continuously onto a display, while FIG. 2B shows an image obtained when the second frame of the input progressive scanning image signal is displayed continuously onto the display. A first line of the first frame (line 1_1) of the input progressive scanning image signals is first selected, and expanded twofold on time base, so that it is displayed onto first and second lines on the display at the same time, as shown in FIG. 2B. Next, a third line of the first frame (line 1_3) is selected and expanded twofold on time base, so that it is displayed onto the third and fourth lines on the display at the same time. Thereafter, only odd lines of the first frame as fifth line, seventh line, and so on are selected one by one and expanded twofold on time base, so that they are displayed onto the odd lines and their adjacent even lines, simultaneously, on the display. As a result, an image shown in FIG. 2B is obtained. Meanwhile, in a second frame, only even lines are selected one by one and expanded twofold on time base, so that they are displayed onto the even lines and their adjacent odd lines, simultaneously, on the display. For example, a second line of the second frame (line 2_2) of the input progressive scanning image signals is selected and displayed onto the first and second lines on the display at the same time. As a result, an image as shown in FIG. 2D is obtained. The steps as described above are repeated on third and fourth frames, and so on. As seen above, only two line periods of input progressive scanning image signals are required to display one frame consisting of the odd lines of the first frame and the even lines of the second frame. This enables an image to be displayed at a half of a speed when the input progressive scanning image signals are displayed continuously.

Among the two display methods, the first display method is preferable for still pictures, while the second display method is preferable for motion pictures. A still image has an image that will not move, so that its non-continuity of the image in the vertical direction is more likely to be discerned than in a motion picture. On this account, it is desirable to ensure the apparent vertical resolution for still pictures, by performing interframe interpolation in the first display method. Meanwhile, a motion picture has intense time variations of the image, so that a motion picture, to which the first display method is applied, would cause so-called motion-picture blurs (jerkiness, interferences and the like). On this account, it is desirable to prevent the occurrence of blurs for motion pictures, by performing intraframe interpolation by the second method. The circuit for selecting either the first display method or the second display method will be described later by using FIG. 9.

In addition, as to the first display method, if a display time (light-emitting time) is as short as a few milliseconds to a few tens of milliseconds as in CRT displays, flickers may happen when the frame period of input progressive scanning image signals is, for example, 60 Hz or the display period of the same line is 30 Hz. However, in displays such as active-matrix type LCDs that hold an image display until the image is refreshed, a full scanning line interpolation is performed.

On the other hand, the second method can be easily implemented by using an electron gun of a multi-gun structure (for example, using two electron guns) for a CRT display, or by making two lines of the gate lines active at the same time for an active-matrix type LCD.

Before the image signal display methods will be explained further in more detail, an image signal display device is described here. That is, because the image signal display methods have a close relation to the display device, better understanding of the operation of the display device can be considered to make it easy to understand the description of the polarity of voltages applied to the pixel electrodes or the like.

Figure 3:
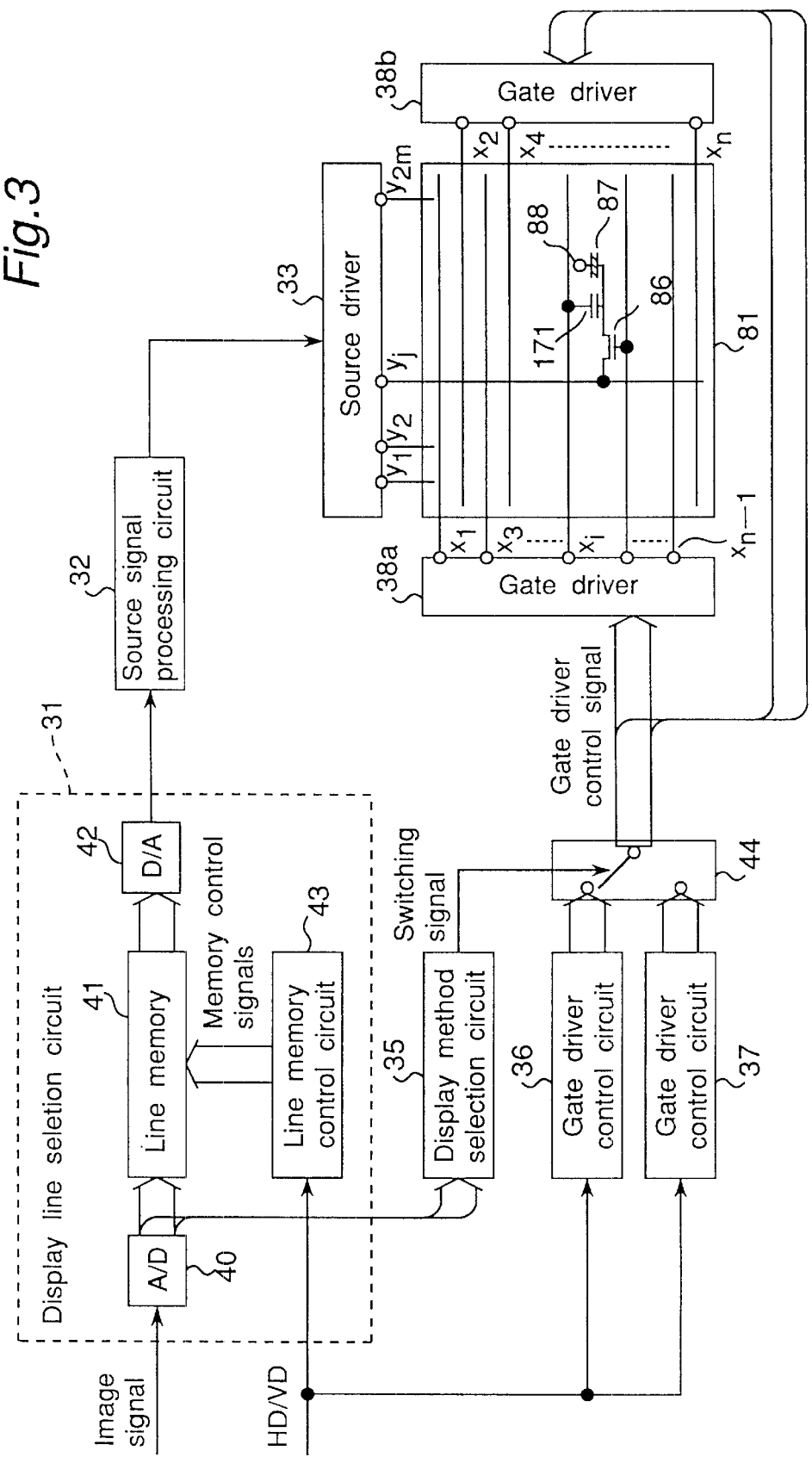
FIG. 3 is a block diagram of an image signal display device using an active-matrix type LCD panel.

FIG. 3 shows an image signal display device of an embodiment of the present invention. In the image signal display device, a display line selection circuit 31 selects a display line and expands an image signal on time base. A source signal processing circuit 32 performs primarily γ-correction and conversion to alternating current to thereby convert an image signal into a signal suited for liquid crystal drive. In an LCD panel 81, a plurality of pixels are arranged in a dot matrix form. A source driver 33 applies a voltage to liquid crystals 87 in the LCD panel 81 connected to the source lines of the LCD panel 81. Gate driver control circuits 36, 37 generate control signals (GCK1, GCK2, GST1, GST2, GEN1, GEN2) in response to a horizontal start pulse HD and a vertical start pulse VD. A gate driver 38 is operated based on the control signals derived from the gate-driver control circuits 36, 37. A display method selection circuit 35 selects either one of the gate-driver control circuits 36, 37 depending on the type of an image (whether the image is a still image or a motion image). A selector 44 switches outputs of the gate-driver control circuit 36 or the gate-driver control circuit 37 in response to a select signal derived from the display method selection circuit 35, and then sends the selected output to the gate driver 38.

The display line selection circuit 31 includes an A/D converter 40, a line memory 41 for storing a video signal of one scanning line, a D/A converter 42, and a line memory control circuit 43 for generating memory control signals (WCK, WEN, RCK) in response to a horizontal start pulse HD and a vertical start pulse VD to control the operation of the line memory 41. The source drive circuit 33 includes a 2m-bit shift register and a sample and hold circuit group having 2m sample and hold circuits.

Gate drivers 38a, 38b are identical on arrangement and function to each other. However, the first gate driver 38a is connected to odd-numbered gate lines of the LCD panel 81, so as to make the odd-numbered gate lines active one by one. Also, the second gate driver 38b is connected to even-numbered gate lines of the LCD panel 81, so as to make the even-numbered gate lines active one by one.

Figure 4:
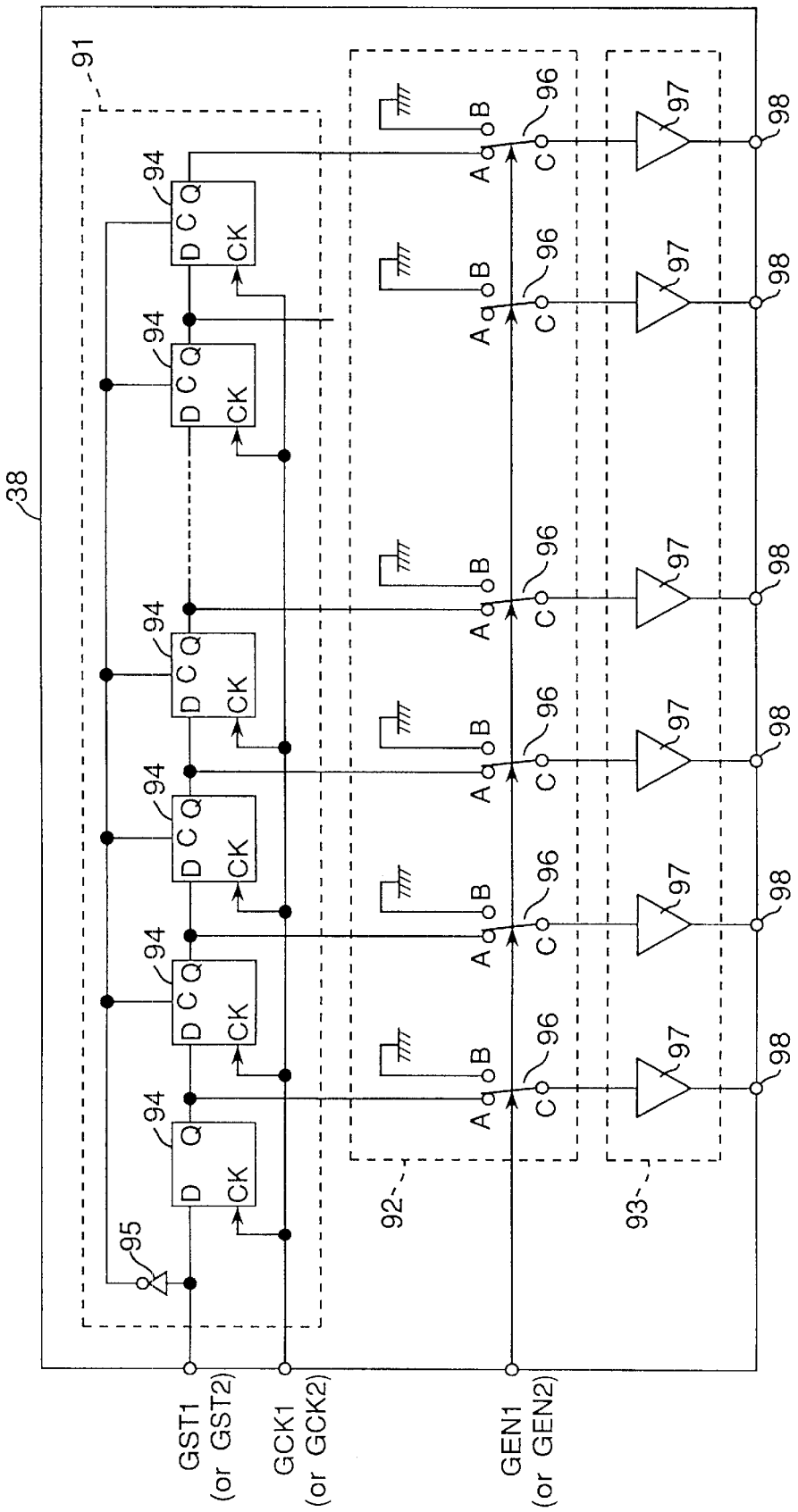
FIG. 4 is a block diagram of a gate driver.

FIG. 4 shows the gate driver 38 in detail. The gate driver 38 comprises a n/2-bit (where n is the number of gate lines of the LCD panel 81) shift register 91, a selector switch group 92 having n/2 of selector switches 96; and an output buffer group 93 having n/2 of output buffers 97. The shift register 91 has n/2 of D flip-flops 94 and one inverter 95.

The start signal GST1 (or GST2) is fed to a data input terminal D of the first D flip-flop 94, while the signal is reversed in polarity by the inverter 95 and fed to the clear terminals C of the second and following D flip-flops 94. The clock signal GCK1 (or GCK2) is fed to the clock terminals CK of the individual D flip-flops 94. Moreover, the data input terminals D of the second and following D flip-flops 94 are fed from Q outputs of their preceding-stage D flip-flops 94. In the shift register 91 explained above, a Q output of the k-th D flip-flop 94 (k=1 to n/2) is extracted as a k-th bit signal and fed to A terminal of the k-th selector switch 96 within the selector switch group 92.

Terminal B of each selector switch 96 is connected to the ground. Output terminal C of each selector switch 96 is connected to A terminal when the enable signal GEN1 (or GEN2) is at high level, and connected to terminal B when it is at low level. Signals outputted from the output terminals C of the selector switches 96 are fed to output pins 98 via their corresponding output buffers 97 within the output buffer group 93. The output pins 98 are connected to their corresponding gate lines of the LCD panel 81, respectively.

Figure 5:
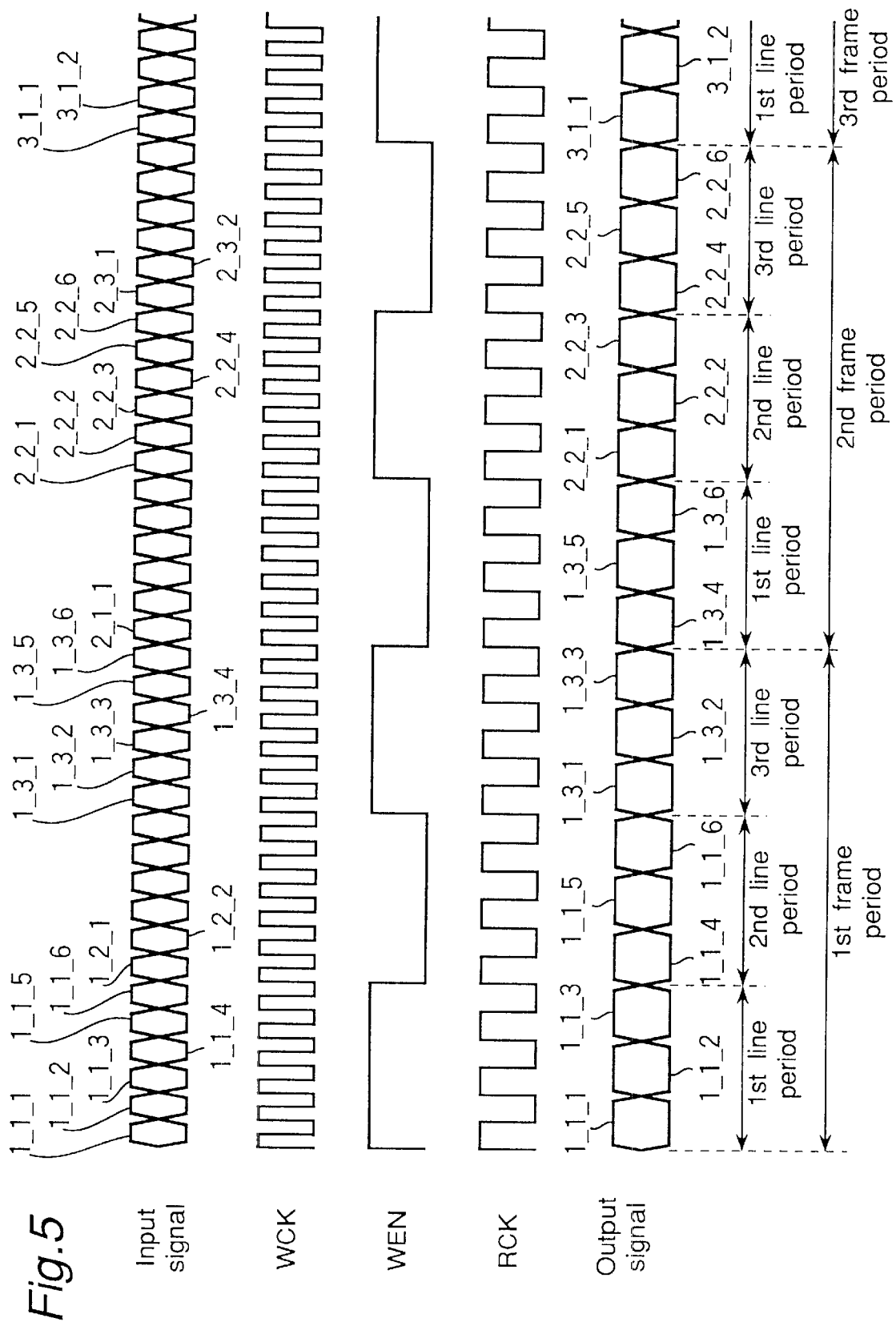
FIG. 5 is a timing chart of memory control signals to be inputted to line memories shown in FIG. 3 and input/output video signals thereof.

The operation of the image signal display device is described below. FIG. 5 shows a timing chart of memory control signals to be inputted to the line memory 41 and input/output image signals of the line memory 41. Referring to FIG. 5, the drive control operation for the source lines is explained. A progressive scanning image signal inputted to the display line selection circuit 31 is first converted into a digital image signal by the A/D converter 40. The line memory 41 gets the digital progressive scanning image signal at a timing synchronized with a write clock signal WCK while the write enable signal WEN is at high level. That is, the first line of the first frame is acquired in synchronization with the write clock signal WCK since the write enable signal WEN is at high level, and the second line of the first frame is not acquired since the write enable signal WEN is at low level. By repeating the above operation, the odd lines of the first frame are obtained into the line memory 41 in succession.

Similarly, the first line of the second frame is not acquired since the write enable signal WEN is at low level, and the second line of the second frame is acquired in synchronization with the write clock signal WCK since the write enable signal WEN is at high level. By repeating the above operation, the even lines of the second frame are acquired into the line memory 41 in succession.

Further, by repeating the above operations in the unit of frame, the odd lines of odd-numbered frames and the even lines of even-numbered frames are acquired into the line memory 41 in succession. The digital image signals acquired into the line memory 41 are read in synchronization with the read clock signal RCK having a frequency ½ that of the write clock signal WCK. Signals outputted from the line memory are digital signals in which the odd lines of odd-numbered frames and the even lines of even-numbered frames of the acquired progressive scanning image signal have been expanded twofold on time base. The signals are converted into analog signals by the D/A converter 42.

Next, the source signal processing circuit 32 executes γ-correction on the progressive scanning image signal, in which selected lines have been expanded twofold on time base, and then reverses the polarity alternately of the frames for the ac drive of the LCD panel 81 and feeds it to the source driver 33.

The source driver 33 writes and holds the input image signal into the sample and hold circuits (not shown) within the driver. In this process, since the signal inputted to the source driver 33 is a progressive scanning image signal expanded twofold on time base, the write clock to the sample and hold circuits, which is generated by the shift register, is only required to be ½ that for such signals not expanded on time base.

When a gate line $x_i$ of the LCD panel 81 is activated by the gate driver 38 so that the TFT 86 is turned on, image data held by the sample and hold circuits are applied to the liquid crystal cells 87 via a source line $y_j$. As a result, one-scanning-line image signals are written into the LCD panel 81. By repeating the above operation and by the gate driver 38 scanning the gate lines, an image is obtained on the LCD panel 81.

Next, the drive control operation for the gate lines is described. The scanning of the gate lines depends on gate-driver control signals (GCK1, GST1, GEN1 or GCK2, GST2, GEN2) outputted from the first gate-driver control circuit 36 or the second one 37. As described before, the gate drivers 38a and 38b are circuits having the same function, and make the gate lines of the LCD panel 81 active successively and selectively under the control of the gate-driver control signals.

In the gate driver 38, when the start signal GST1 (or GST2) is at high level, the internal shift register 91 (see FIG. 4) is reset on the rising-edge of the clock signal GCK1 (or GCK2) (at a time point when it makes a low to high transition) so that the first gate line is selected (retraced). Likewise, the second, third and forth gate lines are successively selected at each rising edge of the clock signal GCK1 (or GCK2). Then, when the enable signal GEN1 (or GEN2) is at high level, the signal is outputted to the selected gate lines, so that the gate lines are activated. As a result, the TFTs 86 connected to the selected gate lines are turned on. When the enable signal GEN1 (or GEN2) is at low level, no signal is outputted to the selected gate lines so that the gate lines are not activated. Therefore, the TFTs 86 connected to the gate lines are in the off state. It is noted that the first gate driver 38a is connected to the odd-numbered gate lines of the LCD panel 81 while the second gate driver 38b is connected to the even-numbered gate lines.

Figure 6:
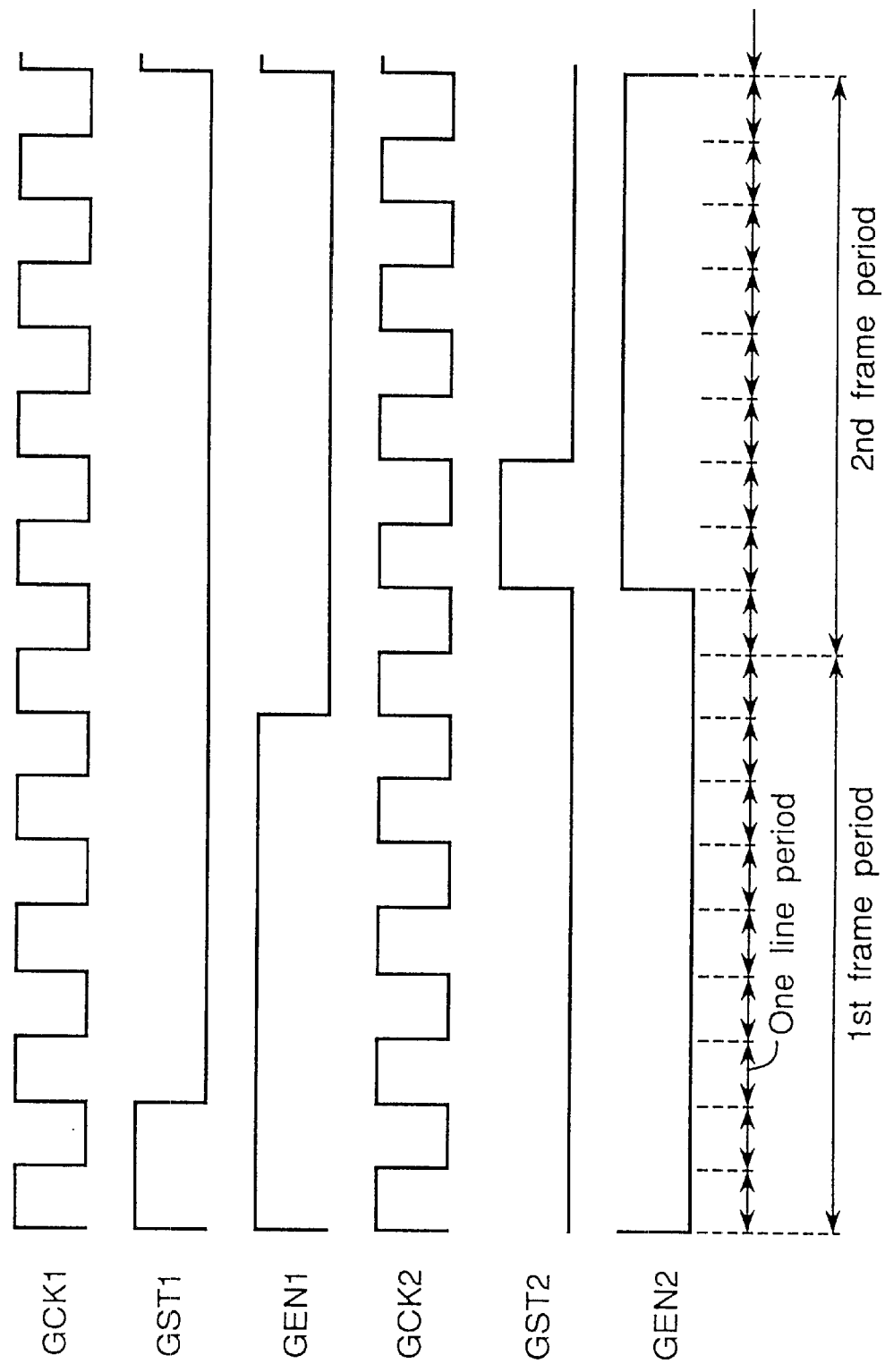
FIG. 6 is a timing chart of gate driver control signals to be inputted from a gate driver control circuit to gate drivers.
Figure 7:
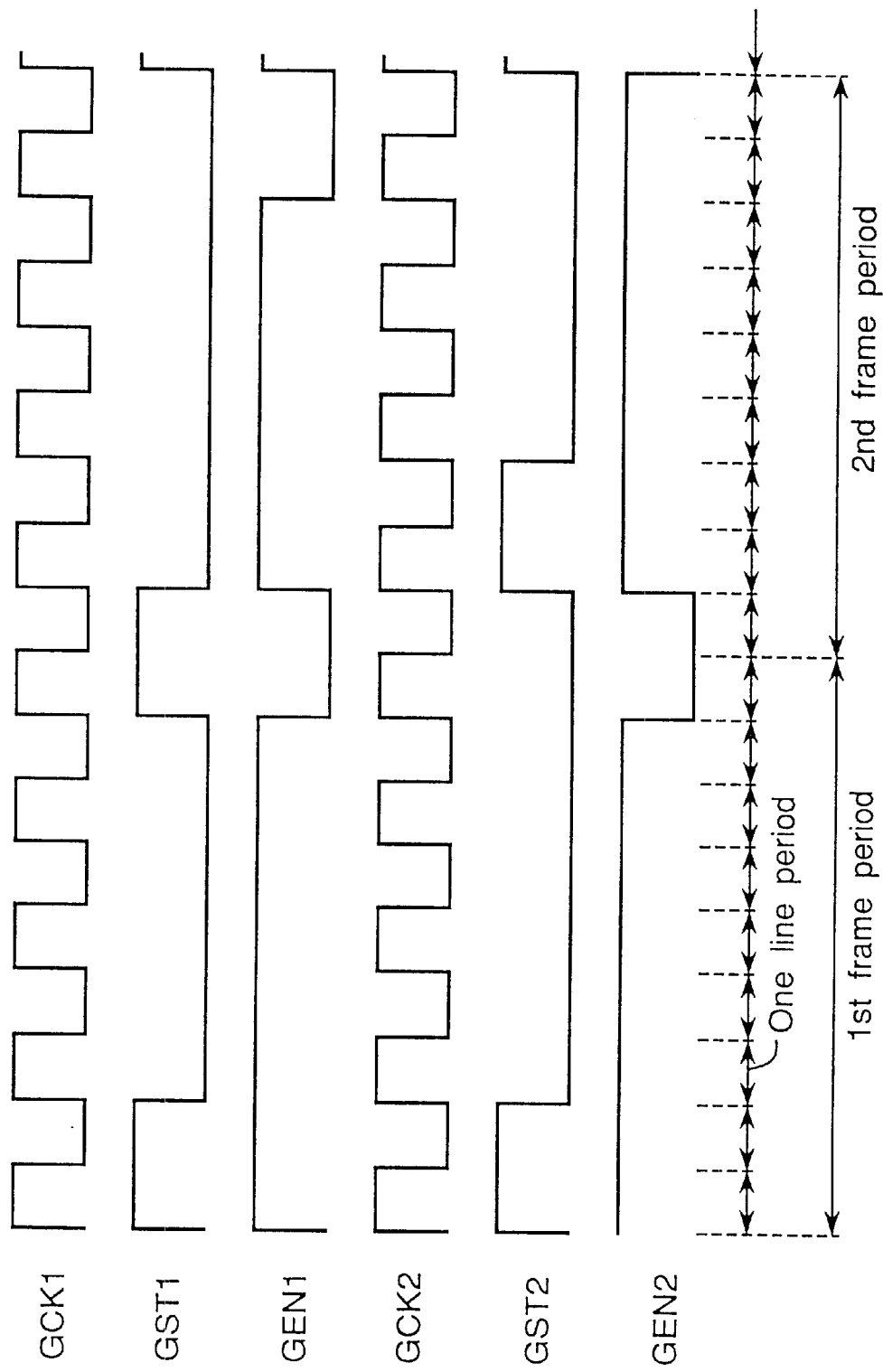
FIG. 7 is a timing chart of gate driver control signals to be inputted from a gate driver control circuit to the gate drivers.

Referring to FIGS. 6 and 7, the drive control operation for the gate lines is described in more detail below. FIG. 6 shows a timing chart of gate-driver control signals outputted from the first gate-driver control circuit 36, and FIG. 7 shows a timing chart of gate-driver control signals outputted from the second gate-driver control circuit 37.

In FIG. 6, the clock signal GCK1, the start signal GST1, and the enable signal GEN1 are gate-driver control signals which are inputted from the first gate-driver control circuit 36 to the first gate driver 38a, while the clock signal GCK2, the start signal GST2, and the enable signal GEN2 are gate-driver control signals which are inputted from the first gate-driver control circuit 36 to the second gate driver 38b.

The clock signal GCK1 goes high level in a cycle of two line periods, the start signal GST1 is at high level at the first line of the first frame, and the enable signal GEN1 holds high level for the duration of the first frame (but low level at the last line of the first frame period). Therefore, at the beginning of the first frame, the first gate driver 38a begins to make the first ($x_1$ of FIG. 3) and following gate lines active successively. Since the first gate driver 38a is connected to the odd-numbered gate lines of the LCD panel 81, the odd lines of the LCD panel 81 are made active successively every two line periods for the first frame period. It is noted that, for the second frame period, since the enable signal GEN1 is at low level, the odd lines of the LCD panel 81 are not made active.

Meanwhile, the clock signal GCK2 goes high level in a cycle of two line periods, the start signal GST2 is at high level at the second line of the second frame, and the enable signal GEN2 goes high level at the second line of the second frame. Therefore, at the beginning of the second frame, the second gate driver 38b begins to make the second ($x_2$ of FIG. 3) and following gate lines active successively. Since the second gate driver 38b is connected to the even-numbered gate lines of the LCD panel 81, the even lines of the LCD panel 81 are made active successively every two line periods for the second frame period. It is noted that, for the first frame period, since the enable signal GEN2 is at low level, the even lines of the LCD panel 81 are not made active.

Accordingly, it becomes possible to select only the odd lines of the first frame of the input progressive scanning image signals, and expand them twofold on time base to display them onto the odd lines of the LCD panel 81. It is also possible to select only the even lines of the second frame of the input progressive scanning image signals, and expand them twofold on time base to display them onto the even lines of the LCD panel 81. The above operations are repeated in the unit of two frames.

Referring to FIG. 7, the clock signal GCK1, the start signal GST1, and the enable signal GEN1 are gate-driver control signals which are inputted from the second gate-driver control circuit 37 to the first gate driver 38a, while the clock signal GCK2, the start signal GST2, and the enable signal GEN2 are gate-driver control signals which are inputted from the second gate-driver control circuit 37 to the second gate driver 38b.

In the first frame period, the clock signal GCK1 goes high level in a cycle of two line periods, the start signal GST1 is at high level at the first line, and the enable signal GEN1 holds high level for the duration of the first frame (but low level for the last line period of the first frame period). Therefore, at the beginning of the first frame, the first gate driver 38a begins to make the first ($x_1$ in FIG. 3) and following gate lines active successively. Meanwhile, in the first frame period, the clock signal GCK2 goes high level in a cycle of two line periods, the start signal GST2 is at high level at the first line, and the enable signal GEN2 holds high level for the duration of the first frame period (but low level for the last line period of the first frame period). Therefore, at the beginning of the first frame, the second gate driver 38b begins to make the second ($x_2$ of FIG. 3) and following gate lines active successively.

The first gate driver 38a is connected to the odd-numbered gate lines of the LCD panel 81 while the second gate driver 38b is connected to the even-numbered gate lines of the LCD panel 81. Therefore, in the first frame period, the odd lines and their next adjacent even lines of the LCD panel 81 are made active at the same time every two line periods, and thereafter the odd lines and the even lines are made active at the same time in the unit of two lines in a cycle of two line periods.

On the other hand, in the second frame period, the clock signal GCK1 goes high level in a cycle of two line periods, and the start signal GST2 is at high level at the last line of the first frame. Therefore, the first gate line ($x_1$ in FIG. 3) has been selected for the first line period of the second frame. However, in the first line period of the second frame, since the enable signal GEN1 is at low level, the first gate line is not made active.

Thereafter, the enable signal GEN1 goes high level at the second line period of the second frame. Therefore, at the beginning of the second line period of the second frame, the first gate driver 38a begins to make the third ($x_3$ in FIG. 3) and following gate lines active successively. Meanwhile, the clock signal GCK2 goes high level in a cycle of two line periods, the start signal GST2 is at high level at the second line, and the enable signal GEN2 holds high level since the second line period of the second frame. Therefore, at the beginning of the second line period of the second frame, the second gate driver 38b begins to make the second ($x_2$ in FIG. 3) and following gate lines active successively.

The first gate driver 38a is connected to the odd-numbered gate lines of the LCD panel 81 while the second gate driver 38b is connected to the even-numbered gate lines of the LCD panel 81. Therefore, in the second frame period, the even lines and their next adjacent odd lines of the LCD panel 81 are made active at the same time every two line periods, and thereafter the even and odd lines are made active at the same time in the unit of two lines successively in a cycle of two line periods. Accordingly, it becomes possible to select only the odd lines of the first frame of the input progressive scanning image signals, and expand them twofold on time base to display it onto the odd lines and their adjacent even lines of the LCD panel 81 at the same time. It is also possible to select only the even lines of the second frame of the input progressive scanning image signals, and expand them twofold on time base to display it onto the even lines and their adjacent odd lines of the LCD panel 81. The above operations are repeated in the unit of two frames.

As described above, only two frame periods of the input progressive scanning image signals are required to display one frame consisting of the odd lines of the first frame and the even lines of the second frame by gate-driver control signals of either first or second gate-driver control circuit 36, 37. This enables an image to be displayed at a half of a speed when the input progressive scanning image signals are displayed continuously. Accordingly, it is no longer necessary to drive the LCD panel 81 in division as is the case with the prior art, so that occurrence of brightness differences can be prevented. Further, the number of parallel shift registers of the source driver 33 can be reduced by a factor of a half, so that the power consumption can be reduced.

In the example explained above, the gate driver 38a is connected to odd-numbered gate lines while the gate driver 38b is connected to even-numbered gate lines of the liquid crystal display panel 81, and a gate on voltage is applied to one of the even gate lines and one of the odd lines at the same time during a two line period (2H). However, this causes a problem for a front state gate structure where a capacitor 171 is formed between a gate signal line $X_i$ and a pixel 101 as in a device explained later with reference to FIG. 29. For example, when a gate on voltage $V_g(+)$ is applied to gate signal lines $X_2$ and $X_3$, a thin film transistor 86 is turned on (active state (+)) to write the output of the source driver 33 in a pixel 101. Then, if an output of the source driver 33 has a polarity of +, positive voltages are applied to the two terminals of the capacitor 171, and the gate off voltage $V_g(-)$ appears at the gate signal line $X_2$ after 2H period. Therefore, the minus terminal of the capacitor 171 is pulled to the minus side, and charges cannot be supplied to the pixel 101.

Figure 8:
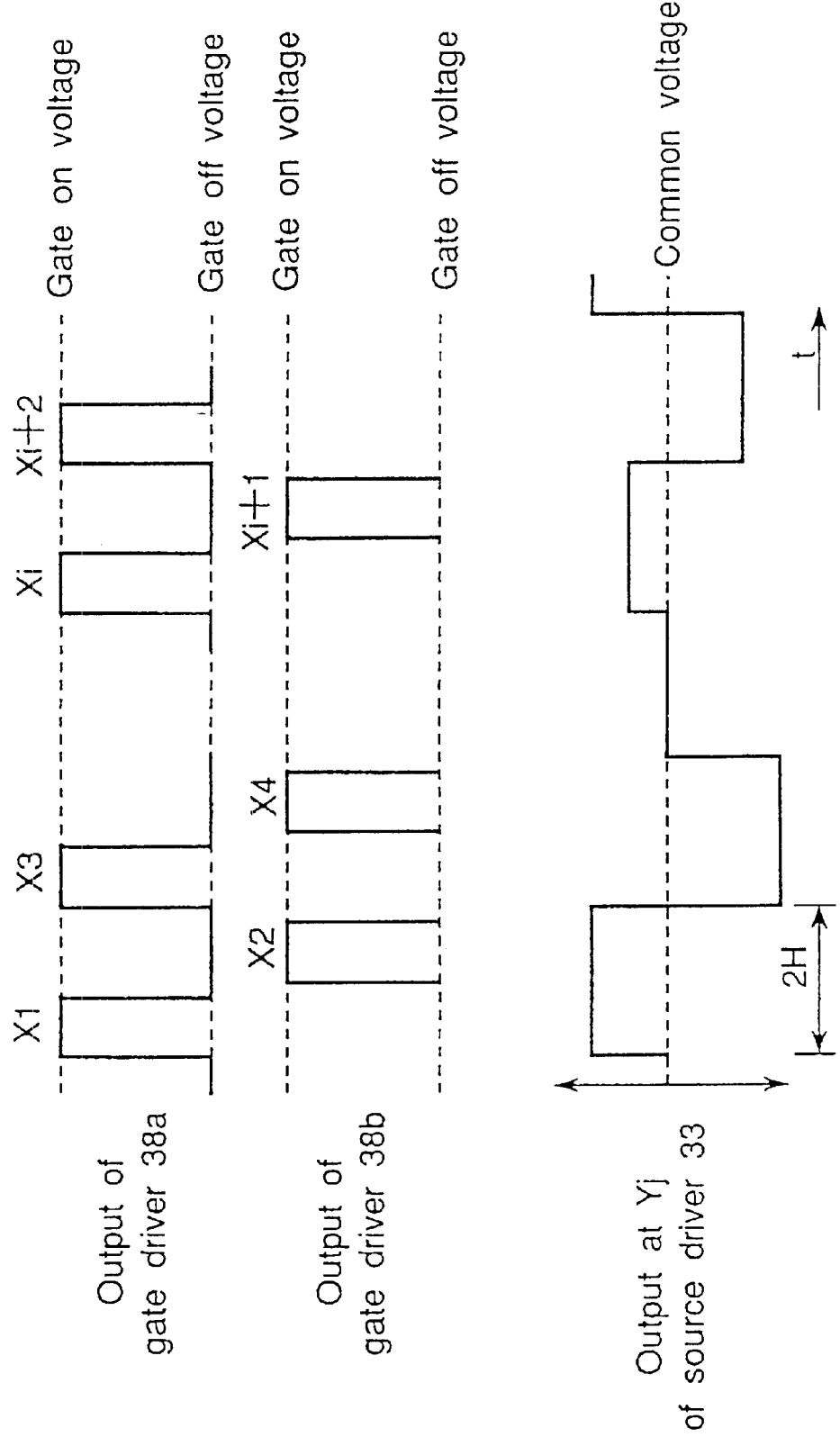
FIG. 8 is a timing chart of the image signal display device.

In order to meet the problem, the liquid crystal panel 81 is driven as shown in FIG. 8. Output positions of the gate drivers 38a and 38b are shifted in time alternately each 1H period. It is noted that the output voltage of the minus gate signal lines are not shown. The gate drivers 38a and 38b output gate on signals alternately, or the gate off voltage is output when the other gate driver outputs the gate on voltage. That is, the two gate drivers 38a and 38b shift gate signal line $X_i$ each 1H period to change the value of a data signal and its polarity. On the other hand, the source driver 33 changes a data signal and its polarity each 2H period, as shown as an output at terminal $y_i$ thereof. That is, the gate drivers operate in the unit of 1H period, while the source driver operates in the unit of 2H period, or the driving frequency is higher for the source driver 33. In the driving method shown in FIG. 8, gate on voltages are not applied to the two gate signal lines at the same time. That is, there are advantages even for the front stage structure shown in FIG. 29 later that charges can be supplied sufficiently to the capacitor 171 and that the operating frequency of the source driver 33 can be reduced.

As described before, the method of scanning the gate lines depends on the gate-driver control signal outputted from the first or second gate-driver control circuit 36, 37. In other words, the display method of the LCD panel 81 is determined by the selection of a gate-driver control signal from the gate-driver control circuits. The selection of the gate-driver control signals is effected with the selector 44 which responds to a switching signal sent from the display method selection circuit 35.

The display method selection circuit 35 has input of a progressive scanning image signal that has been converted into a digital signal by the A/D converter 40. The display method selection circuit 35 calculates a difference for each frame of the input progressive scanning image signals, and decides whether it is a still image or a motion image, depending on the magnitude of the differences. As a result, the gate-driver control signals outputted from the first gate-driver control circuit 36 are selected for a still image, and the gate-driver control signals outputted from the second gate-driver control circuit 37 are selected for a motion image.

Figure 9:
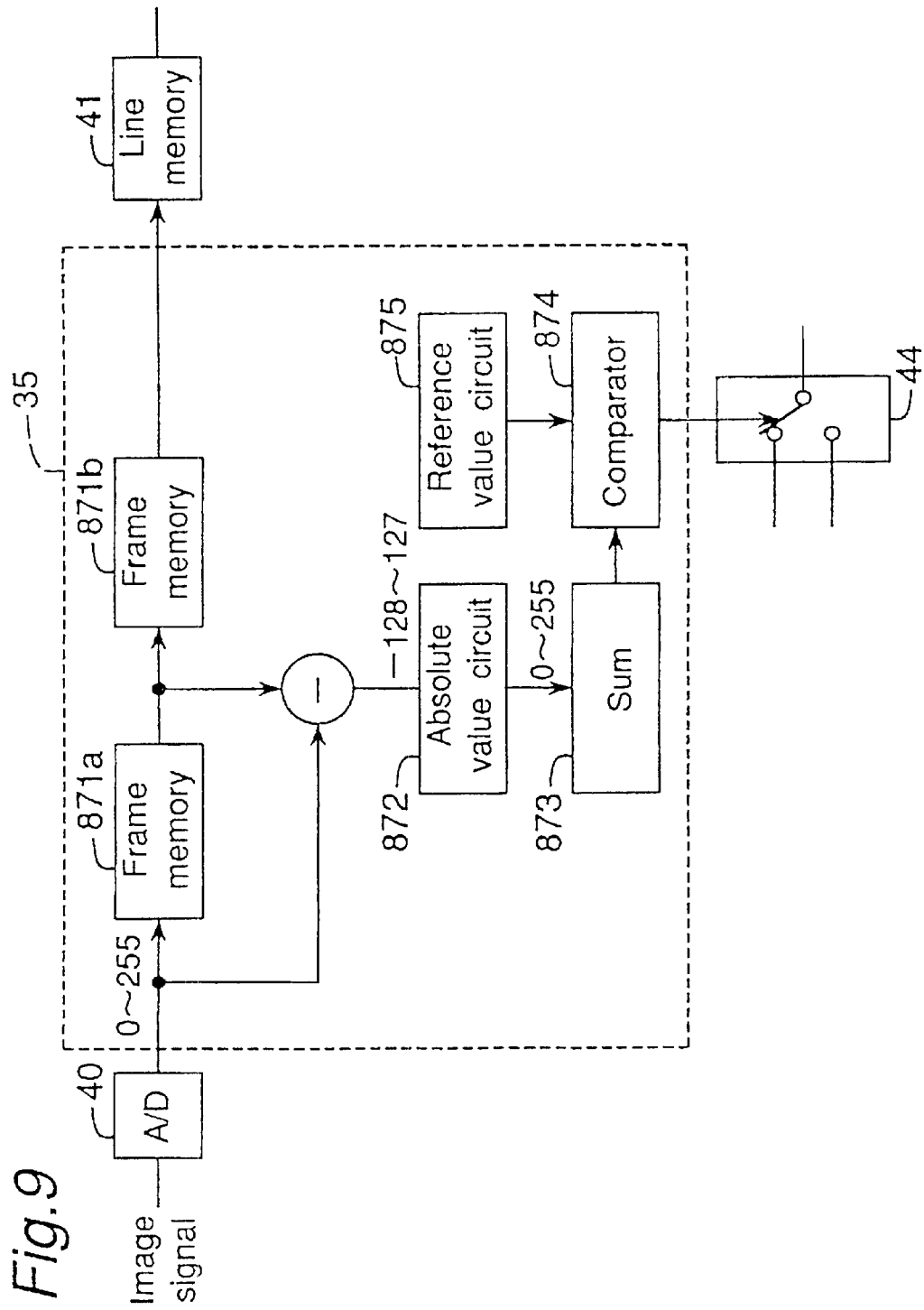
FIG. 9 is a block diagram of an image signal processor.

More specifically, FIG. 9 shows the display method selection circuit 35. If the A/D converter 40 handles a 8-bit signal, it converts an image signal into data of 0 to 255. Such data is inputted to and stored in a frame memory 871a. The data held by the frame memory 871a is outputted with a delay by one frame, and again inputted to another frame memory 871b. Data inputted to the frame memory 871a is referred to as input data, while data outputted is referred to as output data. The output data is delayed to the input data by one frame period.

A difference is obtained between input data and output data, where the difference can have a value of −128 to 127. Then, the aforementioned data is inputted to an absolute value circuit 872, where a value "128" is added so that the data becomes a value of 0to 255. The purpose of calculating the difference between input and output data is to detect any interframe motion of the image. If no intraframe motion of image is found, a difference value of "0" results. The larger the amount of motion, the larger the value of the difference.

Data outputted from the absolute value circuit 872 is inputted to a sum circuit 873, where the difference value for one frame period is added thereto. This allows the amount of intraframe motion to be determined. It is shown here that the larger the sum value results from the addition, the larger the motion amount is. The summed total difference for one frame period is sent to a comparator 874, where it is compared with a reference value of a reference value circuit 875. The reference value herein means a value by which the motion of image is decided to be large when it is more than a specified value. This value is used to select either the first display method or the second display method of the present invention. When the value is larger than the reference value, a signal is transferred from the comparator 874 to the selector 44 so that the second display method is selected. The selector 44, receiving the signal, implements the second display method. Conversely, when the value is smaller than the reference value, a signal is transmitted to the selector 44 so that the first display method is implemented. That is, when the sum value is larger than the reference value, a display method suitable for motion images is selected, while when it is smaller, a display method suitable for still images is selected. However, when the image has sum values at around the threshold level, the display method may be switched rapidly between the first and second display methods, and it may be difficult to view a display state that involves too frequent turn-overs between the first and second display methods. As a countermeasure of this problem, it is necessary to keep a display method, once it is selected over, for a certain period from returning to the original display state. That is, a hysteresis may be properly provided. The hysteresis can be easily provided by counting the number of signals outputted by the comparator 874 to switch over the display method, and by switching the display method when the count value reaches a specified value.

It is also important for the present embodiment that the first gate driver 38*a* is connected to the odd-numbered gate lines while the second gate driver 38*b* is connected to the even-numbered gate lines. This arrangement allows the first display method and the second display method to be implemented with simplicity. That is, in the first display method, it is only required to operate the first gate driver 38*a* for the first frame and to operate the second gate driver 38*b* for the second frame. In the second display method, it is only required for the first and second gate drivers 38*a*, 38*b* to each select one gate line (totally two gate lines) for one horizontal scanning period, and successively shift the position of selecting the gate lines. If all the gate lines were connected to one gate driver, it would be required in the first display method to select every other gate line for each of the first frame and the second frame. Such a selection of every other line would result in complex circuitry.

In the example explained above, the first gate driver 38*a* is connected to the odd-numbered gate lines while the second gate driver 38*b* is connected to the even-numbered gate lines, however, it is not necessary to adopt such an arrangement. For example, two shift registers 91*a* and 91*b* are provided within one gate driver 38, in which case the shift register 91*a* is connected to the odd-numbered gate lines while the shift register 91*b* is connected to the even-numbered gate lines. In this case, although apparently only one gate driver is provided, two systems of independent shift registers are provided so that substantially two gate drivers are provided.

As in active-matrix type LCDs (panels), which hold an image display state until it is refreshed, the interframe interpolation is performed to ensure the vertical resolution for still images, while the intraframe interpolation is performed to prevent motion image blurs. Thus, a successful image can be obtained despite a half of the display speed when the input progressive scanning image signals are displayed continuously.

Although automatic switching is explained above, a manual selection by a user to operate the selector 44 has practical convenience. For example, the selector 44 may be exemplified by a push button.

In some applications, it may be more practical to use the forced switching by using the selector 44 provided by a push button without using the display method selection circuit 35. It is applicable to, for example, a case where whether the image displayed on the display 81 is mainly a still image or mainly a motion image can be decided. Generally, display units of workstations have input of a progressive signal and present display images of, in most cases, characters and graphics. In such a case, it is proper to display an image on the display by the first display method (FIG. 1). The first display method is capable of displaying high-grade still images. A display satisfactory of still images is practical enough for application to workstations. The selector 44 may be fixed so that the first display method can be implemented, that is, the selector 44 is not necessitated. Meanwhile, televisions for home use generally have input of interlace signals, and present display images of, in most cases, motion images. Therefore, the selector 44 may be fixed so that the second display method of the present invention can be implemented. The second display method is more or less unsuitable for display of still images, but is able to implement superior display grade for motion images. In particular, the display method of the present invention can be predicted to be suitable for display of MUSE signals that have been proposed in high-definition televisions. As described above, when it can be decided whether images to be displayed consist mainly of still images or motion images, it is not necessary to adopt particularly the display method selection circuit 35.

The display device of the present invention may also be applied to simple matrix type LCD panels, electroluminescence panels, plasma displays, displays using PLZT, and ferroelectric LCD panels. However, an active-matrix type LCD panel is adopted in terms of reliability, image grade, cost, and the like in the display device of the present embodiment.

As explained above, according to the image signal display methods of the present invention, since one-frame image information is displayed by two frame periods, the image can be displayed at a ½ of the speed when input progressive scanning image signals are displayed continuously. As a result, even displays poor at high-speed display such as matrix type LCDs can display wideband (high data rate) progressive scanning image signals for personal computers, workstations, and the like without causing any deterioration of image quality.

Further, by using an arrangement that a first display control means and a second display control means are selectively activated, an optimum display can be obtained any time in correspondence to the type of progressive scanning image signals (e.g., a still picture or a motion picture).

Further, by using an arrangement that when the value representing the correlation between adjacent frames of progressive scanning image signals is not less than a specified value (i.e., when it is a still image), the first display control means is selectively activated and when the value is less than the specified value (i.e., when it is a motion image), the second display control means is selectively activated, interframe interpolation is performed for a still image to ensure the vertical resolution and, besides, intraframe interpolation is performed for a motion image to prevent any blurs from occurring to motion images.

The above-described image signal display method of the present invention produces merits when applied to an LCD panel in which a large number of pixels are arrayed in a matrix form. The large number of pixels are, for example, SXGA (horizontal 1280 dots×vertical 1024 dots). It is not easy to display an image on such a display panel. This is because the large number of pixels means a high data transfer rate while the SXGA involves the transfer of progressive scanning image signals. Displaying an image in the SXGA would require a large number of parallel shift registers in the source driver. Because operating frequencies are limited to 1 to 3 MHz for the polysilicon technique or the like, the time-base is needed to be expanded for data transfer rate, Thus, the more the time-base is expanded, the larger the number of parallel shift registers. Conventionally, it has been sufficient for home-use televisions to conform to the NTSC standard (horizontal around 640 dots×vertical 480 dots). Personal computers are also required only to conform to the VGA (horizontal 640 dots×vertical 480 dots). However, in recent years, there is a desire for conformity also to the HD (High Definition) standard, as well as to the SXGA.

For the conformity to the above standards, the display device of the embodiment to which the image signal display method of the present invention applied is uses an active-matrix type LCD panel, and the LCD panel is formed into a matrix of horizontal 1820 dot×vertical 1024 dots. The number of horizontal dots is not necessarily limited only to 1820 dots, but needs to be at least within a range of 1820 dots±100 dots. Too large a deviation from 1820 dots would cause the pixel shape to be deviated from the square shape of a vertical to horizontal ratio of 1:1 such that it becomes unsuitable for SXGA image display. The number of horizontal dots needs to be 1024 dots. Although some deviation from 1024 dots may be allowed for practical use, less than 1024 dots would make it impossible to implement perfect display of the SXGA screen.

Figure 10:
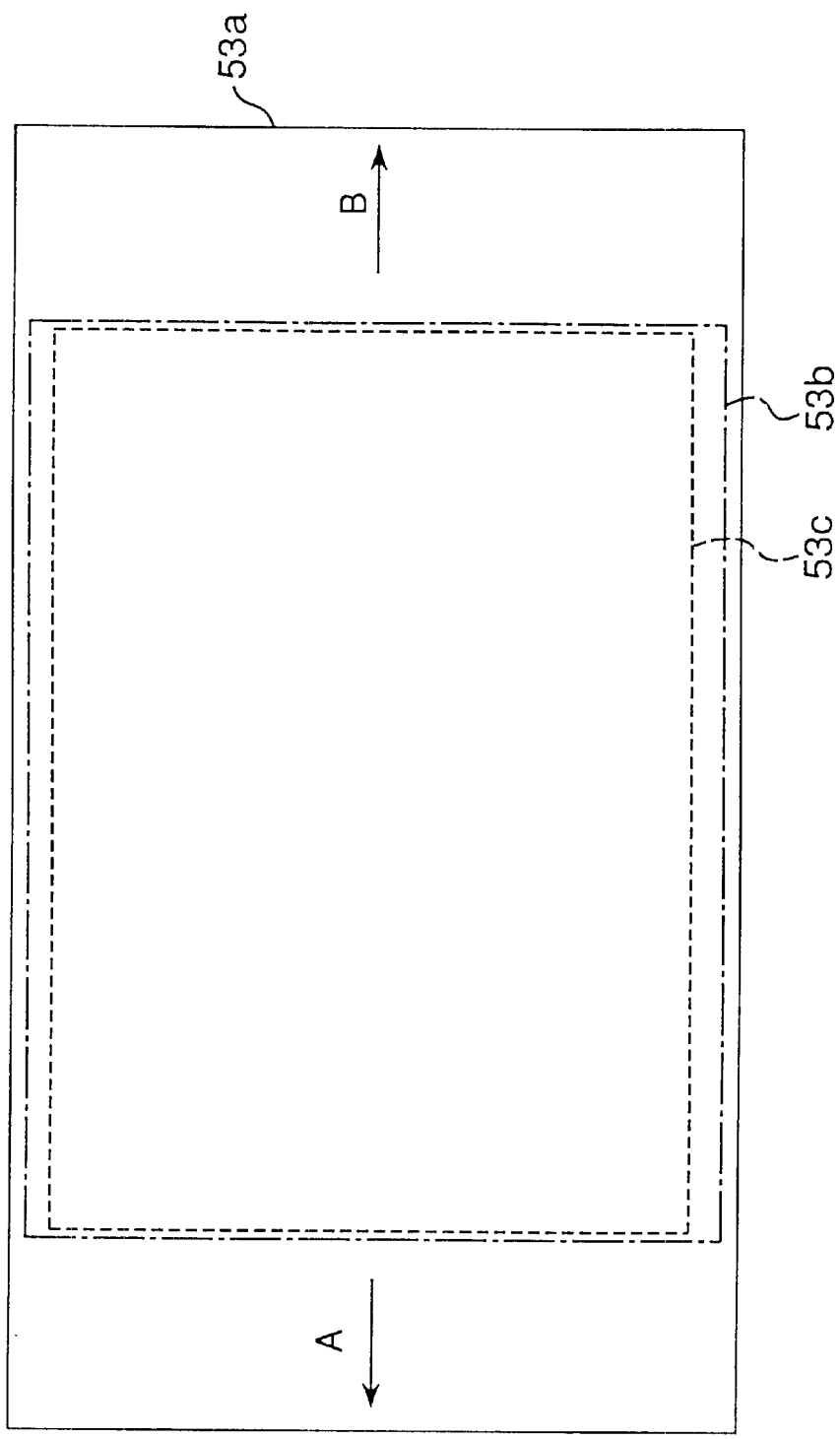
FIG. 10 is a diagram of three display areas in a display device of the embodiment.

FIG. 10 shows an image display state in the display device of the present embodiment. The display device of the present embodiment has pixels of 1820×1024 (16:9) in compliance with the HD standard in a display area 53a, and uses part of them to implement an SXGA (1280×1024 (5:4)) display in an area 53b. Also, the device uses pixels of ((640×2)×(480× 2) (4:3)) to display images of the NTSC and VGA standards in an area 53c.

The NTSC and HD use interlace scanning image signals, while the VGA and SXGA use progressive scanning image signals. Conformity to the NTSC and HD is enough for home-use televisions, but the display of SXGA is also intensely desired. However, when the LCD panel is applied to the progressive scanning image signals, the number of parallel shift registers doubles that of the interlace scanning image signals. Accordingly, for the application to the SXGA progressive scanning image signals, it is necessary to provide the doubled number of parallel shift registers, which would not be required for the HD standard. This would result in great demerits.

The demerits are due to difficulties in fabricating TFT arrays included in a LCD panel (difficulties in production yield and design), disadvantages of reduced effective display area as a result of a widened area needed for shift registers, and difficulties in implementing low resistance values of signal lines that are needed to improve the signal transfer speed of gate lines and the like of a half of that for displaying the HD standard signal.

The present embodiment provides a method in which odd-line data is extracted from progressive scanning image signals of the first frame and displayed onto the display panel while even-line data is extracted from the second frame and displayed onto the display panel, where one screen image is formed in the two frame periods. According to the present embodiment method, by using the number of shift registers corresponding to that for application to the interlace of the HD standard, it becomes possible to display an image of the SXGA standard progressive scanning image signals. In particular, since the SXGA and the like are used for workstations, where images used for workstations are in most cases still images, the method will appropriately do. As a matter of course, the display method can be adapted to the display of motion images by using the second display method, and moreover an appropriate image display method can be implemented depending on the type of the image signal (whether a motion image or a still image) by operating the selector 44 as is the case with the above-mentioned third display method.

As can be understood from FIG. 10, a display area 53b of the SXGA just fits into the display area 53a of the HD in the vertical direction (it is natural because of the vertical 1024 dots). Also in the display area 53c of the NTSC (VGA), there occurs almost no non-display area (pixel lines outside image display), so that almost all the pixels can be utilized effectively. Further, the display area 53b of the SXGA can be "moved" within the display area 53a of the HD rightward and leftward (along the directions of A and B).

Figure 11:
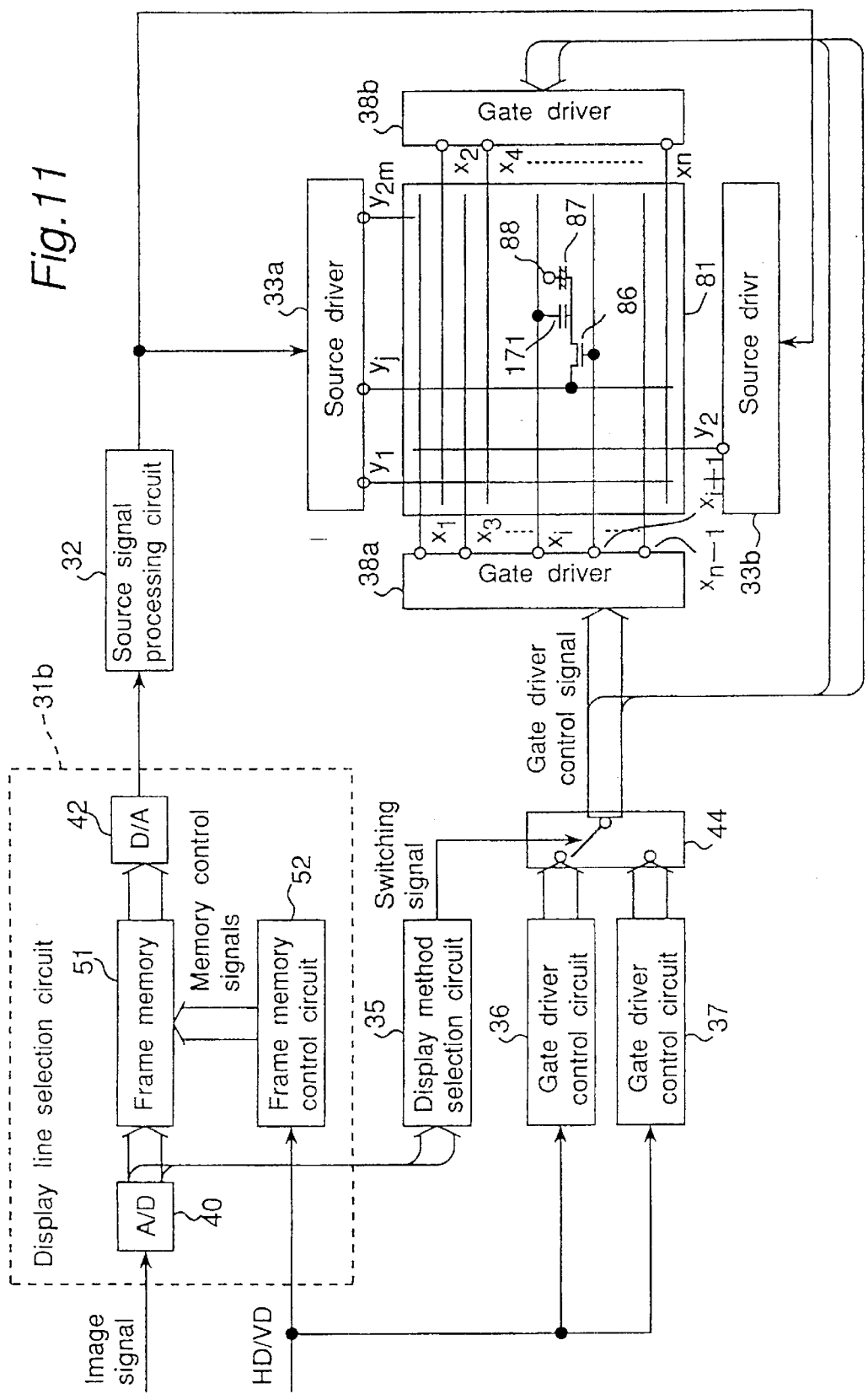
FIG. 11 is a block diagram of an image signal display device using an active-matrix type LCD panel.

The above "move" method is compatible with the multi-window system, having an effect of widening the application range of the display device explained above. Whereas the line memory 41 has been used in the display line selection circuit 31 as shown in FIG. 3 or the like, a frame memory 51 needs to be used for the "move" as shown in FIG. 11. An image signal is converted into digital data by the A/D converter 40 and inputted to the frame memory 51. The resulting data is read under the control by a frame memory control circuit 52 and outputted to the source signal processing circuit 32 through the D/A converter 42.

In addition, the source driver 33 may preferably be arranged as source drivers 33a, 33b at top and bottom of the LCD panel 81 as shown in FIG. 11. If the source drivers are arranged at the top and bottom, the column-inversion drive becomes easy to implement where signals of different polarities are applied to the column pixels, as will be later described.

Figures 12, 13:
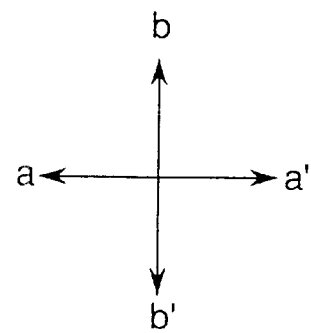
FIG. 12 is a diagram in a first frame in H inversion drive.
FIG. 13 is a diagram in a second frame in H inversion drive.
Figures 14, 15:
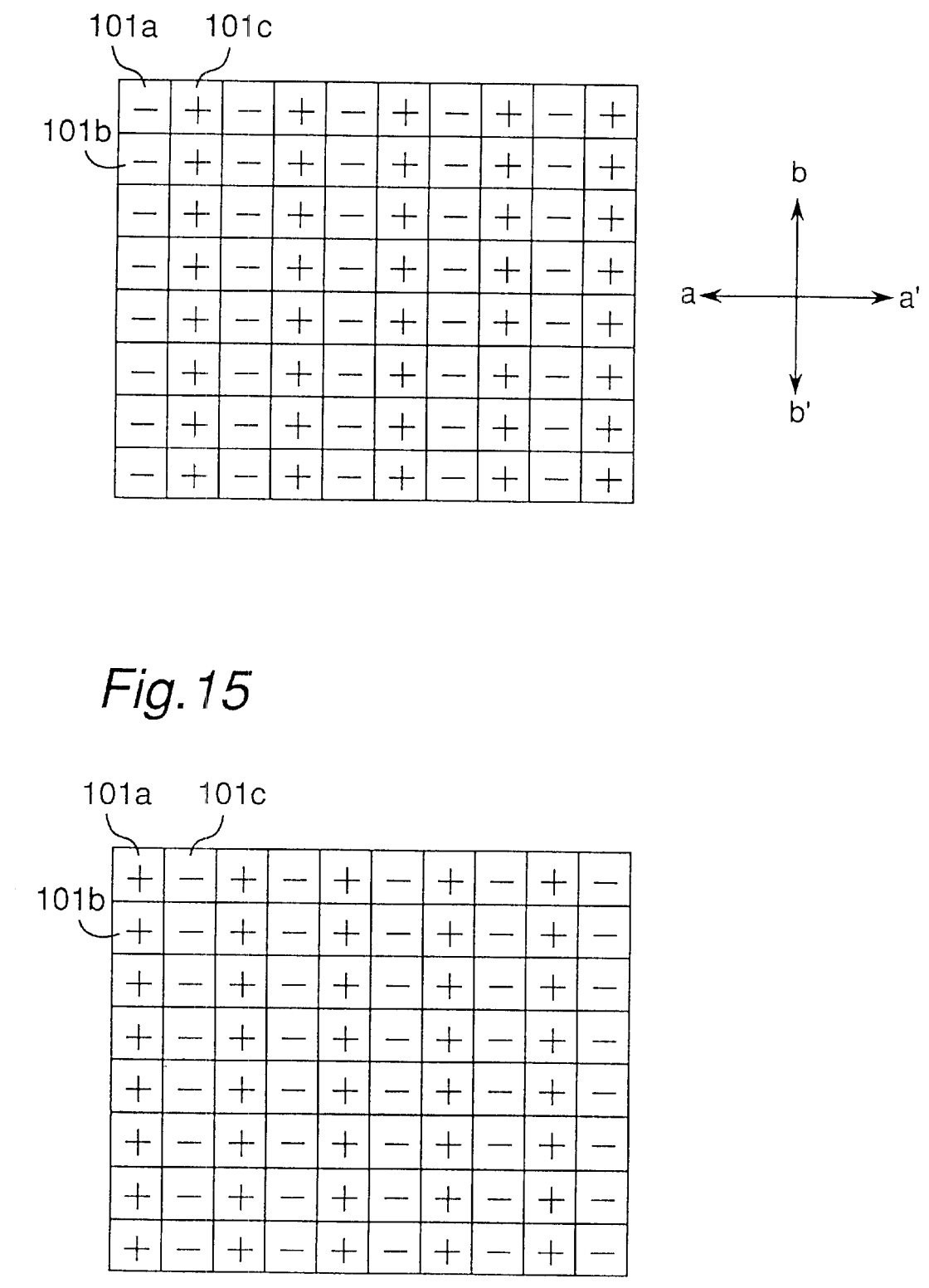

The LCD panel 81 is liable to cause a flicker phenomenon that the screen flickers. In order to prevent flicker phenomenon, H-inversion drive is adopted, as shown in FIG. 12, to signals with the polarity reversed every one-line pixels 101 or every some plurality of lines. In addition, such column-inversion drive is also adopted, as shown in FIG. 14, to apply signals with the polarity reversed every one-column pixels 101 or every some plurality of columns. In the H-inversion drive, if FIG. 12 shows a signal application state in the first frame, then FIG. 13 shows the counterpart in the second frame. In the column-inversion drive, if FIG. 14 shows a signal application state in the first frame, then FIG. 15 shows the counterpart in the second frame. The individual pixels 101 have signals of the same polarity applied thereto in a cycle of two frames.

It is noted that in the above drawings the positive polarity is denoted by "+" and the negative polarity by "−" Also, the positive polarity generally represents a forward voltage with respect to the potential of a counter electrode 88, while the negative polarity represents a reverse voltage with respect to the potential of the counter electrode 88.

Figure 16A:
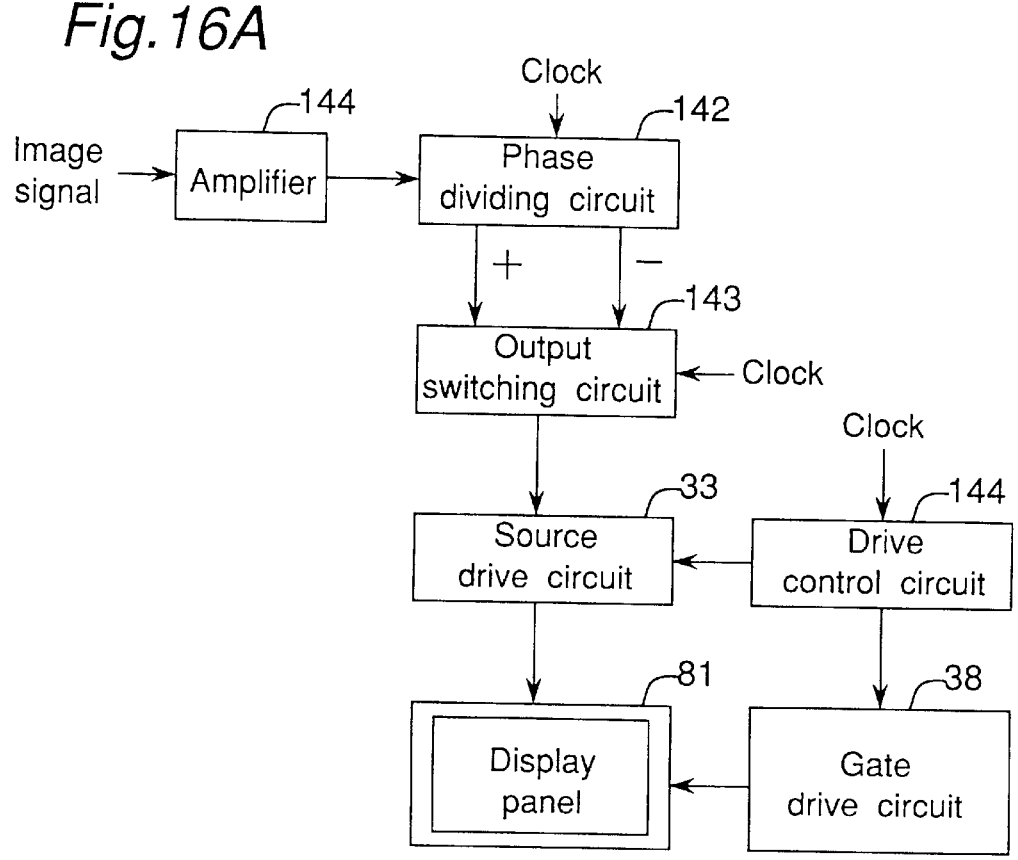
FIG. 16A is a block diagram of a display device.
Figure 16B:
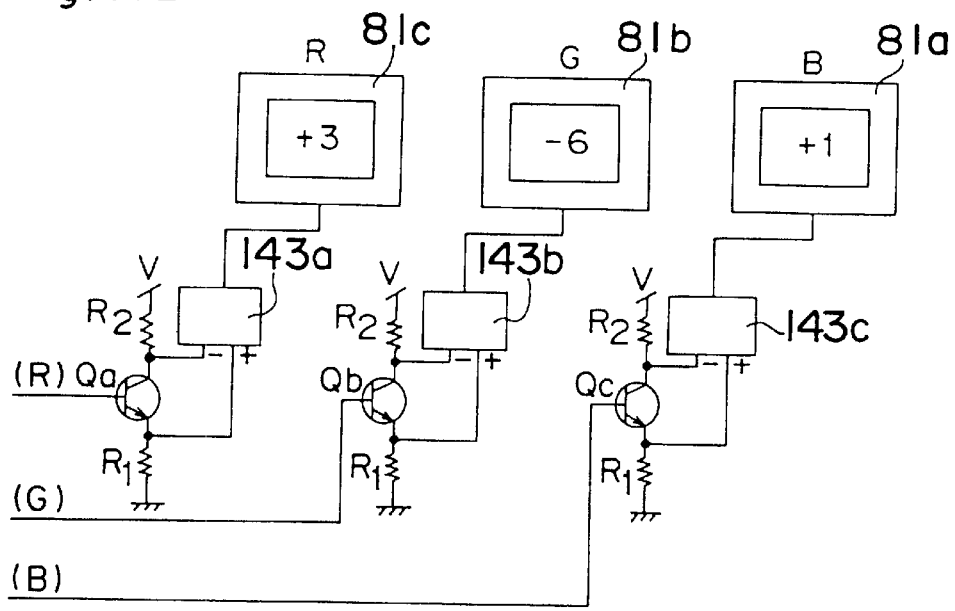
FIG. 16B is a block diagram of a color display device.

The H-inversion drive and the like can be implemented easily. As shown in FIG. 16A, an image signal is inputted to a phase dividing circuit 142 through an amplifier 141. The phase dividing circuit 142 can be easily made up from a transistor Q and two resistors $R_1$, $R_2$ as shown in FIG. 16B for illustrating a color display device. Signals of two polarities, positive "+" and negative "−" are prepared by the phase dividing circuit 142, and inputted to an output switching circuit 143. The output switching circuit 143 outputs a signal of either one of the positive or negative polarity. If the output switching circuit 143 outputs a signal with the polarity switched every one horizontal scanning (1H) period (every 2H period in FIG. 12), the H-inversion drive is realized. The column-inversion drive is realized by using the circuit as shown in FIG. 11 where a signal of positive polarity (negative polarity) is applied to the source driver 33a while a signal of negative polarity (positive polarity) is applied to the source driver 33b at the same time.

As mentioned above, it is an important matter for a liquid crystal display to prevent flickers recognized visually. Therefore, an image signal display method is devised in a way described below. It is noted that, through-out the diagrams of FIGS. 17 to 21, nF (n is a positive integer) along the horizontal direction denotes each frame, where for example 1F is succeeded by 2F. The vertical direction represents lines of the display panel. The sign "+" denotes a signal of positive polarity while the sign "−" denotes a signal of negative polarity, and alphabets of a, b, c and the like denote voltages (amplitudes) to be applied to the pixels 101. It is assumed that the individual frames contain different image signal data, where a, b, c and the like are added in correspondence to the data of the individual frames. The reference characters a, b, c, and the like are provided only for convenience of description. For example, a, b, c and the like would be all the same voltage (amplitude) in the case of a raster display. Also, throughout the drawings that appear hereinafter, the signs "+" and "−" are used merely for convenience of description, and may be replaced with each other. The foregoing points are applicable also to the following drawing.

Now, a fifth image signal display method is described by using FIG. 17. The fifth image signal display method displays HD-standard signals (interlace scanning image signals) onto a display device. The signal is so assumed that odd-line image signals (data of scanning lines) are transmitted to a first field and even-line image signals are transmitted to the following second field. In FIG. 17, the column of 1F has a notation of $a_j$ (j is an integer of 1 or more), showing that image signal data of the first field are held at one column of pixels of the display panel. The column of 2F has a notation of "+$a_1$" at its top, and $b_j$ (j is an integer of 2 or more) in the following, showing that image signal data of the first field is held as it is at the top pixel and image signal data of the second field are held at the other pixels.

The above description shows clearly that +$a_3$ and −$a_3$ represent that the voltages held by pixels 101 are equal to each other and different only in signal (voltage) polarity from each other. If +$a_3$ and +$a_5$ are referred to, their image signal data are of the same field and the signals held by the pixels 101 are of the same polarity.

In actual image signals, the value of $a_1$ of line 1 and the value of $a_5$ of line 5 may be either different from or identical to each other. This is because if one screen image is all of a white raster display, an identical voltage is written into all the pixels 101. Therefore, it is only for convenience of description that different suffixes (added numbers) are provided. Also, for example in FIG. 17, a positive-polarity voltage, +$a_1$, is held at line 1 of 1F, but it is not limitative but for convenience of description. Otherwise, −$a_1$ may be provided for line 1, and likewise −$a_1$ for line 2, +$a_3$ for line 3, +$a_3$ for line 4, and so on. Further, the character "×" denotes "don't care," which means data written at fields before 1F.

Now, the polarity of voltages applied to the pixels in the image signal display method is explained. By taking into consideration the polarity of voltages applied to the pixels in the following way, the flicker can be suppressed from being visually recognized. It is assumed that the number of pixels and the like are the same as those described in FIG. 10. FIG. 17 shows a display method by which HD-standard interlace scanning image signals are displayed onto the display panel. In the odd fields, an identical voltage is held at pixels of an odd line and its consecutive even line. In the even fields, an identical voltage is held by pixels of an even line and its consecutive odd line. Further, in one column, the voltages are held by the pixels 101 in the unit of two pixels. In more detail, voltages of "++−−++−− . . . " are held by one-column pixels 101 in the first field (1F), and voltages of "+−−++−− . . . " are held by one-column pixels 101 in the succeeding second field (2F). Further, voltages of "−−++−−++ . . . " are held in the third field (3F), and voltages of "−++−−++− . . . " are held in the consecutive fourth field (4F). In the fifth field, the voltages are "++−−++−− . . . ," which are the same as in the first field.

That is, with respect to only one pixel 101, voltages with polarity "++−−++−−" are applied in the field direction (time axis direction), where four fields constitute one period. Accordingly, since one field corresponds to 1/60 second, four periods are 1/15 second such that flickers occur. However, voltages with the polarity alternated every two fields are applied to the pixels above and below the foregoing pixel. For example, with respect to a pixel 101a of line 3 of the first field, the pixel has voltages of "−−++−−++" applied thereto in the direction of time axis, whereas a pixel 101c of line 2 has voltages of "+−−++−−+" applied thereto, and a pixel 101b of line 4 has voltages of "−++−−++" applied thereto. As a result, even if flickers occur to some degree, it is not discerned as flickers, because a voltage of reverse polarity is applied to the pixel above or below adjacent to an arbitrary pixel. Besides, voltages of different polarities as "++−−++−−" are periodically applied also in the direction of columns, producing an advantage that flickers are further suppressed not to be discerned.

The method shown in FIG. 17 has an advantage that a processing similar to line interpolation is performed, thus it is suitable especially for display of images containing more motion image areas. The method of FIG. 17 is practically sufficient for general home-use televisions, because they include almost no still images. In addition, a voltage, +$a_1$, is applied to the pixel of line 1 of 2F, showing that the voltage, +$a_1$, that has been written at line 1 of 1F is held. Like this, it is also important to display images as they are shifted by one line for each field.

FIG. 18 shows a method for displaying progressive scanning image signals used in workstations or the like onto the display device of the present embodiment. In other words, the method is a modification of the first image signal display method, in which the polarity of voltages to be applied to the pixels is taken into consideration as in the fourth image display method. In a first frame, odd-line signals are extracted from progressive scanning image signals of the first frame and displayed onto the odd lines. In this process, voltages of positive polarity are applied to line (4n−3) (where n is a positive integer) while voltages of negative polarity are applied to line (4n−1). In a second frame succeeding the first frame, even-line signals are extracted from progressive scanning image signals of the second frame, and displayed onto the even lines. In this process, voltages of the negative polarity are applied to line (4n−2) while voltages of positive polarity are applied to line 4n. In the two frame periods, one-frame image can be displayed.

Subsequently in a third frame succeeding the second frame, odd-line signals are extracted from progressive scanning image signals of the third frame and displayed onto the odd lines. In this process, voltages opposite in polarity to those applied to the first frame are applied to the individual pixels. Also, in the fourth frame, voltages opposite in polarity to those applied to the second frame are applied to the individual pixels.

As a result of applying voltages as described above, the polarity of the voltages applied to the individual pixels is the same as in FIG. 17. Therefore, flickers are not discerned. The display method of FIG. 18 can be regarded as having implemented the line interpolation, thus suitable for still images. In workstations, most often displayed are graphics, sentences, or program texts, most of which are still images. Accordingly, the first display method of the present invention is suitable for workstations. The drive frequency (data transfer rate) can also be reduced to a half of that when the progressive scanning image signal is displayed, as it is, to the LCD panel 81. Therefore, even with a panel in which the source driver 33 and the like are formed by using the polysilicon technique, the number of shift registers in the source driver 33 is not increased.

For HD-standard signals, which are transmitted in the form of interlace scanning image signals, interlace scanning image signals may properly be used for display if provided as shown in FIG. 17. Progressive scanning image signals of workstations and the like may be practical enough if provided as shown in FIG. 18.

The display device of the present embodiment displays HD-standard interlace scanning image signals by the method described in FIG. 17, and progressive scanning image signals as well as a still image by the display method of FIG. 18. Also, the display device applies the image signal display method of the present embodiment as shown in FIGS. 2A, 2B, 2C, and 2D to progressive scanning image signals as well as motion pictures, as required.

For image display of NTSC standard signals, it is appropriate to use the method as will be described in FIG. 19. The NTSC standard has around 480 effective horizontal scanning lines (number of lines), whereas the display device of the present embodiment has 1024 effective horizontal scanning lines. Therefore, in order to display an NTSC-standard signal, 960 lines, a double of 480, are used out of the 1024 lines. That is, data of one scanning line is displayed onto a plurality of lines of the display device. Moreover, the NTSC-standard signals are also interlace scanning image signals. As shown in FIG. 17, the same data has been displayed onto two lines for display of HD-standard interlace scanning image signals. Since 960 lines, a double of 480, are used for the NTSC standard, data of one scanning line is displayed onto four lines as shown in FIG. 19.

As shown in FIG. 19, if odd-numbered image signal data are transferred to odd fields (F) and if n denotes an integer of one or more, then identical voltages are written into the pixels 101 of lines (8n−7) to (8n−4). If even-numbered image signal data are transferred to even fields (F), then identical voltages are written into the pixels 101 of lines (8n−5) to (8n−2) with a shift of two lines from the foregoing. In the even fields, the data of an odd field one preceding the foregoing even field is kept to be held at the pixels 101 of lines (8n−7) and (8n−6). The reason therefor is the same as when the data "+a$_1$" of line 1 of the first field (1F) is kept to be held at the pixels of the first line in the second field (2F) as shown in FIG. 17.

In FIG. 19, for reduction of flickers, the polarity of voltages to be written into the pixels 101 is also taken into consideration. In more detail, voltages with polarity "++++−−−−++++ . . . " are applied in the direction of column (lines 1 to n) in the first field, and voltages with polarity "++−−−−++++−− . . . " are applied in the second field. Also, as viewed about one pixel (e.g., 101a) in the direction of time axis (direction of field=1F to 9F), voltages with polarity "++−−++−− . . . " are applied. A pixel 101b just below the pixel 101a has voltages with polarity "+−−++−− . . . " applied thereto so as to be different from the pixel 101a. Therefore, flickers occur actually if only one pixel is watched, but the flickers are canceled on the whole (if one arbitrary pixel and its neighboring pixels are viewed at the same time), so that the flickers are not discerned visually.

Further, a seventh image signal display method of the present embodiment, as shown in FIG. 20, may be implemented in order to prevent any effects of the flickers further. In FIG. 19, voltages of the same polarity have been applied to four lines of a field (e.g., "++++" for lines 1 to 4 of 1F, and "−−−−" for lines 5 to 8 of 1F). On the other hand, in FIG. 20, four lines have voltages identical in value but changed in polarity by the two lines (e.g., "++−−" for lines 1 to 4 of 1F, and likewise "++−−" for lines 5 to 8 of 1F).

By using the display explained above, voltages with polarity "++−−++−− . . . " are applied to pixels in the direction of column (lines 1 to n) in the first field, and voltages with polarity "−−++−−++ . . . " are applied to pixels in the direction of column in the second field. Also, when one pixel (e.g., 101a) is observed in the direction of time axis (direction of field=1F to 9F), voltages with polarity "+−+−+−+− . . . " are applied. A pixel 101b just below the pixel 101a has voltages with polarity "−+−+−+−+ . . . " applied thereto, the polarity sequence just opposite to that of the pixel 101a. Therefore, occurrence of flickers is suppressed very successfully.

HD-standard signals can be displayed by the display method of FIG. 17. The display method of FIG. 18 has the same data transfer rate as that of FIG. 17. It could therefore be understood easily that if the display method of FIG. 17 can be implemented by the display device of the present embodiment, then the display method of FIG. 19 can also be implemented.

FIG. 21 shows a display method for implementing the display of the VGA standard. FIG. 21 also shows a sixth image signal display method. In order to display an image of the VGA standard, the display device uses progressive scanning image signals as received. The VGA standard has 480 effective horizontal scanning lines, while 960 lines, a double of 480, are used for the display out of the 1024 lines in the display device used for this method. In order to display an image of the VGA standard, it is unnecessary to distinguish between odd frames and even frames, unlike the display methods described above. Out of image signal data of the first frame, signals corresponding to the odd lines are displayed onto lines (4n−3) and (4n−2). Signals corresponding to the even lines are displayed onto lines (4n−1) and (4n). That is, one-line data of the image signal data is written to two pixel lines. This means that progressive scanning image signals as received are displayed in two lines of the display device successively.

In order to prevent flickers, the polarity of voltages to be written into the pixels is also taken into consideration. Voltages with polarities "++−−++−− . . . " are held, while voltages with polarities "−−++−−++ . . . " are held in the even frames along the direction of column in the odd frames. On the other hand, voltages with polarities "+−+−+−+− . . . " are held by pixels in the direction of frame (time axis). Therefore, with respect to one pixel, voltages of identical polarity are applied to pixels in a cycle of 1/30 second. As a result, flickers will not occur at all.

As described above, the display device of the embodiment can display an image of the HD, NTSC, VGA, and SXGA standards by using an LCD panel whose number of pixels is horizontally 1280 dots and vertically 1024 dots as shown in FIG. 10. Further, by using the methods described in FIGS. 1A–1C and FIGS. 2A–2D, the data transfer rate to the LCD panel can be reduced to a half of that of the counterpart in the prior art, so that reduction of power consumption, and simplification of source drivers and the like can be implemented. Moreover, by using the methods described in FIG. 17 and the like, the display device prevents flickers.

The above-mentioned image signal display methods can be applied to display panels of a type that voltages are held at pixels, such as TN LCD panels, ferroelectric LCD panels, and display panels using PLET. Among these panels, the TN LCD panel, which is more often used than others, has some problems. For example, it has dependence on the angle of incidence of light; inverted domains occur to pixels; a rubbing process is needed to orient liquid crystal molecules so that defects tend to occur.

Figure 22:
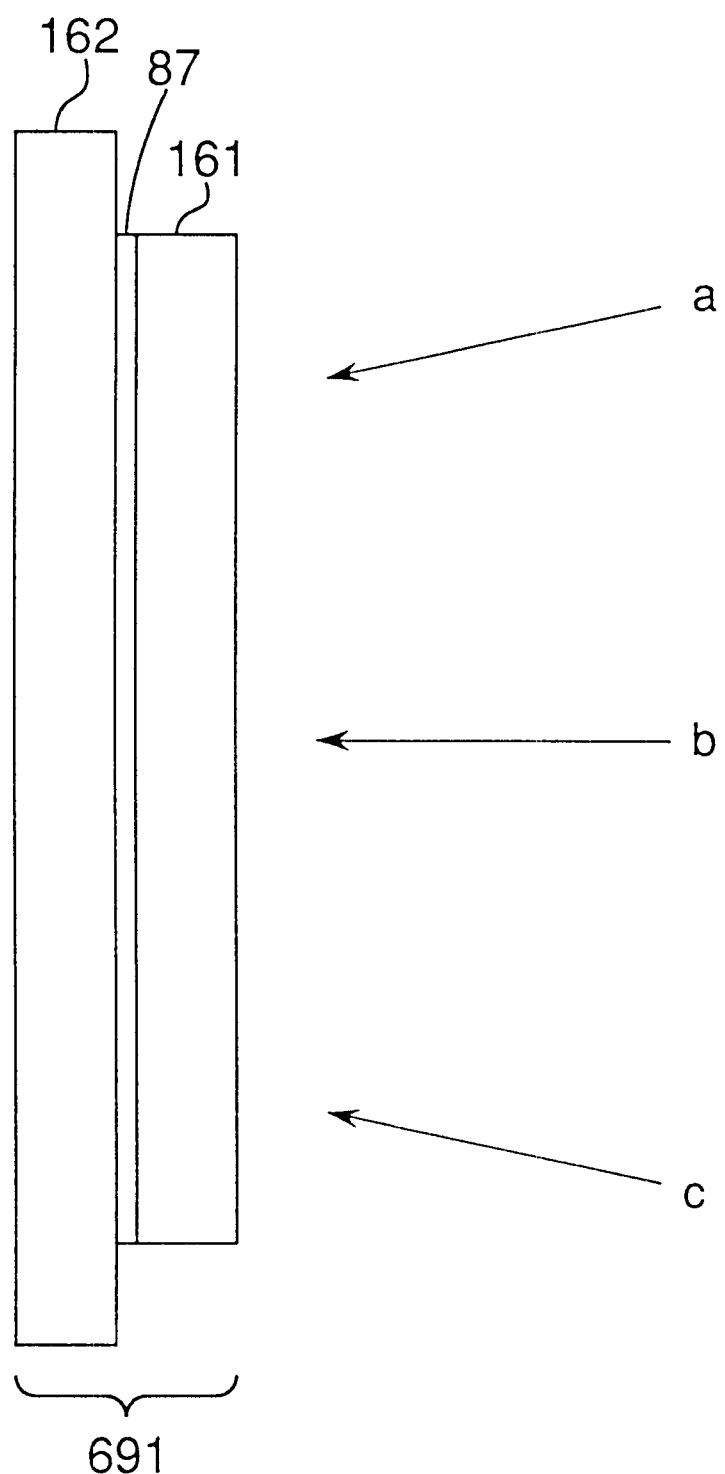
FIG. 22 is a schematic sectional view of a prior art LCD device for explaining problems thereof.

In the TN liquid crystal display panel, display contrast depends on the angle of incidence of light. This is due to a fact that the liquid crystal molecules in a liquid crystal layer are tilted at a constant angle with respect to the normal to pixel electrodes. If the tilt of the liquid crystal molecules is coincident with the angle of incidence of light, the contrast is good, otherwise the display contrast deteriorates considerably. This problem is crucial to a projection type display device using the TN liquid crystal display panel as a light valve, because it is difficult in the design of an optical system for the projection type display device to orient principal rays of light incident on the light valve along a constant direction for all the areas of the light valve. For example, as shown in FIG. 22, the principal rays of light incident on a TN liquid crystal display panel 691 are different in direction between upper and lower parts of the panel. If the tilt of the liquid crystal molecules in the liquid crystal layer 87 is coincident with a principal ray of light c, the lower part of the display area of the TN LCD panel 691 has a good display contrast. On the contrary, it is not coincident in the upper part so that the upper part has a considerably worse display contrast. Thus, there occurs a deterioration in the display contrast from the lower to the upper part. That is, the lower part of the panel has a good image display, while the upper part thereof results in a poor, low grade of image display state. This phenomenon deteriorates the image display considerably.

Figure 23:
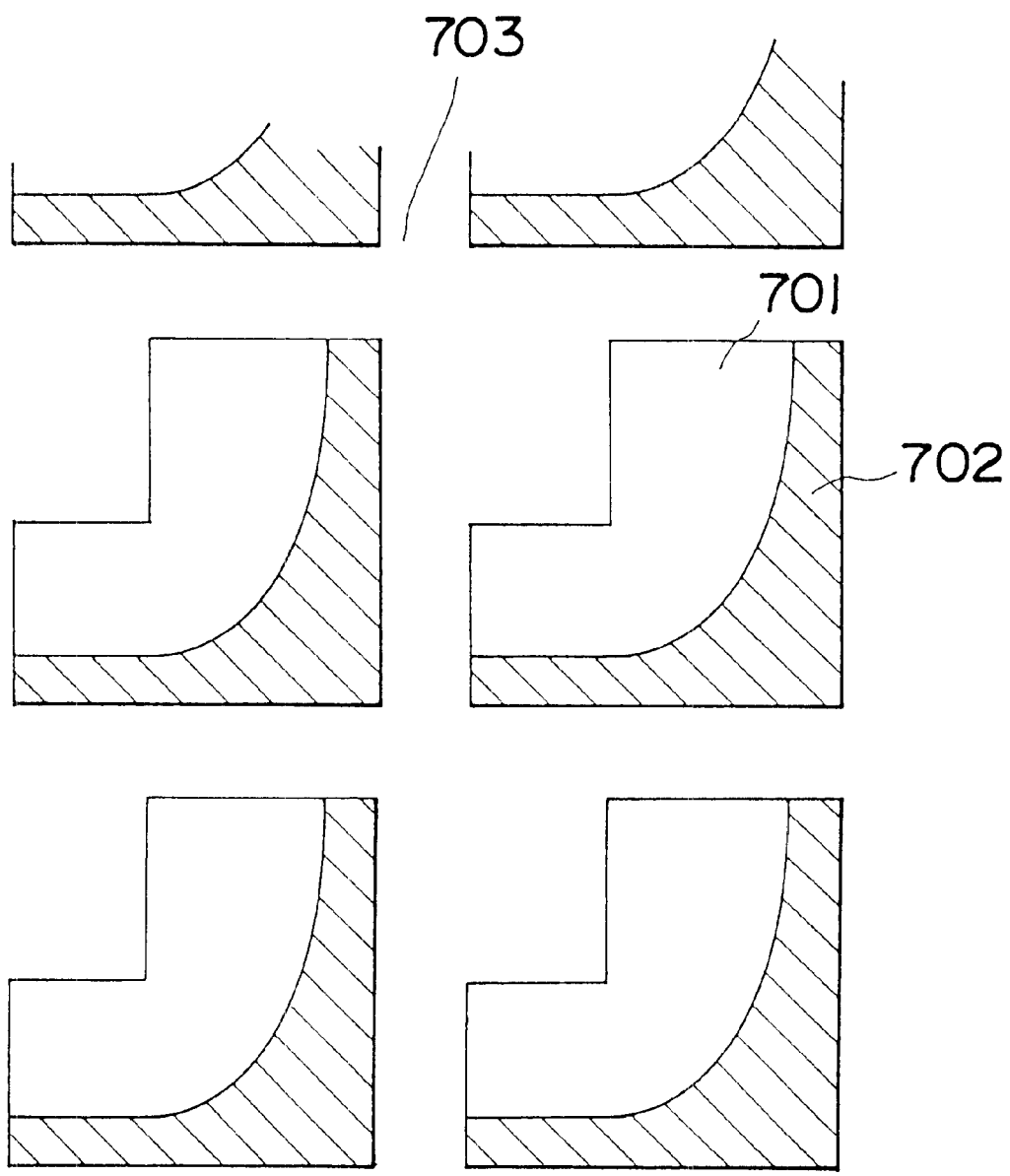
FIG. 23 is a diagram of a part of a display device for explaining problems of the prior art LCD device.

Another problem of the TN liquid crystal panel is explained next. As shown in FIG. 23, there occurs light leakage (an inverse domain area 702) in peripheral portions of pixel openings 701. This is due to an alignment of liquid crystal molecules in a direction opposite to that of the regular orientation. Such an aligned state is called an inverse tilt domain. This state takes place when liquid crystal molecules are raised partially in the inverse direction by an electric field generated between pixel electrode and signal line. The portions where the liquid crystal molecules aligning in the inverse direction allow light to pass a polarizer (analyzer) at the outgoing surface despite the voltage applied. That is, there occurs light leakage. If liquid crystal molecules align in a proper direction, light leakage will not occur.

One way of preventing light leakage is to increase the width of a black matrix 703 to be formed on the counter electrode. That is, the black matrix 703 is formed so as to shield the inverse domain area 702. This would also cause the aperture area of pixels to decrease so that the display brightness would decrease. Thus, the black matrix could not be said to be effective.

The liquid crystal display panel using TN liquid crystals is also subject to occurrence of light penetration at peripheral portions of pixels, so that the panel is required to have a wide black matrix. As a result, the rate of using light becomes low, resulting in low display brightness. The light applied to the black matrix heats the LCD panel to increase the panel temperature, so that a service life of the panel is shortened.

Further, the TN LCD panel needs a coating process of an orientation film and a rubbing process therefor. The rubbing process and the like increases the number of fabrication processes, causing an increase in cost. Further, the pixel size tends to become small recently as the number of pixels in a liquid crystal display panel used in projection type display devices is increased to large capacities as much as 300,000 or more. This smallness of pixels causes a multiplicity of protrusions and depressions of signal lines and TFTs to be formed, so that the rubbing process has become impossible to carry out successfully eventually because of the protrusions and depressions. Further, the smallness also causes an increase in the area occupied by TFTs and signal lines in one pixel, so that the pixel aperture rate decreases. As an example, when 350,000 pixels are formed in an LCD panel of diagonal of three inches, the pixel opening rate is about 30%. It is also predicted that when 1,500,000 pixels are formed with TFTs made of amorphous silicon, the rate would be less than 20%. Such reduction in the pixel aperture rate would not only result in lower brightness of the displayed image, but also cause the LCD panel to be heated by light applied to portions other than the openings for incident light, to enhance the aforementioned performance deterioration.

Thus, the display device of the present embodiment uses polymer dispersion liquid crystals for an optical modulation layer 87. An LCD panel using polymer dispersion liquid crystals (hereinafter, referred to as polymer dispersion LCD panel) has no angle of incidence dependence unlike the TN LCD panel. Further, it does not cause inverse tilt domains, and the rubbing process is not needed. Moreover, a polarizer is not needed for optical modulation, so that a high brightness display can be implemented. The polymer dispersion LCD panel is explained below in detail.

Polymer dispersion liquid crystals consist of a polymer component and a liquid crystal component, and they are classified roughly into two types according to the dispersion state of liquid crystals and polymer. One is a type in which droplets of liquid crystals are dispersed in a polymer component, where the liquid crystal component is present in the polymer in a non-continuous state. Such liquid crystals are referred to as polymer dispersion liquid crystals in a narrow sense. The other is a type which involves a structure like a polymer network extending in the liquid crystal layer, resulting in a state as if the liquid crystal component is impregnated into the sponge structure. In this case, liquid crystals are present in a continuous state without forming droplets. Such liquid crystals are referred to as polymer network liquid crystals. Image display by these two types of LCD panels transmit light under the control of scattering state.

Polymer dispersion liquid crystals in a narrow sense are used for the property that they have a changed index of refraction in a direction in which the liquid crystal molecules are oriented. Without any voltage applied, individual droplets of liquid crystals are oriented in irregular directions. In this state, there arise differences in index of refraction between polymer component and liquid crystal component, so that incident light is scattered. If a voltage is applied in this state, the liquid crystal molecules are aligned. If the index of refraction of the liquid crystal component in the state in which they are oriented along a specified direction is previously made coincident with that of the polymer component, the incident light will be transmitted without being scattered.

In contrast to this, polymer network liquid crystals are used for the irregularity itself of orientation of liquid crystal molecules. In the irregular orientation state, or without a voltage applied, incident light is scattered. On the other hand, when a voltage is applied so that liquid crystals are oriented into a regular state, the light is transmitted.

Typical behavior of two types of polymer dispersion liquid crystals and polymer network liquid crystals are explained above. The polymer dispersion liquid crystal in a narrow sense and polymer network liquid crystal are included generically in polymer dispersion liquid crystals in a broad sense, as already stated above. The polymer dispersion liquid crystal in a narrow sense is described for example in WO 8504262, while the polymer network liquid crystal is described for example in Japanese Patent Laid-Open Publications 5-173117/1993, 3-46620/1991. Further, a liquid crystal in which a resin component is formed into layers is described in Japanese Patent Laid-Open Publications 6-208126/1994 and 6-202085/1994. Still further, a liquid crystal in which a liquid crystal component is sealed in a capsule-like container medium is described in Japanese Patent Laid-Open Publication 5-113558/1993 and U.S. Pat. No. 4,435,047. A liquid crystal in which dichroic or multichroic pigments are contained in liquid crystals or a resin is described for example in U.S. Pat. Nos. 4,596,445 and 4,556,289. These various types of liquid crystals are referred to as polymer dispersion liquid crystals.

Figure 24A:
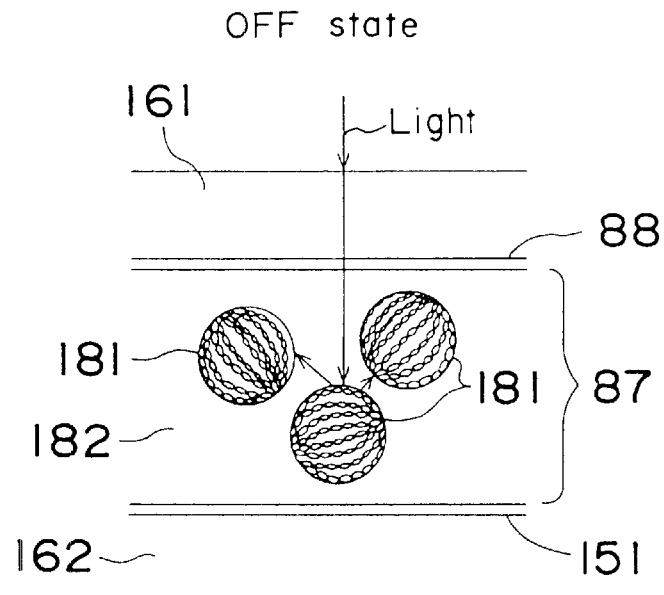
FIGS. 24A and 24B are schematic diagrams of polymer-diffused liquid crystals in the off state and in the on state.
Figure 24B:
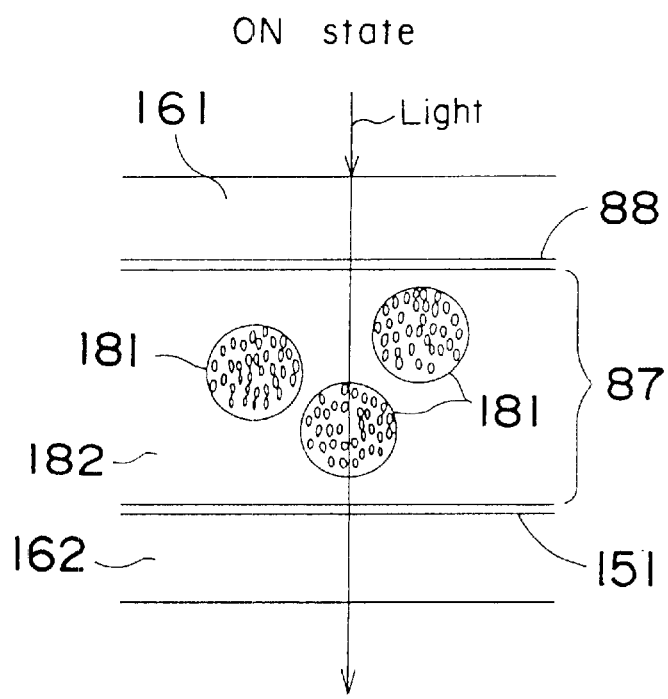

Although the present embodiment is not limited to either one type of the polymer dispersion liquid crystals, the polymer dispersion liquid crystal in a narrow sense is taken as an example below for the ease of description. FIGS. 24A and 24B show the alignment of polymer dispersion liquid crystals. A polymer dispersion liquid crystal layer 87 consists of droplets 181 and a polymer 182. A TFT (not shown) and the like are connected to a pixel electrode 151. A voltage is applied between the pixel electrode 151 and a counter electrode 66 formed on substrates 161 and 162 by the TFT turning on and off, so that the orientation direction of liquid crystals on the pixel electrode 151 is varied so that light is modulated. With no voltage applied, as shown in FIG. 24A, liquid crystal molecules in each droplet 181 are oriented in irregular directions. In this state, there arise differences in index of refraction between the polymer 182 and the droplets 181, which causes incident light to be scattered. If a sufficient voltage is applied between the pixel electrode 151 and the counter electrode 88, as shown in FIG. 24B, the liquid crystal molecules are aligned in their orientation. By setting previously that the index of refraction of the liquid crystal molecules aligned along a specified direction is equal to the index of refraction np of the polymer 182, the incident light will not be scattered and go out through an array substrate 162.

Preferably, the liquid crystal component for the liquid crystal layer 87 is a nematic liquid crystal, a smectic liquid crystal, or a cholesteric liquid crystal. The liquid crystal may consist of a single compound or a mixture of two or more liquid crystals, or a mixture further including a substance other than liquid crystal compounds. Among the above-mentioned liquid crystal materials, cyanobiphenyl group nematic liquid crystals are preferable because they have a large difference between the ordinary index of refraction $n_o$ and the extraordinary one $n_e$. A nematic liquid crystal of fluoride or especially of chloride of good resistance to light and heat is preferable as to scattering characteristic and stability with time.

Preferably, the polymer matrix material is a transparent polymer, and a photosetting polymer is used because it can be used easily in the production of a liquid crystal panel and well separated from the liquid crystal phase. Especially, an ultraviolet-setting resin such as an ultraviolet-setting acrylic resin is preferable. Particularly, a resin is preferable which contains acrylic monomers or acrylic oligomers which can be polymerized and set by ultraviolet ray irradiation. Among them, a photosetting acrylic resin including fluorine group is preferable, which is capable of fabricating an optical modulation layer 87 of good scattering characteristics and less variation with time.

The liquid crystal material to be used preferably has an ordinary-ray index of refraction $n_o$ of 1.49 to 1.54, more preferably of 1.50 to 1.53. Further, a liquid crystal material preferably has a index of refraction difference $\Delta n$ of 0.15 to 0.30. Larger $n_o$ or $\Delta n$ would cause deterioration in heat and light resistances of the- liquid crystal material. Decrease in $n_o$ or $\Delta n$ would improve heat and light resistances, but result in lower scattering characteristic and therefore insufficient display contrast. The scattering characteristic is approximately in proportion to the square of $\Delta n$.

From the above description, it is preferable to use, as the constituent material of the optical modulation layer 87, chlorine-based nematic liquid crystals having an ordinary-ray index of refraction $n_o$ of 1.50 to 1.53 and a $\Delta n$ of 0.15 to 0.30, and to use a photo-setting acrylic resin having a fluorine group as the polymer component.

A monomer for the polymer phase may be 2-ethylhexyl acrylate, 2-hydroxyethyl acrylate, neopentyl glycol diacrylate, hexanediol diacrylate, diethylene glycol diacrylate, tripropylene glycol diacrylate, polyethylene glycol diacrylate, trimethylol propane triacrylate, pentaerythritol acrylate or the like. An oligomer or prepolymer for the polymer phase may be polyester acrylate, epoxy acrylate, polyurethane acrylate or the like.

In order to enhance the polymerization rate, a polymerization initiator may be used such as a 2-hydroxy-2methyl-1-phenylpropane-1-on ("DAROCURE 1173" available from Merck & Corp. Inc.), 1-(4-isopropylphenyl)-2-hydroxy-2methylpropane-1-on ("DAROCURE 1116" available from Merck & Corp. Inc.), 1-hydroxy cyclohexyl phenylketone ("Irgacure 651" available from Ciba-Geigy AG) or the like. Furthermore, a chain transfer agent, a photosensitizer, a dye agent, a crosslinking agent or the like may be appropriately incorporated as an additional ingredient.

In addition, it is required that the index of refraction $n_p$ when the polymer material is cured, and the ordinary-ray index of refraction $n_o$ of liquid crystals are generally equal to each other. When a voltage is applied to the liquid crystal layer, the liquid crystal molecules are oriented in one direction, where the index of refraction of the liquid crystal layer becomes $n_o$. Accordingly, it coincides with resin's index of refraction $n_p$, where the liquid crystal layer is transformed to a light-transmitting state. If a difference between the index of refractions $n_p$ and $n_o$ is too large, the liquid crystal layer will not come into a full transparent state even if a voltage is applied to the liquid crystal layer, so that the display brightness lowers. The difference in index of refraction between $n_p$ and $n_o$ is preferably within 0.1, more preferably within 0.05.

Although the ratio of the liquid crystal material in the PD liquid crystal layer 97 is not specified herein, it is generally around 30 to 90% by weight, and preferably around 60% to 85% by weight. If it is below 30% by weight, the amount of liquid crystal droplets is so small that the scattering effect is poor. If it is above 90% by weight, the polymer and the liquid crystals are more likely to be separated from each other into upper and lower layers, with the results of a lower rate of interface and deteriorated scattering characteristic. The structure of a polymer dispersion liquid crystal layer depends on the ratio of liquid crystal portion. If it is below 50% by weight, the liquid crystal exists in the form of discrete droplets. If it is above 50% by weight, the liquid crystal layer is formed into a continuous layer in which the polymer and the liquid crystals are combined with each other complicatedly.

The mean size of droplets or the mean hole size of holes in the polymer network is preferably within a range of 0.5 $\mu$m to 2.0 $\mu$m. Among others, mean size of 0.7 $\mu$m to 1.5 $\mu$m is preferable. The mean size is set to be rather small when the light to be modulated is a short wave (e.g., blue light), and rather large when the light is a long wave (e.g., red light). If the mean size of the droplets or the mean hole size of the polymer network is large, the voltage for transforming to a transmission state becomes low, but the scattering characteristic deteriorates. If it is small, the scattering characteristic is improved, but the voltage for giving a transmission state becomes high. The aforementioned range of 0.7 to 1.5 $\mu$m provides not only appropriate drive voltage and high scattering characteristics but also high responsivity of liquid crystals.

When the polymer dispersion liquid crystal display panels are used as light valves in a projection type display device, the mean size of droplets or the mean hole size of polymer a network of a panel that modulates blue light is set to be smaller than that of the panel that modulates red light.

The film thickness of the liquid crystal layer 87 is preferably within a range of 5 to 20 $\mu$m, and more preferably a range of 8 to 15 $\mu$m. A thickness thinner than the above lower limit would result in worse scattering characteristic so that a proper contrast could not be obtained. Conversely, a thickness thicker than the above upper limit would involve high-voltage drive, making it difficult to design the gate driver 38 that generates a signal for turning on and off TFTs on the gate lines, and a source driver that applies an image signal to the source lines.

Figure 25:
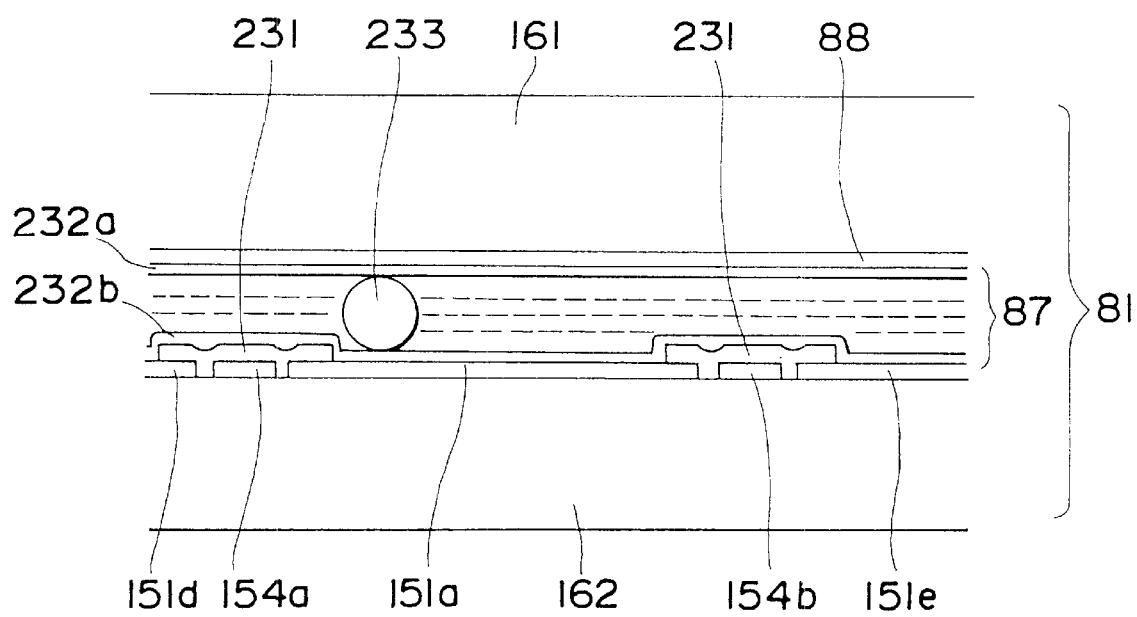
FIG. 25 is a schematic sectional view of a display device.

As shown in FIG. 25, the thickness of the liquid crystal layer 87 is controlled by using black glass beads 233 or black glass fibers, or black resin beads or black resin fibers. In particular, black glass beads or black glass fibers are so high in light absorbance and so hard that a necessary number to be distributed in the liquid crystal layer becomes smaller.

The color of the beads or fibers are black in the above-mentioned example, but it is not limited to black when the liquid crystal display panel is used as a light valve of a projection type display device. The display device uses three display panels to modulate the three colors of R, G, and B. The beads 233 used in the display panel to modulate red light is required only to absorb red light. That is, it is sufficient to use beads 233 containing pigments that have a complementary color of the color of light to be modulated.

The liquid crystal layer 87 scatters incident light with no voltage applied (black display). If transparent beads are used, light leakage would occur through the beads even with a black display on a display screen, to lower the display contrast. Use of black glass beads or black glass fibers inhibits light leakage so that a successful display contrast can be realized.

Further, it is effective to form insulating films 232a, 232b on the pixel electrodes 151 and the counter electrode 88. However, resin shielding films 231 for shielding light are applied to source signal lines 154a, 154b provided between the pixel electrodes 151, and the insulating films 232a and 232b are applied to the shielding films 231. The polymer dispersion liquid crystal layer 87 is relatively low in specific resistance. Therefore, in some cases it is impossible to hold the charges applied to the pixel electrode 151, fully for a time period of one field ($\frac{1}{30}$ or $\frac{1}{60}$ second). If the charges cannot be held, the liquid crystal layer 87 would not become fully transparent, causing the display brightness to lower. A thin film composed of polyimide or other organic substance has a very high specific resistance. Accordingly, the thin films 232a, 232b composed of organic substances are formed on the electrodes to improve the holding rate of charges. Thus, a high-brightness, high-contrast display can be implemented. The insulating films 232a, 232b are for example orientation films of polyimide or the like used for a TN LCD panel or the like, an organic substance such as polyvinyl alcohol (PVA), or an inorganic substance such as $SiO_2$. Polyimide and other organic substances are preferable from the viewpoint of adhesion property.

The insulating films 232a, 232b have another advantage of preventing for the liquid crystal layer 87 from being separated from the substrates 161 and 162 because nearly half the materials constituting the liquid crystal layer 87 are organic substances composed of polymers. Therefore, the insulating films 232a, 232b serve as bonding layers.

Further, the insulating films 232 composed of organic substances also have an advantage that the hole size of the polymer network or the droplet size of droplets of liquid crystals becomes generally uniform. This is ascribable to a fact that organic remainings, even if left on the counter electrode 88, are coated with the insulating film 232a. PVA is superior in this point to polyimide, and this may be ascribed to the polyvinyl alcohol being higher in wettability than polyimide. However, endurance (light resistance and heat resistance) tests performed with various types of insulating films 232 fabricated on. the panel shows that polyimide used for orientation films of TN liquid crystals is superior or almost no variation with time occurred. Therefore, it is preferable to use polyimide as the insulating films 232 for the display panel.

When the insulating films 232 are fabricated with organic substance, its thickness is preferably within a range of 0.02 $\mu$m to 0.1 $\mu$m, and more preferably a range of 0.03 $\mu$m to 0.08 $\mu$m.

The polymer dispersion liquid crystal display panel is indeed able to offer a high-brightness display, but there remain some problems. The problems and their countermeasures adopted for the display panel (display device) are explained below.

Figure 26A:
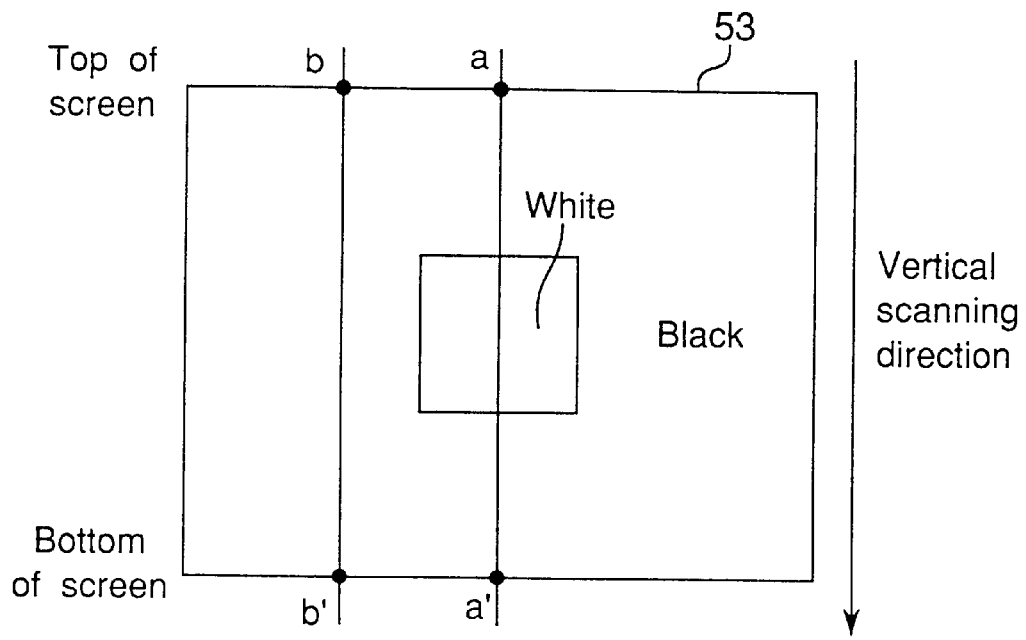
FIG. 26A is a diagram of an image on a display and FIG. 26B is a graph of brightness along a–a' and b–b' lines in FIG. 26A for explaining problems of a prior art LCD.
Figure 26B:
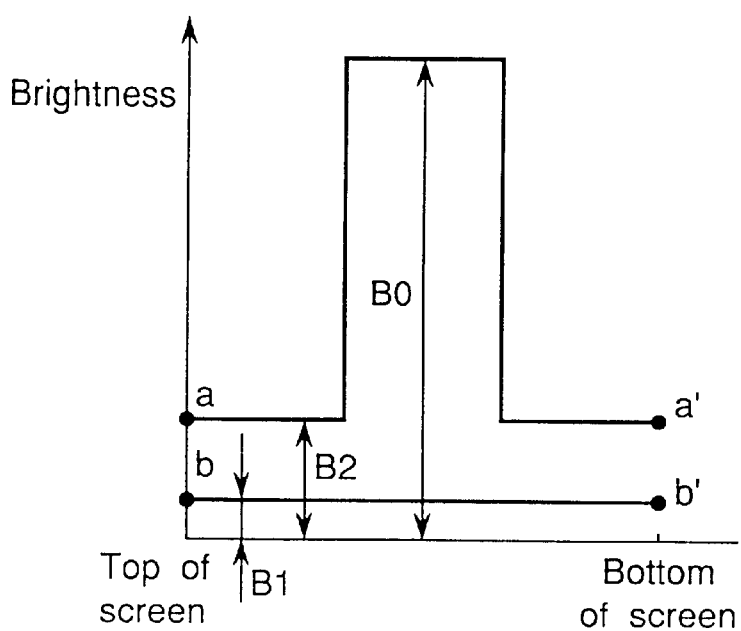

One factor which deteriorates contrast in an image with a polymer dispersion liquid crystal display panel is light leakage through peripheral portions of the pixels. This is due to the orientation of liquid crystal molecules along electric lines of force generated between source lines and pixel electrodes. In particular, as shown in FIG. 26A, the light would leak noticeably when a white window is displayed, or black display areas above and below the white window would become gray (this phenomenon will hereinafter be referred to as black instability). FIG. 26B shows brightness distribution in this case. The black instability will not occur in a portion along line b–b' in FIG. 26A, and theoretically the brightness is constant at brightness $B_1$ from upper to lower portions of the screen. However, in a portion along line a–a' in FIG. 26A, the portion corresponding to brightness $B_1$ increases to $B_2$. When a natural image is displayed on the panel, white lines are displayed above and below the white display portion (which phenomenon will hereinafter be referred to as tailing). This phenomenon deteriorates the image display grade to a large extent.

The above-mentioned black instability can be prevented by forming a black matrix as in the TN LCD panel. However, it is not preferable to form a black matrix on the counter electrode 88. This is due to a fact that, in the process of fabricating a polymer dispersion liquid crystal display panel, a mixture of uncured ultraviolet-setting resins and liquid crystals (mixed solution) is injected between the counter electrode 88 and the pixel electrodes 151 and then ultraviolet rays are applied to set the resins so that the resin component and liquid crystal component are separated in two phases. The ultraviolet rays are applied from the side of the counter substrate 161. If a black matrix is formed on the counter electrode 88, the resin components under the bit matrix would not be set so that the liquid crystal and polymer resin components are separated from each other. As a result, the display panel would be poor on stability, and its characteristics largely vary with time such that it could hardly be used as a light valve substantially.

Further, when a black matrix was formed on the counter electrode 88, the bonding precision between the counter substrate 161 and the array substrate 162 would be of importance. If there was a shift in bonding position, light leakage would occur at ends of the bit matrix. The black matrix is generally formed into a thick width by taking into consideration the bonding precision, where a common bonding precision is 5 to 10 $\mu$m. A thick black matrix would cause the pixel aperture rate to lower eventually, to lower the display brightness.

Figure 28A:
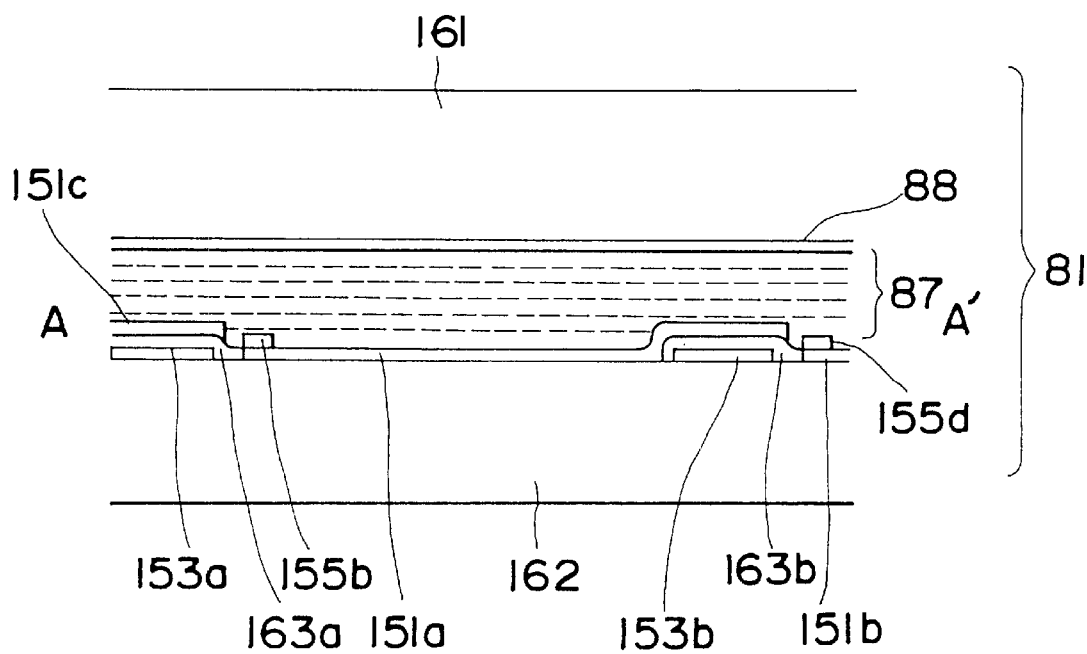
FIG. 28A and FIG. 28B are schematic sectional views along A–A' line and along B–B' line in FIG. 27.
Figure 28B:
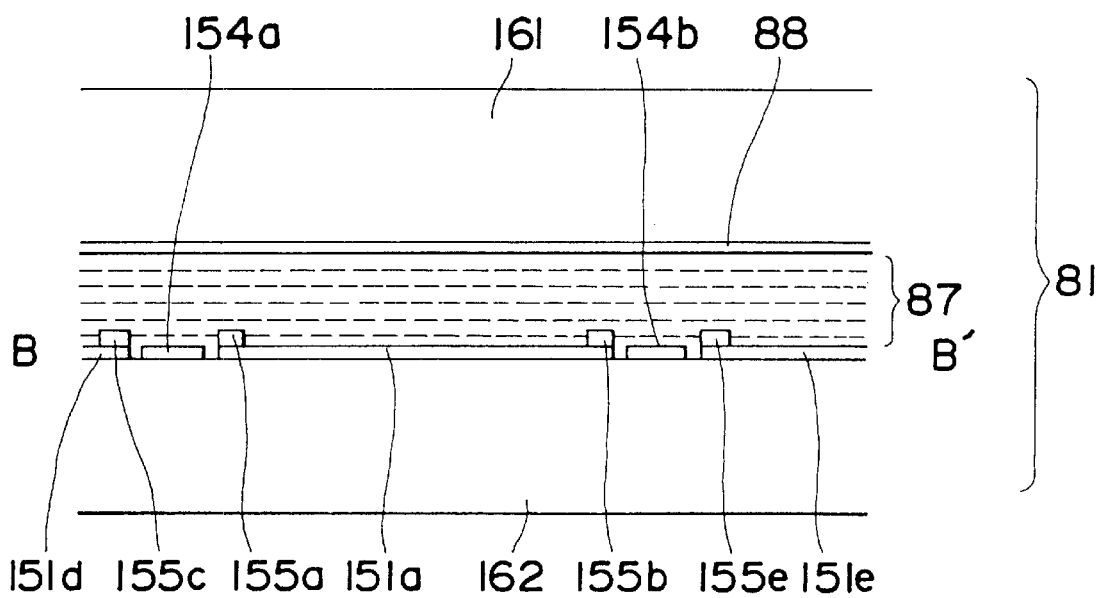

Thus, as shown in FIGS. 28A and 28B, for example, light-shielding films 155 or equivalents thereof serving as a black matrix are formed on the side of the pixel electrodes 151. Normally, the light-shielding films 151 are not formed on the side of the counter electrode 88. Therefore, when ultraviolet rays are incident from the side of the counter electrode 88 in fabricating processes, there will not occur unreacted resin components nor variation with time. By forming the black matrices 156 at the side of the pixel electrodes 151 on thin film transistors 86, the need to take into consideration the bonding precision between the counter substrate 161 and the array substrate 162 is eliminated.

Figure 27:
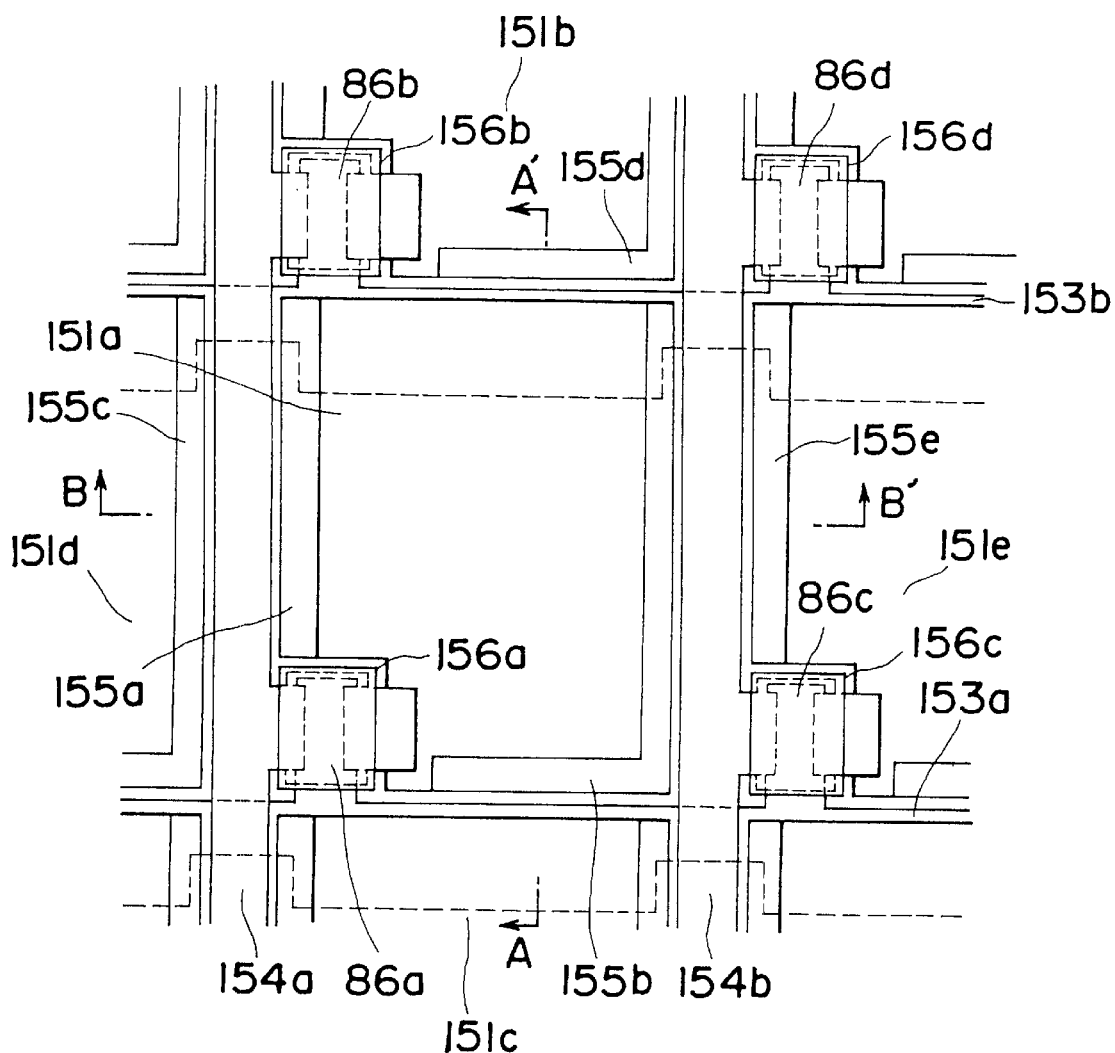
FIG. 27 is a plan view of a display device.

FIG. 27 is a plan view of an array substrate 162 and it shows an example of light-shielding films 155a–155d formed on the pixel electrodes 151 at the sides thereof. In FIG. 27, reference numerals 153 and 154 denote gate signal lines and source signal lines. Further, FIG. 28A is a sectional view taken along the line A–A' of FIG. 27, and FIG. 28B is a sectional view taken along the line B–B' of FIG. 27.

Figure 29:
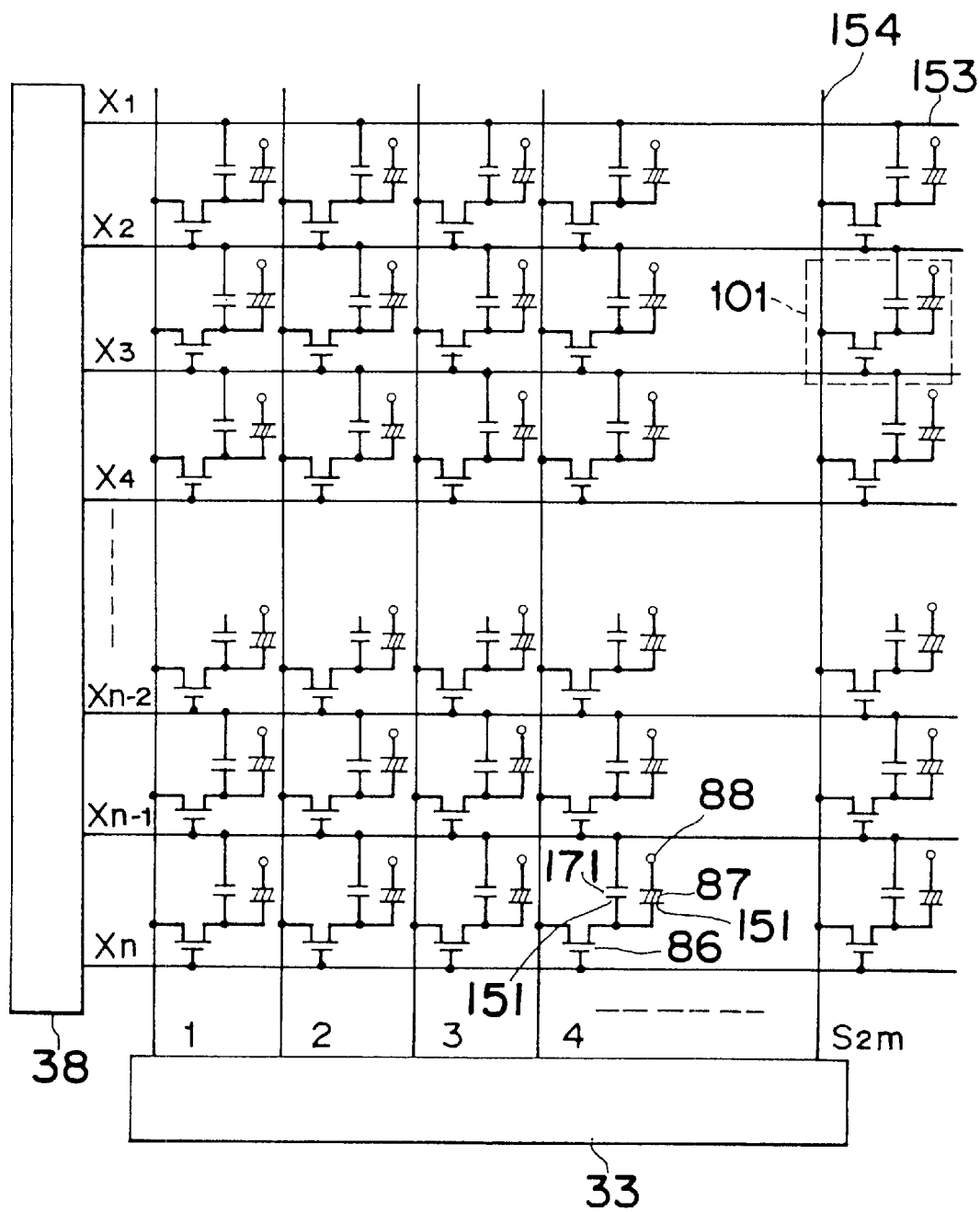
FIG. 29 is a partial equivalent circuit diagram of a display device.

FIG. 29 shows an equivalent circuit diagram of the display device shown in FIGS. 27, 28A and 28B. Reference characters $S_1$ to $S_n$ denote the source signal lines 154, while characters $G_1$ to $G_m$ denote the gate signal lines 153. The thin film transistors (TFTs) 86 as switching devices are formed at intersecting points between the source lines 154 and the gate lines 153. One terminal of the TFTs 86 is connected to a gate signal line 153, another terminal is connected to a source signal line 154, and the remaining one terminal is connected to a pixel electrode 151. Further, since charges necessary for one field could not be accumulated at the terminals only with charges in the liquid crystal layer 87, additional capacitors 171 are provided between the pixel electrode 151 and the gate signal lines 153. It is noted that the area surrounded by dotted lines in FIG. 29 corresponds to one pixel 101.

A material of the light-shielding films 155 is for example chromium, and its film thickness needs to be 500 Å or more in view of the light-shielding. The width of the light-shielding film 155 should be determined by taking into consideration a voltage applied to the signal lines 154 and the like and the film thickness of the liquid crystal layer 87. Shorter distances between the counter electrode 88 and the signal lines would result in relatively smaller numbers of lines of electric force generated between the signal lines 154 or the like and the pixel electrodes 151. Further, wider intervals between the pixel electrodes 151 and the signal lines 154 would also result in relatively smaller numbers of lines of electric force. A smaller amplitude of signals applied to the source lines 154 allow the width of the light-shielding film 155 to be decreased.

The light-shielding films 155 are not limited to metal thin films. They may be replaced with light-absorbing films. A light-absorbing material for forming the light-absorbing films is required only to be a material that has a high electrical insulating property so as not to adversely affect the liquid crystal layer 87. For example, a material in which a black coloring matter or pigment has been dispersed in a resin may be used, or otherwise gelatin or casein may be colored with a black acidic dye as in color filters. As examples of the black pigment, a fluorane-based pigment that presents the black color by itself may be used, or a blended black in which green pigments and red pigments are mixed together may be used.

Although the above materials are all for black color, they are not limited to the above-mentioned examples when the display device of the present embodiment is used as a light valve of a projection type display device. The projection type display device uses three display devices. Each of the display devices is assigned to one color of the three colors of light, R, G, and B, and serves to modulate it. For example, the light-absorbing film of a display device for modulating red light is required only to absorb red light. Accordingly, for example, in order to absorb a particular wavelength, a light-absorbing material for a color filter may be modified to obtain a desirable light-absorbing characteristic. In principle, as in the aforementioned black-color absorbing materials, it is possible to use materials in which natural resins are colored with pigments or in which pigments have been dispersed in synthetic resins. The pigments may be selected from a wider range than the black pigments, that is, appropriate one or more types may be selected among azo dyes, anthraquinone dyes, phthalocyanine dyes, triphenylmethane dyes, and the like.

The black pigments are usually materials which adversely affect the liquid crystal layer 87. Therefore, it is not preferable to use them. It is preferable to adopt pigments that can absorb a particular wavelength as the pigments contained in the light-absorbing thin film, as described above.

Light-absorbing films are easy to be adopted in a projection type display device using three display devices for red, green, and blue as the light valves. That is, it is only required that a pigment of a complementary color of the color of light to be modulated be contained in the light-absorbing films. The complementary color is, for example, yellow to B light. A light-absorbing film colored into yellow absorbs B light. Accordingly, a yellow light-absorbing film may be formed for a display device that modulates blue light.

Generally two advantages can be mentioned on the formation of the light-absorbing films. These advantages are explained with reference to FIG. 30. A first advantage is improvement in the display contrast. An incident ray A is scattered by droplets 181 of liquid crystals and reaches onto the pixel electrodes 151. If the light-absorbing films 155 are provided, the light is absorbed on reaching onto the pixel electrodes 151. If the light-absorbing films 155 are not provided, the light reaches onto the array substrate 162 and goes out therethrough, so that black instability takes place and the display contrast deteriorates.

A second advantage is the prevention of indirect propagation of light to adjacent pixels. An incident ray B is reflected by droplets 181 of liquid crystal, and repeatedly reflected between the counter electrode 88 and the pixel electrodes 151, to reach to adjacent pixels (as indicated by dotted line). Because the light-absorbing films 155 are provided, the light is absorbed by the light-absorbing films 155, so that the light will not be incident on adjacent pixels. This suppresses the pixels from blurring.

P-polarized light and S-polarized light are defined here with reference to FIGS. 31A and 31B because they are involved in later description. The P-polarized light refers to light 317 that oscillates in a plane containing both a normal 312 to the plane of a light source component such as a dichroic mirror 314 and a forward propagation direction of incident light 311. It is noted that "plane containing a forward propagation direction of light" is designated as a P-polarizing plane 318 and that an axis extending on the plane and vertical to the forward propagation direction of light is designated as a P-polarization axis 315. Also, the S-polarized light refers to light that oscillates in a direction vertical to the oscillating direction 313 of the P-polarized light. The plane in which the S-polarized light oscillates is designated as S-polarizing plane, and the axis extending on the plane and vertical to the foward progapation direction of light is designated as S-polarization axis. Therefore, the P-polarization axis and the S-polarization axis intersect each other perpendicularly.

Even in polymer dispersion liquid crystals, a polarization dependence is caused by the liquid crystals oriented. The reason of this polarization dependence is explained by using FIGS. 26A, 26B, 32A and 32B. As to liquid crystal molecules 281, the index of refraction in the major-axis direction and that of the minor-axis direction are different from each other. For liquid crystal molecules normally having a positive index of refraction, the index of refraction in the major-axis direction is designated as extraordinary-ray index of refraction $n_e$, while that in the minor-axis direction is designated as ordinary-ray index of refraction $n_o$. The polymer dispersion liquid crystal includes a polymer material 182 having a index of refraction generally equal to the ordinary-ray index of refraction $n_o$. The index of refraction of the polymer 182 is assumed as $n_p$.

Figure 32A:
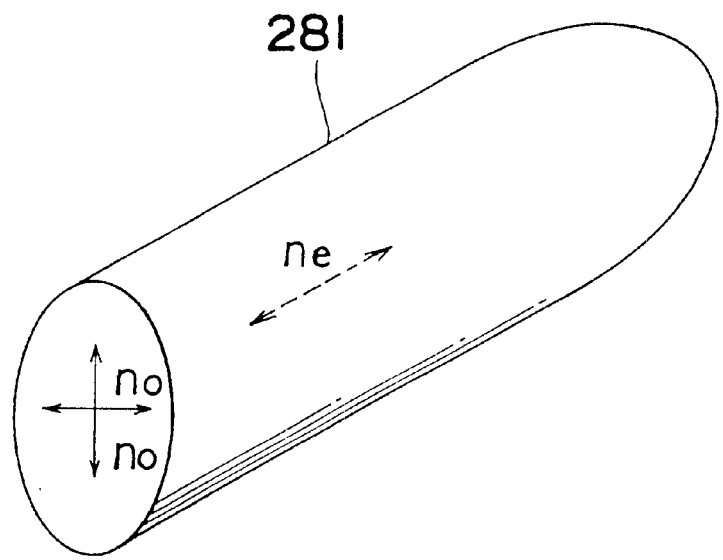
FIG. 32A is a schematic view of a liquid crystal molecule.
Figure 32B:
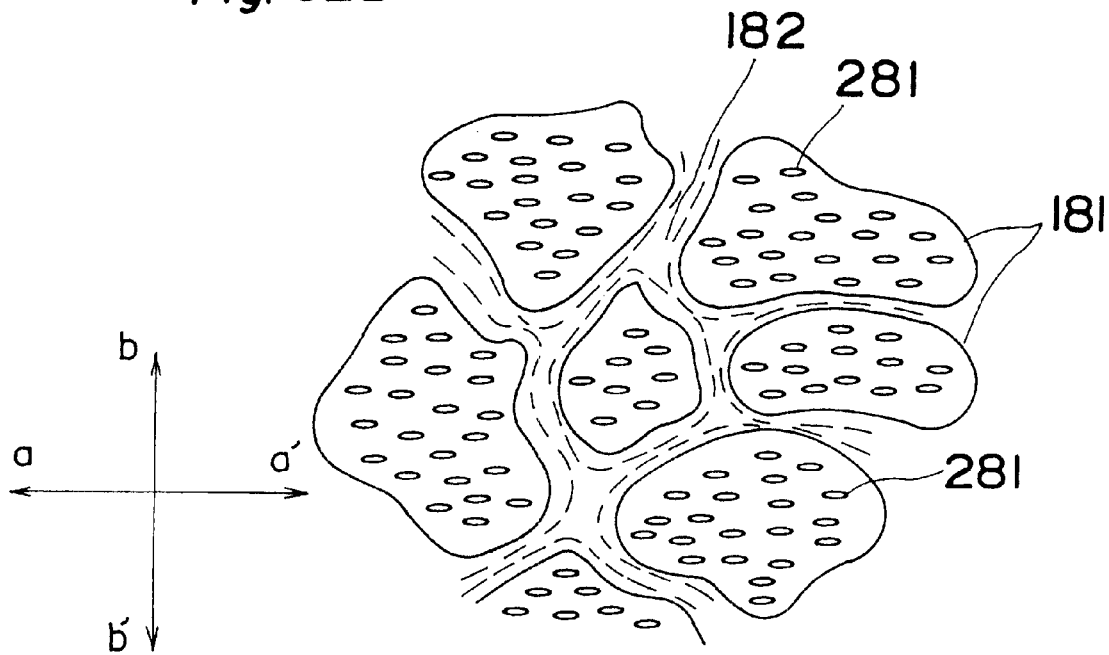
FIG. 32B is a schematic view of liquid crystals.

As shown in FIG. 32B, when an electric field exists in a direction of aa', the liquid crystal molecules 281 are oriented along the electric field. Then, the index of refraction distribution in the aa' direction is brought into such a state that the index of refraction $n_p$ of polymer ($n_p=n_o$) and the extraordinary-ray index of refraction $n_e$ of liquid crystal molecules are mixedly present, where $n_p \neq n_e$. As a result, the polarized light in the aa' direction is scattered. In the direction of bb', on the other hand, the state is such that the ordinary-ray index of refraction $n_o$ and the index of refraction $n_p$ are mixedly present, where $n_o=n_p$, so that the polarized light in the bb' direction is transmitted without being scattered.

As described above, when a lateral electric field in the aa' direction causes the liquid crystal molecules 281 to orient along the lateral electric field, the polarized light in the bb' direction is transmitted while the light in the aa' direction is scattered. That is, polarization dependence takes place.

As will be described later, if signals of identical polarity are applied to the pixels in the direction of lines (aa' direction) as shown in FIG. 12, the lateral electric field between adjacent pixels is developed in the vertical direction (bb' direction, or direction of columns). Accordingly, the liquid crystals are oriented along the bb' direction, so that the polarized light in the aa' direction is more easily transmitted (light leakage). Therefore, a highly successful contrast could not be realized without suppressing the aforementioned lateral electric field. Thus, in an embodiment of display method of the present invention, the panel structure is also subjected to various measures. In this sense, the display method is integrated with the structure of the display panel with indispensable relationship to each other.

Figure 33:
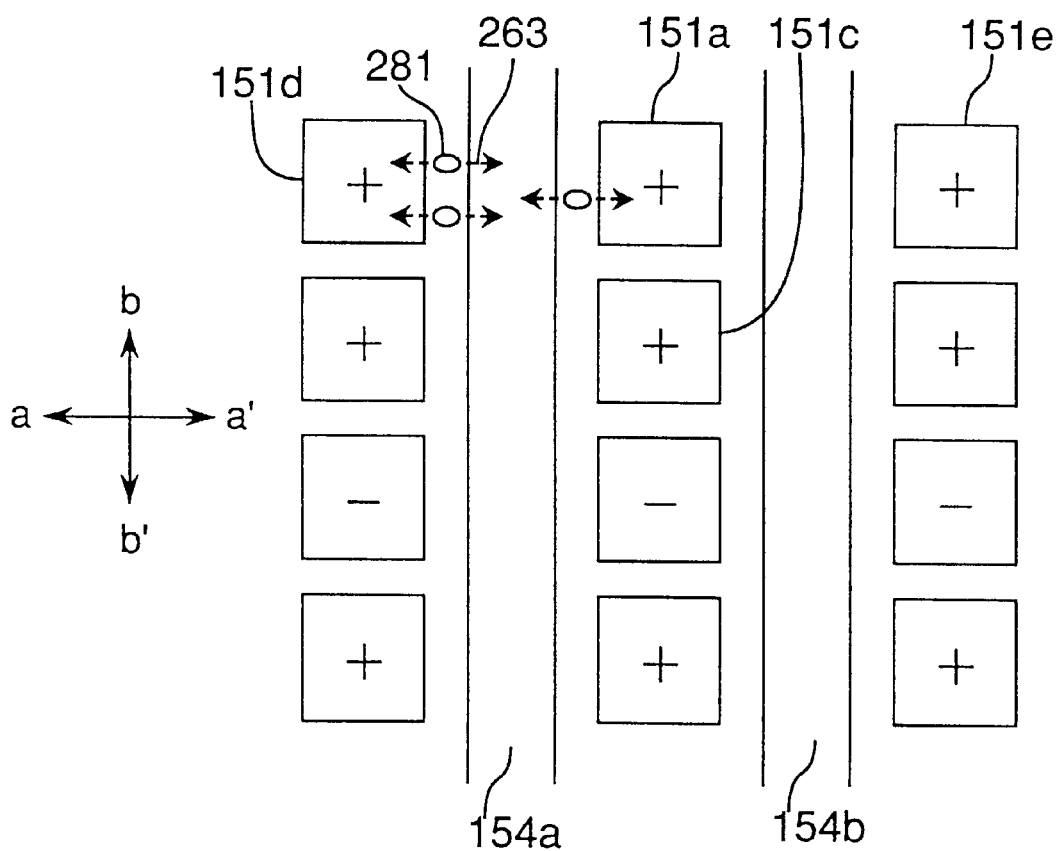
FIG. 33 is a diagram of pixel electrodes for explaining alignment of molecules along a lateral electric field.

With a potential difference between the pixel electrode 151 and a source line 154 as shown in FIG. 33, a line of electric force 263 (lateral electric field) is developed, so that the liquid crystal molecules 281 are oriented along the electric field. Since the liquid crystal molecules 281 are oriented in a single direction, there occurs light penetration at portions around pixel electrodes 151 while polarization dependence is caused between the pixel electrodes 151 and the source lines 154.

Referring to FIGS. 34A–34F provided for a simpler description, it is assumed that polarized light in the aa' direction in FIG. 33 is an incident direction. Also for a simpler description, it is further assumed that the potential of the counter electrode is 0 V (denoted by "G" in the drawings), a positive potential with respect to the potential of the counter electrode is a positive voltage (denoted by "+" in the drawings, and the negative-polarity potential with respect to the potential of the counter electrode is a negative voltage (denoted by "−" in the drawings).

Figure 34A:
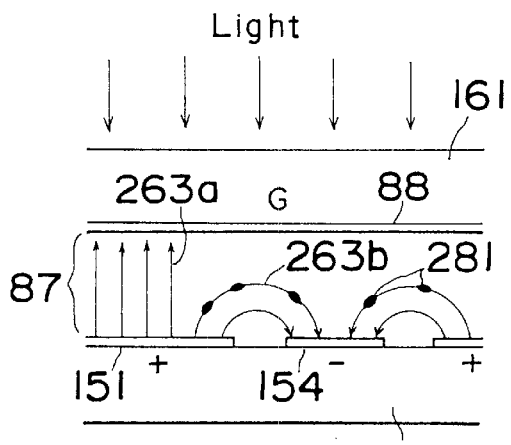
FIGS. 34A, 34B, and 34C are diagrams for showing electric fields in a liquid crystal display.
Figure 34B:
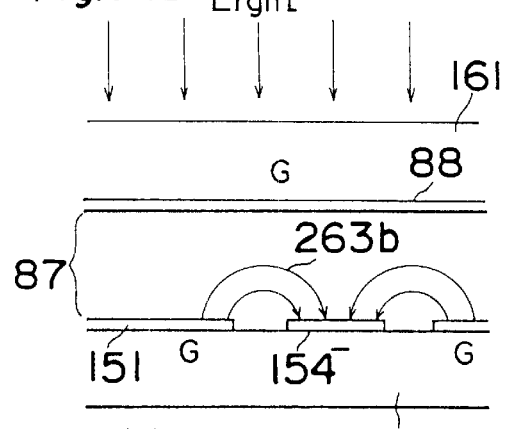
Figure 34C:
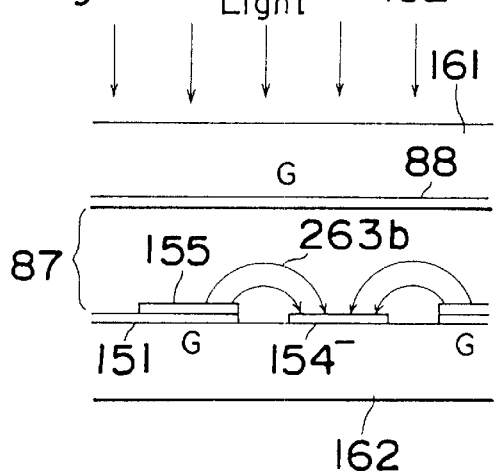
Figure 34D:
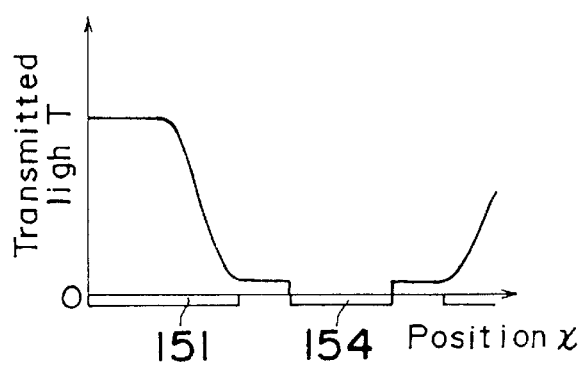
FIGS. 34D, 34E and 34F are schematic sectional views on the distribution of transmitting light.
Figure 34E:
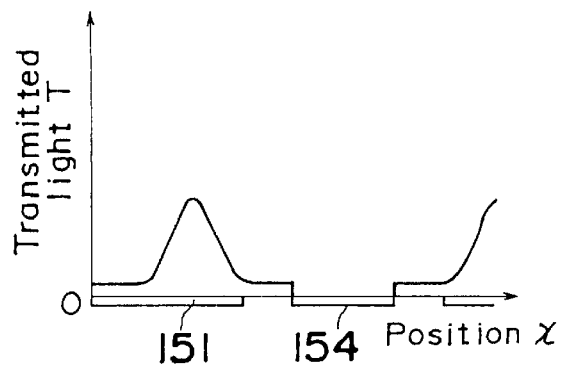
Figure 34F:
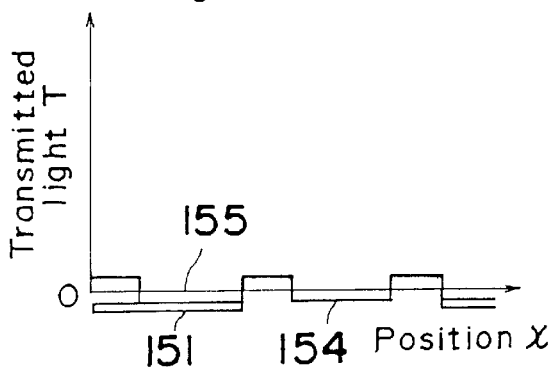

FIGS. 34A, 34B, and 34C each illustrate the occurrence of lines of electric force within the liquid crystal layer 87. FIGS. 34D, 34E, and 34F show the transmittance T in the vertical axis at position x of the array substrate 162 in the horizontal axis, where the distribution of transmitted light is plotted conceptually. In FIGS. 34A, 34B, and 34C, a positive voltage is applied to the pixel electrode 151 while a negative voltage is applied to the source line. Lines of electric force take place between the counter electrode 88 and the pixel electrode 151 (a line of electric force 263a) and between the pixel electrode 151 and the source line 154 (line of electric force 263b). A line of electric force between pixel electrode 151 and signal line in this way is called a lateral electric field. The liquid crystal molecules 281 are oriented along the line of electric force 263 when the strength of the line of electric force (electric field strength) is not less than a specified value (a rise voltage of liquid crystals). On the condition that the direction of the line of electric force 263 is vertical to the counter electrode 88, when the liquid crystal molecules 281 are oriented along the line of electric force, the apparent index of refraction of the liquid crystal layer becomes the ordinary-ray index of refraction $n_o$. Since the indices of refraction $n_o$ and $n_p$ of the polymer 182 have the relationship that $n_o \approx n_p$, the liquid crystal layer 87 comes into transparent state. Meanwhile, on condition that the direction of the line of electric force 263 is parallel to the counter electrode 88, when the liquid crystal molecules are oriented along the line of electric force 263, the apparent index of refraction $n_x$ of the liquid crystal layer becomes $(n_o+n_e)/2$. Since $n_x \approx n_p$, the liquid crystal layer 87 comes into scattering state.

The liquid crystal layer between the pixel electrode 151 and the signal line 154 is brought into scattering state. The lines of electric force 263 around the pixel electrodes 151 are directed oblique to the counter electrode 88, causing semi-transparent state. This results in a distribution of transmitted light T as shown in FIG. 34D.

FIG. 34B shows a case where the potential of the pixel electrode 151 is ground potential (G). In this case, there occur only lines of electric force 263b between the signal line 154 and the pixel electrode 151. It is at pixels in display areas above and below the white display area of FIG. 32A that such a potential state takes place. Since the pixels of the display areas above and below display black, there is no potential difference between the counter electrode 88 and the pixel electrode 151. However, a signal applied to the pixels of the white display portion is added to the source line 154, causing the lines of electric force 263b to be generated by a lateral electric field. As a result, the liquid crystal layer 87 around the pixels is brought into a semitransparent state, where light penetrates therethrough. In the display panel of the present embodiment, since the light-shielding films 155 are formed around the pixel electrodes as shown in FIG. 34C, there occurs no light penetration so that a successful black display can be realized.

According to experiments, the light penetrates largely around the pixel electrodes but relatively little between the pixel electrodes 151 and the signal lines 154. Accordingly, only the provision of the light-shielding film 155 suffices for practical use in many cases, without providing a polarizing plate to the polymer dispersion LCD panel. Therefore, high-brightness display is more often desired.

Figure 35A:
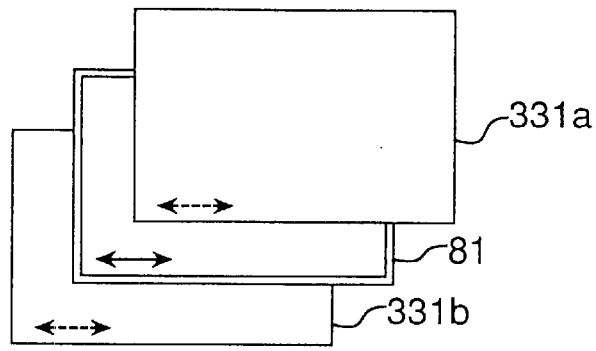
FIGS. 35A, 35B and 35C are schematic diagrams of liquid crystal display panels.
Figure 35B:
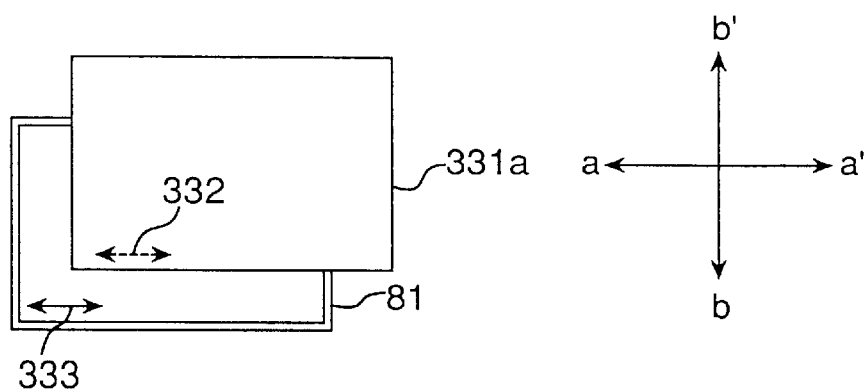
Figure 35C:
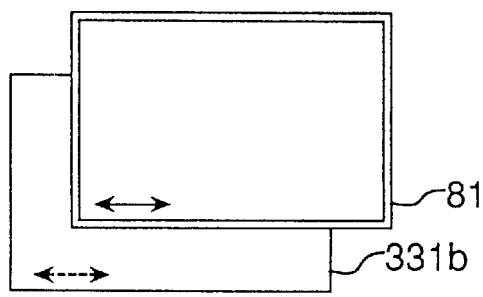

When a polarizer is used, the polarization axis of the polarizer is aligned with the direction in which the lateral electric field is generated. For example, when a lateral electric field is generated between the source lines 154 and the pixel electrodes 151, a polarizer 331 and the display panel 81 are arranged as shown in FIGS. 35A–35C where the polarization axis 332 is along the direction in which the gate lines are formed. In FIGS. 35A–35C and 36A–36C, arrows of solid line denote the direction in which the lateral electric field is generated in the display panel, while arrows of dotted line denote the direction of the polarization axis of the polarizer (direction of polarization). The polarizer may be disposed either on both incoming and outgoing sides of light of the polymer dispersion liquid crystal display panel as shown in FIG. 35A, or only on one side as shown in FIGS. 35B and 35C. Of course, FIG. 35A shows a good contrast display, where the display brightness will be lowered in proportion to the transmittance of the polarizer 331. Which arrangement in FIGS. 35A–35C is adopted may be determined according to the light use efficiency, cost, and display contrast. It is noted that such a structure using a polarizer 331 is referred to as a polarizer structure.

Figure 36A:
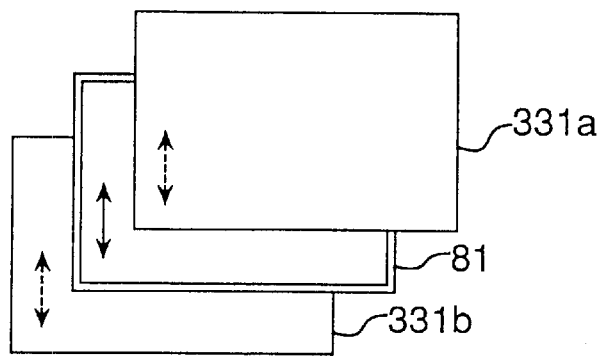
FIGS. 36A, 36B and 36C are schematic diagrams of liquid crystal display panels.
Figure 36B:
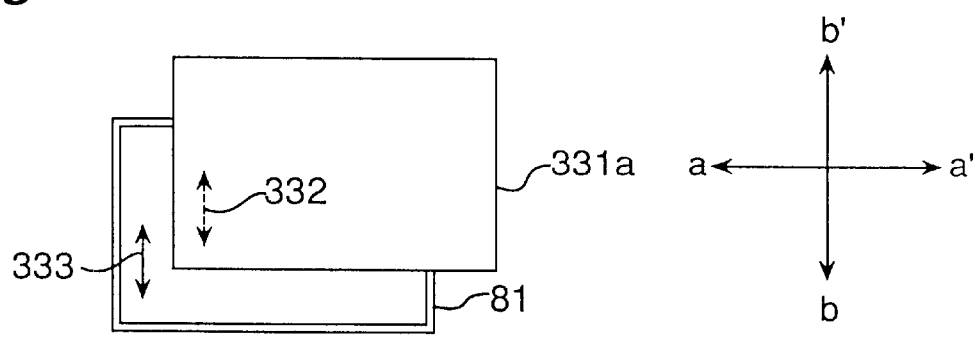
Figure 36C:
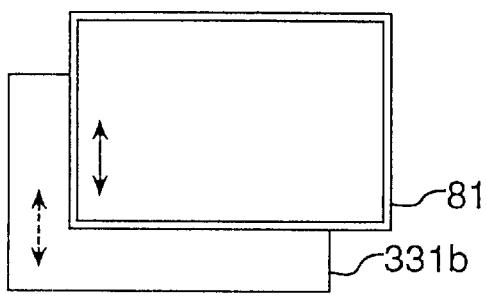
Figure 37:
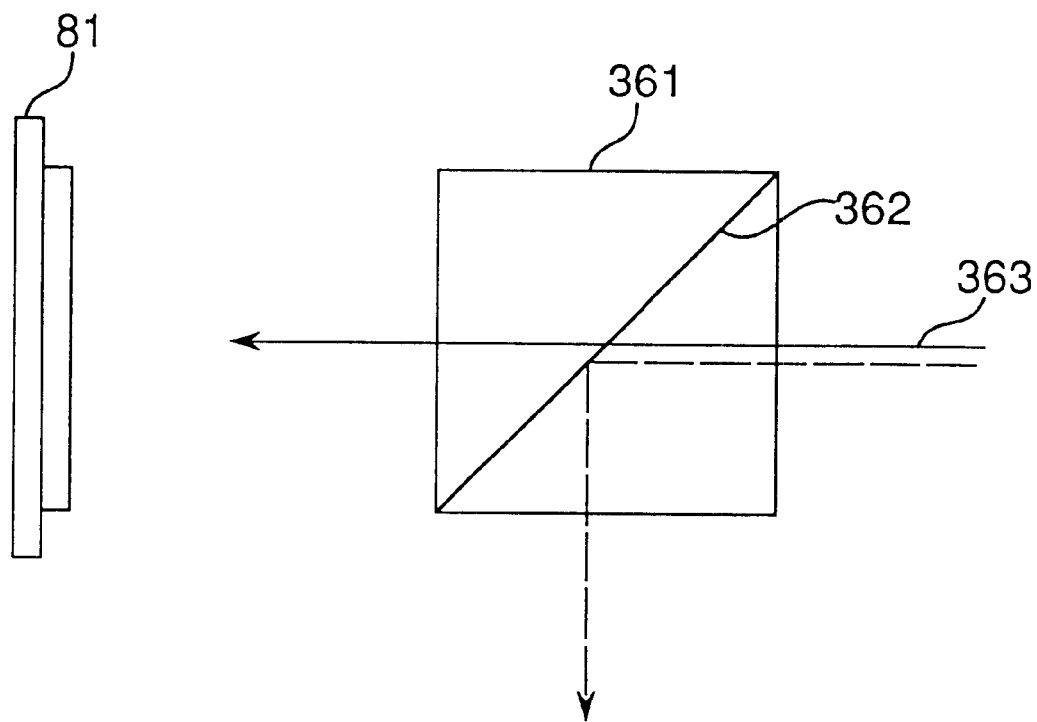
FIG. 37 is a sectional view of a display device having a polarization beam splitter.

The technical concept of the embodiment is to make linearly polarized light incident on the LCD panel 81 by taking the direction of the lateral electric field into account. One means for implementation of this concept is to use the polarizer 331, as described above as shown in FIGS. 35A–35C or 36A–36C. Another means is to use a polarization beam splitter 361 as shown in FIG. 37. Incident light 363 is separated into P-polarized light and S-polarized light by a light-separating plane 362 of the polarization beam splitter 361. The P-polarized light and the S-polarized light are arranged for the light to become incident on the LCD panel 81.

In FIG. 33 and the like, the voltage written into the pixel electrodes 151 is represented as + for positive and − for negative with respect to the counter electrode 88, regardless of the magnitude of the voltage. Actually there is no possibility that voltages applied to the individual pixels are of the same, except raster display. However, since signals of nearly the same level are-applied between adjacent pixel because electrodes 151, it further minimizes problems that, with respect to one given pixel, its neighboring pixels have signals (voltages) of the same level written thereinto. That is, if the voltages applied to the adjacent pixel electrodes 151 are identical in polarity among them, no lateral electric field is generated among those pixel electrodes 151. Conversely, if the voltages are different in polarity, even though equal in absolute value, among those pixel electrodes 151, then a lateral electric field is generated.

If no electric field derived from the source lines 154 is generated so that the liquid crystal molecules are oriented by a lateral electric field generated only among the adjacent pixel electrodes, with light leakage occurring, then the direction in which the lateral electric field is generated is the bb' direction in the case of H-inversion drive of FIG. 12. Accordingly, the polarized light in the aa' direction becomes easy to transmit. Therefore, the light leakage can be prevented by disposing the polarizer 331 as shown in FIGS. 36A–36C. In the case of column-inversion drive of FIG. 13, the direction in which a lateral electric field is generated is reverse to that of FIG. 12. Thus, the polarizer 331 may properly be disposed as shown in FIGS. 35A–35C.

The direction of display in the present embodiment is one of the H-inversion drive in which voltages of the same polarity are applied in the line direction. Accordingly, a polarizer, when used, is disposed as shown in FIGS. 36A–36C. This is an important point for the present embodiment, because combining this arrangement with the polarizer structure of FIGS. 36A–36C makes it possible to perfectly prevent any light leakage around the pixel electrodes 151 due to a lateral electric field, so that a very successful display contrast can be realized. The technical concept of taking into account the polarity of the voltages applied to the pixel electrodes 151 and the polarization axis 332 of the polarizer 331 as described above is an important matter for the aforementioned polarizer structure.

As described above, a lateral electric field takes place in a polymer dispersion LCD panel. As a result, light leakage occurs at peripheral portions of the pixel electrodes 151. Countermeasure of light leakage due to lateral electric field is an important matter for implementation of successful display contrast.

Figure 38:
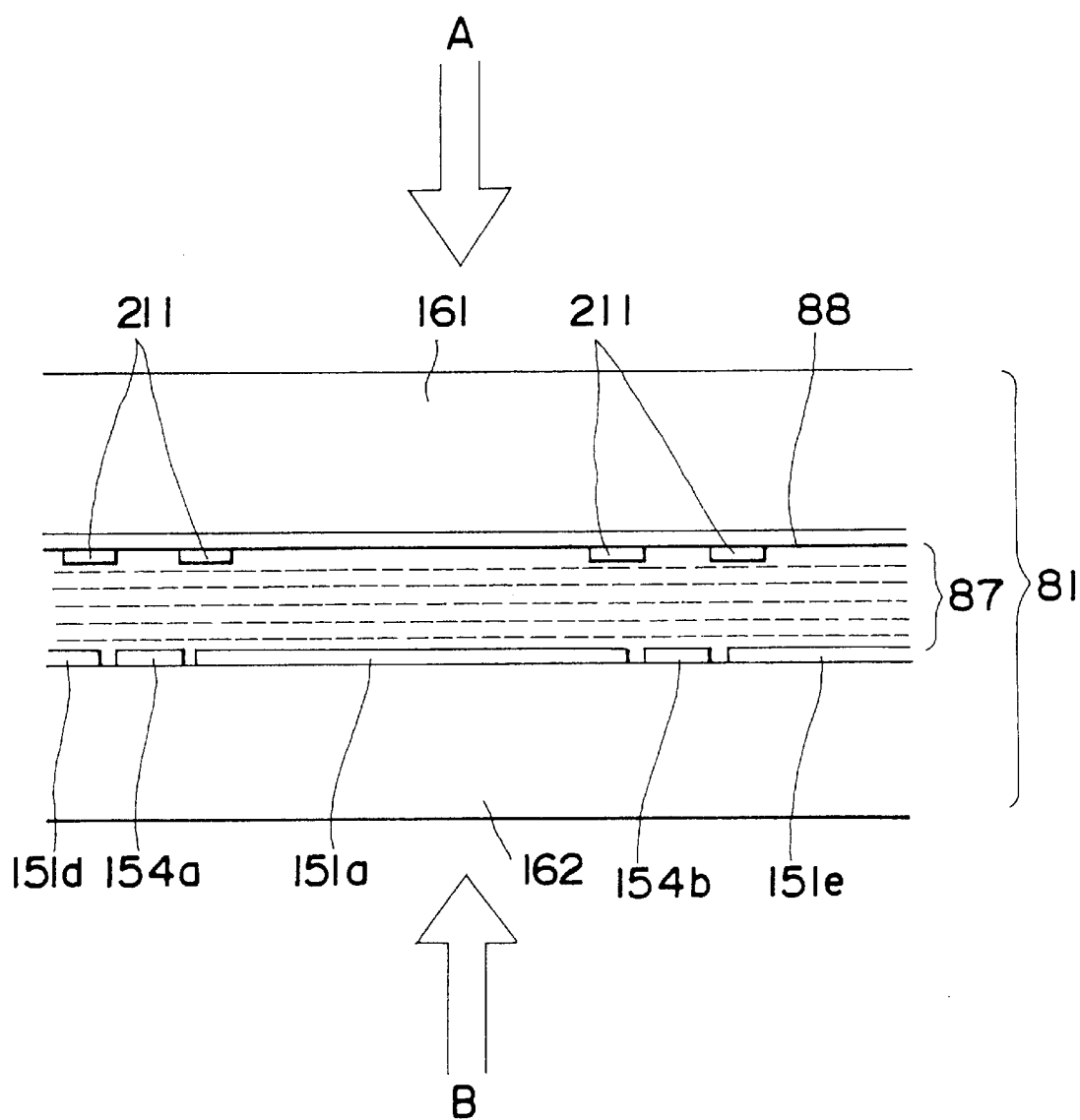
FIG. 38 is a sectional view of a display device.

One of the countermeasures is a light-shielding film structure as shown in FIG. 27 in which the light-shielding film 155 is added. Although the light-shielding film 155 (which may also be regarded as a light-absorbing film) has been arranged to be formed on the pixel electrodes 151 in FIG. 27, it may also be formed on the counter electrode 88 as shown in FIG. 38 (light-shielding films 211). For some reasons involved in fabricating processes, the light-shielding film 211 would cause unpolymerized polymer components to be produced in the process of phase separation between liquid crystal component and resin components. However, it can be solved as explained below.

First, an unpolymerized polymer component and liquid crystal component are injected between the pixel electrodes 151 and the counter electrode 88, and then ultraviolet rays are applied in a direction of A. Since the polymer in a lower layer below the light-shielding film 211 remains unpolymerized, the remaining unpolymerized polymer component is set by irradiating ultraviolet rays in a direction of B. That is, the polymer on the light-shielding film 211 is set in the direction of B while the polymer on the source lines 154 is set in the direction of A. As a result, the liquid crystal layer 87 can attain perfect phase separation between the liquid crystal and the polymer component.

Figure 39:
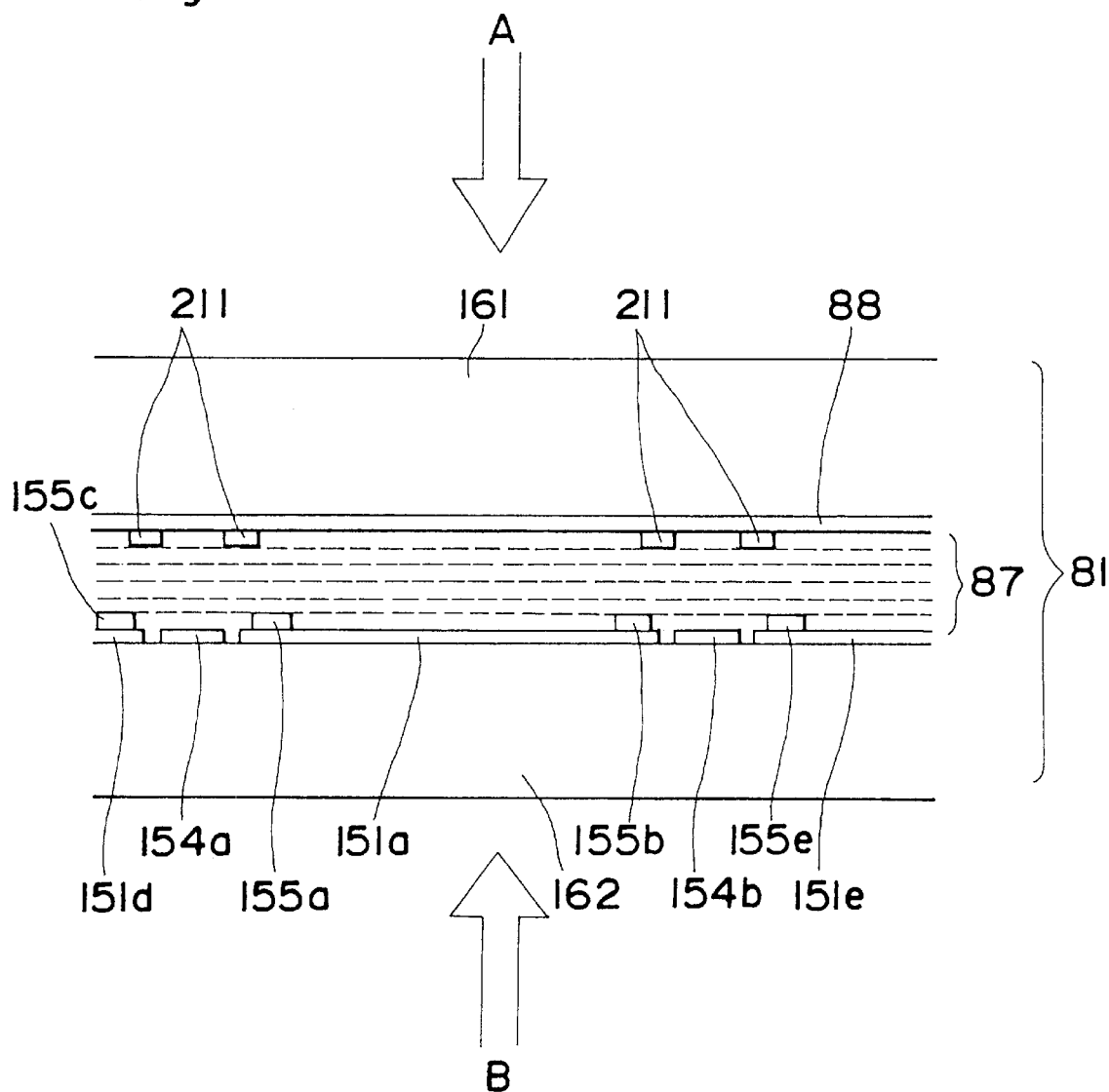
FIG. 39 is a sectional view of a display device.

In order to enlarge an allowable range for the positioning in bonding between the opposite substrate 161 and the array substrate 162, there is provided a structure shown in FIG. 39 in which light-shielding films 155 are formed on the pixel electrodes 151 near edges thereof, besides the structure shown in FIG. 38 using the light-shielding films 211. In this structure, even if a shift is involved more or less in the bonding, there will never occur light penetration through the peripheral portions of the pixel electrodes 151. Consequently, it is appropriate that the light-shielding film 155 and the light-shielding film 211 are overlapped with each other as to an allowable range of bonding as viewed in the direction of A.

If a black matrix is not formed, as in conventional TN LCD panels, the polymer component on the source lines 154 would remain uncured in the polymer dispersion LCD panel. This is because a black matrix is present on the counter electrode 88 above the source lines 154. In the present embodiment, as shown in FIGS. 27 or 38, the light-shielding film is removed from being on the source lines 154, so that uncured polymer component will not be generated. In addition, the light-shielding films 155, 211 may be replaced with a light-absorbing film structure as described before.

Further, as shown in FIG. 25, the light-shielding film may be formed between the pixel electrodes 151 and the signal lines 154, as well as on the signal lines 154 (light-shielding films 231). In this case, the light-shielding films 231 must be made of an insulating material. It is needless to explain that, as the insulating material, available are the blended black, which has been illustrated before for the light-absorbing film structure, or those in which carbon is contained in acrylic polymer, or the like.

The light-shielding films 155, 231, and 211 described above are formed around the source lines 154 or on the signal lines, but they are not limited to such positions. It is apparent that they should be formed around the gate lines 153 or on the gate lines 153. This is because if the H-inversion drive is executed as shown in FIG. 12, lateral electric field is generated between upper and lower pixels so that light penetration takes place.

One arrangement for preventing the light penetration due to lateral electric field is such that the source lines 154 or the gate lines 153 are surrounded by a material of low dielectric constant. Such structures are shown in FIGS. 41 and 42. Source lines 154 are surrounded by low dielectric films 241 in FIG. 40 and source and gate lines 153, 154 are surrounded by low dielectric films 241. The low dielectric films 241 are made of a material having a dielectric constant lower than the dielectric constant of the liquid crystal layer 87. The dielectric constant of the polymer in the liquid crystal layer 87 is around 5, while that of the liquid crystal is 15 to 30. The liquid crystal layer 87 is a mixture of the polymer and liquid crystal and therefore its dielectric constant is in a range of 5 to 30.

The material of the low dielectric films 241 may be the same organic material as the polymer, an inorganic substance such as $SiO_2$ or $SiN_x$, or a resist material used for semiconductor processes. Since the low dielectric films 241 need to be formed relatively thick, it is preferable to use the same materials as the polymer or an organic substance like a resist. Such a structure is referred to as a low dielectric film structure. If necessary, the low dielectric film 241 is formed also on the gate lines 153.

The low dielectric films are formed at places where lateral electric field is generated. Its film thickness is preferably thick. Since the polymer dispersion LCD panel does not need the rubbing or other orientation process, it is no problem that irregularities are generated on the surface of the array substrate 162 and the like due to the low dielectric film 241. This is a large advantage of the polymer dispersion LCD panel, in contrast to the TN LCD panel.

If pigments used in the light-shielding film 155 and the like are mixed into the low dielectric film 241, the low dielectric film 241 becomes a light-shielding film fortunately. Mixing pigments and the like would cause almost no increase in the dielectric constant. However, use of carbon as a pigment would cause the dielectric constant to increase more or less. Further, the degree of capacitive coupling between the pixel electrodes 151 and the source lines 154 would be increased in low frequency regions. However, in frequency bands of signals ordinarily applied to the source lines 154, the degree of capacitive coupling would undergo almost no increase.

Figure 40:
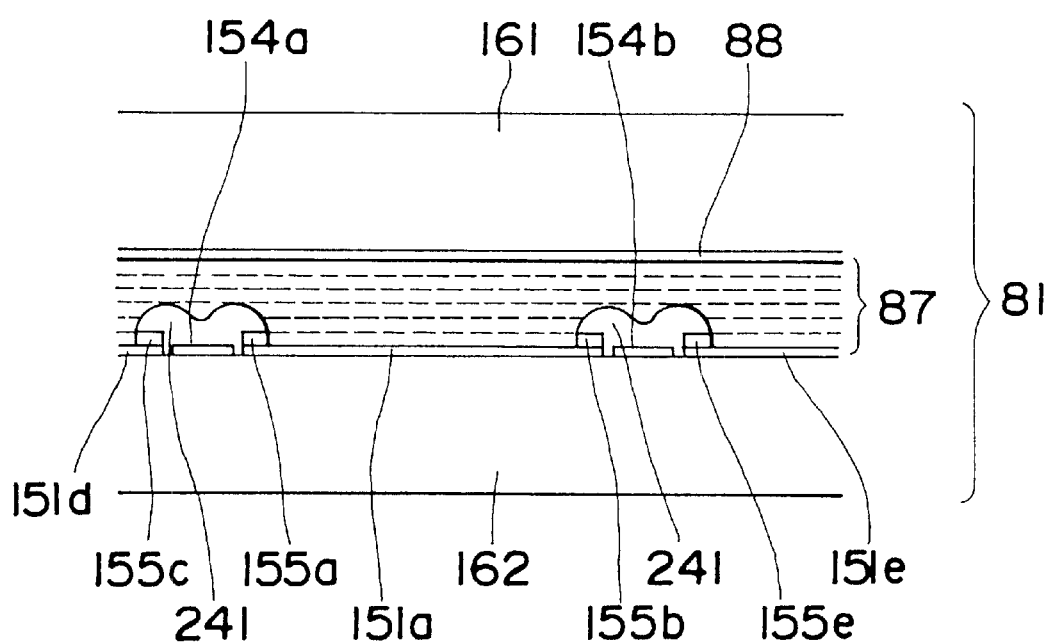
FIG. 40 is a sectional view of a display device having light-shielding films.
Figure 41:
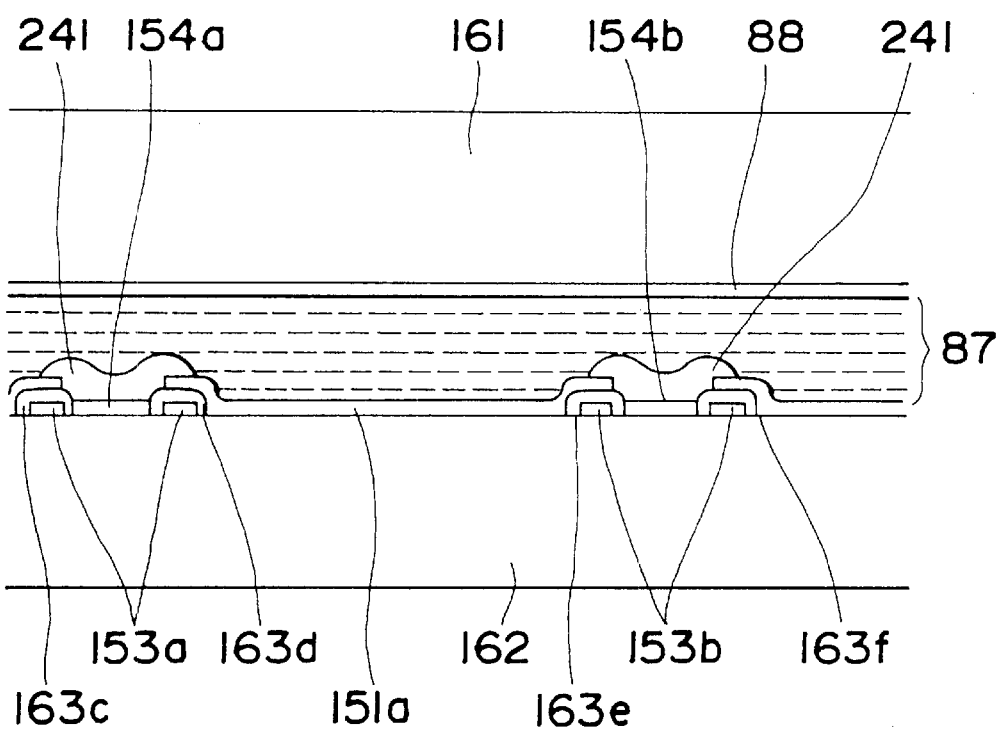
FIG. 41 is a sectional view of a display device having light-shielding films.
Figure 42:
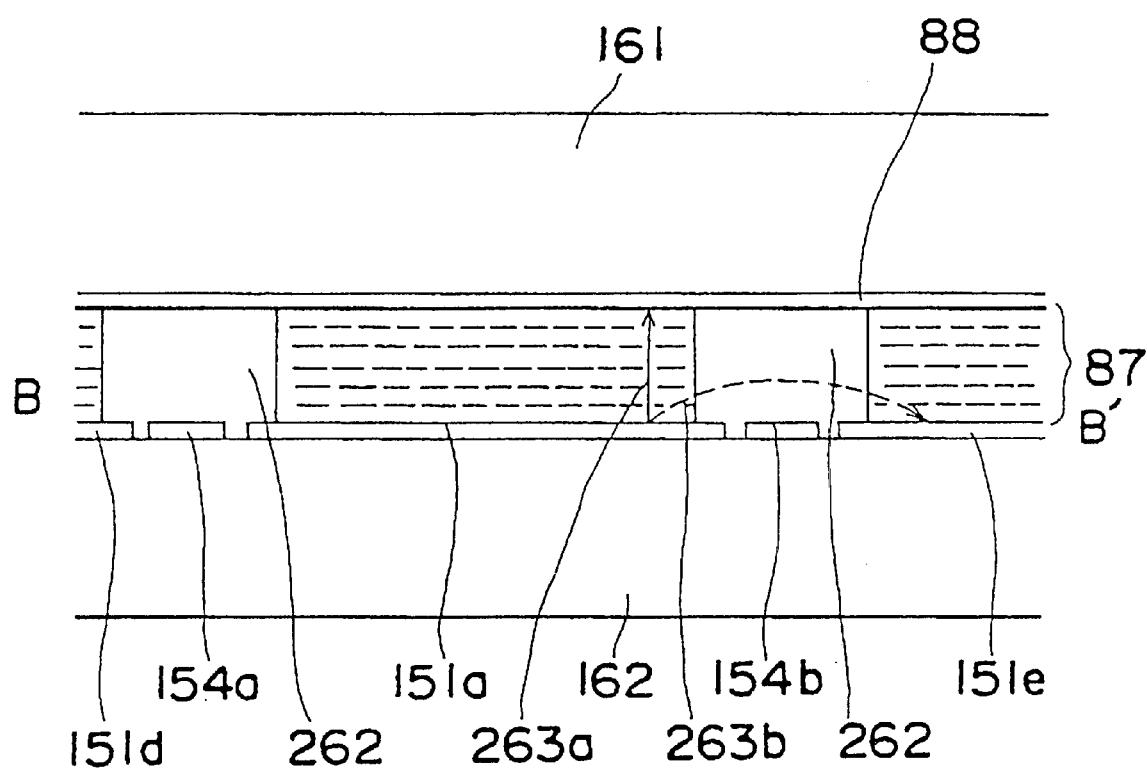
FIG. 42 is a sectional view of a display device having pillers.

When the display device of the present embodiment as shown in FIGS. 40 and 41 is used as a light valve in a projection type display device, there is no need of using carbon as a pigment. The reason is that each light valve is intended to modulate only one color out of red (R), green (G), and blue (B) and therefore one that can absorb the one color will do as a light-shielding film. For example, a pigment of yellow will do for a modulation color of blue.

The light-shielding film used for the light-shielding film structure is not limited to be made of an insulating material such as a polymer. For example, it is also possible to laminate an insulating film on the source lines 154 and form a light-shielding film made of metal on the resulting insulating film. For example, the light-shielding film is a thin film made of chromium (Cr), aluminium (Al), or the like. If hexavalent chromium is used, the hexavalent chromium, which is black, serves also as a light-absorbing film.

Figure 30:
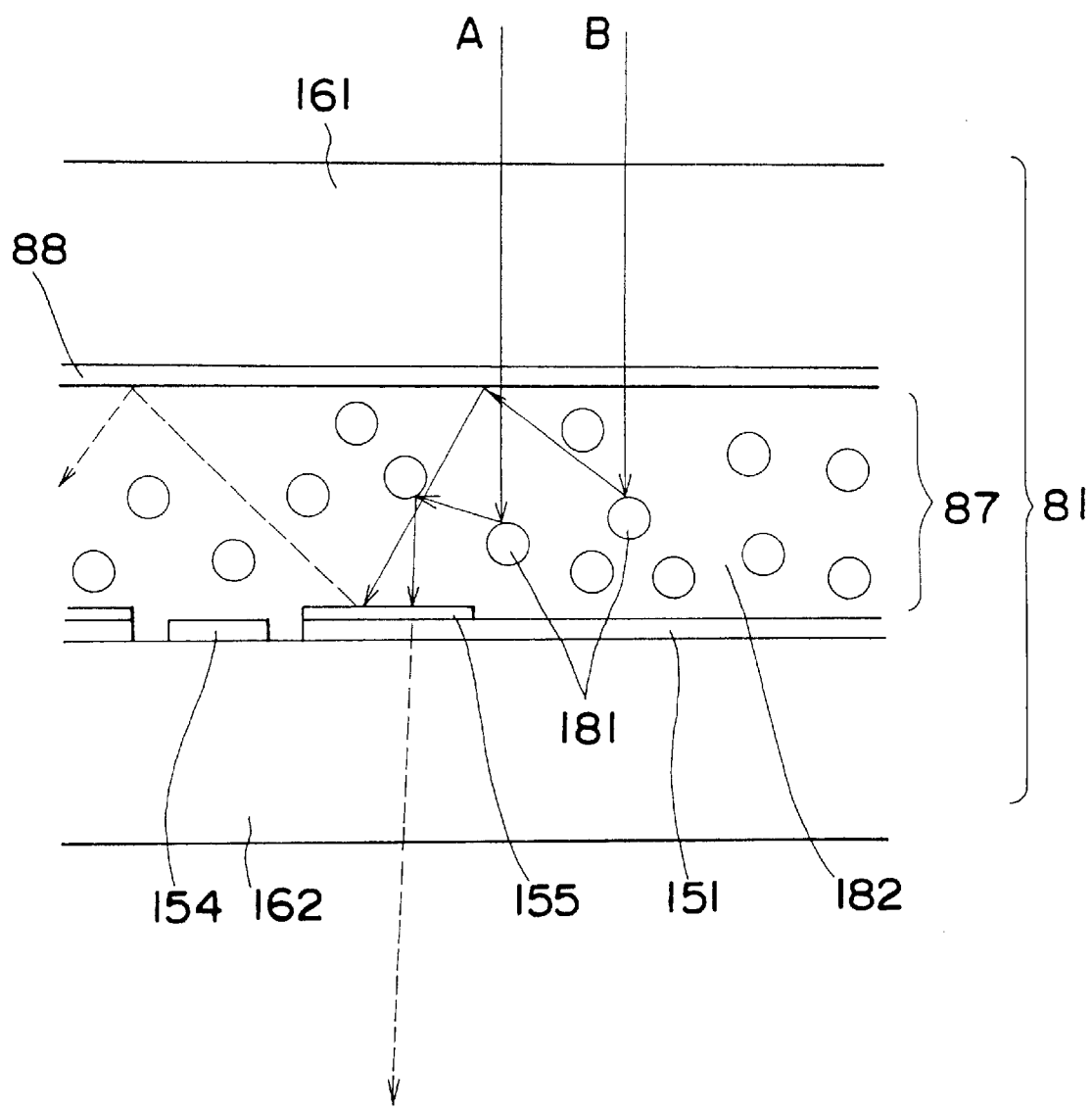
FIG. 30 is a schematic sectional view of a display device.

As described above, the light-shielding film structure of the present embodiment is a structure for shielding light around the pixel electrodes, where it does not matter what its composition is (whether polymer or metal thin film). If the effect of light absorption as shown in FIG. 30 is unnecessary, a composition that reflects and shields light is adopted. Because lines of electric force hardly penetrate through a low dielectric material, the lateral electric field is weakened so that light penetration will not occur.

Figure 43:
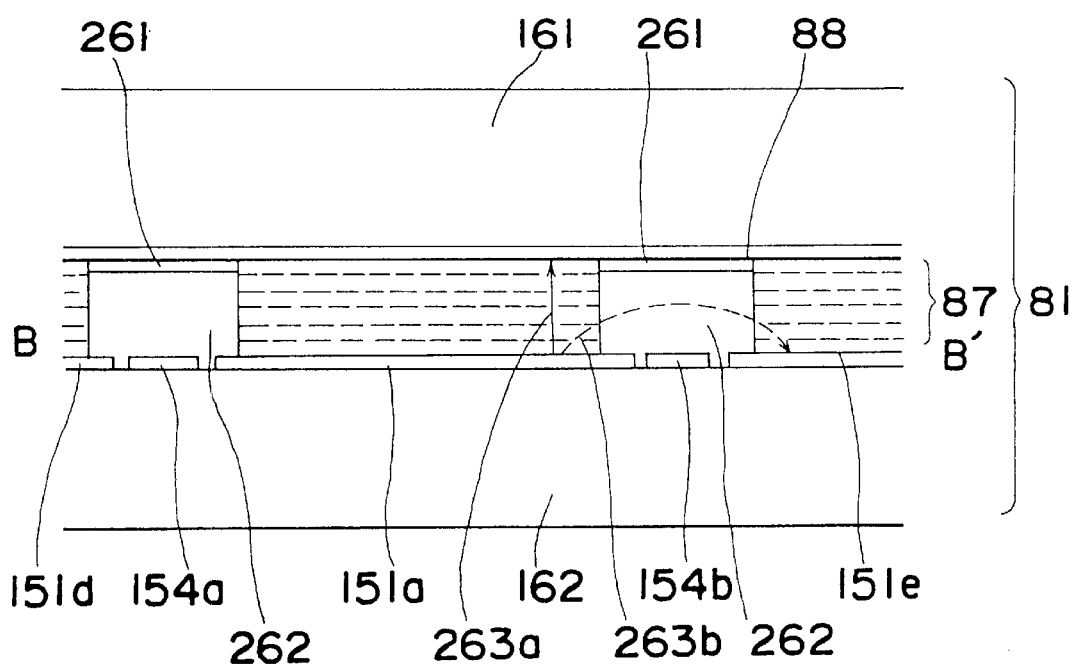
FIG. 43 is a sectional view of a display device having pillers.

The thicker the low dielectric film 241 is, the more the lateral electric field is suppressed or light is prevented to penetrate. Therefore, the low dielectric film 241 may also be filled fully between the counter electrode 88 and the source lines 154, as shown in FIGS. 42 and 43. Further, the more the outer peripheral portion of the pixel electrodes 151 is coated, the more the light penetration can be prevented.

In the structures of FIGS. 42 and 43, a low dielectric film 262 is formed as pillars (hereinafter, referred to as a low dielectric pillar), serving as a means for holding a constant distance between the counter electrode 88 and the pixel electrodes 151. In FIG. 43, a black matrix 261 is further formed on the counter electrode 88. That is, it is no longer necessary to use the beads 233 to hold the film thickness of the liquid crystal layer 87 at a constant distance as shown in FIG. 25. This is an important matter. In the TN LCD panel which necessitates the rubbing process, the formation of such low dielectric pillars 262 as shown in FIGS. 42 and 43 would make it impossible to achieve the orientation because a rubbing cloth interferes with the pillars 262 in the rubbing process. The structure of FIGS. 42 and 43 could not be implemented by any other than the polymer dispersion LCD panel. It is of course desirable to mix pigments also into the low dielectric pillar 262 to provide a "light-shielding pillar."

Because the lines of electric force 263b are not generated at all by the shielding of the low dielectric pillar, there occurs no light penetration due to lateral electric field. Lines of electric field are generated straight in the pixel electrodes 151 and the counter electrode 88 (line of electric force 263a). Also, the low dielectric pillar 262 has a function of defining the film thickness of the liquid crystal layer 87 as the beads 233. Accordingly, there is no need of dispersing the beads 233. As a result, the possibility of light penetration around the beads 233 is eliminated so that a successful display contrast is obtained.

Further advantageously, the positioning alignment is no longer needed for bonding together the opposite substrate 161 and the array substrate 162. It is preferable to form the low dielectric pillar 262 on the counter electrode 88. This is because there are no other components on the counter electrode 88 so that the low dielectric pillar is easy to form. On the array substrate 162, TFTs and the like have irregularities, so that the low dielectric pillar is difficult to form. In contrast, the counter electrode 88 has quite high smoothness, so that the low dielectric pillar is easy to form thereon.

The black matrix 261 shown in FIG. 43 is formed on the low dielectric pillar 262. With such a structure, there occurs no light leakage even if the low dielectric pillar 262 is made of a transparent material.

Figure 44:
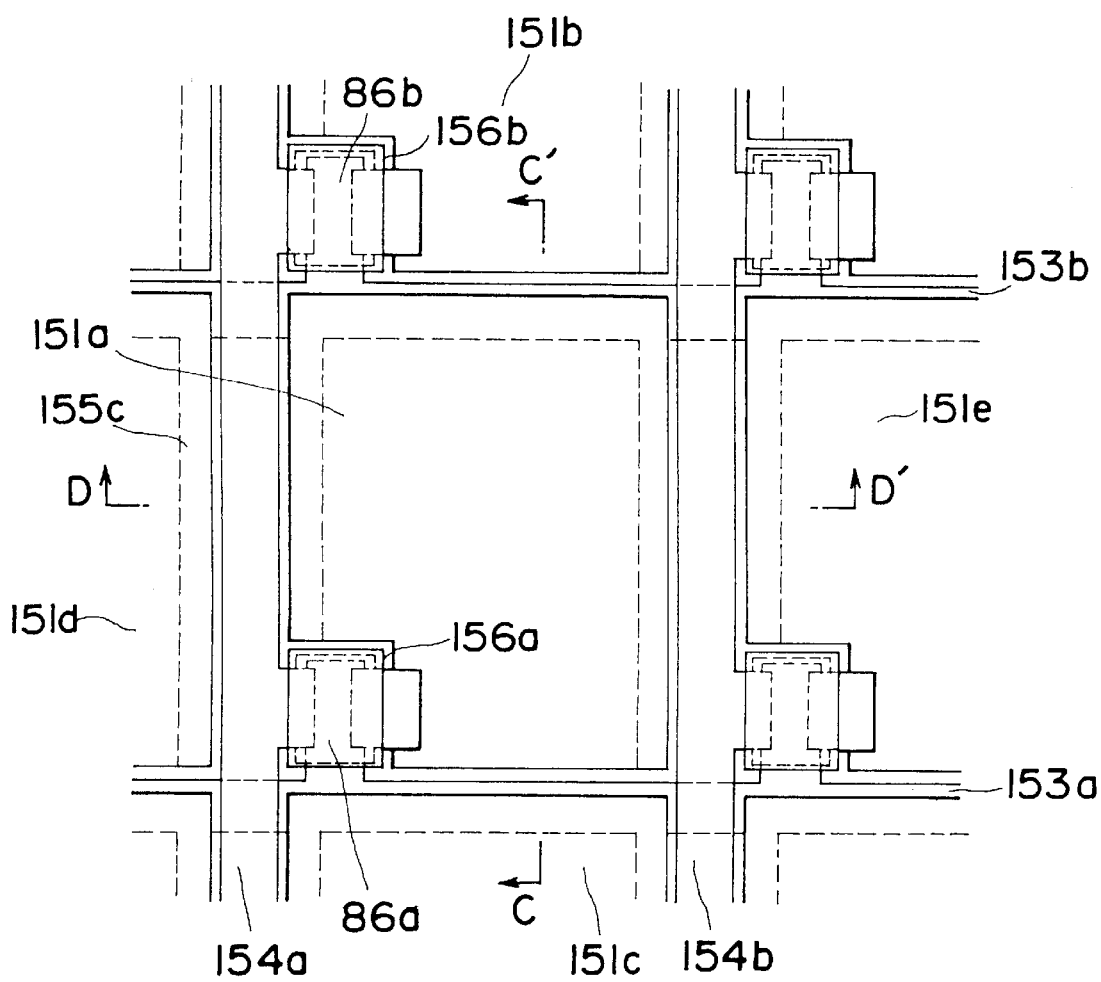
FIG. 44 is a plan view of a display device.
Figure 45A:
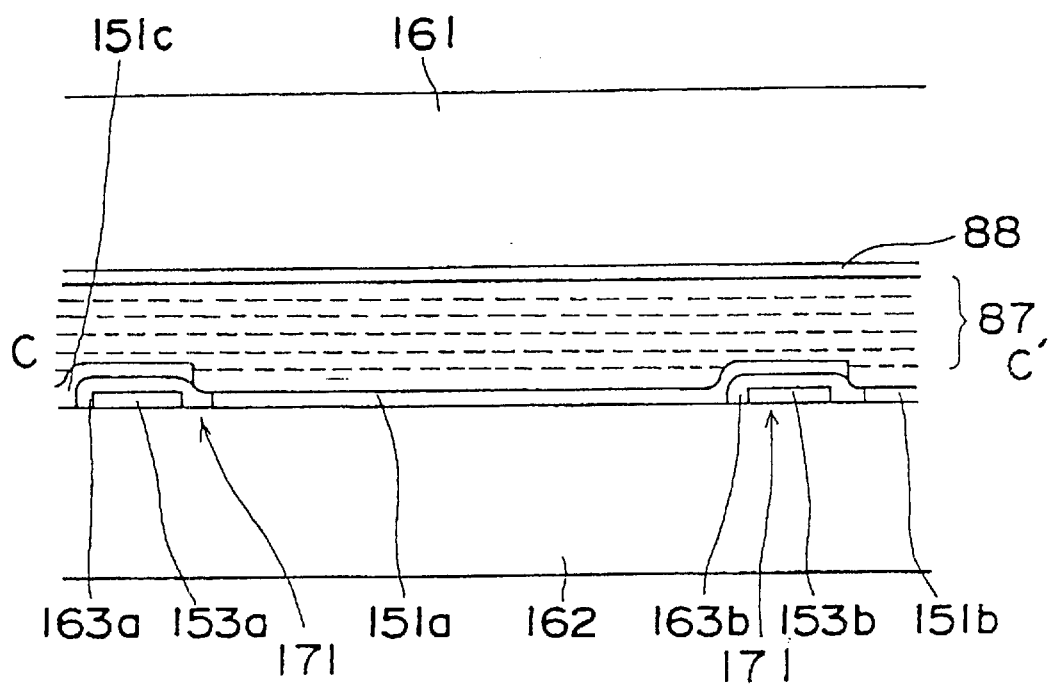
FIGS. 45A and 45B are sectional views along C–C' line and along D–D' line in FIG. 44.
Figure 45B:
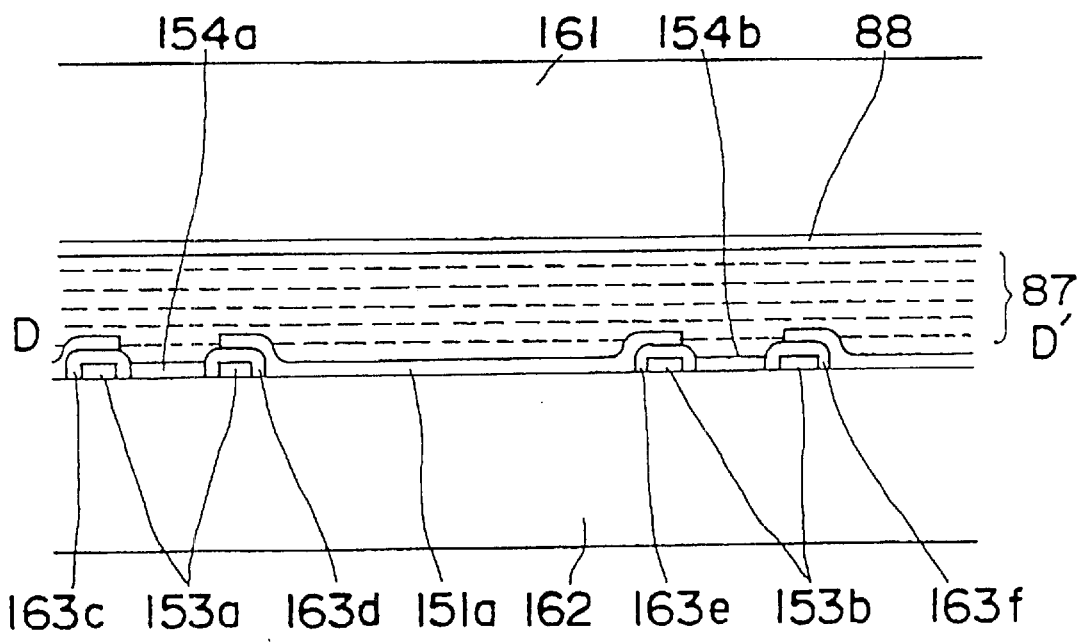

FIG. 44 is a plan view of a display device on an array substrate. FIG. 45A is a sectional view taken along the line C–C' in FIG. 44, and FIG. 45B is a sectional view taken along the line D–D' in FIG. 44. In FIG. 45A additional capacitors 171 (capacitances) are provided between the pixel electrodes 151 and the gate lines 153. The additional capacitor 171 is formed by forming an insulating film 163 on the gate lines 153, overlaying the pixel electrodes 151 on the insulating film 163. The gate lines 153 are branched along the source lines 154. The pixel electrodes 151 are preferably formed so as to shield the top of the gate lines 153.

The positions of the additional capacitor 171 are around the gate lines 153 and the pixel electrodes 151, centered on the same site as the light-shielding film 155 shown in FIG. 27. Since the gate lines 153 are usually formed of a metal thin film, the branched gate lines 153 resultantly have a function as the light-shielding film.

The display device of FIG. 27 is of the front stage gate system. In the front stage gate system device, the gate lines 153 are formed into a thick width, and the gate lines 153 and the pixel electrodes 151 are overlaid on each other so that a specified capacitance is obtained. However, thickened width of the gate lines 153 would result in a lowered pixel aperture ratio. In FIG. 44, it is arranged that charges can be accumulated between the branched gate lines 153 and the pixel electrodes 151. Therefore, the gate lines may have a thinner width by an amount of the quantity of the above-mentioned accumulated charges. Further, the branched gate lines are made to serve also the function of the light-shielding film 155. Accordingly, the aperture ratio of the display device of FIG. 27 can be made equivalent to the aperture ratio of the conventional front stage gate system display devices.

The light penetration through the pixel peripheral portions due to lateral electric field between the source lines 154 and the pixel electrodes 151 can be prevented by the branched gate lines 153. This could be understood by replacing the light-shielding film 155 with the gate lines 153 in FIG. 27.

When constant signals are applied to the source lines 154 or the gate lines 153, lines of electric force (lateral electric field) are generated between the pixel electrodes 151 and the signal lines due to the voltages of the signals. The liquid crystal molecules are oriented by the lateral electric field to cause the polarization dependence. This causes light penetration to occur around the pixel electrodes 151.

In order to prevent this, it is preferable to coat the signal lines 154 and the like with the low dielectric film as shown in FIG. 25. However, even if the lines of electric force from the signal lines and the like are fully shielded, lateral electric field is generated this time by lines of electric force that take place between adjacent pixel electrodes 151. In order to prevent this lateral electric field, the structure of FIG. 42 where the low dielectric pillar 262 is formed is effective. A method of using the polarizer 331 or the like is also effective.

In the image signal display methods explained above, the prescribed polarities of voltages are applied to the pixels 101, as shown in FIG. 12. Therefore, the lateral electric field between adjacent pixel electrodes is generated in the direction of bb'. When the polarizer 331 is used, the polarization axis 332 needs to be in the direction of bb' as shown in FIGS. 36A–36C. The lines of electric force derived from the source lines 154 are fully shielded by using the low dielectric films 241 or the low dielectric pillars 262, or otherwise light leakage is prevented by the light-shielding films 155 or 231.

In the image signal display methods and in a display devices therefor, in which the foregoing image signal display method is adopted, voltages of prescribed polarities are applied to the pixel electrodes 101 as shown in FIG. 12. However, it is also preferable to adopt a drive method described below. For the liquid crystal layer 87, the thicker the width, the more successful the scattering characteristic, and therefore the higher the display contrast. However, a high voltage is required to make the liquid crystal layer 87 transparent. With the use of the method of FIG. 12, it becomes possible to apply high voltages effectively to the liquid crystal layer 87.

First, the potential of the counter electrode 88 should be inverted in polarity every horizontal scanning period (H) (1H or 2H) (refer to FIG. 46A). For the potential of the counter electrode 88, voltages of $\pm V_{1+}$ around a potential $G_1$ are applied in a cycle of 4 horizontal scanning periods (4H). The period of 4H is based on a fact that voltages of the same polarity are applied to two lines as shown in FIG. 12.

Figure 47:
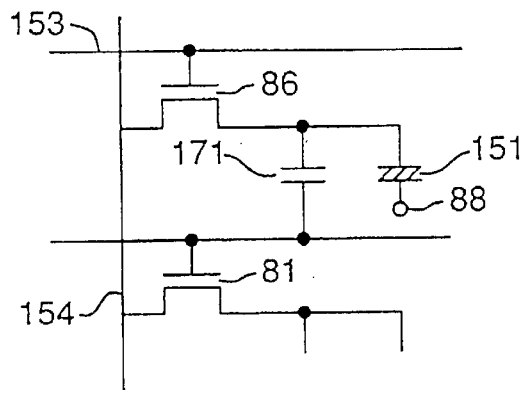
FIG. 47 is an equivalent circuit diagram of the preceding-stage gate system structure.

On the other hand, in a front stage gate system shown in FIG. 47, a capacitor is formed between the gate lines 153 and the pixel electrodes 151 to provide the additional capacitance 171. In the system, voltages of $\pm V_{2+}$ around a potential $G_2$ are applied to the gate lines 153 also in the 4H cycle. In addition, although voltages for turning on and off the TFTs 86 are applied to the gate lines, this is not taken into account here for simpler description. The system using such a driving method is referred to as a floating gate system.

Figure 48A:
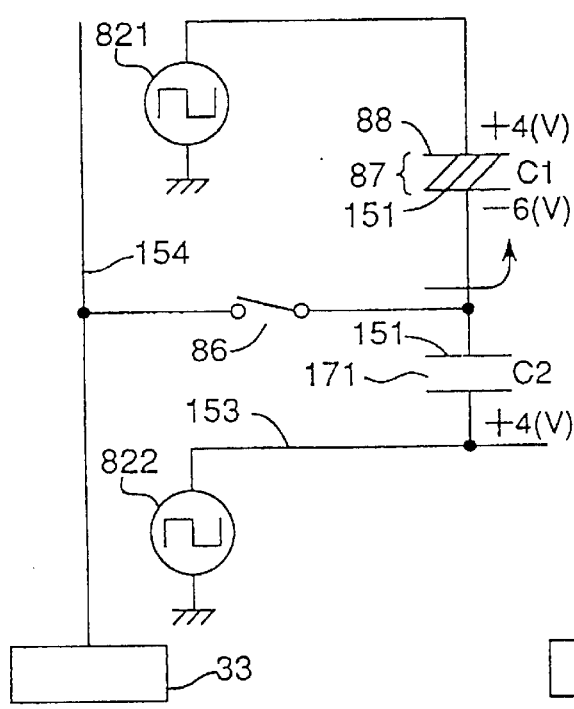
FIGS. 48A and 48B are diagrams of floating gate circuits.
Figure 48B:
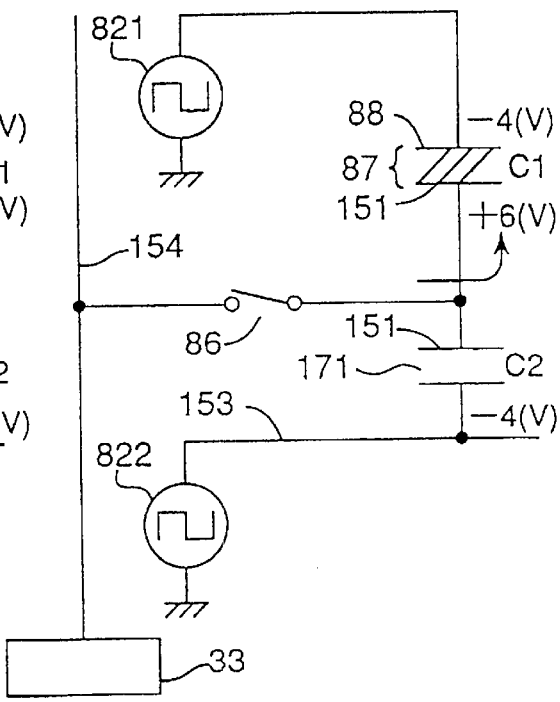

FIGS. 48A and 48B show examples of floating gate system. A rectangular wave 801 in the 4H period is applied to the counter electrode 88 by a drive means 821. Meanwhile, a rectangular wave 802 in the 4H period is applied to the gate lines 153 by a drive means 822. It is arranged that the capacitor's capacitance of the liquid crystal layer 87 is $C_1$ and the capacitance of the additional capacitor 171 is $C_2$. For further simpler description, it is also assumed that $C_1 << C_2$. In TN liquid crystals, the capacitor's capacitance $C_1$ of the liquid crystal layer is relatively large. However, in polymer dispersion liquid crystals, the capacitor's capacitance $C_1$ of the liquid crystal layer is in many cases substantially small, compared with the capacitance $C_2$ of the additional capacitor. This is because the polymer dispersion liquid crystals have a low dielectric constant and the liquid crystal layer 87 has a film thickness as thick as 8 $\mu$m. With the TFTs 86 regarded as switches, it is assumed that the voltage waveform applied to the gate lines is outputted to the pixel electrodes 151 with almost no attenuation. This is because there is a relationship that $C_1 << C_2$.

For ease of description, it is assumed that $V_1 = 4$ (V) and $V_2 = 4$ (V). Although an image signal voltage $V_s$ outputted from the source driver 33 varies from one image signal to another, here it is assumed that $V_s = \pm 6$ (V) constant.

Referring to FIG. 48A, a voltage of $V_{1+} = 4$ (V) is applied to the counter electrode 88, in which state a voltage of $V_{2+} = +4$ (V) is applied to the gate lines (where the level of OFF voltage is not taken into account here). In this state, for example, a voltage of $V_s = -6$ (V) (which is the image signal derived from the source driver 33) is applied to the pixel electrodes 151 by the TFTs 86. Then, a voltage of $+4+(-6) = 10$ (V) is applied to the liquid crystal layer 87. This is the period of "a" in FIG. 46A. Subsequently, in the period of "b" of FIG. 46A, a voltage of $V_{1+} = -4$ (V) is applied to the counter electrode 88 as shown in FIG. 48B, in which state a voltage of $V_{2-} = -4$ (V) is applied to the gate lines. Since the counter electrode 88 and the gate line voltage $V_2$ are common to all the pixels, a change in the voltage $V_2$ to $V_{2-}$ and another in the voltage $V_1$ to $V_{1-}$ cause the voltage −6 (V), which has been applied in FIG. 48A, to change as −6 (V)+$V_{2-}$ = −6 (V)+(−4 (V)) = −10 (V). However, the voltage applied to the liquid crystal layer 87 remains unchanged as 10 (V). In FIG. 48B, a voltage of +6 (V) is applied to the pixel electrodes 151, so that a voltage of −4 (V)+(−6 (V)) = −10 (V), or a voltage of 10 (V) is applied to the liquid crystal layer 87.

As described above, the liquid crystal layer has a voltage of a sum of the voltage $V_s$ derived from the source driver and $V_2$ or $V_1$, continuously applied thereto. It is a characteristic of the system that the voltage of the counter electrode 88 is changed in the 4H period. This system is favorable particularly for an LCD panel using a polymer dispersion liquid crystal, which has a small capacitance of the liquid crystal layer 87. The reason is that if $C_1$ is larger than $C_2$ by more than a certain extent, even making a change in $V_2$ would hardly cause a voltage to be applied to the pixel electrodes 151.

Figure 49:
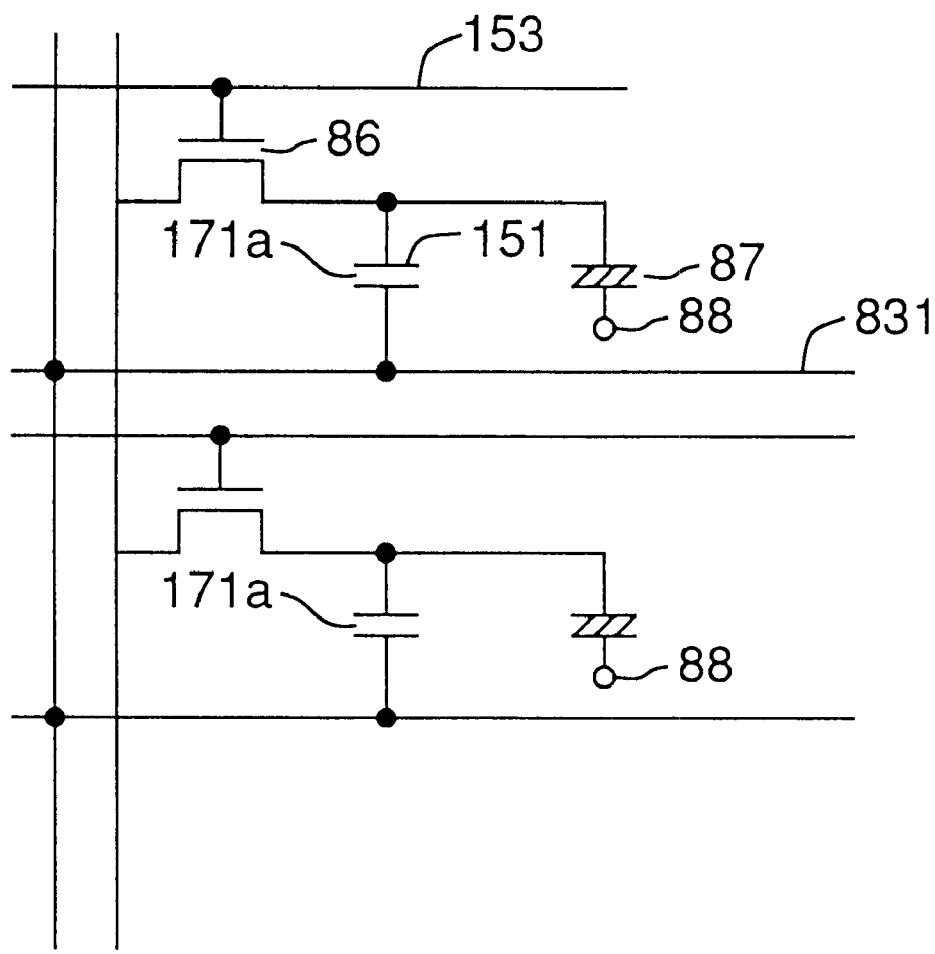
FIG. 49 is an equivalent circuit diagram of a common electrode system structure.

The above description is directed to the drive method for the front stage gate system structure. Otherwise, it is applicable also to the common electrode system as shown in FIG. 49. The common electrode system is a structure in which additional capacitors 171a are formed by a common electrode 831 and a pixel electrode 151. In the common electrode system, the common electrode 831 can be replaced with the gate line 153 in FIGS. 48A and 48B to implement the drive method of the previously mentioned floating gate system. In other words, that is equivalent to an arrangement that the drive means 822 is connected to the common electrode 831. Further description is omitted here because it has already been explained with reference to FIGS. 46A, 46B, 48A and 48B.

In the common electrode system, the common electrode 831 is required to be an independent layer, which involves increased numbers of masks in the process of array formation disadvantageously. However, it is unnecessary to use the gate line 153 as a one-side electrode of the additional capacitor 171. This allows an enhanced degree of freedom for the capacitance design of the additional capacitor. It also offers another advantage of improved pixel aperture ratio in general. In particular, the circuit construction of the driver 33 is simple. Accordingly, the common electrode system is preferably adopted when the driver 33 and the like are formed by the polysilicon (especially, low-temperature polysilicon) technique, as in the present embodiment.

Figure 50:
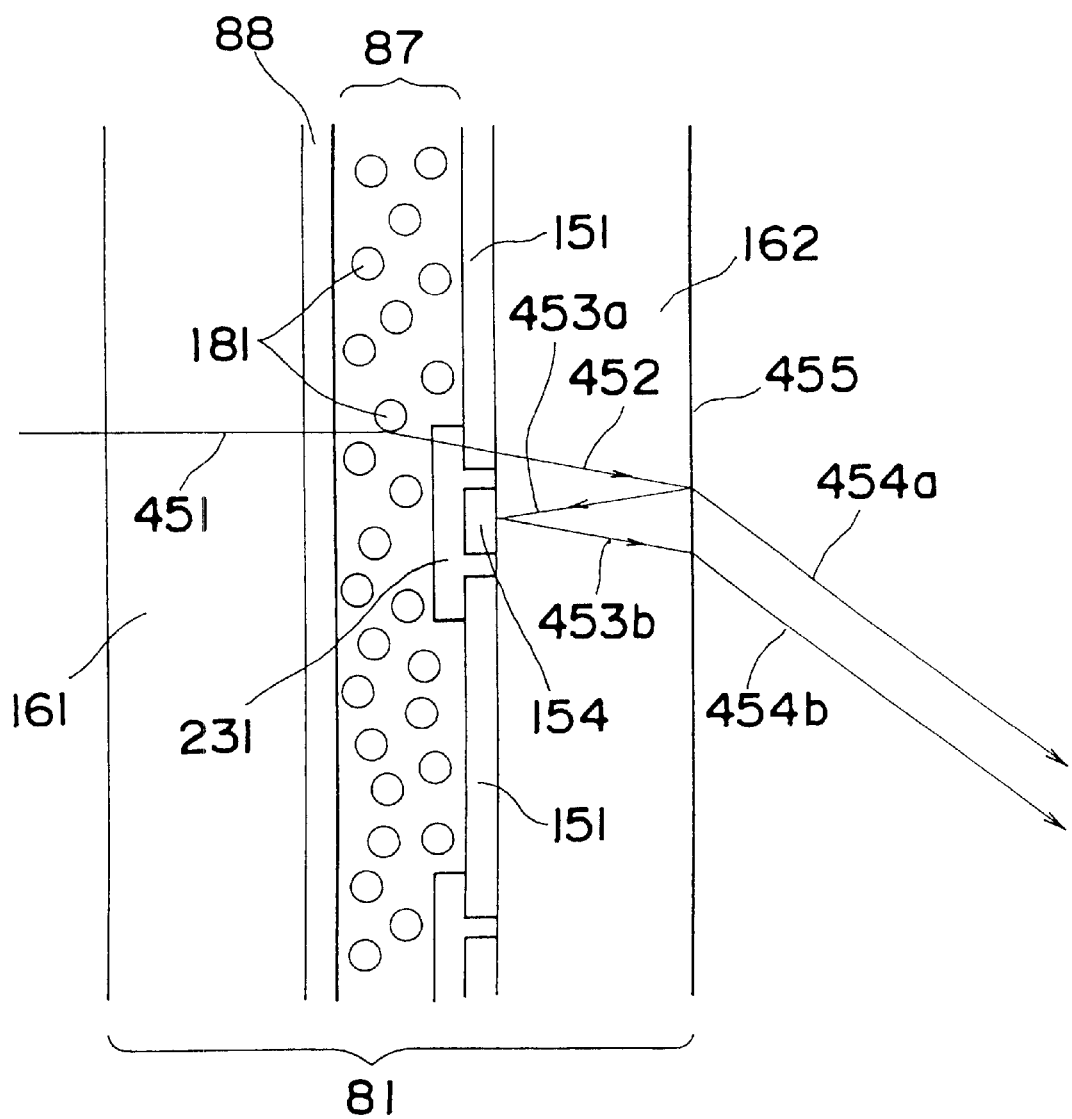
FIG. 50 is a schematic sectional view of a prior art display device.

When the display device is used as a light valve of the projection type display device, there are some cases where problems occur such as ghost and display contrast lowering due to reflection at the metal thin film of the rear side of the LCD panel. As shown in FIG. 50, incident light 451 is scattered by droplets 181 in the liquid crystal layer 87. The scattered light 452 becomes transmitted light 454a, while part of the scattered light 452 becomes reflected light 453a. The reflected light 453a is reflected by the metal thin film of the source line 154 or the like, forming reflected light 453b and then transmitted light 454b. The transmitted light 454b becomes a ghost when projected onto the screen. The transmitted light 454b is also irregularly reflected by a projection lens and the like, to lower the display contrast.

The polymer dispersion LCD panel performs optical modulation by scattering incident light by the liquid crystal layer 87. Accordingly, most of light is incident on an interface 455 at a critical angle or more. Since light of the critical angle or more is totally reflected, the ratio of light that is reflected by the interface so as to be incident on the metal thin film surface of the source line 154, the gate line 153, or the like is larger than that in the TN LCD panel or the like. Therefore, it is a crucial matter to remove the causes of the aforementioned ghosts. In addition, if pixel aperture ratio is 50%, it could be considered that the area except the openings is formed as a metallic thin film.

As a first measure for the ghost, an antireflection film is formed at the interface 455 between panel and air. The antireflection film is formed by a three-layer or two-layer laminated thin films. The three-layer lamination is used to prevent the reflection in the wide wavelength band of visible light, and is referred to as multi-coating. The two-layer lamination is used to prevent the reflection in a particular wavelength band of visible light, and is referred to as V-coating.

The multi-coating lamination is formed by stacking aluminium oxide ($Al_2O_3$) to an optical film thickness of nd=$\lambda$/4, zirconium ($ZrO_2$) to nd=$\lambda$/2, and magnesium fluoride ($MgF_2$) to nd=$\lambda$/4. Generally, for G light, the thin film is formed with the value of $\lambda$ being or around 520nm. The V-coating lamination is formed by stacking silicon oxide (Sio) to an optical film thickness of nd=$\lambda$/4 and magnesium fluoride ($MgF_2$) to nd=$\lambda$/4, or yttrium oxide ($Y_2O_3$) and magnesium fluoride ($MgF_2$) to nd=$\lambda$/4. Since Sio has its absorbing band on the side of blue, $Y_2O_3$ is preferably used for modulation of blue light. $Y_2O_3$ is stable and therefore preferable also in terms of the substance stability. It is noted that $\lambda$ herein referred to is the peak wavelength of light to be modulated, i.e., center wavelength. n is the index of refraction of the thin film, and d is the physical film thickness.

However, an antireflection film of the multi-coating or the V-coating is not sufficient because light incident on the interface 455 at the critical angle or more could not be prevented from being reflected at the interface 455. Therefore, as a second measure, the structure of FIG. 51 or FIG. 52 can preferably be adopted.

Figure 53:
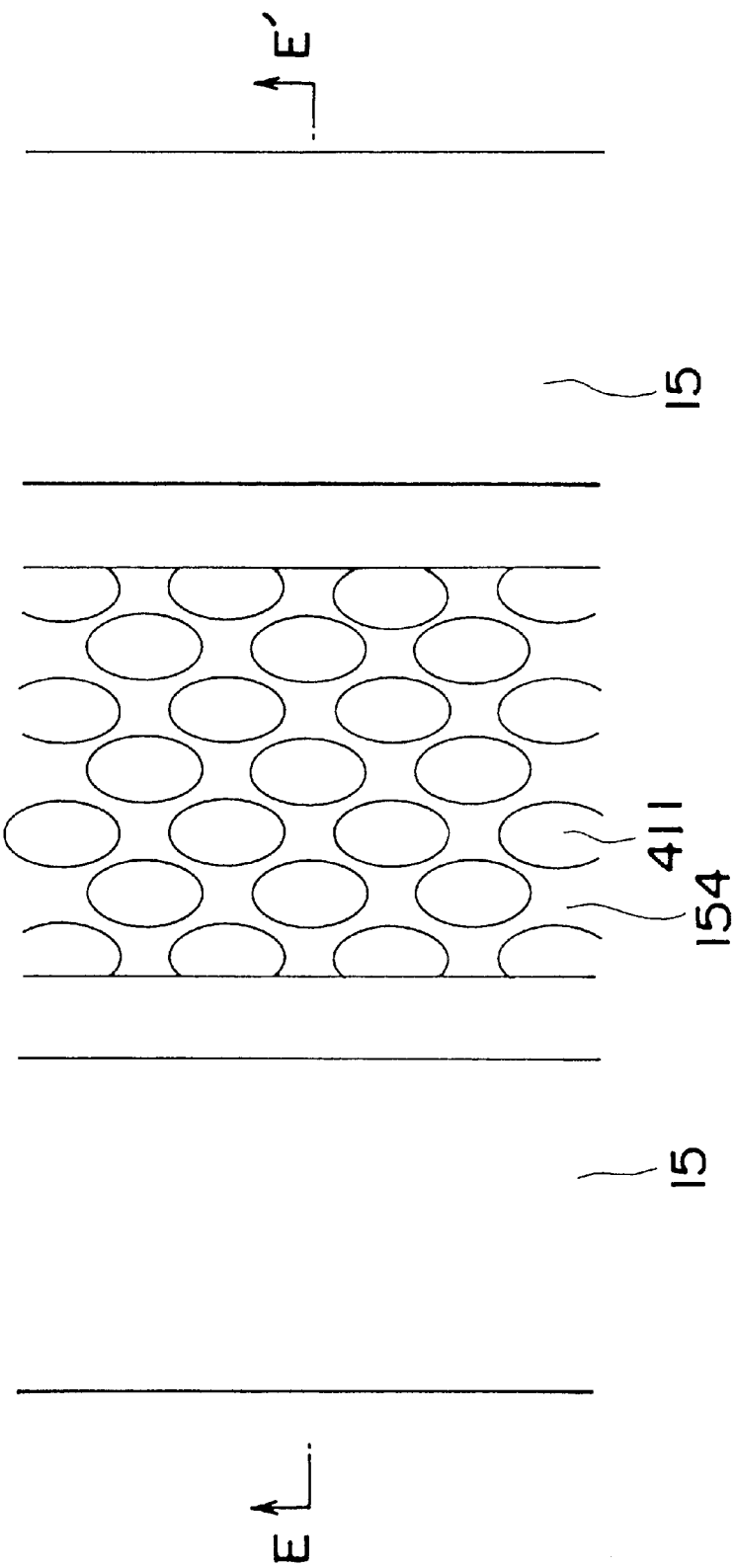
FIG. 53 is a partly plan view of a display device which is another embodiment of the present invention.

The structures of FIGS. 45A and 45B are structures in which the metallic thin film (source lines 154 and the like) has an uneven surface. Such a structure is referred to as a convex structure. FIG. 53 is a sectional view taken along the line EE' in FIG. 51. Convexes 411 are first formed at locations where a metal thin film is formed. The material of the convexes 411 may be $SiO_2$, $SiN_x$, or other inorganic material or the like. In alignment onto the convexes 411, the metal thin film of the source lines 154 and the like is formed. In addition, the convexes 411 may be formed cyclically so as to provide a diffraction effect.

Light 453a that is reflected by the interface 455 and returned to the source lines 154 is changed in its traveling direction by the convexes 411. As a result, there occurs no transmitted light 453b, so that ghosts or the like will not occur.

Figure 52:
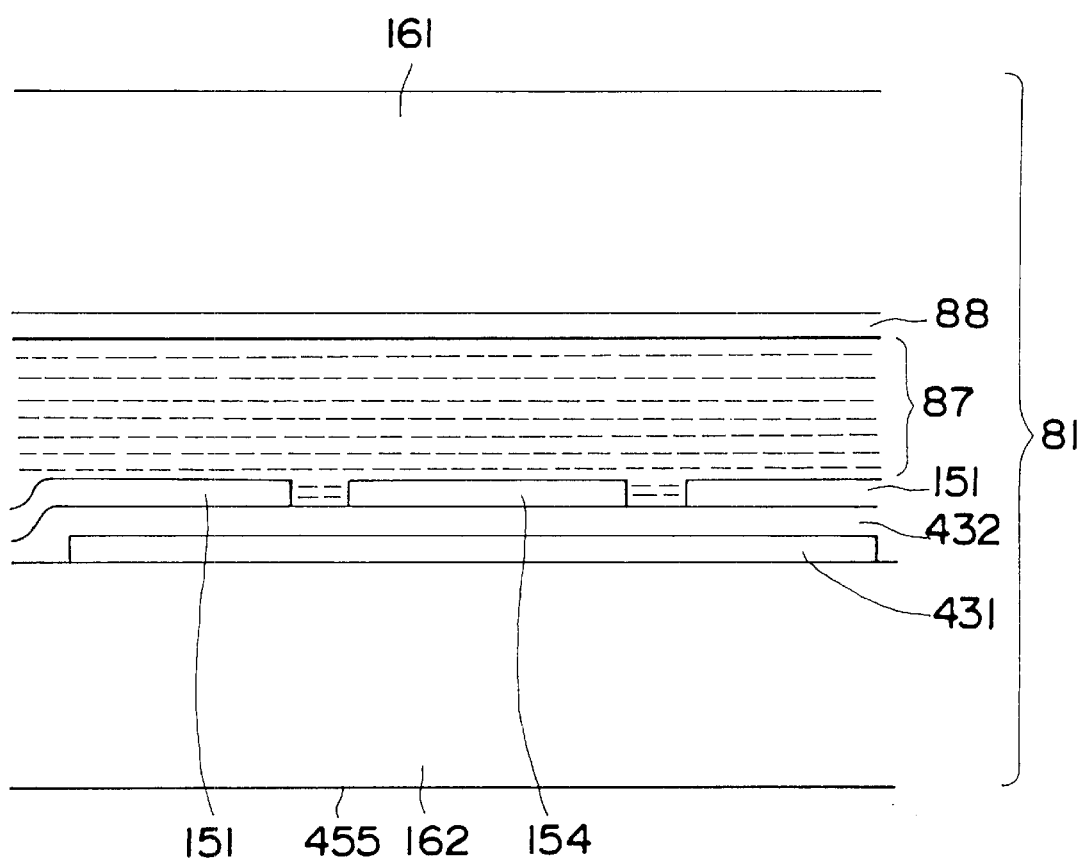
FIG. 52 is a schematic sectional view of a display device.

FIG. 52 shows another possible structure that a light-shielding film 431 is formed on the array substrate 162, and the source lines 154 and the like are formed on the light-shielding film 431. Such a structure is referred to as a lower-layer light-shielding film structure. Also, it is needless to say that the light-shielding film 431 is preferably given in the light-absorbing film structure.

A material of the light-shielding film 431 may be, for example, a hexavalent chromium or other metallic material, or any of the materials of the light-shielding film 155 in FIG. 27 or the light-shielding film 231 in FIG. 25. An insulating film 432 is formed on the light-shielding film 431, and peripheral portions of the source lines 154 and the pixel electrodes 151 are overlaid on the insulating film 432. The light-shielding film 431, which is a lower layer below the pixel electrodes 151, corresponds to the light-shielding film 155 of FIG. 27.

In the structure of FIG. 52, the light-shielding film 431 is formed also at the lower layer between the pixel electrodes 151 and the signal lines 154, so that light leakage will never occur through between the pixel electrodes 151 and the signal lines 154. Also, since the reflected light 453a can be absorbed by the light-shielding film 431, there occurs no ghosts or the like.

Also for the thin film transistors (TFTs) 86, it is important to provide for the reflected light 453a. When light is incident on the semiconductor layer of the TFTs 86, there occurs a photoconductor phenomenon (a phenomenon that the off characteristic is deteriorated). When the photoconductor phenomenon occurs, the electric field applied to the pixel electrodes 151 can no longer be held for a period of one frame, resulting in lower brightness of the white display and therefore deteriorated display contrast.

Figure 54:
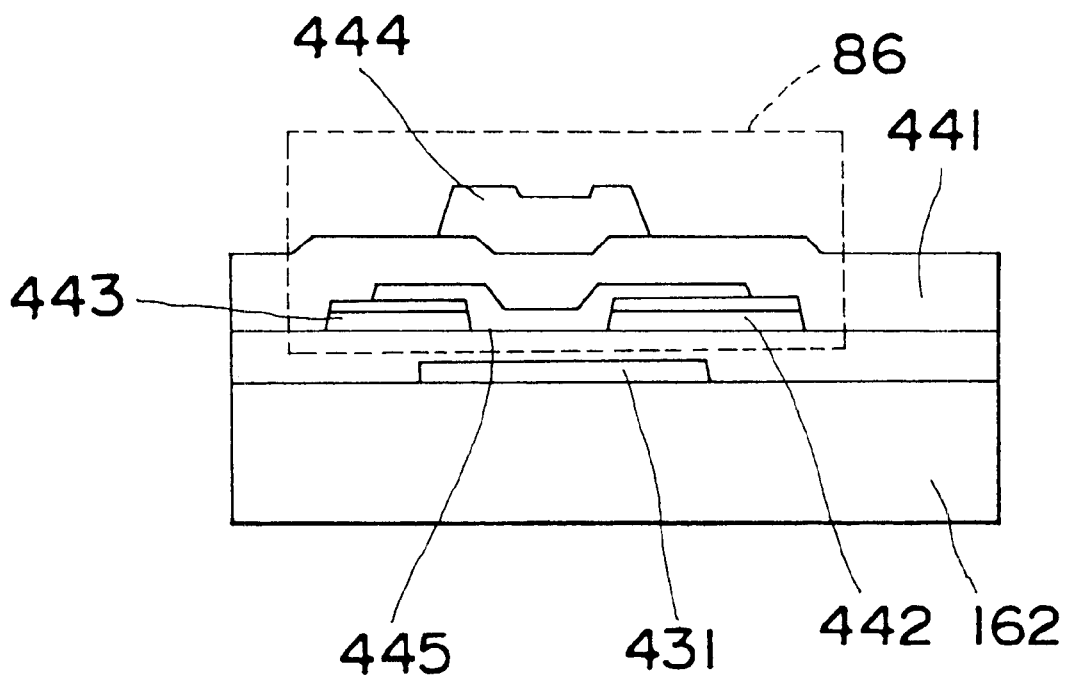
FIG. 54 is a sectional view of a selector of a display device.

In order to prevent the photoconductor phenomenon due to the reflected light 453a, the display panel of an embodiment is so arranged that the light-shielding film 431 is formed at the lower layer below the semiconductor layer 445 of the TFTs 86 as shown in FIG. 54. Accordingly, the reflected light 453a is absorbed by the light-shielding film 431, so that the occurrence of the photoconductor phenomenon can be prevented.

In the TN LCD panel, liquid crystal molecules are oriented with a twist of 90 degrees, and incident light is rotated in its direction of polarization along the direction of the twist, whereby the incident light is modulated. Therefore, there is no scattering of light. As a result, less quantity of light is reflected by the interface 455. However, in the polymer dispersion LCD panel, as described in FIGS. 24A and 24B, the modulation is attained by scattering the incident light. Therefore, a larger quantity of light is reflected by the interface 455. As a result, it is of great significance to adopt the structures as shown in FIGS. 51–54. Those structures could be considered as structures unique to the polymer dispersion LCD panels.

With respect to light of particular wavelengths, the scattering characteristic of polymer dispersion liquid crystals becomes optimum at a certain mean size of droplets of liquid crystals or a certain mean hole size of the polymer network. In general, the longer the wavelength of light (red light) is, the larger the mean size of the droplets of liquid crystals and the like should be set. Conversely, the shorter the wavelength of light (blue light) is, the smaller the mean size of the droplets of liquid crystals and the like should be set so that the scattering characteristic is enhanced. Accordingly, it is preferable to set the mean size or the like for a display panel for modulation of red light larger than that for a display panel for modulation of blue light. When ultraviolet rays are applied after an injection of a mixed solution, changes in the mean size can be realized by arranging the strength of the ultraviolet rays to be variable. If intense ultraviolet rays are applied for a short time, the mean size of the droplets of liquid crystals becomes small. Conversely, if weak ultraviolet rays are applied for a long time, the mean size becomes large.

For the projection type display device of the present embodiment, three display panels of the present embodiment for modulation of red, blue, and green are used as light valves. As described above, these display panels are arranged to have optimum mean sizes for droplets or holes for their corresponding wavelengths of light to be modulated, by changing the irradiation intensity of ultraviolet rays in the process of polymerizing polymer components of the mixed solution.

It would be a problem that one display panel is used to modulate the three colors of red, blue, and green. It is actually exemplified by a case in which the display panel comprises mosaic color filters corresponding to pixels. Unless mean size is optimum for the individual pixel electrodes, successful display contrast could not be expected. Accordingly, it would be difficult to polymerize the polymer components of the mixed solution by applying ultraviolet rays in the same manner.

Figure 55:
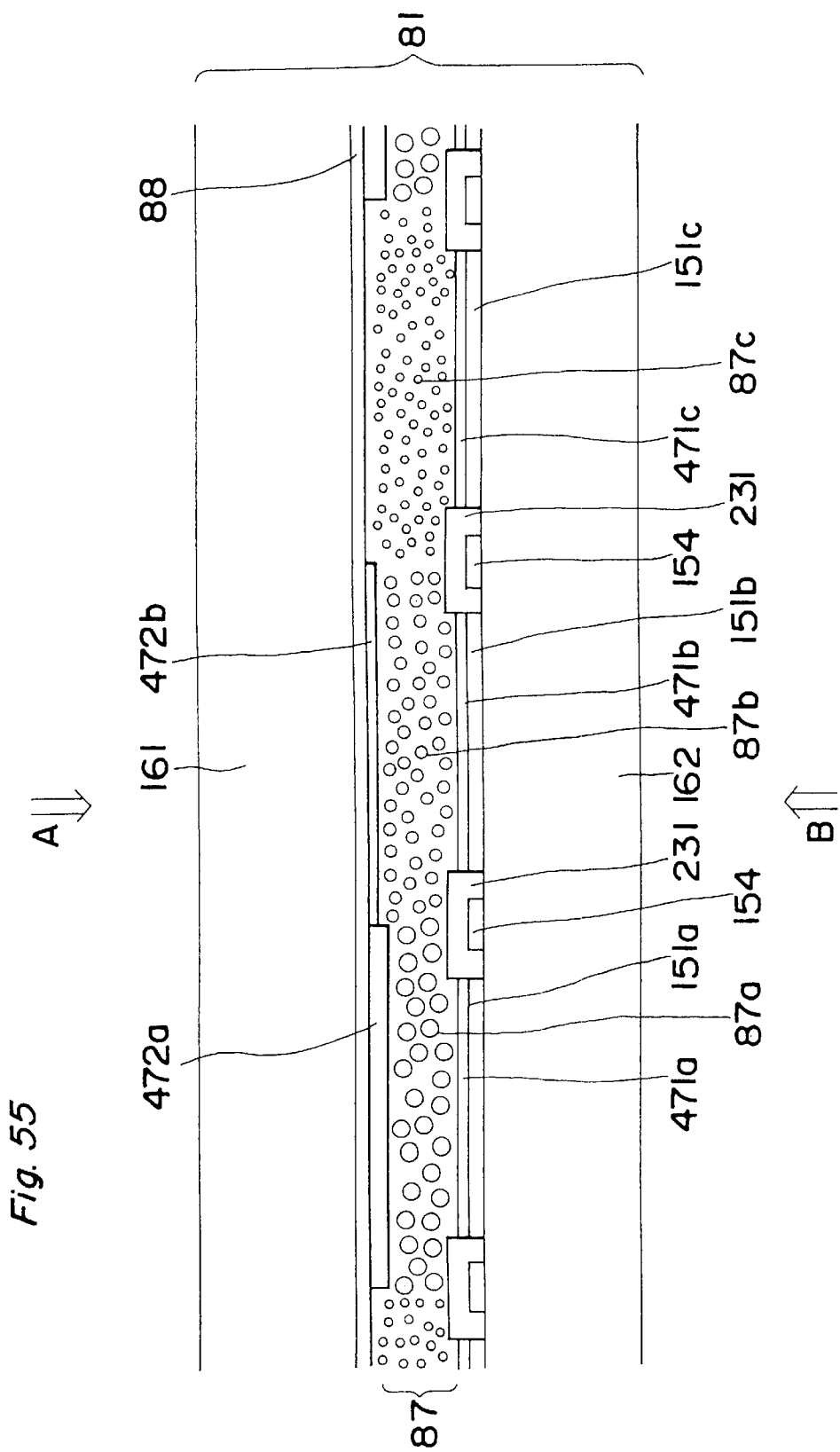
FIG. 55 is a sectional view of a display device.

A structure as a countermeasure for the above problem is as shown in FIG. 55. Color filters 471 are arranged on the pixel electrodes 151. It is assumed for simpler description that a color filter 471a is for red, 471b for green, and 471c for blue in a transmission type display panel.

Dielectric thin films 472 are formed on the counter electrode 88 by patterning. The thin films 472 are formed into a shape generally identical to that of the pixel electrodes 151. In addition, since the dielectric thin films 472 are used as an ultraviolet-absorbing means, they are not limited to dielectric thin films. For example, ITO may be formed thick and used as the ultraviolet-absorbing means. Of course, the dielectric thin film contains inorganic materials such as $TiO_2$, and organic materials such as polyimide and PVA.

Examples of the material for forming the dielectric thin films 472 are $TiO_2$ and SiO. The index of refraction n of $TiO_2$ is 2.3, and the index of refraction n of SiO is 1.7. Both materials will absorb the light of wavelengths of the ultraviolet region, and transmit visible light. However, since their wavelength band of absorption and the absorption rate will vary depending on deposition conditions, it is necessary to set them by repeated experiments. As an example, according to experiments, it was shown with $TiO_2$ that when the physical film thickness of the film was 0.075 μm, the light absorption rate was 40% for light with wavelength 350 nm, 37% for 360 nm, 30% for 370 nm, and 16% for 380 nm, and that almost no absorption was for visible light. Since SiO may absorb visible light more or less, $TiO_2$ is preferable.

A dielectric thin film 472a on a red color filter 471a is the thickest, a dielectric thin film 472b on a green color filter 471b is thinner than that, and no dielectric thin film is formed on a blue color filter 471c. Accordingly, in the process of polymerizing a mixed solution, if ultraviolet rays are applied in the A direction, the intensity of ultraviolet rays incident on a liquid crystal layer 87c is the highest, that of a liquid crystal layer 87b is the next highest, and that of a liquid crystal layer 87a is the weakest. The weaker the ultraviolet rays, the larger the mean size of the droplets of liquid crystals 181. This is also applicable to the mean hole size of the polymer network. That is, the polymer dispersion liquid crystals are not limited to those having droplets of liquid crystals.

Due to the above differences in absorption rate of ultraviolet rays among the dielectric thin films 472, the liquid crystal layers 87 have a following relationship of mean size $d_a$, $d_b$, and $d_c$ of the droplets of liquid crystal layers 87a, 87b and 87c:

$$d_a > d_b > d_c.$$

The wavelength at which light to be modulated is optimally scattered is generally in proportion to the mean size of droplets in the liquid crystal layers 87. By providing optimum mean sizes of droplets for colors as shown in FIG. 55, successful display contrast can be obtained.

In addition, if the mean hole size of the polymer network or the mean size of the droplets of liquid crystals is 1.2 to 1.6 μm for red light as the light to be modulated, 1.0 to 1.4 μm for green light, and 0.8 to 1.2 μm for blue light, then the resulting display contrast is successful. These mean droplet sizes can be attained by controlling the film thicknesses of the dielectric thin films 472, where the film thicknesses are determined after performing enough experiments. In addition, such a structure as described above, in which the mean droplet or hole size in the liquid crystal layer is varied from pixel to pixel by the dielectric thin films 472 or the like, is referred to as a particle-size varied structure.

Figure 51:
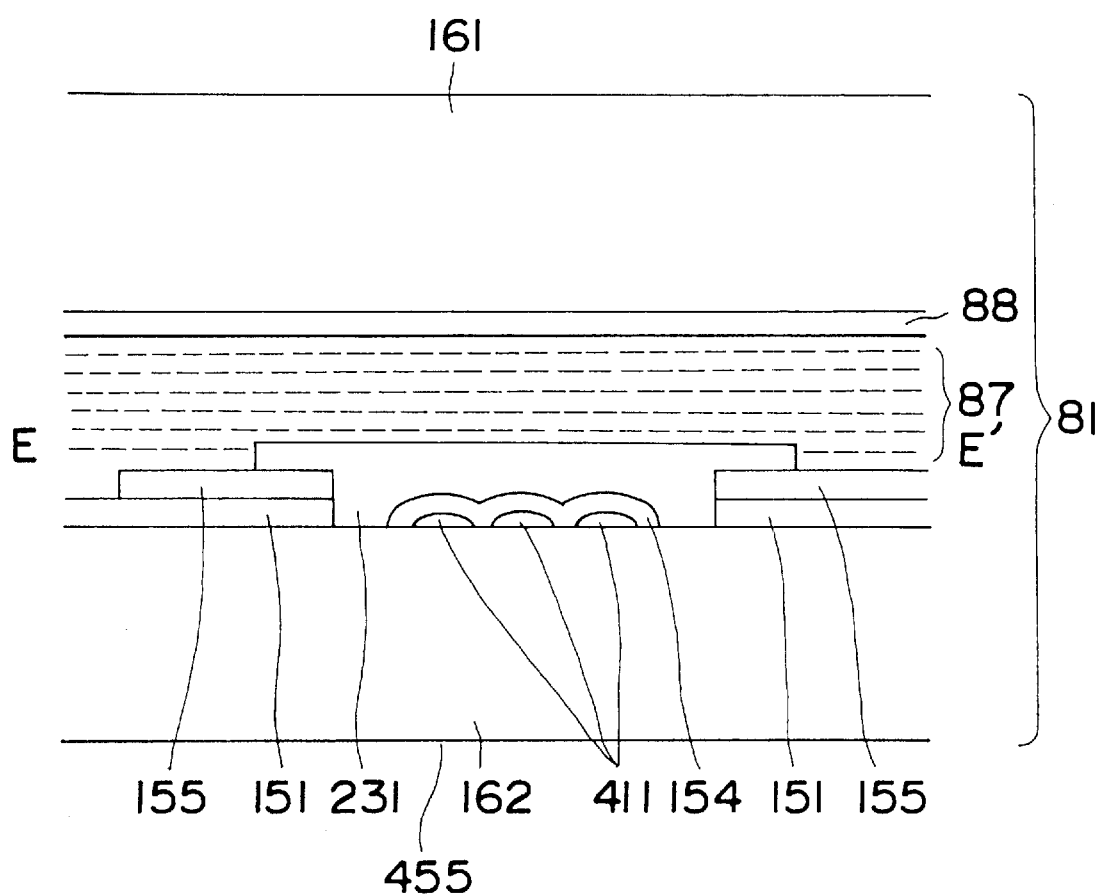
FIG. 51 is a schematic sectional view of a display device.

In FIG. 55, the low dielectric films 231 have been formed on the source lines 154 and the like. Otherwise, low electric pillars 562 may instead be provided as shown in FIG. 41. It is of course also possible to provide light-shielding pillars 261 instead. Other than these, if the light-absorbing film structure and the insulating film 232 as shown in FIG. 25 are adopted, or if the polarizer structures using the polarizer 331 as shown in FIGS. 35A–35C, the convex structure as shown in FIG. 51, the light-shielding film structure as shown in FIG. 52, or the TFT light-shielding structure as shown in FIG. 54 is adopted as the case may be, then effects by those structures can be exerted, needless to say. In addition, these arrangements or structures are adopted also in reflection type display devices which will be described later.

Figure 56:
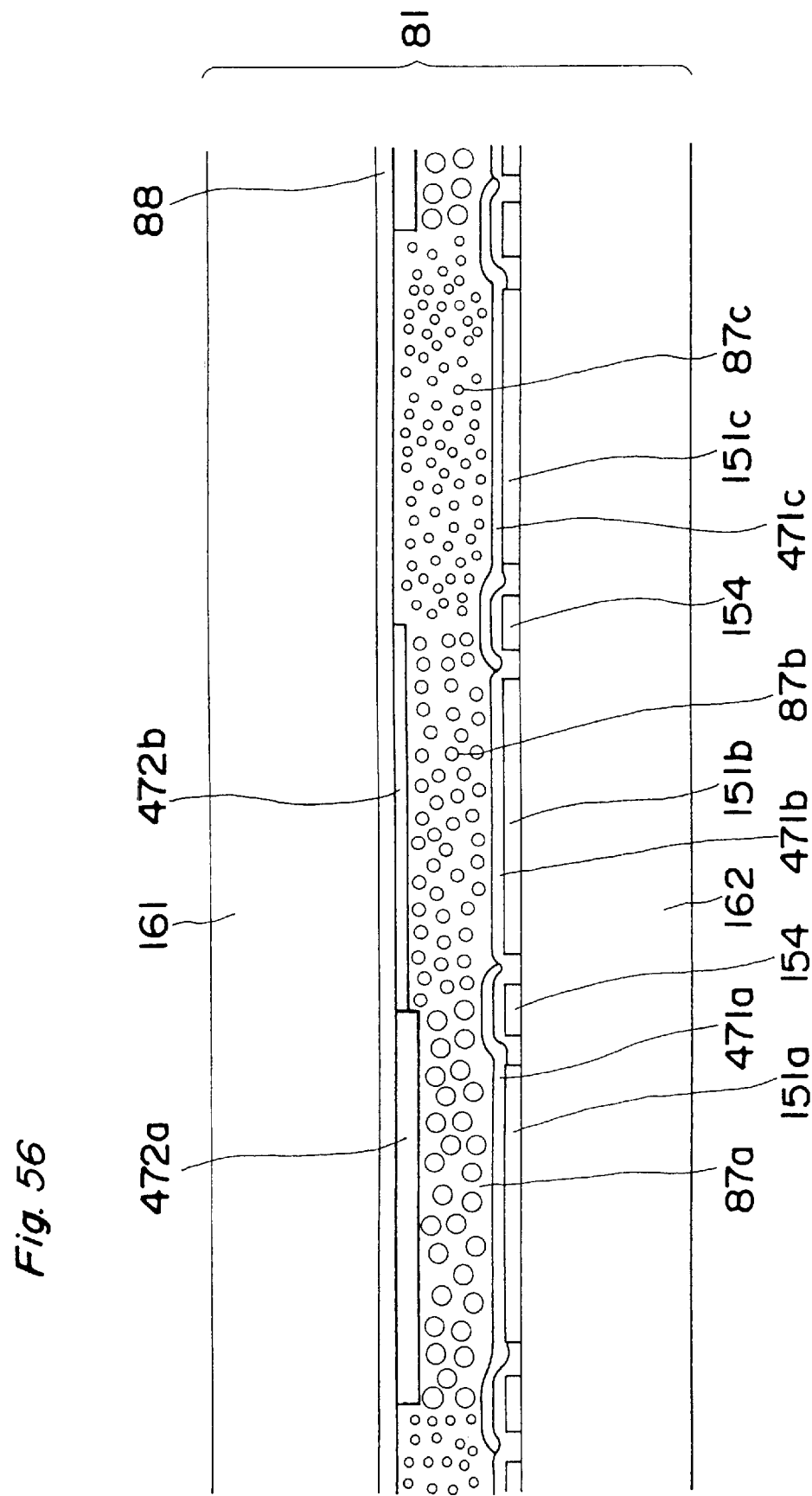
FIG. 56 is a sectional view of a display device.

The arrangement of FIG. 55 or the like has a structure to prevent the lateral electric field by forming the low dielectric films 231. On the other hand, FIG. 56 shows that the source lines 154 and the like may be coated with the color filters 471 and the like so as to implement electromagnetic shielding. It can be easily accomplished in manufacture, only by coating the source lines 154 and the like simultaneously when the color filters 471 are fabricated. The color filters are made of polymer components and therefore relatively low in dielectric constant, so that they can be arranged to have the same effects as the low dielectric films 231.

In the process of applying ultraviolet rays to the mixed solution, extremely intense light would cause the mean size of the droplets of liquid crystals to be very small. Extremely small droplet size would make it impossible to obtain a transmitting state even with voltage application. For example, mean droplet size of 0.6 μm or less tends to result in voltage for transmitting state reaching to 10 (V).

The liquid crystal layer on the pixel electrodes 151 is so arranged to come into a transmitting state normally at a voltage of 6 (V) or less. If the specification is 10 (V) for transmitting state, then the voltage of 6 (V) would cause a scattering state. Since the scattering state results in a black display, the pseudo-same effect as when the black matrix is provided can be obtained.

Figure 57:
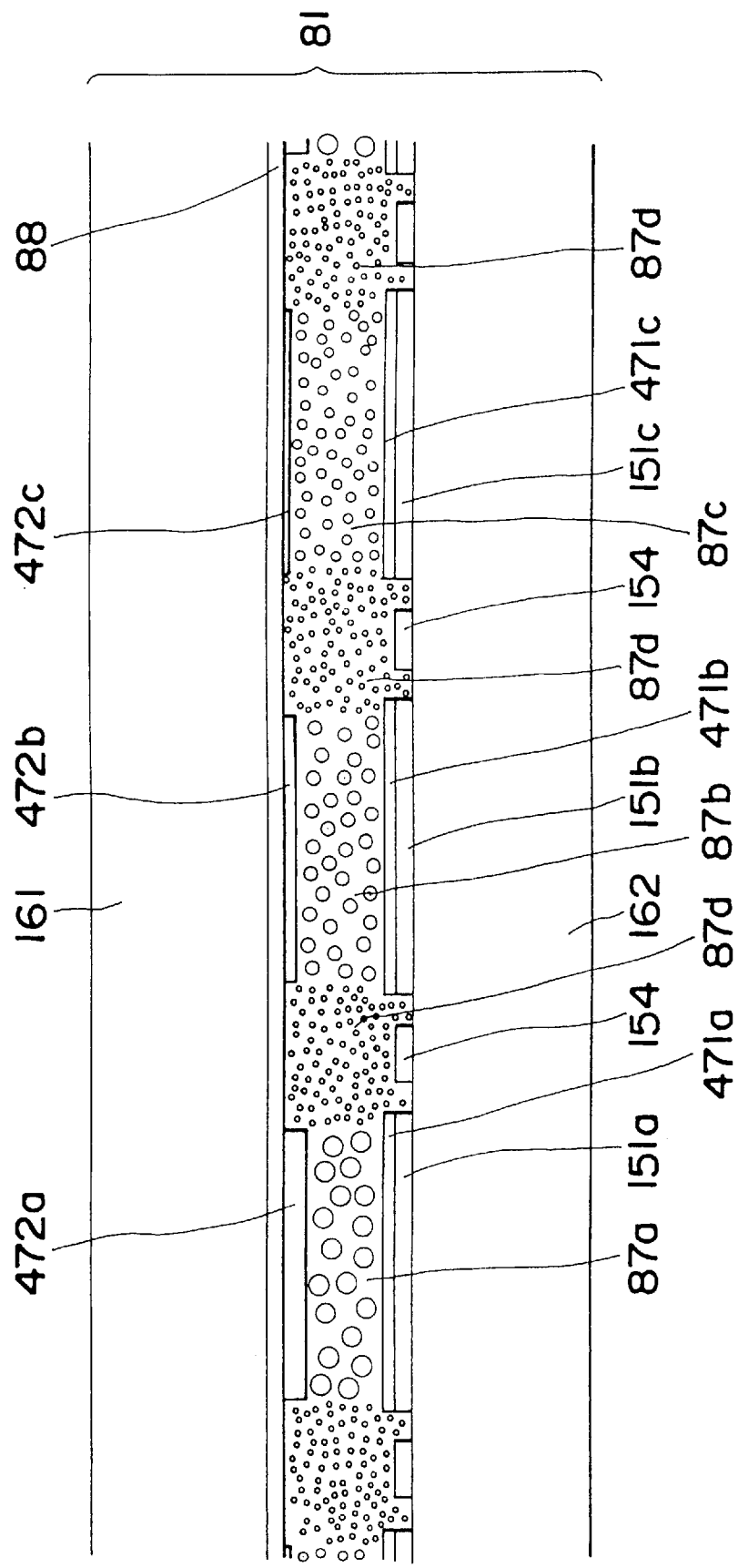
FIG. 57 is a sectional view of a display device which is another embodiment of the present invention.

FIG. 57 adopts a structure in which the liquid crystal layers 87 of the source lines 154 and the like are normally in a scattering state and a pseudo-black matrix is provided as described above. The dielectric thin films 472 are not formed on the counter electrode 88 confronting the source lines 154, but the dielectric thin films 472 are formed on the counter electrode 88 confronting the pixel electrodes 151. A dielectric thin film 472a confronting a red color filter 471a is the thickest, a dielectric thin film 472b confronting a green color filter 471b is the next thickest, and a dielectric thin film 472c confronting a blue color filter 471c is the thinnest. Accordingly, in the process of applying ultraviolet rays, the liquid crystal layers 87 have the following relationship in energy of ultraviolet rays to be incident thereon where $e_a$, $e_b$ and $e_c$ denote energies of ultraviolet rays for the liquid crystal layers 87a, 87b and 87c:

$$e_a < e_b < e_c.$$

Due to these differences in the energy of ultraviolet rays, the liquid crystal layers have the following relationship in mean sizes of the droplets of liquid crystals:

$$d_a > d_b > d_c,$$

where $d_a$, $d_b$ and $d_c$ denote mean size of the droplets of liquid crystal layers 87a, 87b and 87c. In this case, it is arranged that the liquid crystal layers 87a, 87b, and 87c come into a transparent state at a voltage of 6 (V), while the liquid crystal layer 87d will not come into a transmitting state until the voltage reaches nearly 10 (V). The structure in which the liquid crystal layer 87d at places other than the pixel electrodes will not respond to the voltage as described above is referred to as a pseudo-black matrix structure.

As described above, if the mean size of the droplets of liquid crystals on the source lines, the gate lines, and the like is made very small as in FIG. 57, the liquid crystal layer will not respond to applied voltages. The effect is the same as when the low dielectric pillars 262 are formed on the source lines 154 and the like. That is, extremely small mean size causes the liquid crystal layer not to respond even to lateral electric field, so that there occurs no light penetration through the peripheral portions of the pixels. Also, the normally held scattering state produces the same effect as when the black matrix is provided. Naturally, low dielectric pillars 262 may also be provided as in FIG. 58.

In the structures of FIGS. 55–58, it has been arranged that the color filters 471 are formed on the pixel electrodes 151, and the dielectric thin films 472 are formed on the counter electrode 88. It is also allowed, of course, that the dielectric thin films 472 are formed on or under the pixel electrodes 151 and the color filters 471 are formed on or under the counter electrode 88, conversely. In such a case, ultraviolet rays may be applied in the B direction in FIG. 55 in the process of polymerizing polymer components of the mixed solution.

Below described are embodiments of the reflection type display device of the present invention. The description is centered on the aspects in which the display device differs from the transmission type display devices. Therefore, the structures of the transmission type as described before are also applied here.

Figure 59:
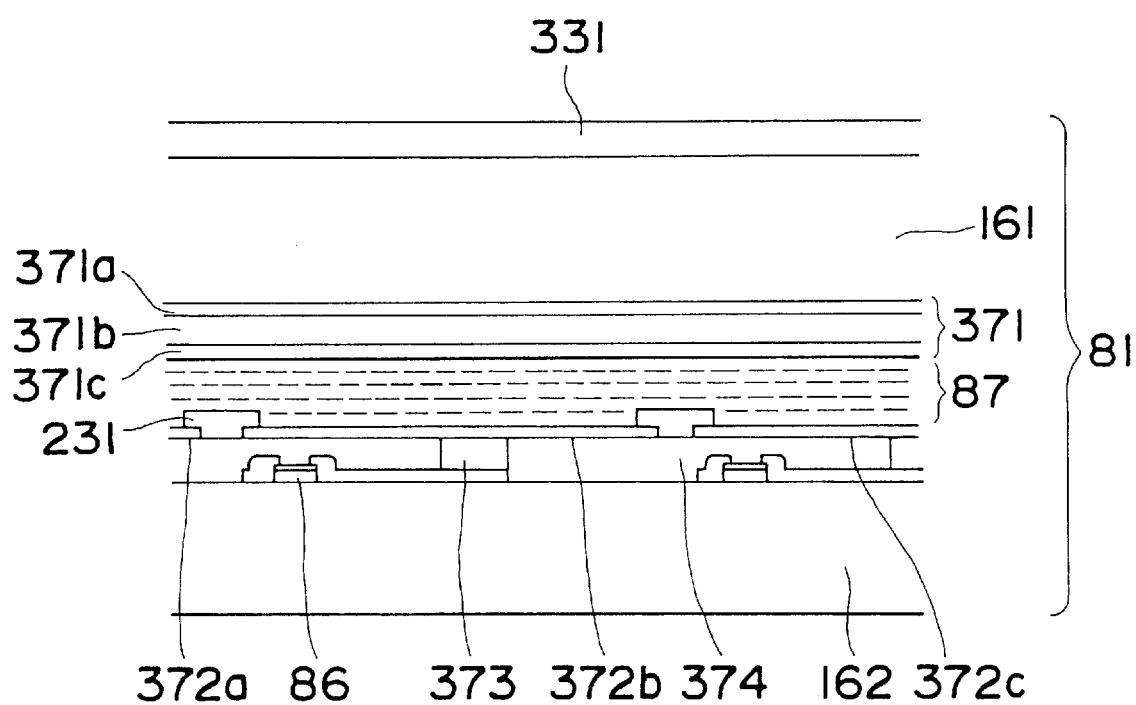
FIG. 59 is a sectional view of a display device.

FIG. 59 is an arrangement view of a reflection type LCD of the present embodiment. A glass substrate used as an opposite substrate 161 has a thickness of 0.6 to 1.1 mm. TFTs 86 and the like are formed on the array substrate 161. Reflection electrodes 372 are formed on the TFTs 86 with an insulating film 374 interposed therebetween. The reflection electrodes 372 and the TFTs 86 are electrically connected to each other by connecting terminals 373. As the material of the insulating film 374, organic materials typified by polyimide and the like, or inorganic materials such as $SiO_2$ and $SiN_x$ are used. The reflection electrode 372 has its surface formed of an Al thin film. It may also be formed by using Cr or the like, in which case Cr is lower in reflectance than Al and not as hard so that breakage or the like around the reflection electrodes 372 tends to occur.

The connecting terminals 373 cause depressions of 0.5 to 1 $\mu$m to be generated. However, it does not matter because the polymer dispersion liquid crystals 87 do not need the process of orientation or the like. In this case, an aperture ratio of 80% or more can be obtained for a pixel size of 100 $\mu$m square, and 70% or more even for 50 $\mu$m square. However, protrusions and depressions are generated on the TFTs 86 and the like, which causes the reflection efficiency to lower more or less. To eliminate those protrusions and depressions, it is appropriate to grind the surface of the reflection electrodes 372. A reflectance of 90% or more can be obtained by grinding.

Although not shown, the source lines 154 and the gate lines 153 are also formed on the array substrate 162. Since the signal lines and the TFTs 86 are covered with the reflection electrodes 372, the liquid crystal layer 87 is put into an orientation action by an electric field generated from the signal lines and the TFTs 86. As a result, there is no possibility that image noise may occur.

In the transmission type display panel, it has been the case that lateral electric field is generated primarily between the signal lines and the pixel electrodes 151. In the reflection type display panel, on the other hand, the signal lines 154 and the like are formed at the lower layer under the reflection electrodes 372, so that almost no lateral electric field will be generated between the signal lines 154 and the reflection electrodes 372. However, lateral electric field will be generated between adjacent pixels. That is, as shown in FIG. 60, with a voltage of positive polarity applied a reflection electrode 372d and a voltage of negative polarity applied to reflection electrodes 372b, 372c, and 372e, a line of electric force (lateral electric field) 263 is developed between the reflection electrodes 372b and 372d. The liquid crystal molecules 281 are oriented along the line of electric force 263. It is noted that no lateral electric field is developed between the reflection electrodes 372b and 372e, because the reflection electrodes are of the same polarity.

If the major axis of the liquid crystal molecules 281 is aligned in the direction of the lateral electric field 263 as shown in FIG. 60, then the polarized light in the bb' direction is transmitted while the polarized light in the aa' direction is scattered. In order to prevent light leakage due to the lateral electric field by using a polarizer, it is appropriate to align the polarization axis 332 of the polarizer 331 along the aa' direction.

However, in the reflection type LCD panel, there will not occur a phenomenon that light is transmitted around the pixel electrodes, as in the transmission type LCD panel. In the reflection type, liquid crystals around the reflection electrodes cause a phenomenon that an irrelevant display (hereinafter, referred to as image noise) is made. That is, the liquid crystal layer is put into a transmitting state by the lateral electric field 263, so that light incident on the transmitting portion is reflected by the reflection electrodes so as to be projected onto the screen.

For further prevention of the lateral electric field that is generated between pixel electrodes, the low dielectric films 231 may appropriately be formed between the reflection electrodes 372. The low dielectric films 231 are formed between reflection electrodes and around the reflection electrodes. Component materials and effects of the low dielectric films 231 have already been described for FIG. 41 and the like, and their description is here omitted. It has also been explained with FIG. 30 that coloring the low dielectric films 231 prevents the halation between the liquid crystal layers 87. In addition, the low dielectric films 231 may be replaced with the light-shielding pillars 262 as shown in FIG. 61.

Figure 58:
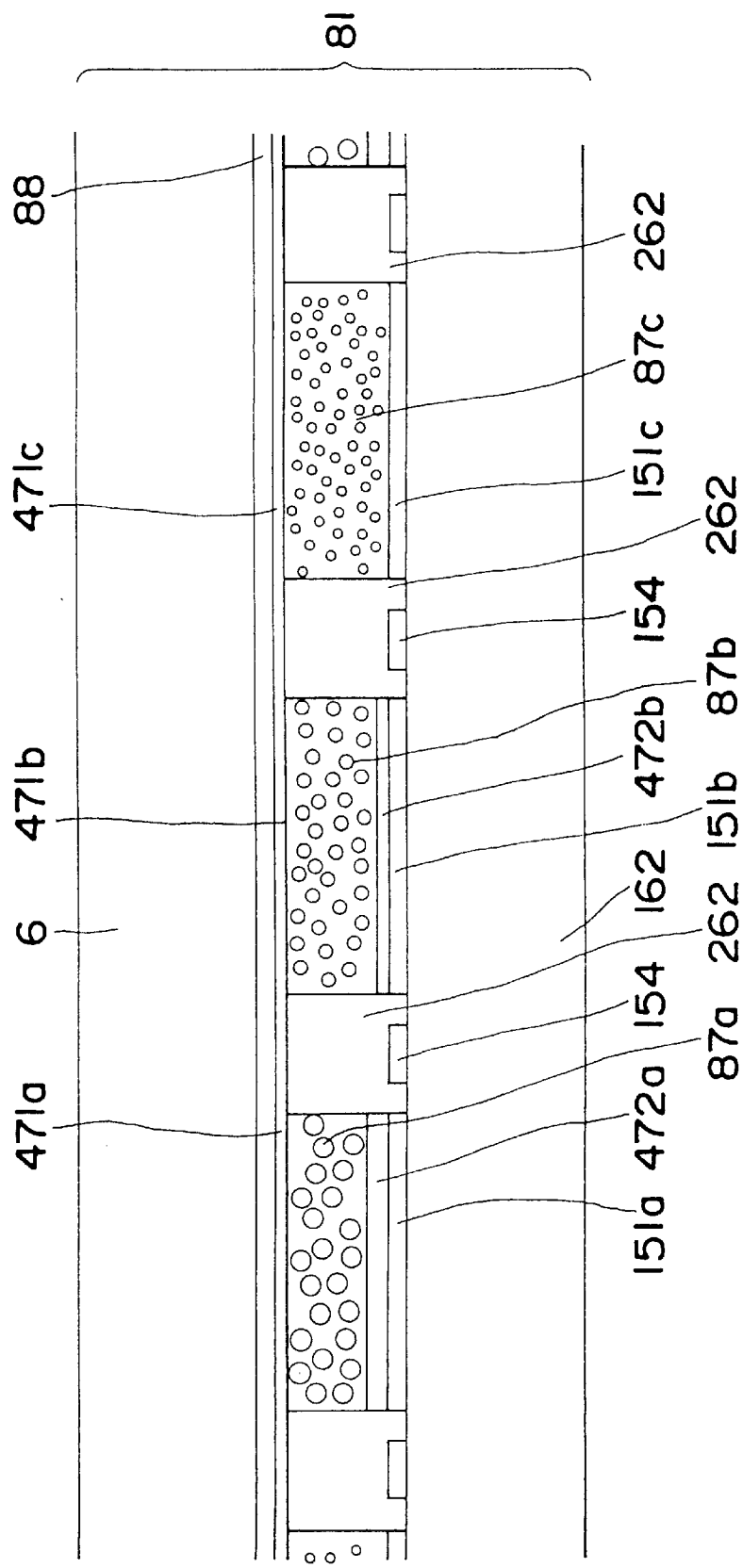
FIG. 58 is a sectional view of a display device.
Figure 61:
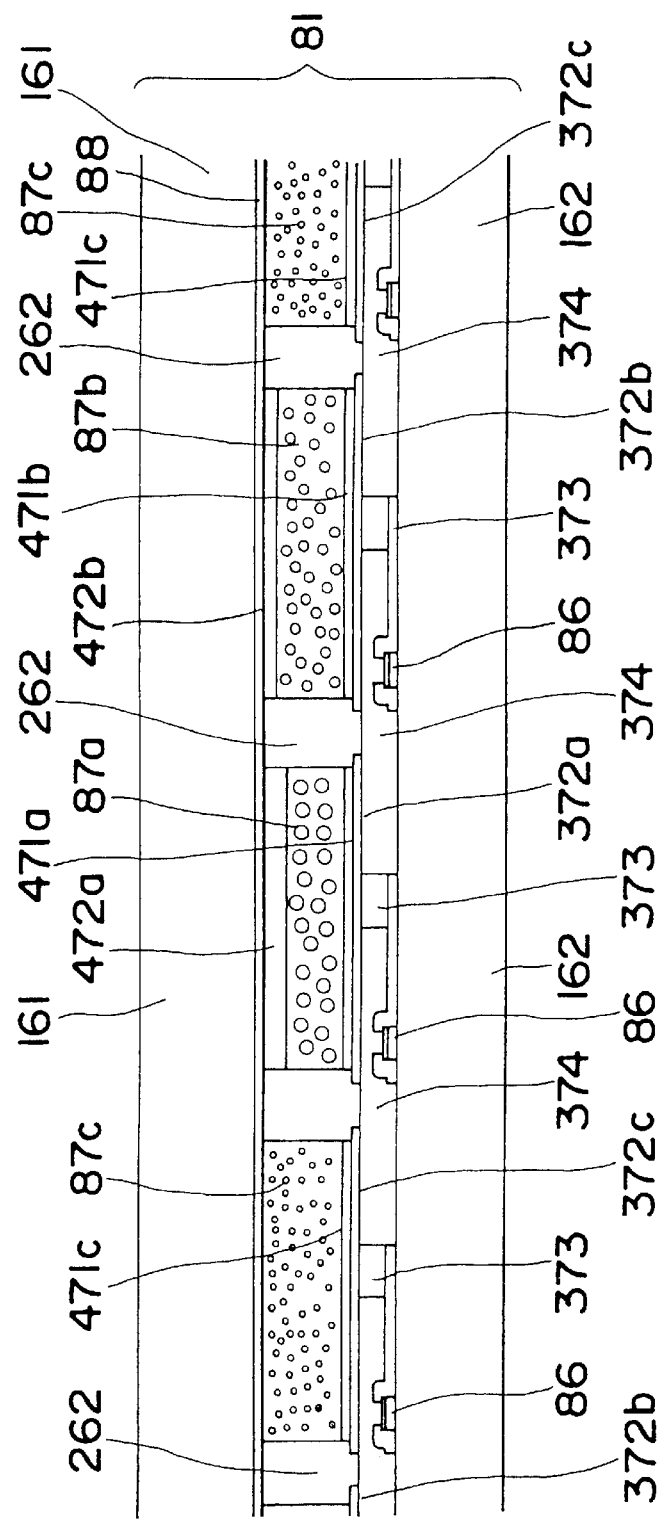
FIG. 61 is a sectional view of a display device.

In order to implement the particle-size varied structure in the reflection type polymer dispersion LCD panel, such a structure as shown in FIG. 61 may be adopted. Since this is a structure in which the structure of the transmission type display panel as shown in FIG. 58 is applied to the reflection type, no particular description would be needed. Ultraviolet rays may be applied in the direction of A.

Dielectric multilayer films 371a, 371b are laminated on both surfaces of the counter electrode 88, thereby providing an antireflection film 371. The antireflection film 371 is of a three-layer structure composed of, as listed starting with the opposite substrate 161 side, a first dielectric thin film 371a, an ITO thin film 371b that is counter electrode, and a second dielectric thin film 371c. The transparent dielectric thin films 371a, 371b are formed before and after the ITO thin film that is a counter electrode 371b, whereby a three-layer structure is made up to provide an antireflection function. The optical film thickness (nd) of the ITO thin film 371b is $\lambda/2$, and those of the first thin film 371a and the second thin film 371c are each $\lambda/4$, where n is the index of refraction, d is the physical film thickness, and $\lambda$ is the wavelength of light.

In the LCD panel 81 as shown in FIG. 59 or the like, the TFTs 86 are formed at the lower layer under the reflection electrodes 372. That is, the reflection electrodes 372 serve both as a light-shielding film. (black matrix) that prevents incident light scattered by the polymer dispersion liquid crystal layer 87 from being incident on the semiconductor layer of the TFTs 86, and as an electrode that applies a voltage to the liquid crystal layers 87. The reflection electrodes 372 are made of a metal material, capable of a sufficient light-shielding effect, and further simple in construction, thus allowing a reduction in cost.

The reflection electrodes 372 and the TFTs 86 are electrically connected to each other by a connecting portion 373. To provide the connection, it is necessary to deposit the metal thin films (reflection electrodes) 372 to a film thickness more than that of the insulating film 374. The film thickness of the insulating film 374 is around 1 $\mu$m. Therefore, a step gap of 1 $\mu$m is generated at the connecting portion 373. Further, since the film thickness of the reflection electrodes 372 is also 1 µm, a valley of 1 µm is generated between adjacent reflection electrodes. The polymer dispersion LCD panel does not need the rubbing process and therefore the aforementioned step gap, if involved, would be no obstacle, so that the LCD panel can be produced at a high fabrication yield.

A step gap of 1 µm is generated at the connecting portion 373. Also, the configuration of the TFTs 86 is patterned to the reflection electrodes 372 and, as a result, irregularities of around 1 µm are generated. The polymer dispersion LCD panel performs optical modulation as a change of the scattering state. Therefore, the change of around 1 µm in the liquid crystal film thickness due to the irregularities of the step gap and the TFTs 86 hardly affects the optical modulation. In display panels, such as of TN liquid crystals, in which the rotary polarization characteristic is applied to the optical modulation, the above irregularities would cause critical damage to optical modulation. Also, the liquid crystal film thickness of the polymer dispersion LCD panel is thick as much as 8 µm or more, which also exerts an advantageous effect to the non-uniformity of film thickness of the liquid crystal layers 87.

It is desirable that the index of refraction of the first thin film and the second thin film is within a range of 1.60 to 1.80. Examples that can be mentioned are $SiO$, $Al_2O_3$, $Y_2O_3$, Mgo, $CeF_3$, $WO_3$, and $PbF_2$. Among others, when the first thin film is made of SiO and the second thin film is of $Y_2O_3$, an excellent antireflection effect of 0.1% or less over the whole visible region can be realized.

The antireflection film 371 has been arranged so that the optical film thickness of the first and second dielectric thin films is $\lambda/4$ and the optical film thickness of the ITO thin film is $\lambda/2$. Instead, it is also possible that the optical film thickness of the first and second dielectric thin films is $\lambda/4$, and the optical film thickness of the ITO thin film is $\lambda/4$.

Further, from the view of the theory of antireflection films, if N is an odd number of 1 or more and M is an integer of 1 or more, then it is only required that the optical film thickness of the first and second dielectric thin films is $(N\cdot\lambda)/4$ and the optical film thickness of the ITO thin film is $(N\cdot\lambda)/4$. Otherwise, it is only required that the optical film thickness of the first and second dielectric thin films is $(N\cdot\lambda)/4$ and the optical film thickness of the ITO thin film is $(M\cdot\lambda)/2$.

Furthermore, either one of the first or second dielectric thin films may be omitted. In such a case, indeed the performance for prevention of reflection would be deteriorated more or less, but it is in many cases no problem in terms of practical use. In this case also, the above-mentioned antireflection theory is applicable.

The formation of the antireflection film 371 prevents the light that is not incident on but reflected by the liquid crystal layer 87, so that the display contrast can be improved to a large extent. More details are described in Japanese Patent Laid-Open Publication HEI 5-109232. Its description on the structure of the antireflection film 371 and the like is incorporated herein.

Figure 62:
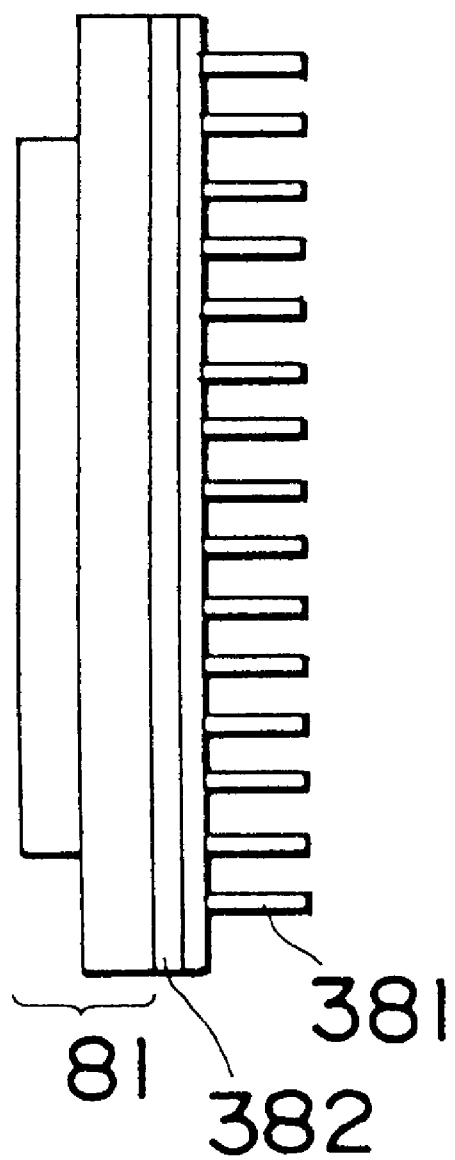
FIG. 62 is a sectional view of a display device.

The reflection type display panel has a good contrast by virtue of the thin film thickness of the liquid crystal layer 87, and a high pixel aperture ratio so that it can present high-brightness display, as compared with the transmission type display panel. Moreover, it has no obstacles on the rear side of the display panel, allowing an easy cooling of the panel. For example, forced air cooling or liquid cooling from the rear side can be easily accomplished, and a heat sink 381 or the like may be mounted on the rear side as shown in FIG. 62. The heat sink 381 is used as it is bonded to the LCD panel 81 with an adhesive 382 such as silicon.

In the display device of the present embodiment, it is arranged that a convex structure as shown in FIG. 51 or a lower-layer light-shielding film structure as shown in FIG. 52 is used to scatter or absorb the light reflected by the interface 455 so as to prevent ghosts and the like. With a structure in which a concave lens or a transparent substrate (hereinafter, referred to generically as a transparent member) is bonded on the light input/output surface of the LCD panel 81 (hereinafter, referred to as a transparent member structure), the above-mentioned ghosts and the like can be prevented and moreover the display contrast can be improved. The transparent member structure can exhibit a unique advantage of improved display contrast and the like when used singly, and increased advantages when combined with the lower-layer light-shielding film structure or the convex structure. Below explained is the transparent member structure.

Figure 63:
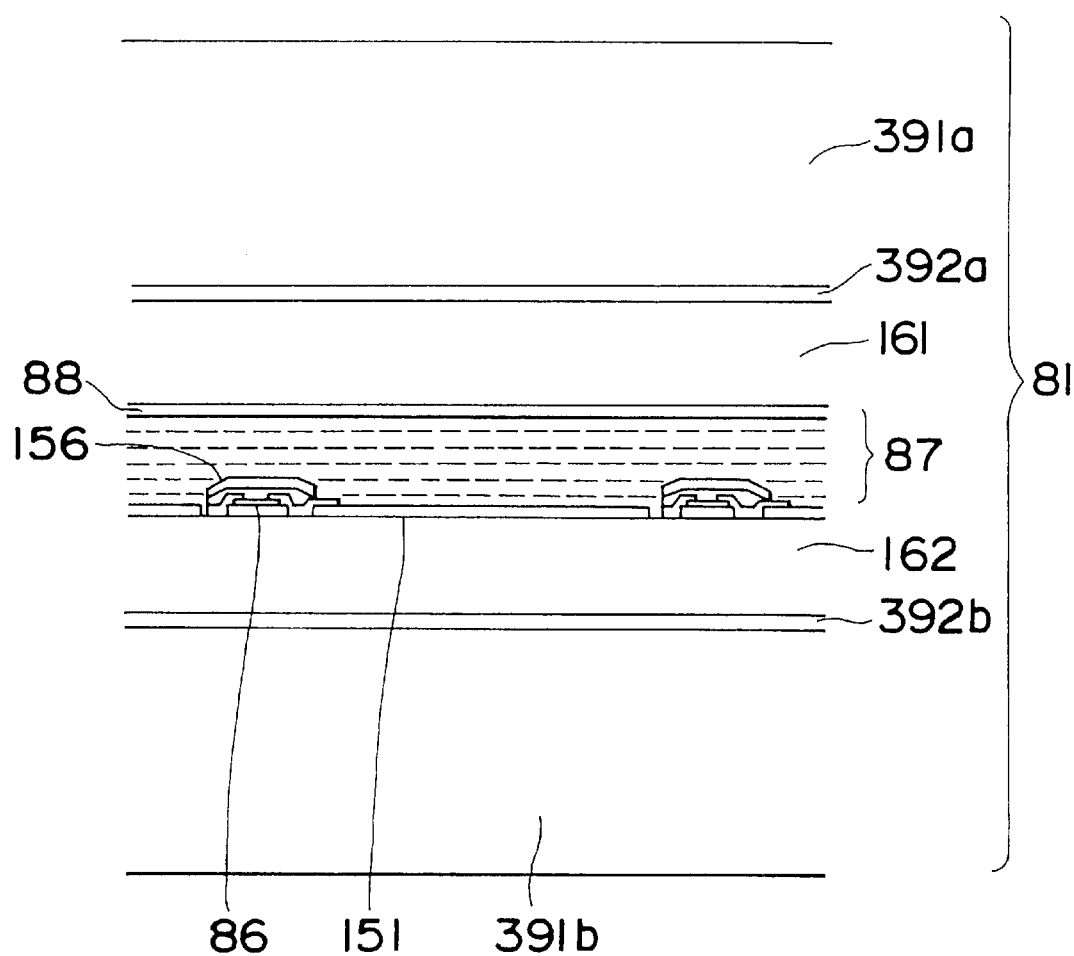
FIG. 63 is a sectional view of a display device.

FIG. 63 shows a structure in which a transparent member or the like is bonded onto the display panel of the present embodiment. A transparent substrate 391 is bonded onto the surface of the display panel. The transparent substrate 391 is bonded to the surface of the display panel via an optically coupling layer 392. An antireflection layer (not shown) for preventing light reflected by the interface with air is formed on the surface of the transparent substrate 391. For example, it is a V-coat as described before.

The optically coupling layer is exemplified by ultraviolet-curing type adhesives. The adhesives in many cases have a index of refraction close to that of the glass substrate constituting the display panel, thus suitable for use as an optically coupling agent. Also, the optically coupling layer is not limited to the ultraviolet-curing type adhesives, but may also be transparent silicon polymer and the like. Otherwise, liquids such as epoxy transparent adhesives and ethylene glycol may also be used. Care should be taken so that air will not mixedly invade the space between itself and the opposite substrate 161 or the like of the display panel. Air, if present, would cause an abnormality in image quality due to a difference in index of refraction.

The transparent substrate 391 is formed of a transparent substance such as glass or acrylic polymer. A light-absorbing film (not shown) is formed from a black paint or the like on non-display areas (called ineffective surface) which are other than the effective display area.

The reason that bonding the transparent substrate 391 onto the display panel allows the display contrast and the like to be improved is described in Japanese Patent Laid-Open Publication 4-145277/1992 in detail, and here omitted. It is noted that the description of the aforementioned publication is incorporated herein.

The structure in which a transparent member is bonded onto the display panel of the present embodiment may be given in a variety of types. For example, as shown in FIG. 13 of the above-mentioned patent laid-open publication, available are a structure in which a convex lens 112 is bonded to the display panel, and a structure or a transparent substrate 111 in which a concave lens 112 is bonded and a convex lens is arranged at a concave portion of the concave lens via an air layer. These arrangements are described in the above-mentioned patent laid-open publication.

Figure 64:
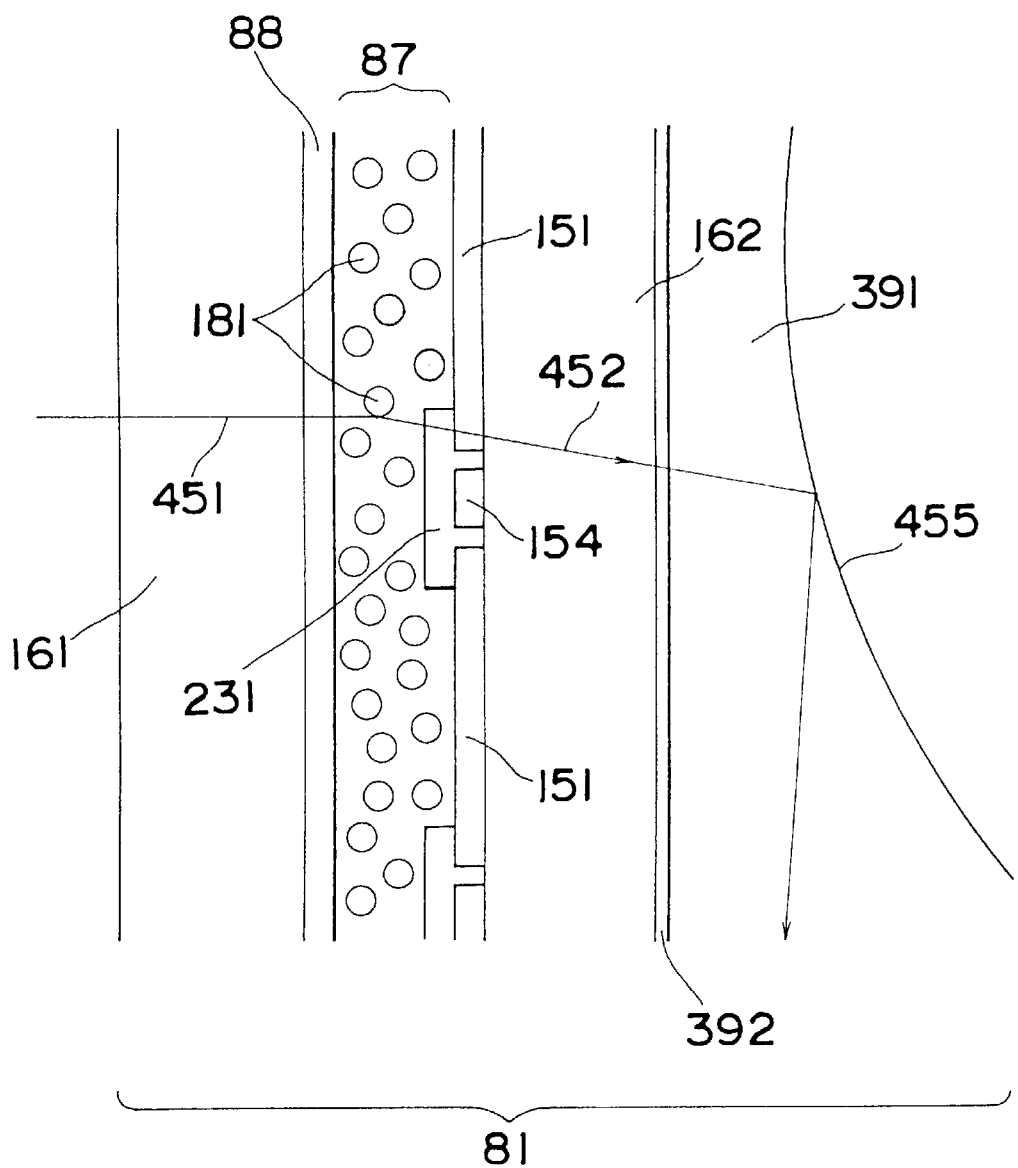
FIG. 64 is a sectional view of a display device.

With an arrangement that a transparent substrate or a concave lens is bonded to the display panel as shown in FIG. 64, light scattered by the liquid crystal layer 87 is reflected by the interface 455, so that it will not be scattered once more by the liquid crystal layer 87 (secondary scattering or secondary light source). As a result, the display contrast can be improved. That the light reflected by the interface 455 will no longer be returned to the liquid crystal layer 87 means that the light 453*b* reflected by the source lines 154 and the like is eliminated. That is, as shown in FIG. 64, incident light 451 is scattered by the liquid crystal layer 87 to form scattered light 452, whereas the light is reflected by the interface 455 of the concave lens 391 so as to be all incident on the light-absorbing film formed on ineffective areas of the concave lens, thus being absorbed.

When the polarizer 331 is bonded to the display panel, it may favorably be sandwiched between the transparent member 391 and the opposite substrate 161 as shown in FIG. 63. The polarizer 331 may also be bonded onto the surface at which the transparent substrate 391 makes contact with air, but it is difficult to form the antireflection layer on a polymer film surface because the polarizer 331 is generally a polymer film. Without an antireflection layer, increased quantity of light would be reflected by the interface 455, causing an optical loss.

When the polarizer 331 is sandwiched between the transparent member 391 and the opposite substrate as shown in FIG. 63, no reflection of light occurs at the polarizer 331 while an antireflection layer is allowed to be formed on the interface of the transparent substrate 391. Thus, improvement of the optical use ratio can be expected. In addition, the polarization axis 332 of the polarizer 331 is set by taking into account the direction in which lateral electric field is generated, as described in FIGS. 35A–35C.

Figure 65A:
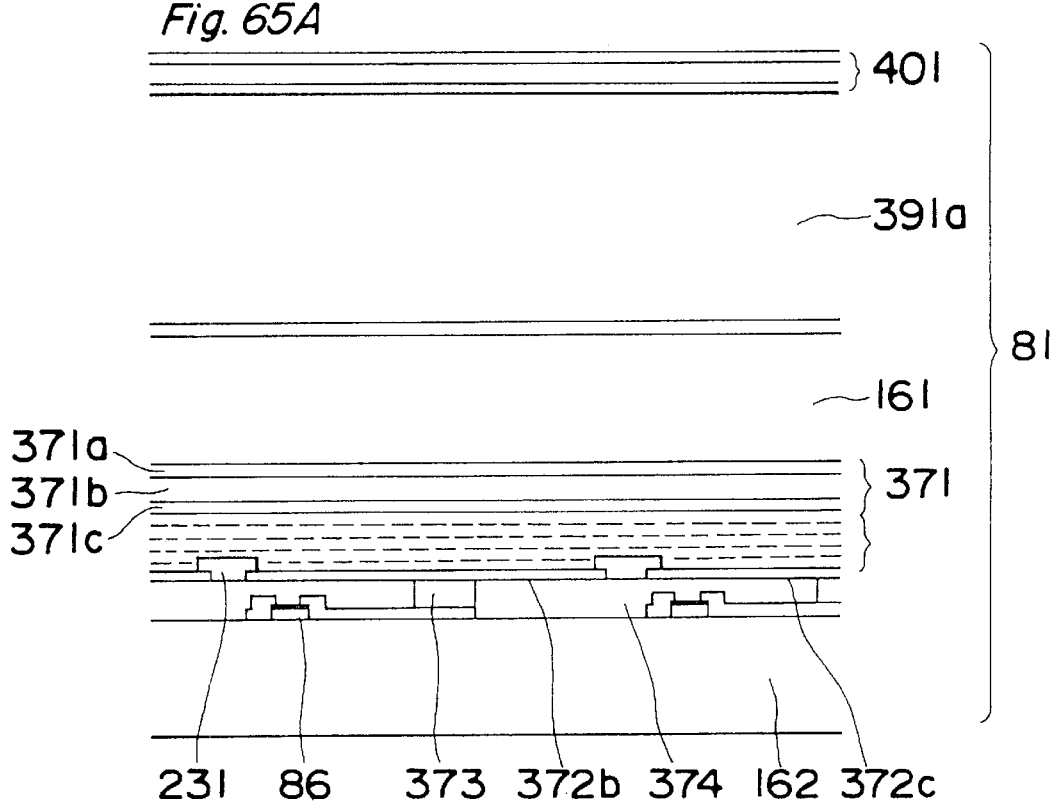
FIGS. 65A and 65B are sectional views of display devices.
Figure 65B:
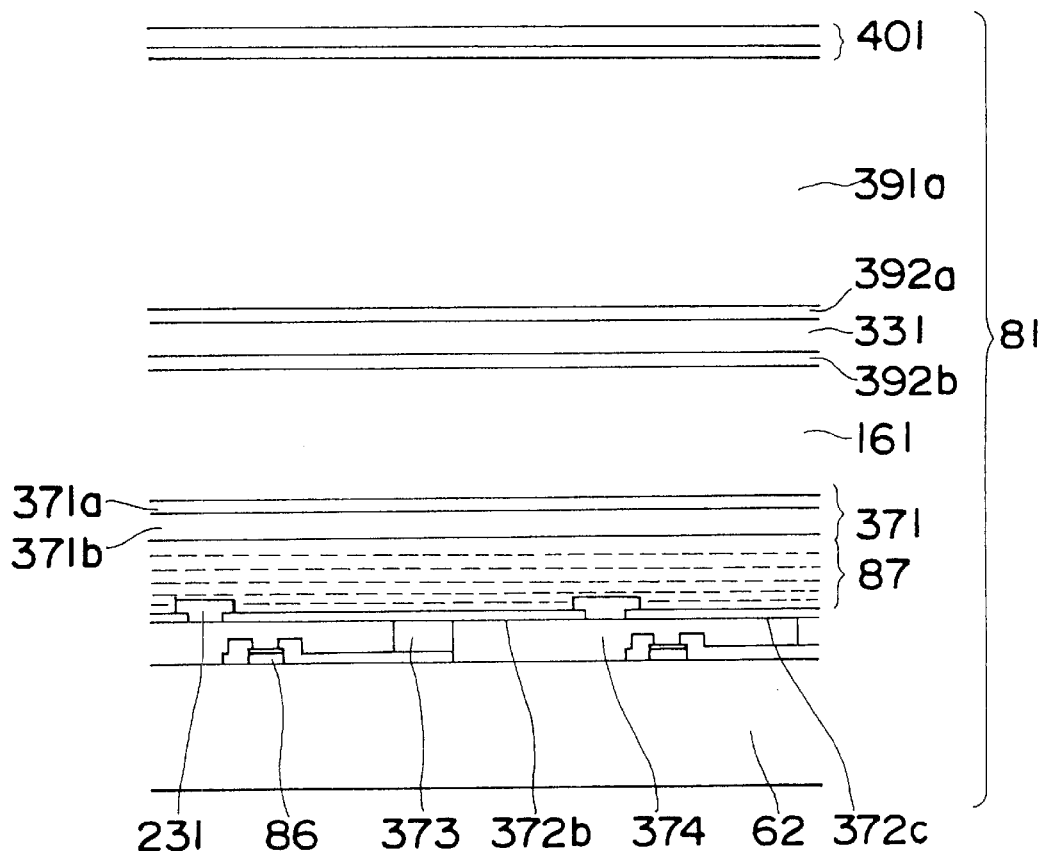

The transparent member structure can be applied also to the reflection type display panel of the present embodiment. FIG. 65A is a view of its arrangement. An antireflection layer 401 of a three-layer multi-coat is formed on the surface of a transparent member 391*a*. A V-coat 401 may be a substitute, of course, as shown in FIG. 65B.

A variety of modifications are possible for the structure of the reflection type display panel, as in FIG. 63. Available is, for example, a structure in which the transparent substrate 391 is bonded to the opposite substrate 161 of the reflection type display panel as shown in FIG. 65A, or a structure in which a concave lens is bonded instead of the transparent substrate, or a structure in which the opposite substrate 161 is made thick enough (thickness of the opposite substrate+ thickness of the transparent substrate 391). Advantages of these structures are similar to those of the transmission type display panel as previously shown in FIG. 63. It is also allowed that the polarizer 331 is sandwiched between the opposite substrate 161 and the transparent member 391, as shown in FIG. 65B.

The reflection type display device as shown in FIG. 59 has adopted the metal thin film 372. However, other types illustrated in FIGS. 66 and 67 are also available as a reflection type display device.

Figure 66:
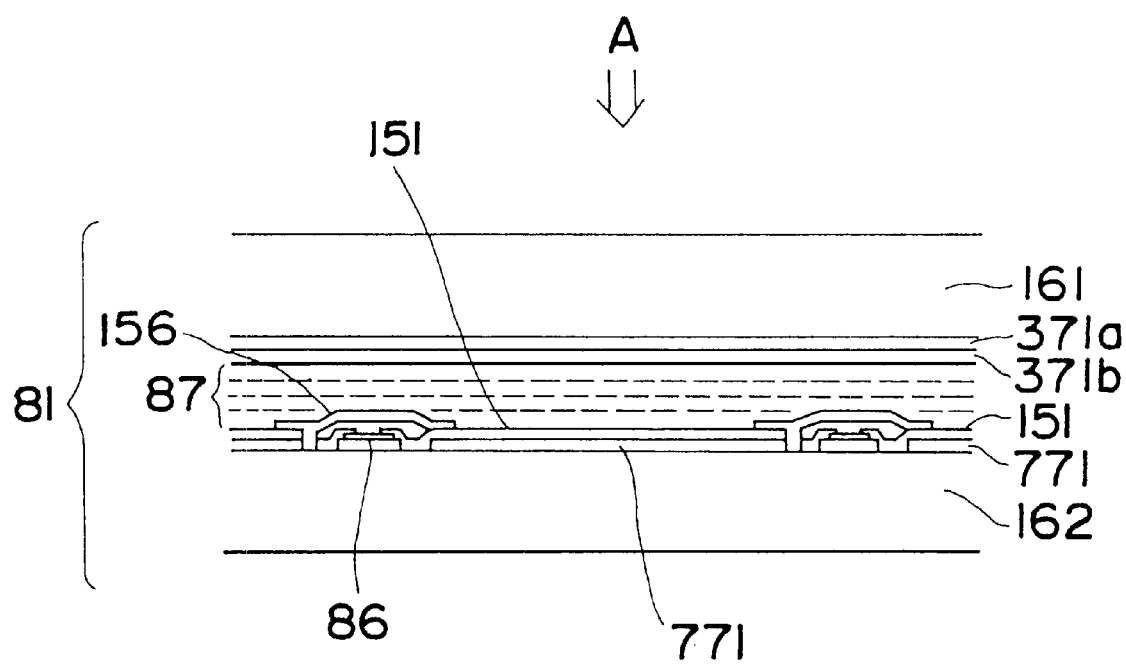
FIG. 66 is a sectional view of a display device.
Figure 67:
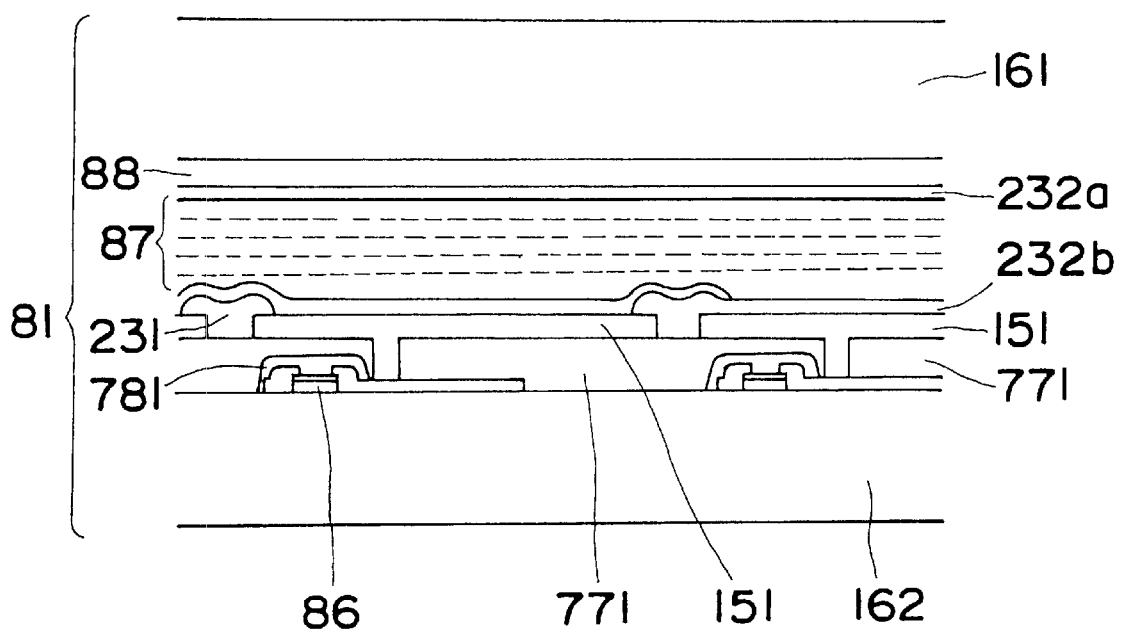
FIG. 67 is a sectional view of a display device.

In FIG. 66, a light-absorbing film 771 is arranged under the pixel electrodes 151 with the arrangement of FIG. 27. The light-absorbing film 771 may be exemplified by polymers containing black dyes. Otherwise, black metal materials such as hexavalent chromium may be mentioned. However, it is desirable to adopt a light-absorbing film composed of polymers in view of the simplicities of fabrication and coloring selection.

The light-absorbing film 771 is patterned in correspondence to the pixel configuration. It is not formed in common to all the pixels (or integrally). This is due to restrictions involved in the fabricating processes of the TFT array.

First, the TFTs 86, the source lines 154, and the like are formed on the substrate 162. Then, the light-absorbing film 771 is coated by a spinner or the like and thereafter patterned in correspondence to the pixel configuration. Finally, ITO that will serve as the pixel electrodes 151 is deposited, whereby pixel electrodes 151 with the ITO patterned are provided.

For deposition of a metal thin film constituting the TFTs 86 and the like, it is necessary. to heat the substrate 162 to relatively high temperatures. The polymer of the light-absorbing film 771 would deteriorate or change under such temperatures. Therefore, the TFTs 86 cannot be formed after the formation of the light-absorbing film 771. Thus, in the present embodiment, after the TFTs 86 are formed, the light-absorbing film 771 is formed. Moreover, patterning for interconnecting the TFTs 86 and the pixel electrodes 151 is performed. Although not shown in the drawings, the light-absorbing film 771 is formed on the signal lines 154 and the like. This is intended to make the light-absorbing film 771 function as a low dielectric film 241 or a light-absorbing film 231, whereby lateral electric fields between the signal lines and the pixel electrodes are prevented.

The pixel electrodes 151, as viewed in the direction of A, look white (scattering) when the liquid crystal layer 87 is in scattering state. When the liquid crystal layer 87 is in a light-transmitting state, a black light-absorbing film 771 can be viewed. That is, the optical transmittance is controlled by the TFTs 86 for each pixel, whereby a black-and-white image or character or the like can be displayed. The structure of FIG. 66 can display characters, graphics, or the like under the illumination of direct light or artificial light such as fluorescent light, without using a light source or the like. Accordingly, the structure permits reduction in power consumption, thus suitable for use as a monitor for pocket computers and the like. Of course, if the light-absorbing film 771 is given by ones that reflect red, green, and blue light, it becomes possible to implement a full color display. This could not be implemented without adopting the polymer dispersion liquid crystals. The TN liquid crystals need the use of a polarizer, so that a practically sufficient display brightness could not be obtained.

Referring to FIG. 66, the structures of a light-shielding film 156, an antireflection film 371, and the like have been described before, and here omitted.

A structure of FIG. 67, where the reflection type of FIG. 59 is modified, is also possible. The structure of FIG. 67 is a structure in which the reflection electrode 372 of FIG. 59 is given by a transparent electrode 151, and the insulating film 374 is given by a light-absorbing film 771. Accordingly, when the liquid crystal layer 87 comes into a light-transmitting state, the color of the light-absorbing film 771 under the ITO 151 can be viewed as shown in FIG. 66.

The TFTs 86 are formed under the ITO 151, whereby the pixel aperture ratio is improved. However, the light-absorbing film 771 may contain impurities such as alkali metals so as to affect the characteristics of the TFTs 86. Therefore, a protective film 781 composed of an inorganic material such as $SiO_2$ or $SiN_x$ is formed on the TFTS. 86.

First, the TFTs 86, the signal lines 154, and the like are formed on the substrate 162. Next, the protective film 781 is formed on the TFTs 86. Thereafter, the light-absorbing film 771 is coated by a spinner or the like, and subsequently patterned in correspondence to the pixel configuration. Finally, the ITO, which will serve as the pixel electrodes 151, is deposited, whereby pixel electrodes 151 with the ITO patterned are provided.

A light-absorbing film 231 is previously formed between adjacent ITOs 151. This is intended for the purpose that areas where the optical modulation results in a display state other than the normal state due to the lateral electric field generated between the pixels are made invisible.

In addition, preferably, in the display panels of the structures of FIGS. 66 and 67, an insulating film 232 is formed on the counter electrode 88 and the ITO electrodes 151. The reason of this has been described before and here omitted. Also, the structure, material, and the like of the liquid crystal layer 87, which has also been described before, is omitted here.

In FIGS. 32A, 32B, 33, and 60, it has been described on the assumption that the liquid crystal molecules have a positive dielectric constant. Therefore, when lateral electric field is generated in the aa' direction, the liquid crystal molecules are oriented in the aa' direction. As a result, polarized light in the bb' direction becomes easier to transmit.

However, when the liquid crystal molecules have a negative dielectric constant, the case is reverse to the above. That is, with a negative dielectric constant, when the lateral electric field is generated in the aa' direction, the liquid crystal molecules can be regarded as having been oriented in the bb' direction. As a result, the polarized light in the aa' direction becomes easier to transmit.

In the case where the liquid crystal molecules have a positive dielectric constant, the image signal display method of the present embodiment is embodied as shown in FIG. 60, the polarized light in the aa' direction becomes more easy to transmit. For this reason, when a polarizer is used in the display device of the present embodiment, the polarization axis of the polarizer is generally aligned with the direction of pixel columns (bb' direction). Also, in the case of column-inversion drive, the polarization axis of the polarizer is aligned with the direction of pixel lines (aa' direction).

The description of the present specification and the appended claims is based on the assumption that the liquid crystal molecules have a positive dielectric constant. In actual cases, most liquid crystals that can be used practically have positive dielectric constants. However, there is a possibility that liquid crystals of negative dielectric constants may be used. Accordingly, when liquid crystals of a negative dielectric constant are used, the description of the present specification and the appended claims should be read with some substitutions. In more detail, when the liquid crystals have a negative dielectric constant, the polarization axis of the polarization means is in the direction of pixel lines (direction in which the gate lines are formed) for the H-inversion drive, and in the direction of pixel columns (direction in which the source lines are formed) for the column-inversion drive.

One technical concept of the present embodiment is a structure of the display panel or a drive method in which the direction of generation of the lateral electric field has been taken into consideration for the purpose of preventing occurrence of light penetration through the peripheral portions of the pixel electrodes by the liquid crystals oriented along the lateral electric field. The concept applies to, for example, the direction of the polarization axis, the low dielectric pillars 261, the light-shielding film 211, the polymer light-shielding film 231, the low dielectric film 241, the light-shielding pillar 262, the drive method (H-inversion drive, column-inversion drive), and the like. Accordingly, since the direction of orientation of the liquid crystal molecules due to the lateral electric field results in a different one if the liquid crystals have a negative dielectric constant, it is natural that the present specification and the appended claims should be read with substitutions for matching to the case of a negative dielectric constant. The technical concept intended by the present embodiment is unchanged even in such cases.

Hereinbelow, the projection type display device of the present embodiment is explained. The projection type display device of the present embodiment incorporates, as its basic structure, the LCD panel 81 of the present embodiment as a light valve. First described are common points among projection type display devices of the present embodiment.

In a projection type display device of the present embodiment, there is a need of increasing the F number of illuminating light with decreasing panel's effective display size (panel's display area) in terms of an improvement of the light use rate. If the panel's effective display size d is increased, the F number of illuminating light can be decreased, so that a bright large screen size can be implemented. However, increased panel's effective display size would cause the system size of the projection type display device to be increased, unfavorably. Also, decreased panel's effective display size would cause increases in the luminous flux per unit area which is incident on the panel's display area, so that the panel is heated, unfavorably.

Assuming that the luminosity of the light-emitting member is $1.2 \times 10^8$ (nt) constant with a consideration to the lamp's life, it is considered that the arc length and the power consumption of the lamp are in a generally proportional relationship. The efficiency of a metal halide lamp is 8 (lm/W). The total luminous flux of a 50 (W) lamp is 4000 (lm), that of a 100 (W) lamp is 8000 (lm), and that of a 150 (W) lamp is 12000 (lm). Arc length and power consumption of a lamp has a correlation, while arc length and F number has a correlation.

In a projection type display device, in order that the screen size of the projected image is 40 inches or more and so that visual angles and image lightness within a practical range can be obtained, the luminous flux needs to be 300 to 400 (lm) or more. Accordingly, if the light use rate of the lamp is around 4%, then a 100 (W) or more lamp should be used. The fact shows that a lamp with arc length 3 (mm) may be used in order only to obtain a satisfactory display contrast (CR), but that a 100 (w) or more metal halide lamp is necessitated for to a sufficient brightness of the projected image.

Also, a sufficient display brightness could not be obtained also when the panel's effective display size is too small. If the arc length is 5 (mm) and the effective F value of illuminating light is 7, then the panel's effective display size needs to be around 3.5 inches. If the arc length is 5 (mm) or so and the panel's effective display size is 2-odd inches, then the effective F value of illuminating light is slightly less than 5. In this case, the display brightness falls within the practical range, but good display contrast (CR) cannot be expected.

As a result of various experiments and investigations, if the effective F value of illuminating light is 5 or more, a display brightness in the practical range can be obtained. However, it was concluded that, in order to obtain successful display brightness and display contrast, and proper power consumption and lamp's life, the lamp should have an effective F value (effective F value of projected light) of around 7, an arc length of around 5 (mm), and around 150 W.

When the F number of the projection lens is decreased, the screen luminous flux reaching the screen is raised. The lamp's power consumption must also be increased proportionally. Also, from a viewpoint of prolonging the lamp's life, when the lamp's power consumption is increased, a longer arc is involved with the arc luminance constant. Naturally, the display contrast (CR) would deteriorate with a decreasing F number. Conversely, the display contrast would rise with an increasing F number of the projection optical system, but the screen luminous flux would be decreased.

As a result of various experiments and investigations, the lamp should be not more than 250 (W) from the viewpoint of power consumption. Besides, a 100 (w) or more metal halide lamp should be used to obtain the screen brightness. More preferably, the arc length should be within a range of 3 (mm) to 6 (mm), taking into consideration the screen brightness and the display contrast.

The diagonal length of the panel's effective display area should be 4.5 inches or less in terms of system size. It also should be 2 inches or more in terms of light use efficiency. Among others, it should be within a range of 3 inches to 4 inches for sufficient light converging efficiency and compact size.

The F number of the projection lens and, in a wide sense, the F number of the projection optical system should be 5 or more for good contrast (CR). It also should be 9 or less for sufficient screen brightness. Further, the F number should be within a range of 6 to 8 in view of the aforementioned arc length of the lamp.

The light use rate would deteriorate unless the divergence angle of beams (F number) of illuminating light is generally coincident with the light-converging angle (F number) of the projection lens. This is because restrictions would be posed by one of them having the larger F number. In the projection type display device of the present embodiment, the F number of illuminating light and that of the projection lens are made coincident with each other.

In the above description, for example when the arc length of the lamp is 5 mm, it implies that the arc length is "substantially 5 mm." The substantially 5 mm implies that even with an arc length of 8 mm, if the projection lens is able to converge only the light that is emitted from 5 mm around the center of the arc out of the light emitted from the arc, then the arc length is substantially 5 mm. Similarly, the F number means the effective F number. Even though the physical F number is 4, the F number is more than 4 if the light passes only through around the center of the iris of the projection lens.

Figure 68:
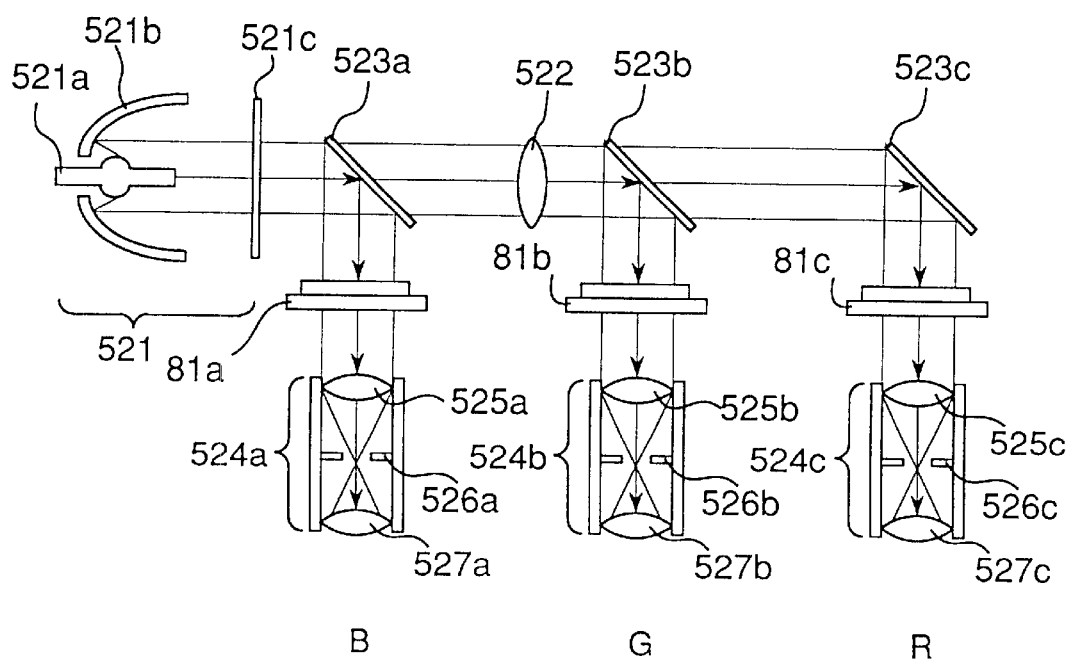
FIG. 68 is a sectional view of an optical system of a projection type display device.

In the projection type display device of the present embodiment, the display device 81 of the present embodiment is used as a light valve. FIG. 68 is an arrangement view of the projection type display device of the present embodiment, where components unnecessary for description are omitted. Referring to FIG. 68, numeral 521 denotes a light source 521, in which a concave mirror 521b and a metal halide lamp or a xenon lamp as a light generating means 521a are arranged inside. Also, a UVIR cut filter 521c is arranged in front of the concave mirror 521b. The UVIR cut filter 521c reflects IR and UV rays and transmits visible light.

Numeral 523a denotes a BDM that reflects B light, 523b denotes a GDM, and 523c denotes an RDM. It is noted that the arrangement of the BDM 523a to the RDM 523c is not limited to the order of the figure. Also, the last RDM 523c may of course be replaced with a full reflection mirror. Further, a relay lens 522 is provided to correct the difference between an optical path that leads from the light source 521 to a display device 81c for modulation of R light, and another optical path that leads to a display device 81a for modulation of B light. In the projection type display device of the present embodiment, the display device 81 of the present embodiment is used principally as a light valve. The aforementioned display device is used as a light valve.

In addition, when the polymer dispersion liquid crystals are used for the optical modulation layer 87, the optical modulation layer for modulation of R light is arranged to be larger in the size of droplets of liquid crystals or thicker in the film thickness of liquid crystals, than the other optical modulation layers for modulation of G and B light. This is because the longer the wavelength of light is, the more the scattering characteristic deteriorates and the more the contrast lowers. The size of the droplets of liquid crystals can be attained by controlling ultraviolet light involved in the polymerization process, or by changing the materials used, or by adopting the size varied structure as described in FIG. 55 and the like. The film thickness of the liquid crystal layer 87 can be adjusted by varying the diameter of beads of the liquid crystal layer or the like. Numeral denotes a projection lens 524, 525. and 527 denote lenses, and 526 denotes an opening as an aperture. It is noted that the aperture 526 is illustrated for explanation of the operation of the projection type display device. The aperture 526 defines the converging angle of the projection lens 524, and therefore can be regarded as being contained in the function of the projection lens. That is, it is considered that a larger value of F of the projection lens 524 is accompanied by a small opening diameter of the aperture 526.

The larger the value of F of the projection lens, the better the result, for the purpose of obtaining a high contrast display. However, increased F values would cause the brightness, of white display, i.e., the screen brightness to lower. Conversely, decreased F values would cause the screen brightness to rise, so that high-brightness display can be enabled, while the display contrast lowers. When a metal halide lamp with arc length 5 mm is used, the F value should be within a range of 5 to 9. Preferably, the F value is around 7. F values of around 7 allow successful display contrast as well as sufficient display brightness to be obtained.

Now the operation of the projection type display device of the present embodiment is explained. Since the modulation systems for R, G, and B light are almost similar to one another in operation, a modulation system for B light is taken as an example for the following description.

White light is illuminated from the light source 521, and B light components of the white light are reflected by the BDM 523a. The B light is incident on the display device 81a. The display device 81a controls the scattered and transmitted state of the incident light by signals applied to the pixel electrodes 151 as shown in FIGS. 24A and 24B, thus modulating the light.

Scattered light is shielded by an aperture 526a, while collimated light or light within a specified angle is passed through the aperture 526a. The modulated light is magnified and projected on the screen (not shown) by a projection lens 524a. In this way, the B light components of the image are displayed on the screen. Similarly, a display device 81b modulates the light of G light components, while a display device 81c modulates the light of R light components, so that a color image is displayed on the screen.

Here described is the driver and drive method of the projection type display device in which three sheets of light valves for modulating red, green, and blue light are used. FIG. 16B is an explanatory view of the driver in an embodiment of the projection type display device of the present invention. In FIG. 16B, $R_1$, $R_2$, and transistor Q make up a phase dividing circuit 142 for producing video signals of positive and negative polarities inputted to the base. Numeral 143 denotes an output switching circuit for outputting to the display device 81 an ac video signal which is inverted in polarity every horizontal scanning period (H) or every one vertical scanning period (1V).

The video signal is gain-controlled to a specified value, and thereafter classified into signals corresponding to R, G, and B light. These divided video signals are assumed to be a video signal (R), a video signal (G), and a video signal (B). The video signals (R), (G), and (B) are each inputted to a phase dividing circuit, by which circuit two video signals of positive and negative polarities are produced. Subsequently, these two video signals are inputted to their corresponding output switching circuits 143a, 143b, and 143c, respectively, where each output switching circuit changes over the polarity of the output signal in a 1H or 1V cycle. Next, the video signal from each output switching circuit 143 is inputted to a source driver 33 as shown in FIG. 11 and the like. A drive control circuit 141 synchronizes the source driver 33 and the gate driver 38 with each other, so that an image is displayed on the LCD panel 81.

Next described is the luminous efficacy of the human eye. The human eye has the highest sensitivity around a wavelength of 550 nm. Out of three primary colors of light, the human eye exhibits the highest sensitivity for green, the second for red, and the least for blue. A luminance signal proportional to these sensitivities can be obtained by mixing up 30% red, 60% green, and 10% blue. It follows accordingly that the colors should be mixed at a ratio of R:G:B= 3:6:1 in order to obtain the white color in a television video. Also, as described before, liquid crystals need to be driven in alternating current. This ac drive is implemented by applying alternately a signal of positive polarity and a signal of negative polarity to a voltage (hereinafter, referred to as common voltage) applied to the counter electrode of the display panel. In the present embodiment, a state in which a signal of positive polarity is applied to the display panel so that light with an intensity of luminous efficacy n is modulated is represented as +n, and a state in which a signal of negative polarity is applied so that a light with an intensity of luminous efficacy n is modulated is represented as −n.

For example, if light of R:G:B=3:6:1 is illuminated to the display panel, if a signal of positive polarity is applied to specified pixels of display panels (81c, 81a) for R and B, and if a signal of negative polarity is applied to pixels of a display panel 81b for G to be overlaid on the foregoing pixels, then the state is represented as +3·−6·+1. It is noted that the ratio of R:G:B=3:6:1 is for NTSC television videos, and the ratio differs in the projection type display device depending on the lamp of the light source, the spectral characteristics of the dichroic mirror, and the like. FIG. 16B has a representation of +3·−6·+1. This shows that, with attention paid to one given pixel of each of the display panels overlapped at the same position of the screen, light with the ratio of R:G:B=3:6:1 is applied to the aforementioned pixels, where a signal of positive polarity is applied to the pixels of the display panels for R and B and a signal of negative polarity is applied to the pixel of the display panel for G 81b. One field later, the above pixels are put into a signal-applied state that can be represented as −3·+6·−1.

In usual cases, even if the same signal is applied to the LCD panels 81, there occurs a slight difference in the voltages held by pixels between even fields and odd fields. This is due to the fact that the ON current and OFF current of the TFTs 86 differ depending on the image signal, or that the holding characteristic differs between positive and negative electric fields such as of the insulating films 372. These differences cause the phenomenon of flicker to appear.

However, in the projection type display device of the present embodiment, the flicker can be prevented from being discerned visually, by arranging the signal for G light modulation to be reverse in polarity to the signals for R and B light modulation as shown in FIG. 16B. The reason that the signal for G light modulation has been arranged to be reverse in polarity to the others is that the intensities of light R:G:B=3:6:1 can be modified to (R+B):G=(3+1):6=4:6 in view of the polarity of signals and the human vision, whereby the intensities are balanced at a ratio of nearly 4:6 (ideally 5:5).

Based on the above grounds, the projection type display device of the present embodiment can present a successful image display without flickers discerned visually. In addition, the above technical concept can be applied not only to the projection type display device in which three display panels are used, but also to the projection type display device using a display panel comprising one display panel as shown in FIGS. 55 and 57, with more or less modifications added. For example, voltages of positive polarity are applied to pixels of R and B while those of negative polarity are applied to pixels of G, and the polarity of voltages applied is inverted every frame.

Figure 69:
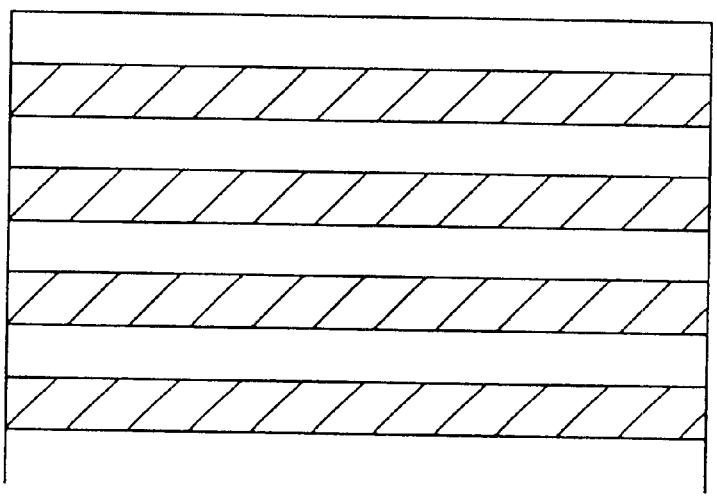
FIG. 69 is a diagram of a display state.

When the driving method shown in FIG. 17 or 18 is used, a display state as shown in FIG. 69 may happen. In this state, white lines (highly bright lines) and black lines (low bright lines) are displayed every one or two lines, and the white lines move slowly in a downward direction. Though the terms of white lines and black lines are used, a difference in brightness between them is very small. However, they are adjacent to each other, the difference attracts attention.

Figure 70:
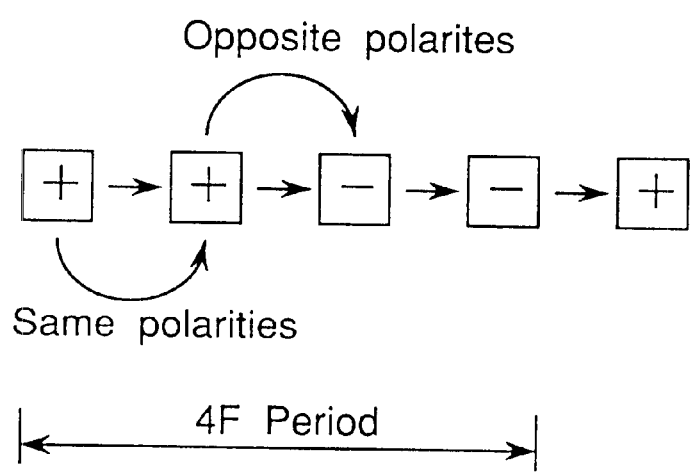
FIG. 70 is a diagram for explaining an example of driving method.
Figure 71:
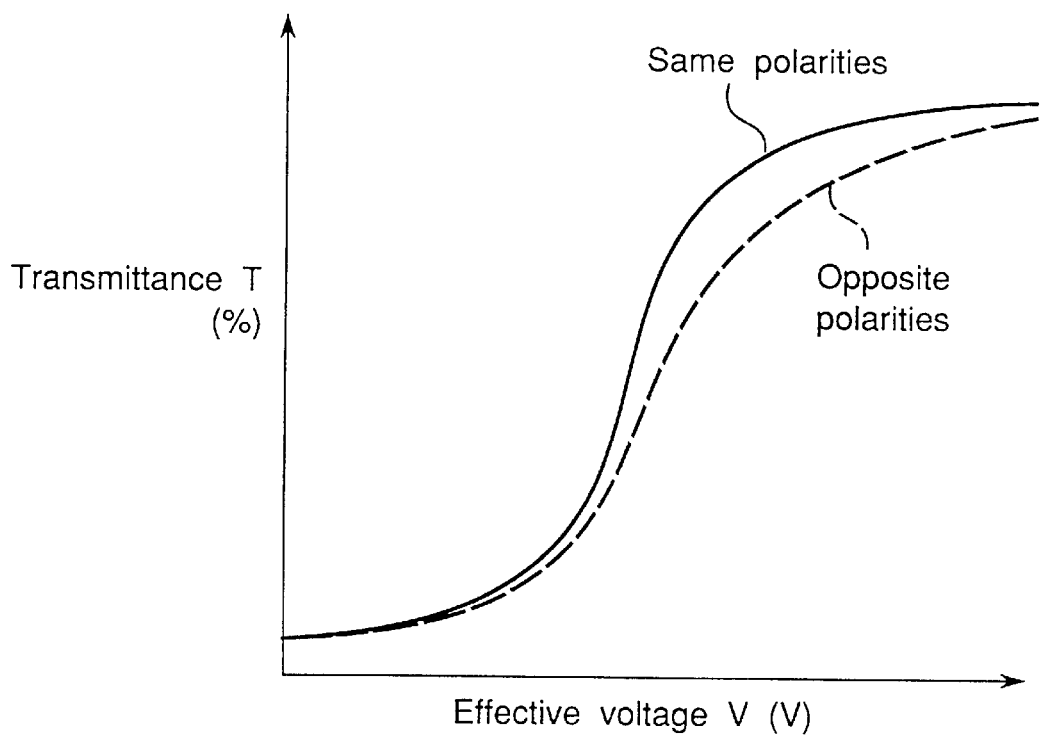
FIG. 71 is a graph of V-T characteristic.

A cause of this phenomenon is considered to be ascribed to difference in charges stored at pixels 101. For example, FIG. 18, in the pixel 101 in a first line has brightness of $+a_1$ in 1F (first frame), $+a_1$ in 2F, $-c_1$ in 3F, $-c_1$ in 4F, $+e_1$ in 5F and so on. As shown in FIG. 70, if only the polarity is noted, it changes as "+"→"+"→"−"→"−"→"+". Charges are stored in the pixel by a thin film transistor 86. The polarity in 1F of "+" is the same as that in 2F, while the polarity in 2F of "+" is changed to the opposite one in 3F of "−". If the polarity is the same, an amount of charges to be added is small. Therefore, a driving ability of the thin film transistor 86 may be small. However, when the polarity is changed, charges of the opposite polarity have to be driven. Therefore, a large driving ability is needed for the thin film transistor 86. This can be explained by using the voltage(V)-to-transmittance(T) curve of the liquid crystal layer 87 shown in FIG. 71, where a solid curve and a dashed curve correspond to the same polarity and opposite polarity, respectively. That is, even if the same effective voltage (V) is applied, the transmittance would change for the two cases, and this would result in the white and black lines shown in FIG. 69. Off course, if a ratio of holding charges in the pixel is high and the driving ability of the pixel is high, no phenomenon as shown in FIG. 69 will not occur. However, there is a requirement to decrease the size of thin film transistors in order to increase aperture ratio.

Figure 72:
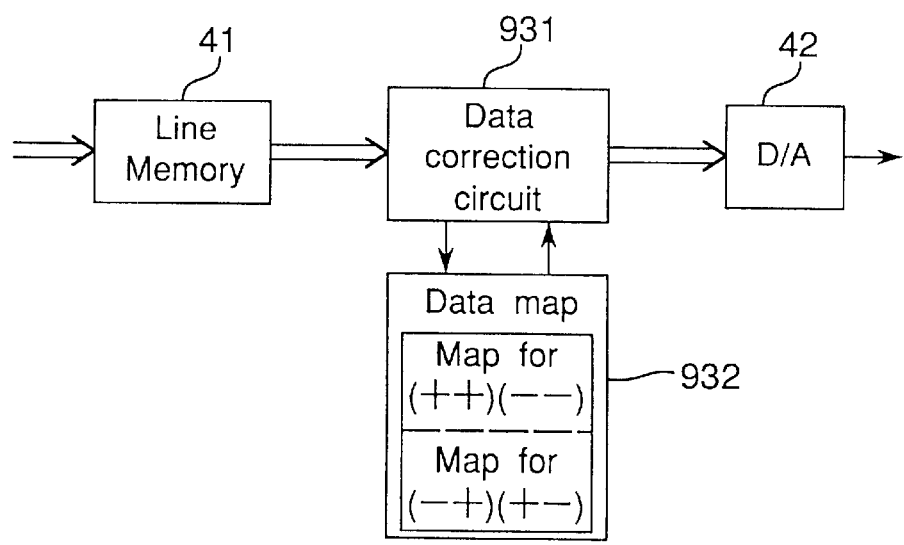
FIG. 72 is a diagram for explaining an example of a driving method.

Then, in the embodiment, a data correction circuit 931 connected to a data map memory 932 is added as shown in FIG. 72. For example, the circuit 931 is added in the display line selection circuit 931 shown in FIG. 3 between the memory 41 and the digital-to-analog converter 42. It may also be arranged after the frame memory shown in FIG. 11.

The data map memory 932 is a ROM storing the V-T curves as a map. The data stored in the memory 932 is stored beforehand according to experimental data. The memory 932 has regions of (++) (−−) map and (−+) (+−) map. When data map memory 932 receives a data in correspondence to the transmittance T from the data correction circuit 931, the (++) (−−) map region sends an effective voltage in correspondence to the transmittance of the solid curve to the data correction circuit 931 when the polarity is kept the same. On the other hand, the (−+)(+−) map region sends an effective voltage in correspondence to the transmittance of the dashed curve to the data correction circuit 931 when the polarity is changed. As mentioned above, the transmittance or voltage data corrected by the data correction circuit 931 is next converted to an analog signal by the D/A converter 42 to be output to the source signal processing circuit 32.

For an apparatus using a plurality of liquid crystal display panels, the phenomenon shown in FIG. 69 can be overcome more easily. As explained already with reference to FIG. 16B, at least one of the panels is arranged to set the voltages applied to the pixels to have an opposite polarity than those of the others. Especially, it is preferable for a panel for green light to provide the voltages of an opposite polarity than those of the panels of red and blue lights. This is already explained with reference to FIG. 16B.

Figure 73A:
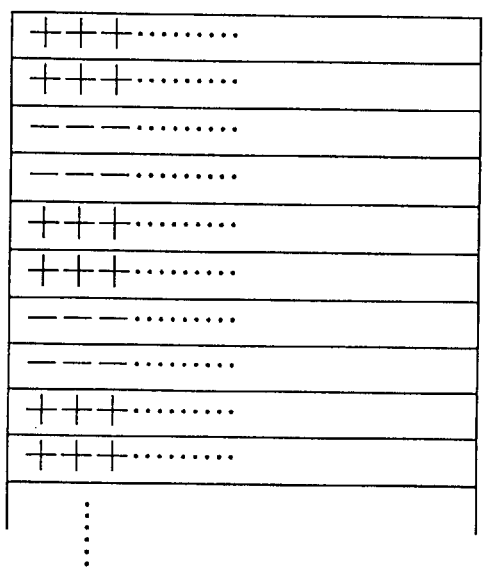
FIG. 73A is a diagram for explaining an example of a driving method on panel 1.
Figure 73B:
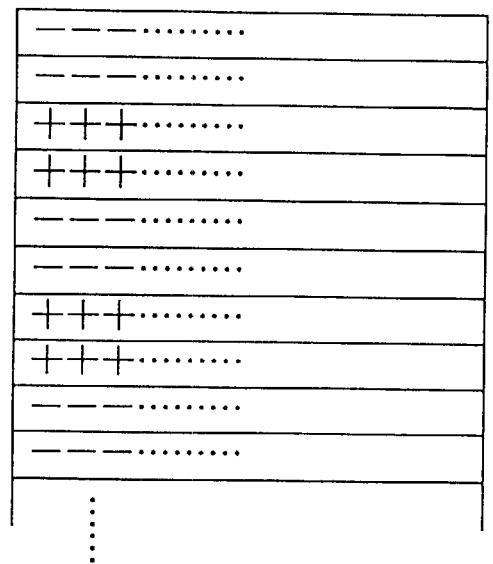
FIG. 73B is another diagram for explaining an example of driving method on panel 2.

The voltage is applied, for example, as shown in FIGS. 73A and 73B. For a first panel, voltages of the same polarities are applied every two lines, as shown in FIG. 73A, while for a second panel, voltages of the opposite polarities are applied every two lines.

Figure 74A:
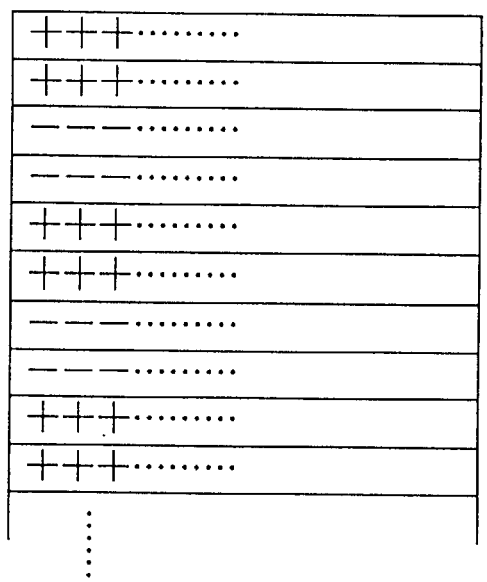
FIG. 74A is a diagram for explaining an example of a driving method on panel 1.
Figure 74B:
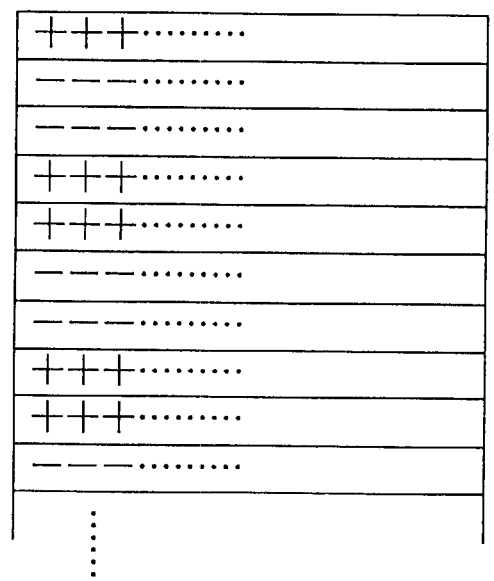
FIG. 74B is another diagram for explaining an example of driving method on panel 2.

A different method shown in FIGS. 74A and 74B are preferable for some cases. In FIG. 74A, in a first panel, the voltages of polarities are changed for every two lines similarly to FIG. 73A ("++--++--++ . . . "), while in a second panel, the polarities are shifted by one line ("+--++--++- . . . "). By driving the panels as shown in FIGS. 74A and 74B, the white lines and the black ones in FIG. 69 are overlapped in a screen to cancel each other. Off course, in FIGS. 73A and 73B, lines of the first panel may be shifted by one line from those of the second one. If the circuit shown in FIG. 72 is incorporated, the methods shown in FIGS. 73A, 73B and 74A, 74B are not needed. However, if the circuit shown in FIG. 72 is combined with the methods shown in FIGS. 73A, 73B and 74A, 74B, better display quality can be realized.

In the projection type display device of the present embodiment, as described above, the image signal display method of the present embodiment as described by using FIG. 12 is applied and the phase of the video signal applied to one LCD panel 81 out of three LCD panels 81 is inverted as shown in FIG. 16B. Accordingly, there occurs no flicker so that good display can be accomplished.

Hereinbelow, other projection type display devices of the present embodiment are described, where differences from the first embodiment are primarily explained. Therefore, the descriptions on the LCD panel, the driver, and the optical system as described in FIG. 68 are applied, as appropriate, to the other projection type display devices of the present embodiment.

Figure 75:
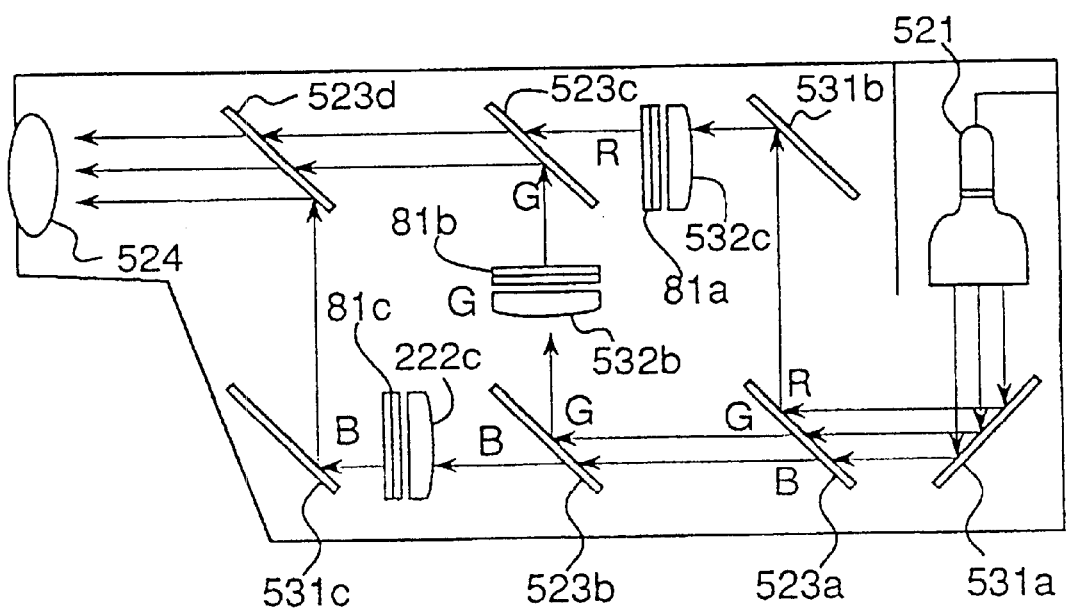
FIG. 75 is a sectional view of a projection type display device.

Whereas FIG. 68 shows a system in which three projection lenses 524 are used to magnify and project an image, one projection lens is used for magnification and projection in some systems. Such an arrangement is shown in FIG. 75. In this case, for simpler description, it is assumed that 81b denotes a display panel 81b for displaying an image of G light, 81c denotes a display panel for displaying an image of R light, and 81a denotes a display panel for displaying an image of B light. Accordingly, as to wavelengths that are transmitted and reflected by each dichroic mirror 531, a dichroic mirror 523a reflects R light and transmits G and B light. A dichroic mirror 523b reflects G light and transmits R light. A dichroic mirror 523c transmits R light and reflects G light. Further, a dichroic mirror 523d reflects B light and transmits G and R light.

Light radiated from a metal halide lamp (not shown) is reflected by a full reflection mirror 531a so as to be changed in its traveling direction. The light is separated into optical paths of the three primary colors, R, G, and B by the dichroic mirrors 523a, 523b, where R light, G light, and B light are incident on a field lens 532c, a field lens 532b, and a field lens 532a, respectively. Each field lens 532 converges its corresponding light. The display panels 81 make liquid crystals change their orientation in correspondence to their corresponding image signal, thus modulating light. The R, G, and B light modulated in this way are synthesized by the dichroic mirrors 523c, 523d, and magnified and projected on the screen (not shown) by the projection lens 524.

Now an embodiment of the projection type display device of the present invention in which the reflection type display device (display panel) 81 of the present invention is used as a light valve is described with reference to FIG. 76. A light source 521 illuminates light containing three primary colors of red (R), green (G), and blue (B). A concave mirror 521b, as described before, is made of glass and by depositing at its reflection surface a multilayer film that reflects visible light and transmits infrared light. Part of the visible light contained in the light radiated from a lamp 521a is reflected by the reflection surface of the concave mirror 521b. Reflected light outgoing from the concave mirror 521b goes out with its infrared and ultraviolet light removed by a filter 521c.

The projection lens 524 is composed of a first lens group 524b on the LCD panel side and a second lens group 524a on the screen side. A plane mirror 531 is arranged between the first lens group 524b and the second lens group 524a. Scattered light outgoing from pixels located in the center of the screen of the display panels 81 is transmitted by the first lens group 524b, and thereafter, about a half of the light is incident on the plane mirror 531 while the remaining is incident on the second lens group 524a without being incident on the plane mirror 531. The normal to the plane mirror 531 is tilted 45⁰ with respect to the optical axis of the projection lens 524. Light from the light source 521 is reflected by the plane mirror 531, transmitted by the first lens group 524b, and incident on the display panels 81.

The reflected light from the display panels 81 is transmitted by the first lens group 524b and the second lens group 524a, in this order, reaching a screen 542. It is arranged that the light that goes out of the center of the aperture of the projection lenses 524 and directed to the display panels 81 will be incident generally perpendicularly on the liquid crystal layer 87, hence a telecentric system.

In addition, for simpler description, it is assumed that 81a denotes a display panel for modulating R light, 81c denotes a display panel for modulating B light, and 81b denotes a display panel for modulating G light.

The dichroic mirrors 523 serve for both the color synthesis system and the color separation system. The bandwidth of the UVIR cut filter 521c is 430 nm to 690 nm in mesial magnitude. Hereinafter, the bandwidth of light will be represented in mesial magnitude. The dichroic mirror 523a reflects R light and transmits G and B light. G light is reflected by the dichroic mirror 523b, incident on the display panel 81b. The bandwidth of R light is assumed to be 600 nm to 690 nm, and that of G light is 510 to 570 nm. Also, the dichroic mirror 523b transmits B light. B light is incident on the display panel 81c. The bandwidth of incident B light is 430 nm to 490 nm. The display panels 81 each form an optical image as a change in scattering state in correspondence to their respective image signals. The optical images formed by the display panels 81 are color-synthesized by the dichroic mirrors 523, incident on the projection lenses 524, and projected on the screen 542 under magnification.

As shown in FIG. 59, the display panel 81 has reflection electrodes 372 arranged in a matrix form, and modulates incident light by the voltage-applied state between the reflection electrodes 372 and an counter electrode 371b. The liquid crystal layer 87 on pixels having a voltage applied to the reflection electrodes 372 is brought into a transmitting state, while the pixels with no voltage applied is put into a scattering state. When the liquid crystal layer 87 is in a transmitting state, the light incident from the opposite substrate 161 is reflected by the reflection electrodes 372, outputted again from the opposite substrate 161.

Figure 76:
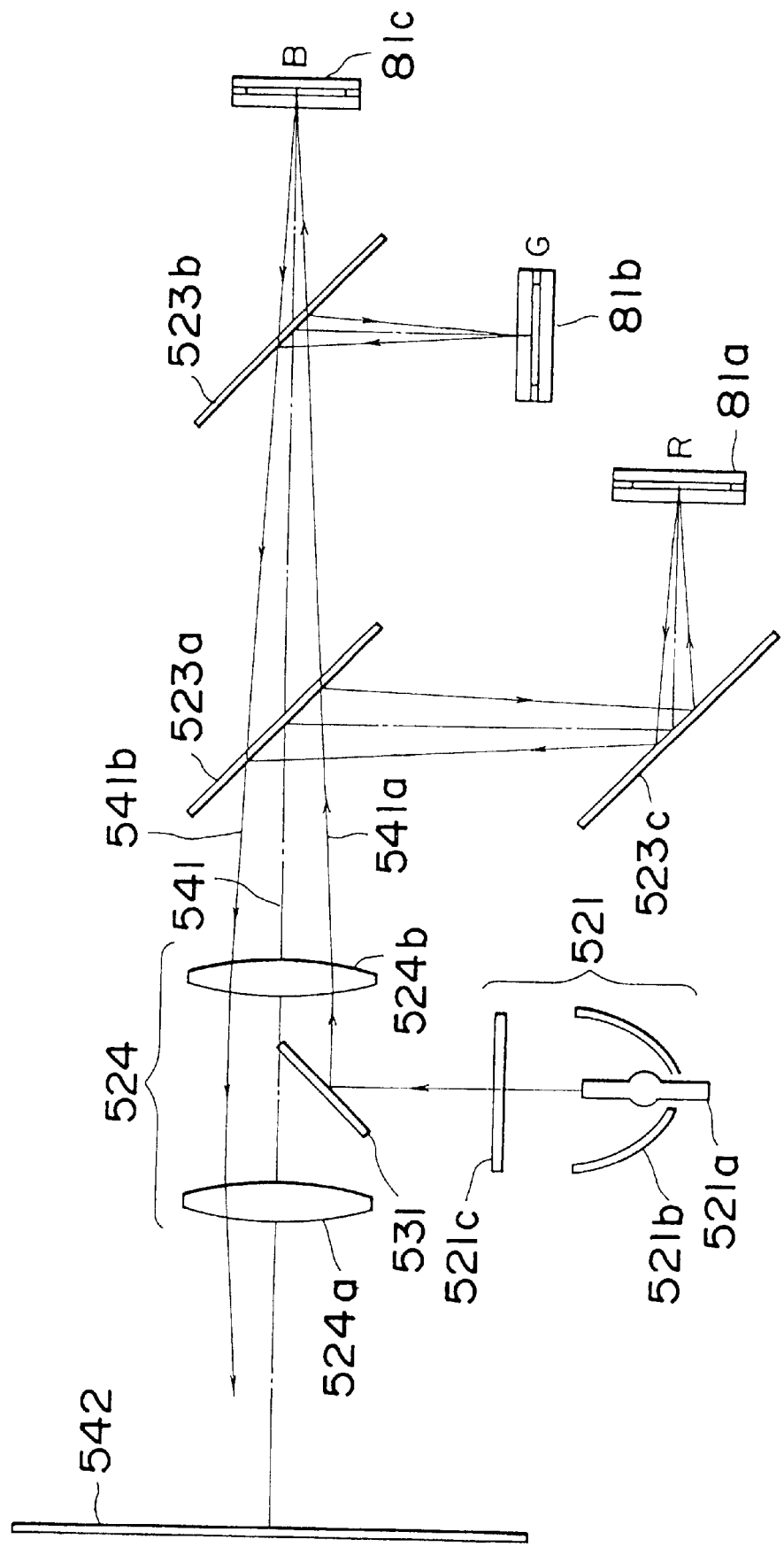
FIG. 76 is a sectional view of a projection type display device.
Figure 77:
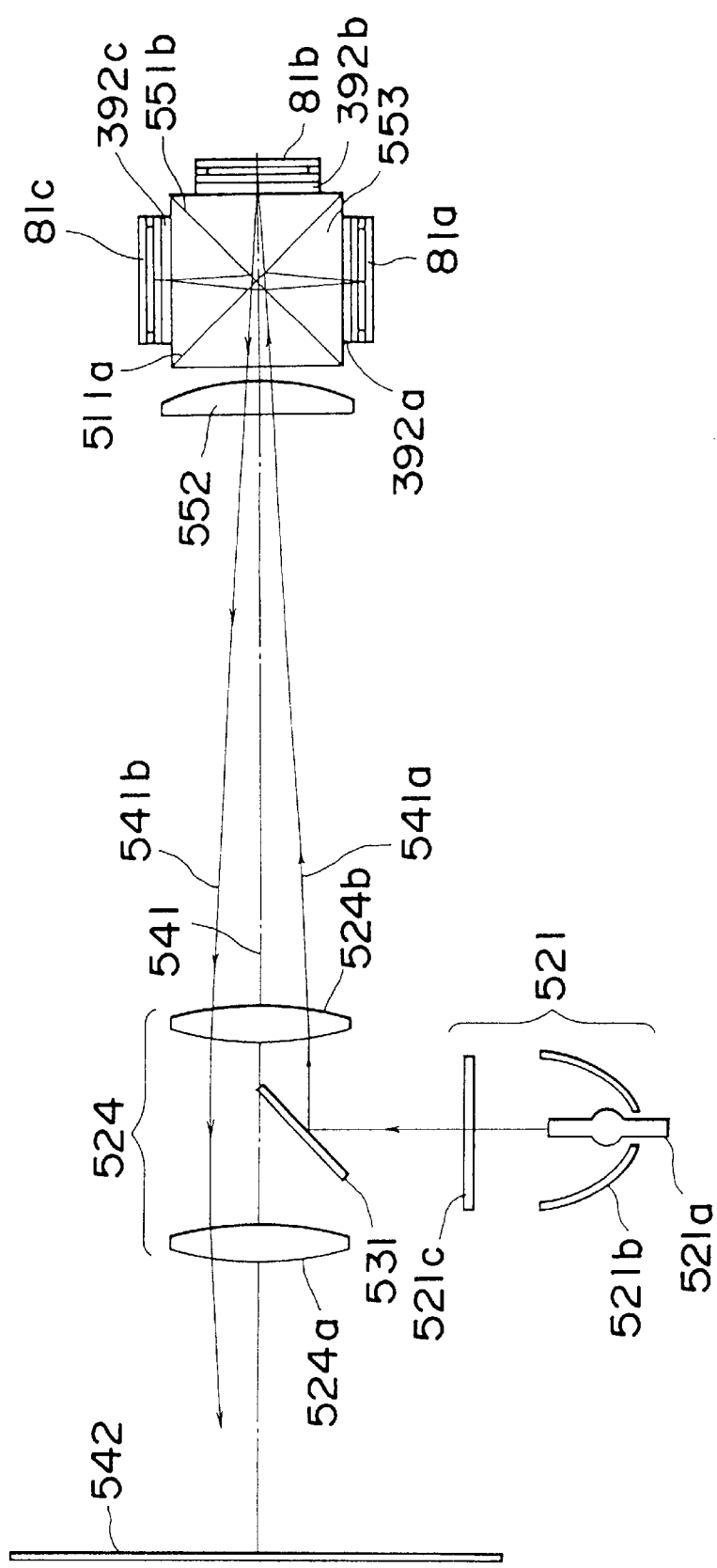
FIG. 77 is a sectional view of a projection type display device.

FIG. 76 is a device in which the dichroic mirrors 523 are used to perform color separation and color synthesis. Otherwise, a dichroic prism 553 may also be used to perform the color separation and color synthesis. An arrangement view of such a system is shown in FIG. 77. The dichroic prism 553 has two light-separating planes 551, where white light is separated into the three primary colors of R, G, and B by the light-separating planes 551. The display panels 81 are attached to the dichroic prism 553 each via an optically coupling layer 392. In addition, designated by 552 is an auxiliary lens 552.

Figure 78:
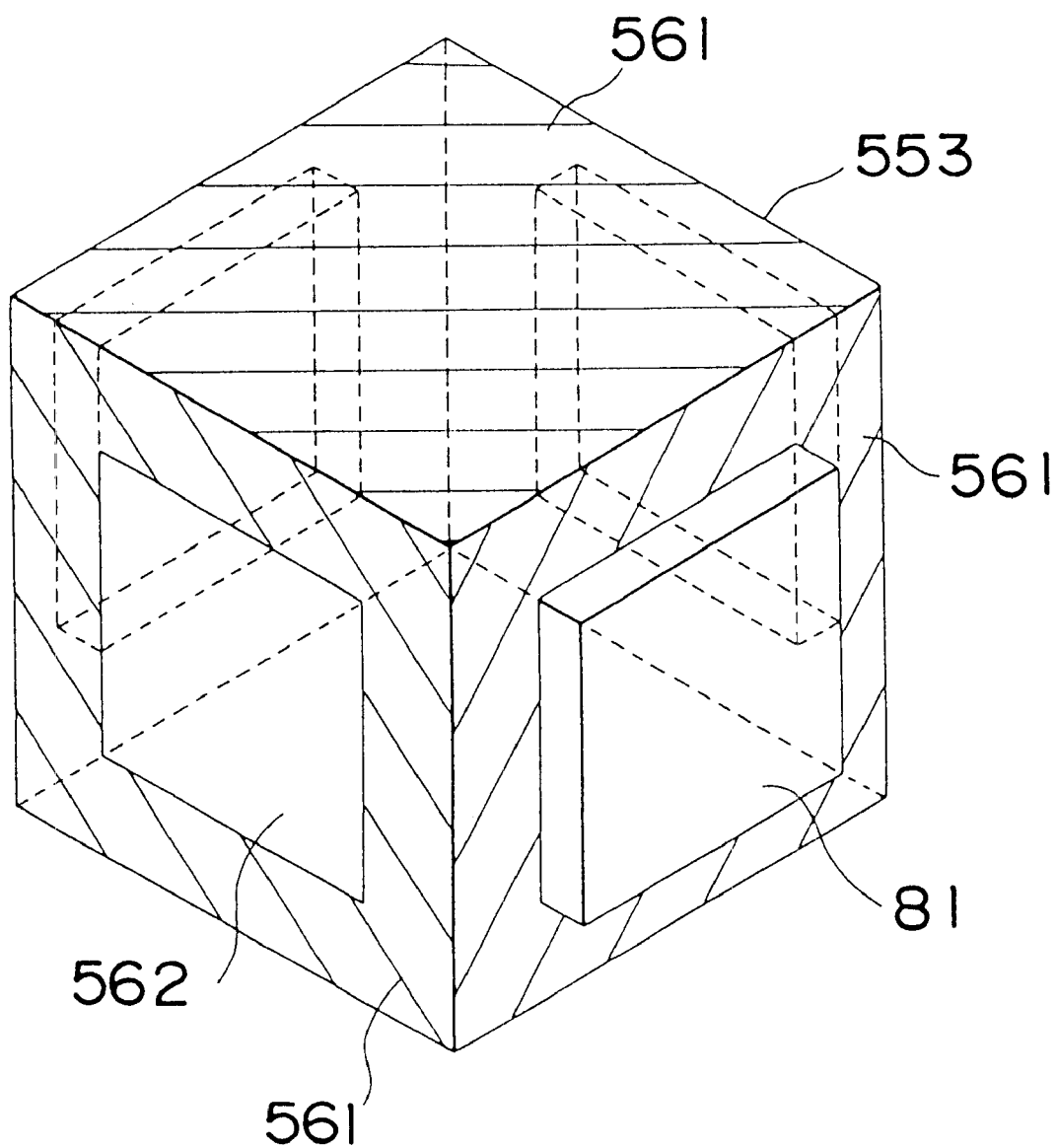
FIG. 78 is a perspective view of optical parts of a projection type display device.

The dichroic prism 553 is coated at its surface with a light-absorbing film (black paint) 561 as shown in FIG. 78. Its material is exemplified by those for light-shielding film 155 as shown in FIG. 27 or the like. The light-absorbing film 561 has a function of absorbing the light scattered by the display panels 81.

The display panels 81 are bonded to the dichroic prism 553, where the light-absorbing film 561 is coated at ineffective areas of the dichroic prism 553 (planes where light is not inputted or outputted). This arrangement functionally resembles the arrangement as shown in FIGS. 65A and 65B in which a transparent substrate 391 is optically coupled with the display panels 81 and a light-absorbing film is coated at ineffective areas of the transparent substrate 391. That is, the present arrangement can be regarded as a modification in which the transparent substrate 391 is replaced with the dichroic prism 553.

For example, centered on the display panel 81a, and assuming that the display panel 81a modulates R light, incident light 541a is incident on a light input/output plane 562 of the dichroic prism 5531 where R light is reflected by a light-separating plane 551b. The display panel 81a varies the degree of scattering of the optical modulation layer 87 in response to the magnitude of the voltage applied to the reflection electrodes 372. Out of the light, components of transmitted light are reflected by the light-separating plane 551b again, being outputted from the light input/output plane 562. Scattered light is mostly incident on the light-absorbing film 561 and thereby absorbed, and returned to the optical modulation layer 87 again, causing almost no secondary scattering.

As described above, it could be understood that, in FIG. 77, the dichroic prism 553 has a function of preventing the occurrence of secondary scattered light, as well as the function of color separation and color synthesis. The arrangement of the present embodiment as shown in FIG. 77 is simple in structure of the color separation and color synthesis system and small in size. Moreover, the arrangement has a function of preventing secondary scattering.

The above-described device is a projection type display device in which the display panel for forming an optical image as a change in the light scattered state is used as a light valve (optical modulation means). However, the technical concept of the present embodiment that P-polarized light and S-polarized light are converted by a polarizer and the bandwidth of light in the color separation and color synthesis system is narrowed whereby the hue of the projection type display device is improved is applicable also to other projection type display devices in which display panels for modulating random light are used.

Figure 79:
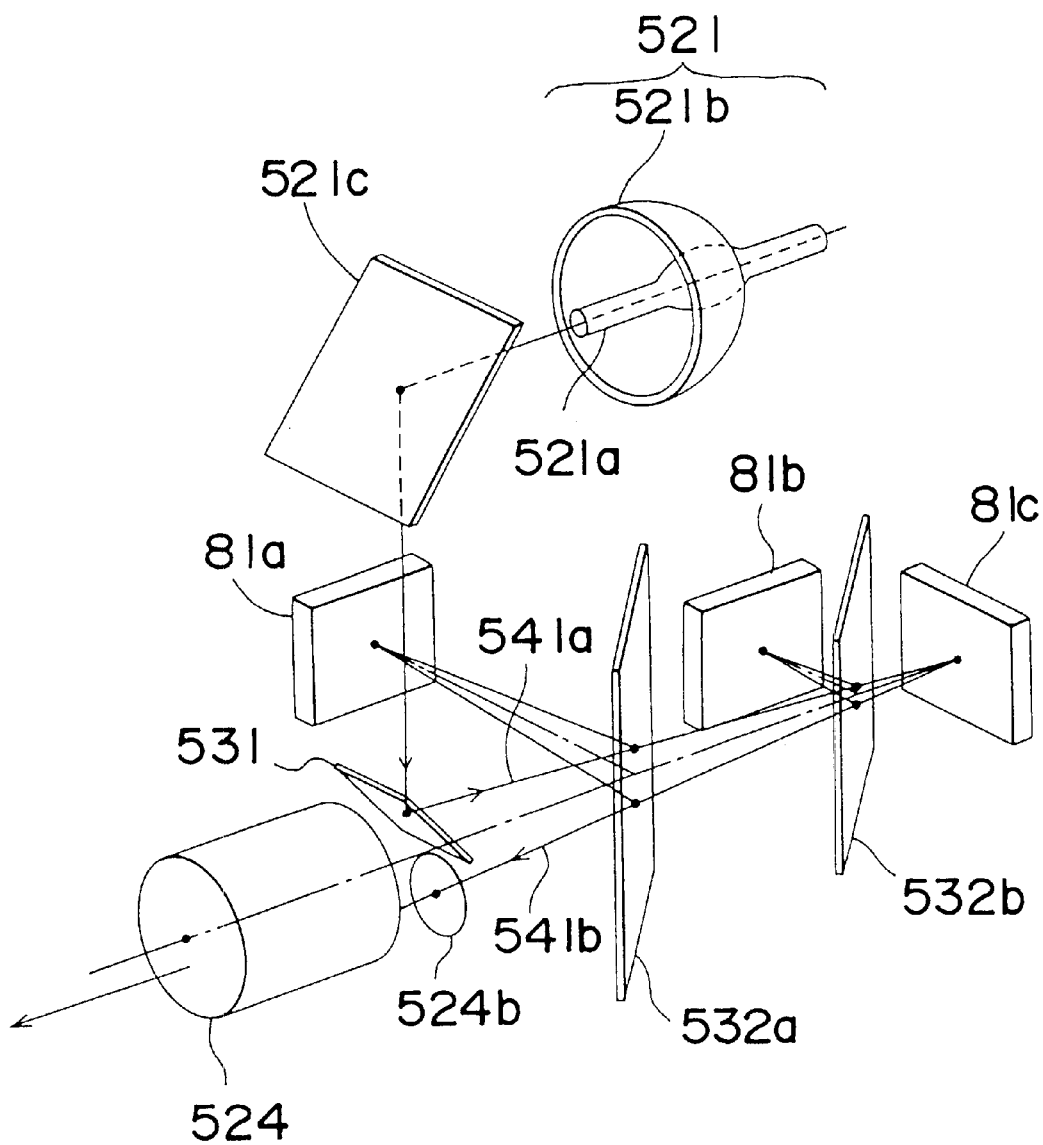
FIG. 79 is a perspective view of a projection type display device.

Although FIGS. 76 and 77 have been illustrated in two-dimensional fashion for an easier understanding, they should be constructed as shown in FIG. 79, more concretely. In FIG. 79, attention should be paid-to the direction in which dichroic mirrors 523 are inclined and the direction in which the plane mirror 531 is inclined. The dichroic mirrors 532 are formed generally by depositing a dielectric multilayer film on a transparent substrate, so that it transmits or reflects light of particular wavelength bands. This type of dichroic mirror 532 has a characteristic that the spectral performance shifts due to the dependence on the angle of incidence of rays of light. As a result, if an incident ray 541a is incident in such a state that the optical axis of the incident ray 541a and optical axis of an outgoing ray 541b are at different angles, it would be difficult to obtain a projected image of a desired color purity because the spectral characteristic for color separation and the spectral characteristic for color synthesis are different from each other.

In the arrangement as shown in FIG. 79, a plane containing both an optical axis 541a of illuminating light outputted from the light source 521 and an optical axis 541b of the projected light reflected by the display panels 81 is arranged perpendicular to a plane containing both the center normal to the display panels 81 and the center normal to the dichroic mirrors 532. Accordingly, the plane containing the optical axis 541a and the optical axis 541b forms an angle of 45° with respect to the color-separation and color-synthesis plane of the dichroic mirrors 532. Thus, both illuminating light and projected light can be made incident on the dichroic mirrors 532 at the same angle of 45°.

Figure 80A:
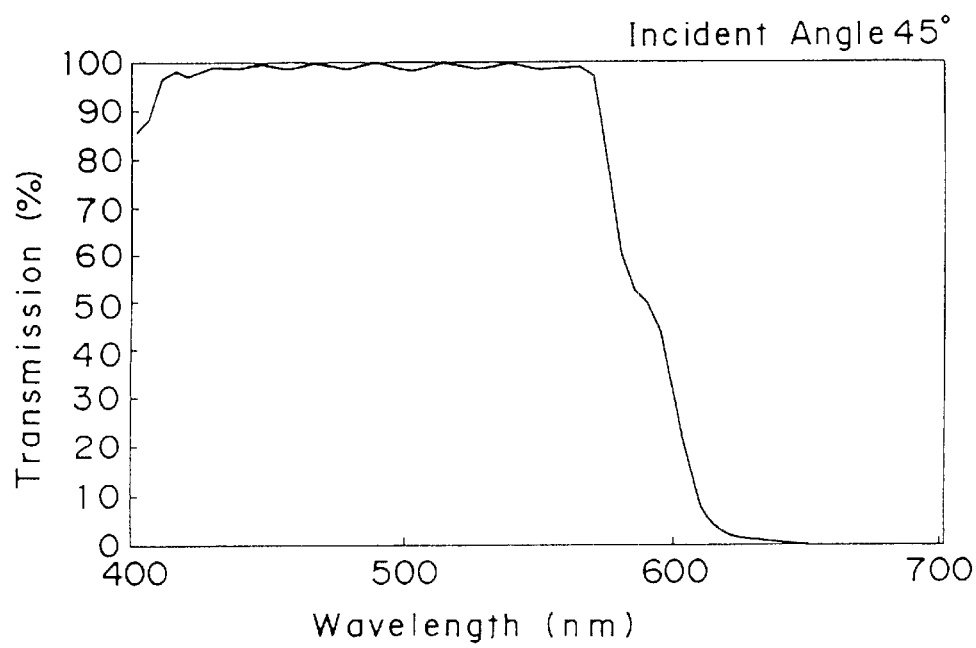
FIGS. 80A and 80B are graphs of spectral distribution of the reflection of a dichroic mirror of the projection type display device shown in FIG. 79.
Figure 80B:
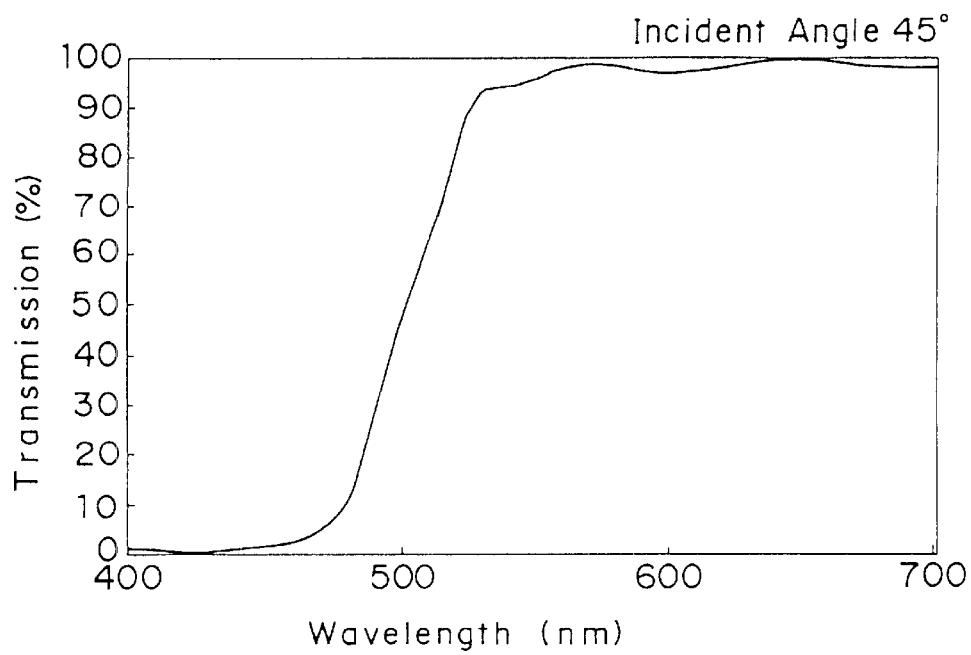

The spectral transmittance of dichroic mirrors 532a, 532b is shown in FIGS. 80A and 80B. FIG. 80A shows the spectral transmittance in a case where the angle of incidence of light to the dichroic mirror 532a is 45°, and where the dichroic mirror 532a is of the type that it reflects R light and transmits G and B light. Also, FIG. 80B shows the spectral transmittance in a case where the angle of incidence of light to the dichroic mirror 532b is 45°, and where the dichroic mirror 532b is of the type that it reflects B light and transmits G light.

According to the arrangement of the present embodiment, since the spectral performance for color separation and the spectral performance for color synthesis are coincident with each other, the spectral performance as shown in FIGS. 80A and 80B can be reflected on the projected image as it is.

Figure 81A:
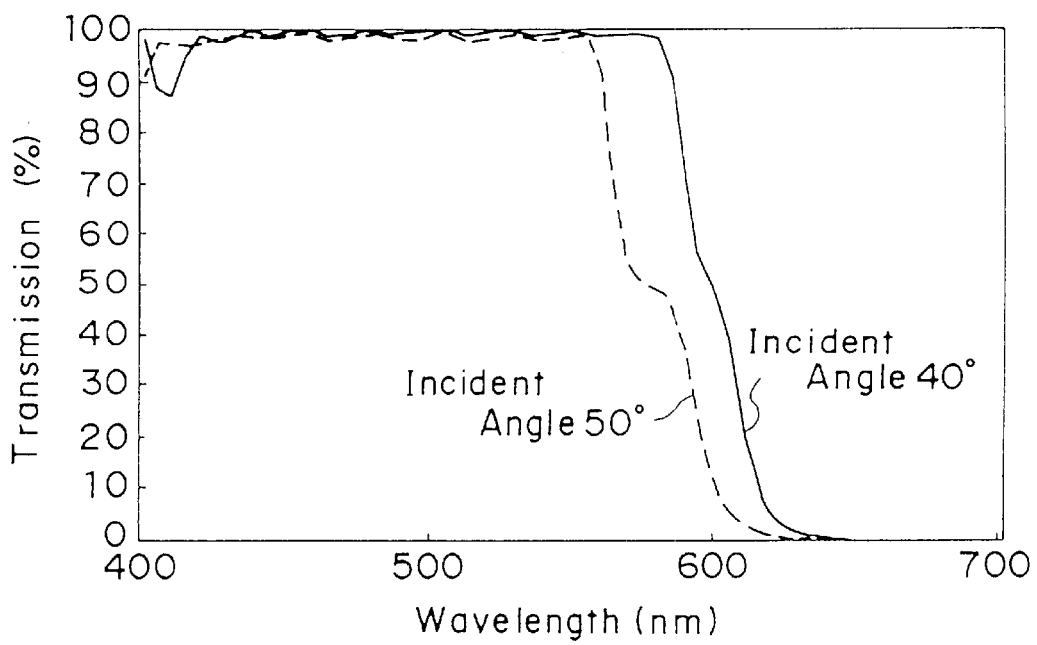
FIGS. 81A and 81B are graphs of spectral distribution of the reflection of a dichroic mirror of the projection type display device shown in FIG. 76.
Figure 81B:
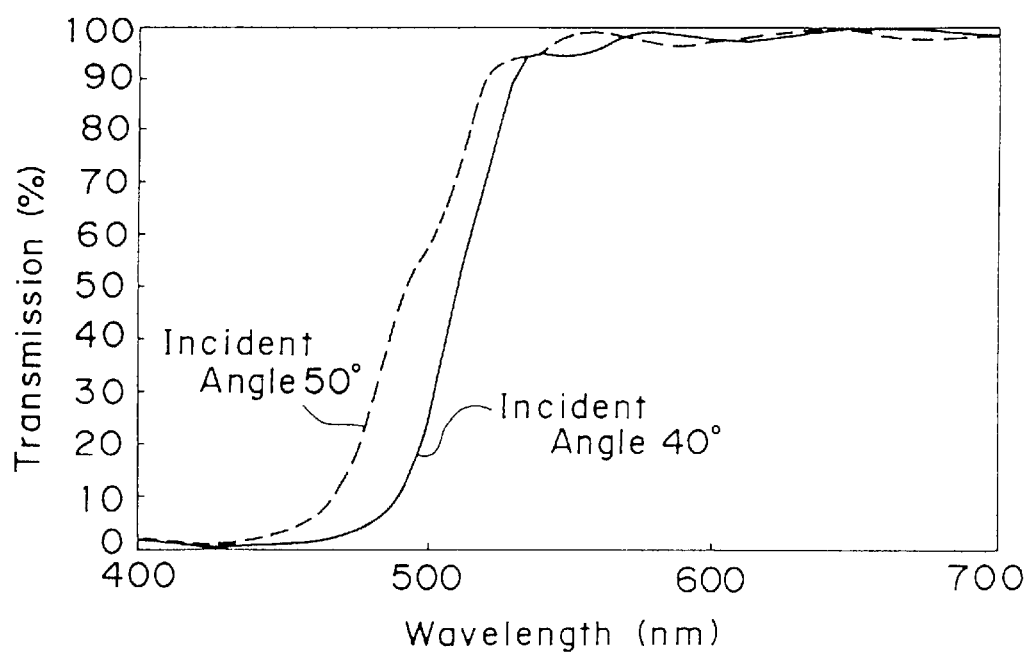

For comparison, a case where the arrangement is as shown in FIG. 76, which has been presented for the prior art example, is described. With an arrangement that the optical axis 541a of illuminating light is incident on the LCD panel 81 at an agree of, say, 5°, the optical axis 541a of the illuminating light and the optical axis 541b of the projected light form an angle of 10°, so that the angle of incidence of the illuminating light to the dichroic mirrors 523a, 523b is 40°, while the angle of incidence of the projected light to the dichroic mirrors 523a, 523b is 50°. The spectral transmittance with angle of incidence 40° and 50° is shown in FIGS. 81A and 81B. FIG. 81A charts the spectral transmittance of the dichroic mirror 523a, while FIG. 81B charts the spectral transmittance of the dichroic mirror 523b, where the solid lines in the figures represent the case of angle of incidence 40°, and the dotted lines represent the case of angle of incidence 50°. As can be seen from FIGS. 81A and 81B, the spectral performance of illuminating light and the spectral performance of projected light largely differ from each other as a result of wavelength shifts due to the dependence on the angle of incidence, so that it is difficult to obtain a desired color purity without lowering the light use efficiency.

Figure 82:
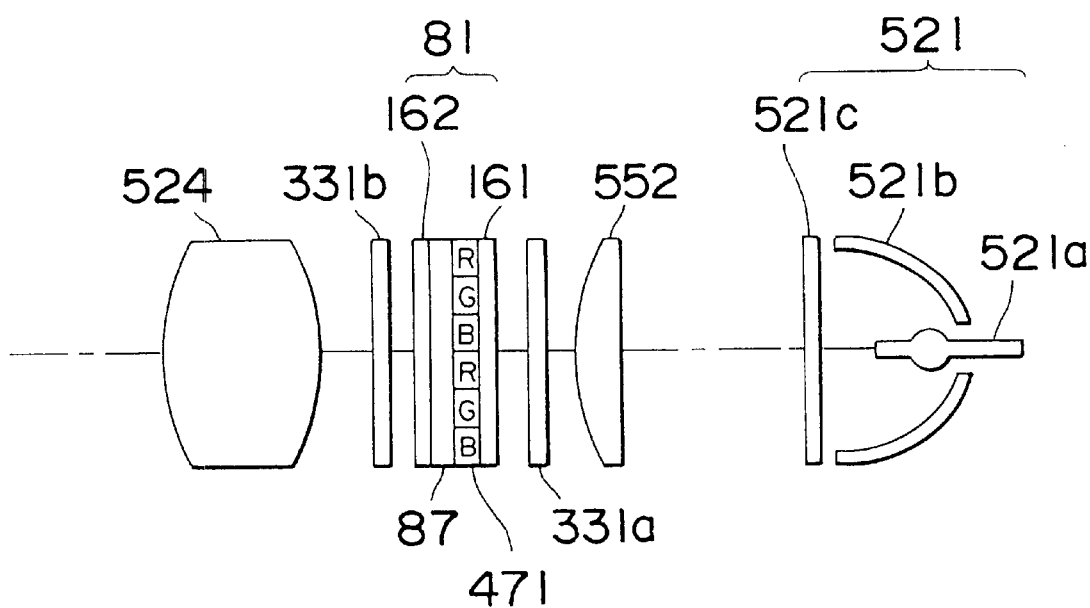
FIG. 82 is a schematic sectional view of a projection type display where a color image is displayed by one display panel.
Figure 83:
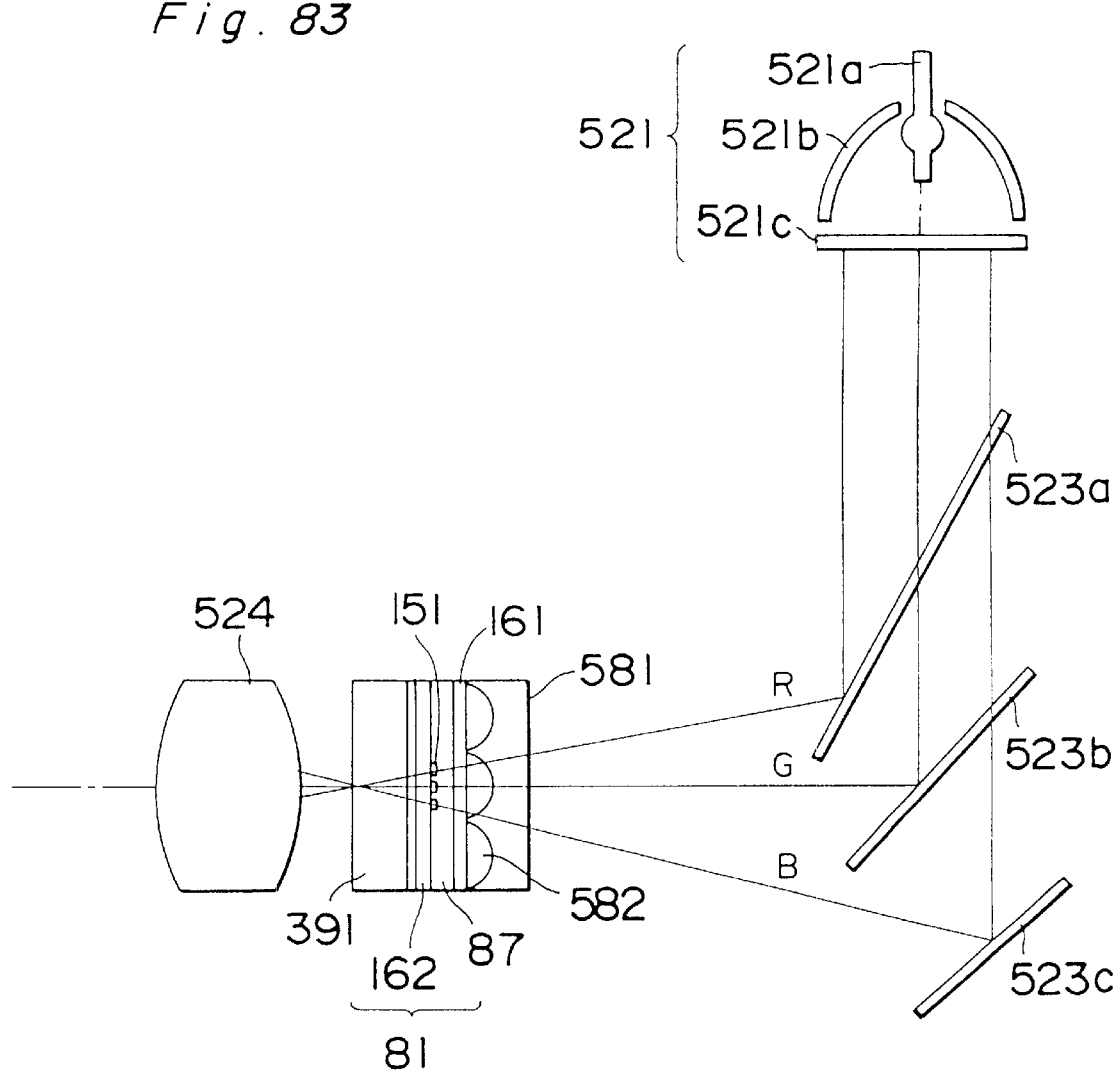
FIG. 83 is a schematic sectional view of a projection type display device where a color image is displayed by one display panel.

In order to implement color display with one LCD panel 81, the arrangement of FIG. 82 or 83 is adopted. In FIG. 82, a display panel 81 (display device) of the present embodiment comprising the color filters 471 as shown in FIGS. 55–58 is used as a light valve. When the polarizer 331 is used, it is arranged either on the incident side 331a or on the outgoing side 331b.

It is of course allowed that polarizers 331a, 331b are arranged on both incident and outgoing sides. When the both-side polarizers 331a, 331b are used, it is important to make the polarization axes of the polarizers 331a and 331b coincident with each other (see the arrangement of the polarizers 331a and 331b in FIG. 35A). In this case, light that has passed through the polarizer 331a becomes linearly polarized light. When the liquid crystal layer 87 is in a transparent state (light transmitting state), the linearly polarized light penetrates through the liquid crystal layer 87 while it keeps polarized. Therefore, no optical loss is involved at the outgoing-side polarizer 331b, so that intense outgoing light can be obtained. When the liquid crystal layer 87 is in a light scattering state, on the other hand, light incident on the liquid crystal layer 87 is scattered so that the linearly polarized state collapses. Therefore, about half the light is absorbed by the polarizer 331b on the outgoing side.

When the liquid crystal layer 87 is in a scattering state, a black display results. That light is absorbed by the outgoing-side polarizer 331b means that decreased quantity of light reaches the screen in black display. As a result, the display contrast is improved.

As can be seen from the above, it is important for the projection type display device in which the display panel for forming an optical image as a change in the light-modulated state is used as a light valve, that the polarization axis of the polarizer 331a on the incident side of the display panel and the polarization axis of the polarizer 331b on the outgoing side are made generally coincident with each other. They may be generally coincident with each other, because slight shifts between the polarization axes of the polarizers would cause the display contrast to lower to only a slight degree, without problems in practical use. Preferably, angular shifts of the polarization axes are suppressed within 20° (degrees).

Figure 84:
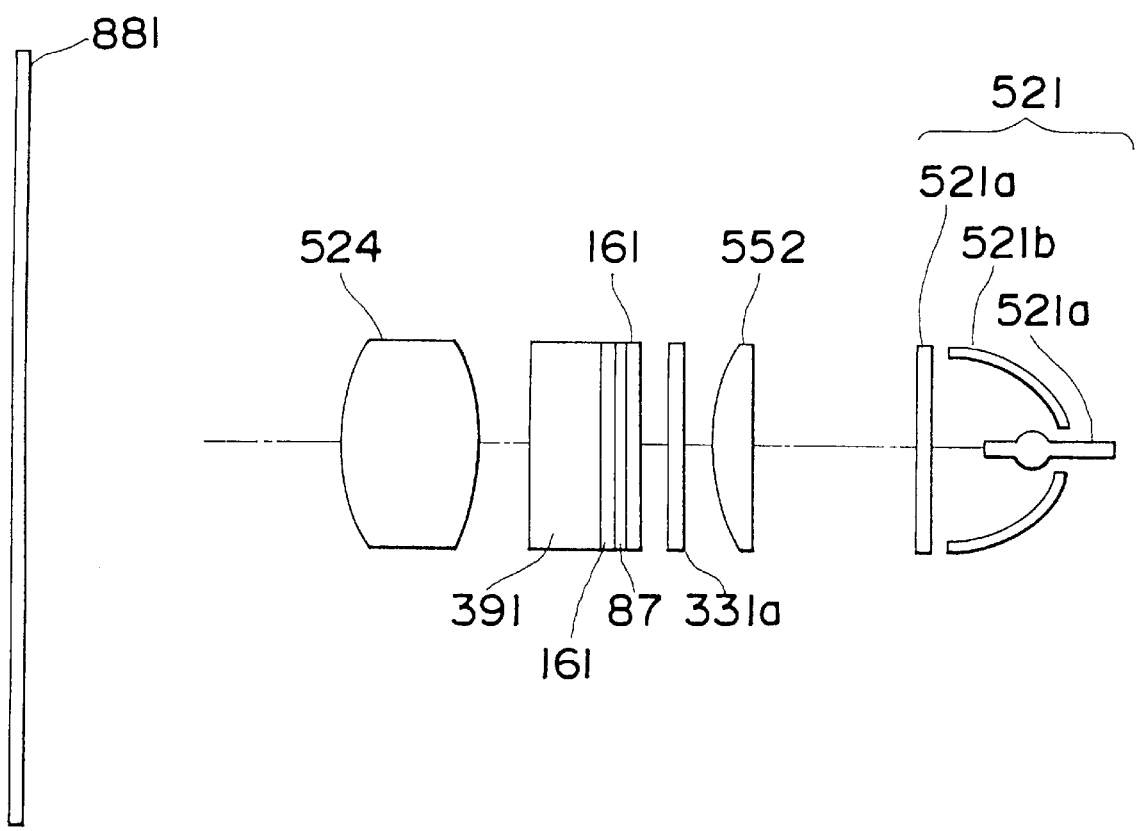
FIG. 84 is a schematic sectional view of a projection type display.

Although the polarizers 331 have been arranged on both incident and outgoing sides of the display panel in the foregoing description, it should be construed as including the arrangement of FIG. 84. In FIG. 84, numeral 881 denotes a polarization screen. As an example, when the polarization screen 881 is of the "reflection type," the arrangement corresponds to one in which the reflection plate and the polarizer are bonded together. Products of such an arrangement are marketed by Arisawa Seisakusho K.K. Further, when the polarization screen is of the "transmission type," one arrangement in which a diffusing plate or the like and a polarizer are bonded together can be mentioned. Therefore, the polarization screen may be either the transmission type or the reflection type. When linearly polarized light coincident with the polarization axis of the polarization screen 881 is incident, the linearly polarized light is reflected or transmitted by the polarization screen. Conversely, when linearly polarized light perpendicular to the polarization axis of the polarization screen is incident, the linearly polarized light is absorbed by the polarization screen.

The arrangement of FIG. 84 has the polarizer 331a on the incident side of the display panel, but no polarizer 331b on the outgoing side. Instead, the polarization screen 881 is arranged. The polarization screen 881 serves the function of the polarizer 331b. The arrangement of FIG. 84 is also able to implement high contrast as in the foregoing embodiment of FIG. 82. The reason and the operation of the projection type display device could be easily understood by substituting the polarization screen 881 for the outgoing-side polarizer 331b in the foregoing description, and so omitted here.

The description for FIGS. 82 and 84 has been made on a case where the projection type display device uses one display panel. However, needless to say, the technical concept that the incident-side polarizer 331a and the outgoing-side polarizer 331b (or polarization screen 881) are made generally coincident with each other is applicable to projection type display devices using a plurality of display panels of FIGS. 68, 75, 85 and the like. Also, it is more preferable to set the direction of the polarization axes of the polarizer 331 and the like by taking into consideration the direction in which the "polarization dependence" takes place, as described by using FIGS. 32A, 32B, 33, 35A–35C and 36A–36C. Further, the polarization means is not limited to the polarizers 331, but may be a polarization beam splitter or the like.

When the display panel comprises no color filters, it is arranged as shown in FIG. 83. White color derived from the light source 521 is separated into the three primary colors of R, G, and B by three dichroic mirrors 523. On the incident side of the LCD panel 81, there is provided a microlens array 581 in which microlenses 582 corresponding to pixels 101 are arranged in a matrix form in a set of three. To the outgoing side of the display panel, a transparent substrate 391 is connected via a transparent coupling layer. The three primary colors of R, G, and B are changed in direction by the microlenses, incident on the corresponding pixels for modulation of R, G, and B.

Next described is a projection type display device which is improved in the projection optical system so as to be able to ensure good color reproducibility and implement high-brightness display and high-contrast display.

In the projection type display device using the polymer dispersion LCD panel as a light valve, indeed bright projected images can be obtained advantageously, but use of a projection lens having a small effective F number would cause the light scattered in a black display state to be mostly converged by the projection lens so that black float takes place. As a result, the contrast of a projected image is deteriorated. When a projection lens having a large effective F number is used, indeed high contrast can be obtained, but there develops light that cannot be converged in a white display state so that an optical loss takes place. To suppress the optical loss, it is necessary to increase the effective F number of illuminating light in correspondence to the effective F number of the projection lens.

When illuminating light having a large effective F number, i.e., having successful parallelism is formed, the optical loss is increased so that a high light use efficiency could not be obtained, without using a light emitter of nearly a point light source. In contrast to this, the light-emitting member of a metal halide lamp commonly known as the short arc type has a length of 5 to 10 mm, while the light-emitting member of a xenon lamp commonly known as a point light source has a length of 2 to 4 mm. When light emitted from these light-emitting members is efficiently converged to form the light with which the light valve is illuminated, both cases involve some illumination angle so that the effective F number of the projection lens needs to be matched to the illumination angle.

When the light-emitting member is reduced in size in order to increase the effective F number of illuminating light without increasing the optical loss, general lamps would deteriorate in their light-emitting characteristics such as life characteristic to an extreme extent, as a problem. Also, using a light valve having a large display area relative to the light-emitting member, effective as it is, would make it difficult to provide a projection type display device, which leads to a problem of increased cost.

Accordingly, in order to obtain a bright, high-contrast projected image with a projection type display device involving less optical loss by using a polymer dispersion LCD panel, it is necessary that the effective F number of illuminating light should match the effective F number of the projection lens. In this case, since the projection lens provides a minimum required aperture with respect to light outputted from the light valve, stray light within the projection lens can be reduced so that a high-contrast projected image can be obtained.

Also, preferably, the effective F number of illuminating light and the effective F number of the projection lens are well matched to each other at every point on the display area of the light valve. This is important for uniform contrast over the entire area of the projected image, particularly when the polymer dispersion LCD panel is used as the light valve. For this purpose, it is required that the illumination angle of illuminating light and the convergence angle of the projection lens can be properly restricted for not only on-axis points on the light valve but also every out-of-axis point. Conventionally, it has been difficult to control the effective F number of the illuminating light and the effective F number of the projection lens in the aforementioned way. This would result in a problem of deteriorated image quality of projected images.

Figure 86:
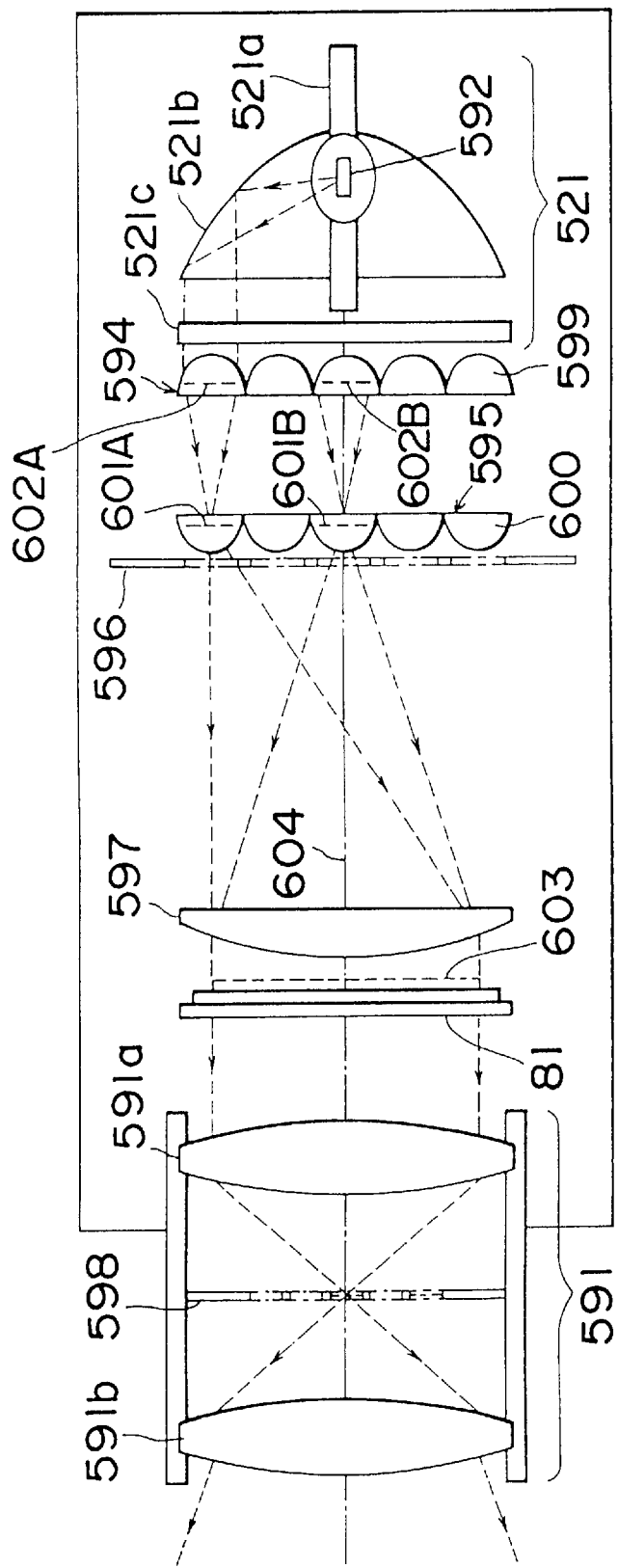
FIG. 86 is a schematic sectional view of a projection type display device.

An arrangement view of a projection type display device of the present embodiment which has overcome the above problem is shown in FIG. 86. The projection type display device of the present embodiment comprises: a light-emitting member 592 as a light-generating means; a light-converging means for converging light emitted by the light-emitting member; a light transfer means on which light outputted from the light-converging means becomes incident; a display panel (light valve 81) of the present embodiment as an optical modulation means which is illuminated with the light outputted from the light transfer means; a projection lens 591 as a projection means for projecting an optical image formed on the light valve 81 onto the screen; a first aperture stop 596 which is disposed on the incident side of the light valve 81; and a second aperture stop 598 which is disposed on the outgoing side of the light valve 81.

The light transfer means is composed of an input convergent lens array 594, a center convergent lens array 595, and an output convergent lens 597. The input convergent lens array 594 is composed of a plurality of input convergent lenses 599 arrayed in a two-dimensional form. The center convergent lens array 595 is composed of a plurality of center convergent lenses 600 arrayed in a two-dimensional form, in the same number as and in pair with the plurality of input convergent lenses 599.

The input convergent lenses 599 form a plurality of secondary light-emitting members respectively in proximity to the principal planes of the respective center convergent lenses 600. The center convergent lenses 600 respectively form images of the object in proximity to the principal planes of the corresponding input convergent lenses 599 in corporation with the output convergent lens 597 in a superimposed form in proximity to the effective display area of the light valve 81. Further, the output convergent lens 597 makes outgoing light from the plurality of secondary light-emitting members reach the projection lens 591 effectively.

The first aperture stop 596 is arranged near the plurality of secondary light-emitting members. Optical devices intervening on an optical path which leads from the first aperture stop 596 to the second aperture stop 598 makes the first aperture stop 596 and the second aperture stop 598 brought into a generally conjugate relationship. The first aperture stop 596 has such an opening shape as to selectively pass the light that has passed through primarily the effective areas of the secondary light-emitting members. Further, the second aperture stop 598 has such an opening shape as to selectively pass the light that has passed through the first aperture stop 596 in a whitest display state of the light valve.

Below described is the basic arrangement of the optical system of the projection type display device of the present embodiment first by using FIG. 86. The projection type display device primarily comprises: a light source 521 composed of a metal halide lamp 521a as a light-generating means, a parabolic mirror 521b, and a UV-IR cut filter 521c; an input convergent lens array 594; a center convergent lens array 595; a stop 596; an output convergent lens 597; an LCD panel 81; a projection lens 591 as a projection means; and a stop 598. The projection lens 591 is composed of a front lens group 591a and a rear lens group 591b. The output convergent lens 597 and the rear lens group 591b make the stop 596 and the stop 598 brought into a conjugate relationship with each other.

Figure 87:
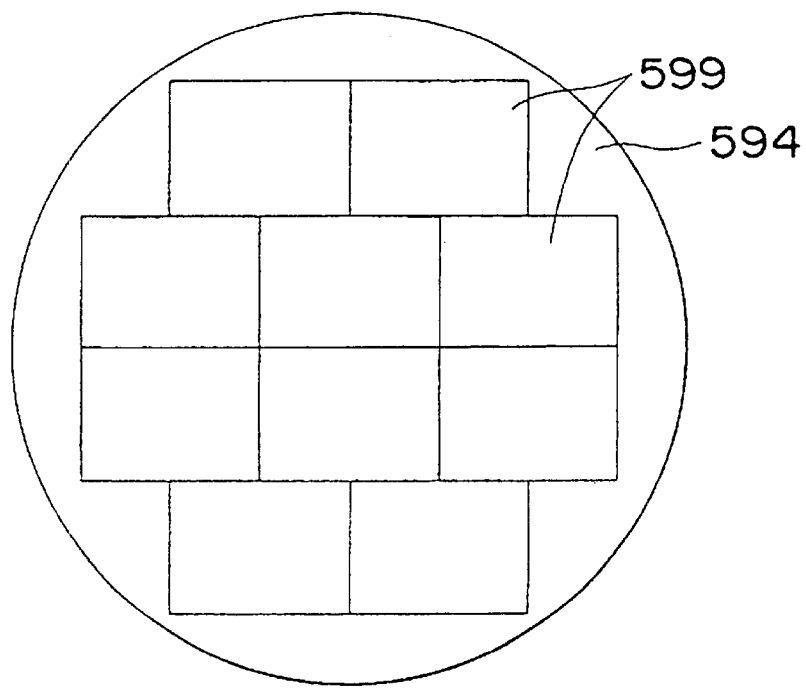
FIG. 87 is an explanatory view of FIG. 86.

The input convergent lens array 594 is made up by arraying a plurality of input convergent lenses 599 in a two-dimensional form. An example of the arrangement is shown in FIG. 87. Ten input convergent lenses 599 having a rectangular aperture are arrayed so as to be inscribed on a regular-circle area. The ten input convergent lenses 599 are plane-convex lenses of the same aperture shape, of which the longer-to-shorter side ratio of the rectangular aperture is 4:3, corresponding to the screen configuration of the effective area of the LCD panel 81. If the screen configuration has such a ratio of 16:9, then the input convergent lenses 599 are also arranged to have a ratio of 16:9.

The center convergent lens array 595 is made up by arraying a plurality of center convergent lenses 600 in a two-dimensional form. The center convergent lenses 600 counting the same number and having the same aperture as the input convergent lenses 599 are arrayed in the same way as the input convergent lens array 594.

Here is described the procedure of illumination in the projection type display device. Light radiated from the light-emitting member 592 of the metal halide lamp 521a is reflected by the parabolic mirror 521b and progresses forward generally in parallel to an optical axis 604 so as to be incident on the input convergent lens array 594. Since the light going out from the parabolic mirror 521b is generally shaped into a regular circle of cross section, the input convergent lens array 594 is arranged in such a way that the total sum of the apertures of the input convergent lenses 599 is inscribed on the above circle. The light that has passed through the input convergent lens array 594 is divided into the same number of partial beams of light as the input convergent lenses 599, and each partial luminous flux illuminates the effective display area of the LCD panel 81.

Figure 88:
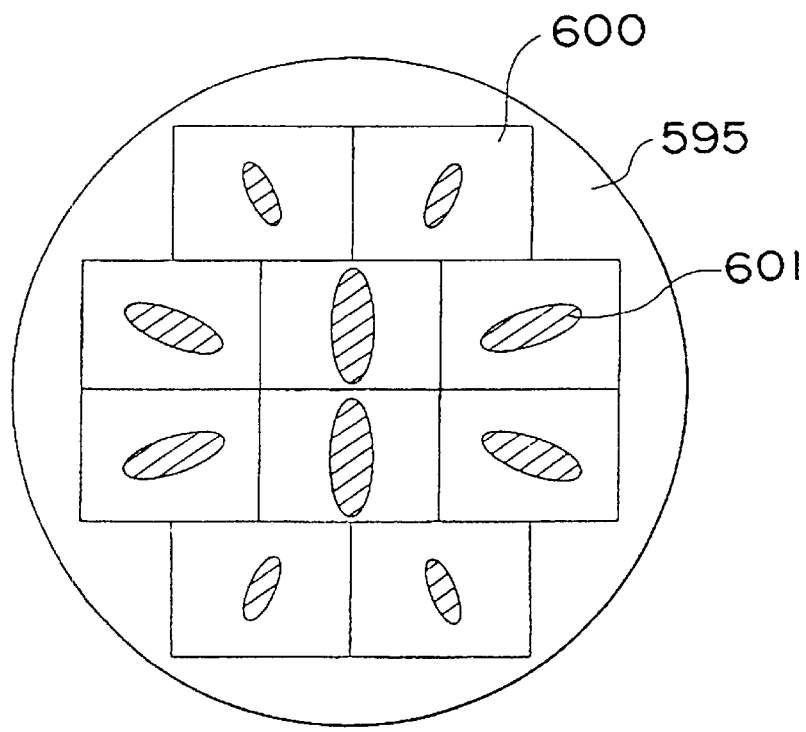
FIG. 88 is an explanatory view of FIG. 86.

Beams of light that have passed through the input convergent lenses 599 are led by the apertures of their corresponding center convergent lenses 600, respectively, so as to be converged. On the individual apertures of the center convergent lenses 600, secondary light-emitting members, for example, 601A, 601B are formed. An example of a plurality of secondary light-emitting members 601 is schematically shown in FIG. 88. The center convergent lenses 600 transfer their corresponding beams of light onto the display area of the polymer dispersion LCD panel 81. In more detail, a real image 603 of the object on the principal plane of the corresponding input convergent lenses 599, for example, 601A and 601B is formed in proximity to the display area of the polymer dispersion LCD panel 81. It is noted that the individual center convergent lenses 600 are made properly eccentric, so that a plurality of images are superimposed to form one real image 603.

According to the above arrangement, the display area of the polymer dispersion LCD panel 81 and the individual apertures of the input convergent lenses 599 are brought into a generally conjugate relationship with each other. Accordingly, if the apertures of the input convergent lenses 599 are similar to the display area of the polymer dispersion LCD panel 81, then the cross section of illuminating light and the shape of the display area can be matched to each other to suppress optical loss. Therefore, the input convergent lens array 594 shown in FIG. 87 is preferably used in combination with the polymer dispersion LCD panel 81 that displays an image having an aspect ratio of 4:3 in conformity to NTSC.

In addition, all the structures, configurations, technical concepts, and functions as described hereinabove are applicable to the polymer dispersion LCD panel in this arrangement. For example, applicable are the display methods of FIGS. 1A–1C and 2A–2D, the circuit construction of FIGS. 3 and 4, the panel structures of FIGS. 27–41, 61, 62, 66 and 67, the arrangements of measures for dependence on polarized light and the drive methods of FIGS. 35A–35C and 36A–36C, and the drive methods of FIGS. 17–21. The display panel is not limited to the polymer dispersion LCD panel, but may also be display panels, TN and STN LCD panels to which PLZT is applied.

In general, light outputted from a concave mirror such as a parabolic mirror has relatively large non-uniformity in brightness. If light with large non-uniformity in brightness is transferred as it is, whereby the polymer dispersion LCD panel 81 is illuminated, then the resulting projected image is lowered in the uniformity of brightness. If the polymer dispersion LCD panel 81 is illuminated by using only the regions of relatively uniform brightness, then increased quantity of light could not be utilized so that the light use efficiency would lower. In contrast to this, the projection type display device of the present embodiment has advantages of being able to obtain high light use efficiency and a projected image superior in the uniformity of brightness. The reason of this is described below.

The input convergent lens array 594 divides the light with large non-uniformity in brightness into a plurality of partial beams of light. The non-uniformity in brightness of the partial beams of light on the apertures of the input convergent lenses 599 is smaller than that of the cross section of the beam of light before division. The individual center convergent lenses 600 enlarge the partial beams of light into appropriate magnitude, and superimpose them on the display area of the polymer dispersion LCD panel 81. As a result, illumination of good uniformity in brightness can be implemented.

Since the total sum of the apertures of the input convergent lenses 599 is inscribed on the cross section of the beam of incident light, the optical loss at the input convergent lens array 594 is small. Also, since the apertures of the center convergent lenses 600 are each set to enough size with respect to the secondary light-emitting members 592, the optical loss at the center convergent lens array 595 is small. Further, since the cross section of the light incident on the polymer dispersion LCD panel 81 is matched to the shape of the display area, the optical loss at the polymer dispersion LCD panel 81 is small. Therefore, most of the light radiated from the light-emitting member 592 is reflected by the parabolic mirror 521*b*, passing through the input convergent lens array 594, the center convergent lens array 595, the output convergent lens 597, and the polymer dispersion LCD panel 81, and thus reaching the projection lens 591. Consequently, if the optical loss at the projection lens 591 is suppressed, high light use efficiency can be implemented so that a projected image bright and superior in uniformity of brightness can be obtained.

Since a plurality of secondary light-emitting members 592 are formed on the center convergent lenses 600 in a discrete fashion, the effective F number of illuminating light in this case needs to be determined from the illumination angle equivalently converted from the total sum of the areas of the secondary light-emitting members 592. On the other hand, the convergence angle of light emitted from the polymer dispersion LCD panel 81 at an angle formed with respect to the optical axis 604 becomes a value larger than the equivalent illumination angle. Accordingly, to suppress the optical loss, the effective F number of the projection lens 591 needs to be smaller than the effective F number of the illuminating light in actual effectiveness. This would cause the contrast of the projected image to lower in the case of the polymer dispersion LCD panel 81, as a problem.

Figure 89:
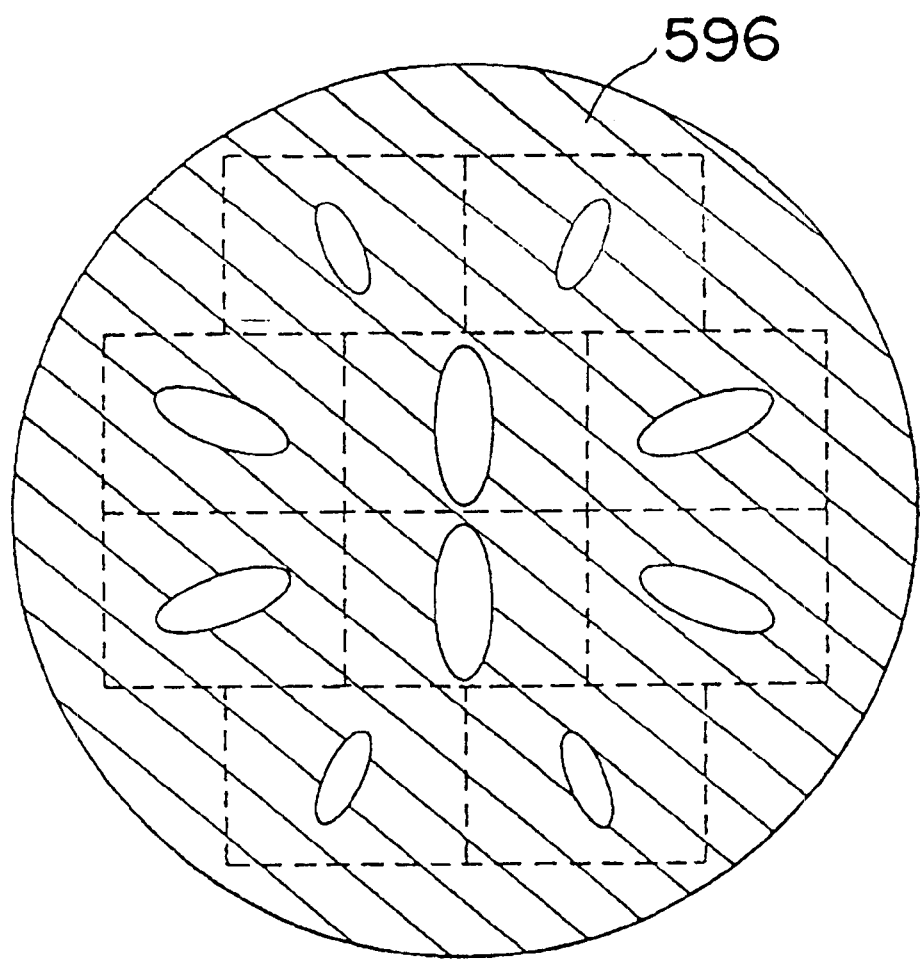
FIG. 89 is an explanatory view of FIG. 86.

On the other hand, in the projection type display device of the present embodiment, the apertures both on the illuminating light side and on the projection lens side can be set to minimum required size without increasing the optical loss by virtue of the function of the stop 596 and the stop 598. Thus, the contrast can be suppressed from lowering. In more detail, the aperture of the stop 596 on the illuminating light side is formed into a shape as shown in FIG. 89 in correspondence to the effective area of the secondary light-emitting members 592 formed in a discrete fashion. Dotted lines correspond to the individual apertures of the center convergent lenses 600 of FIG. 89. Further, since a real image of the secondary light-emitting members 592 is formed on the apertures of the stop 591 on the projection lens side, the aperture shape of the stop 598 is also made identical to the aperture shape of the stop 596. Thus, light that has passed through the stop 596 passes through the stop 598, so that high light use efficiency can be implemented. Moreover, since the projection lens 591 provides a minimum required aperture needed for the illuminating light, a high-contrast display image can be implemented. As a result, bright, high-quality projected images can be provided as a great advantage.

Figure 90:
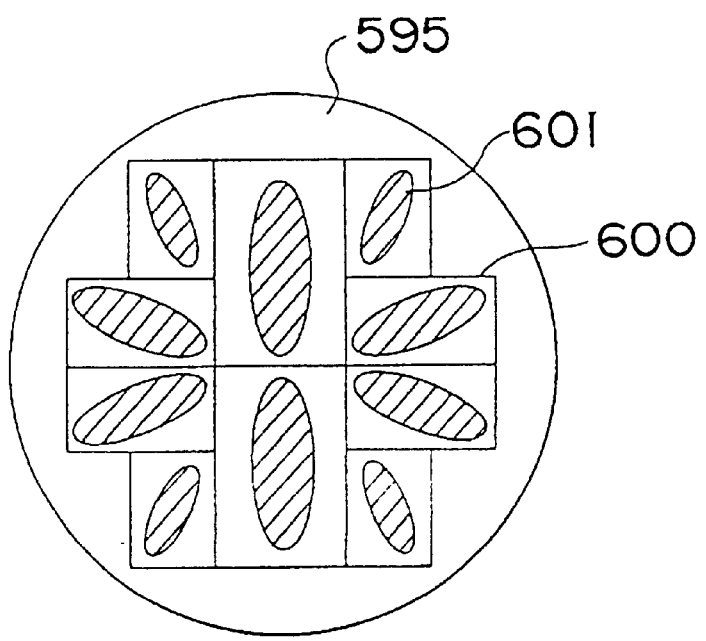
FIG. 90 is an explanatory view of FIG. 86.

The input convergent lens array 594, the center convergent lens array 595, the stop 596, and the stop 598 used in the projection type display device of the present embodiment are more preferably arranged as follows. FIG. 90 shows the arrangement of the center convergent lens array 595 in this case. In general, the closer to the optical axis the input convergent lens 599, the larger the size of the secondary light-emitting member 592. The individual apertures of the center convergent lenses 600 are not necessarily required to be of the same size, but have only to be enough size for the individual secondary light-emitting members 601. If a plurality of center convergent lenses 600 with apertures effectively differentiated from one another are closely arrayed to make up the center convergent lens array 595, then the total sum of the aperture areas can be reduced as an advantage. The input convergent lens array 594 to be combined with the center convergent lens array 595 may be arranged in the same way as in FIG. 89, where the input convergent lenses are individually made eccentric properly, and the secondary light-emitting members 601 are formed in the center of the corresponding center convergent lenses 600.

Figure 91:
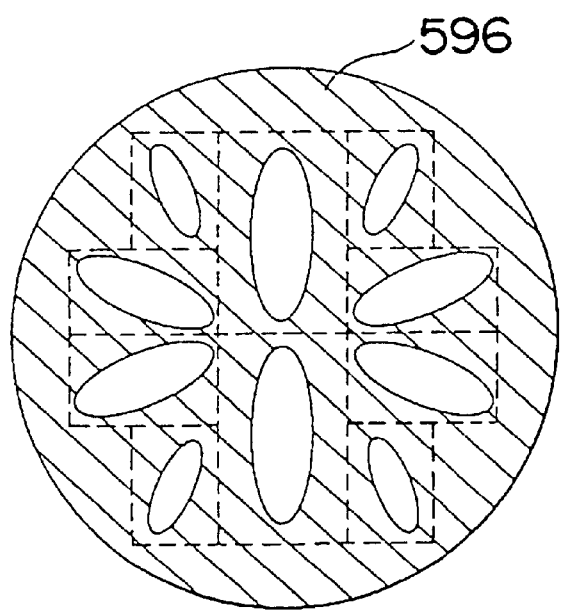
FIG. 91 is an explanatory view of FIG. 86.

In this case, the stop 596 having the aperture shape as shown in FIG. 91 may appropriately be used instead of the stop 596 on the illuminating light side. The case is the same also with the stop 598 on the projection lens side. As a result, the aperture diameter of the center convergent lens array 595 can be reduced without causing optical loss, and moreover the lens diameter of the projection lens 591 can also be reduced, advantageously.

When a plurality of secondary light-emitting members are formed in a discrete fashion to illuminate the light valve as described above, the projection type display device of the present embodiment offers a greater advantage. Even if a projection lens having a large maximum convergence angle is used, providing a stop having a plurality of apertures in a discrete fashion allows a minimum required aperture to be provided with respect to the light outputted from the light valve. As a result, bright, high-contrast projected images can be obtained.

Figure 85:
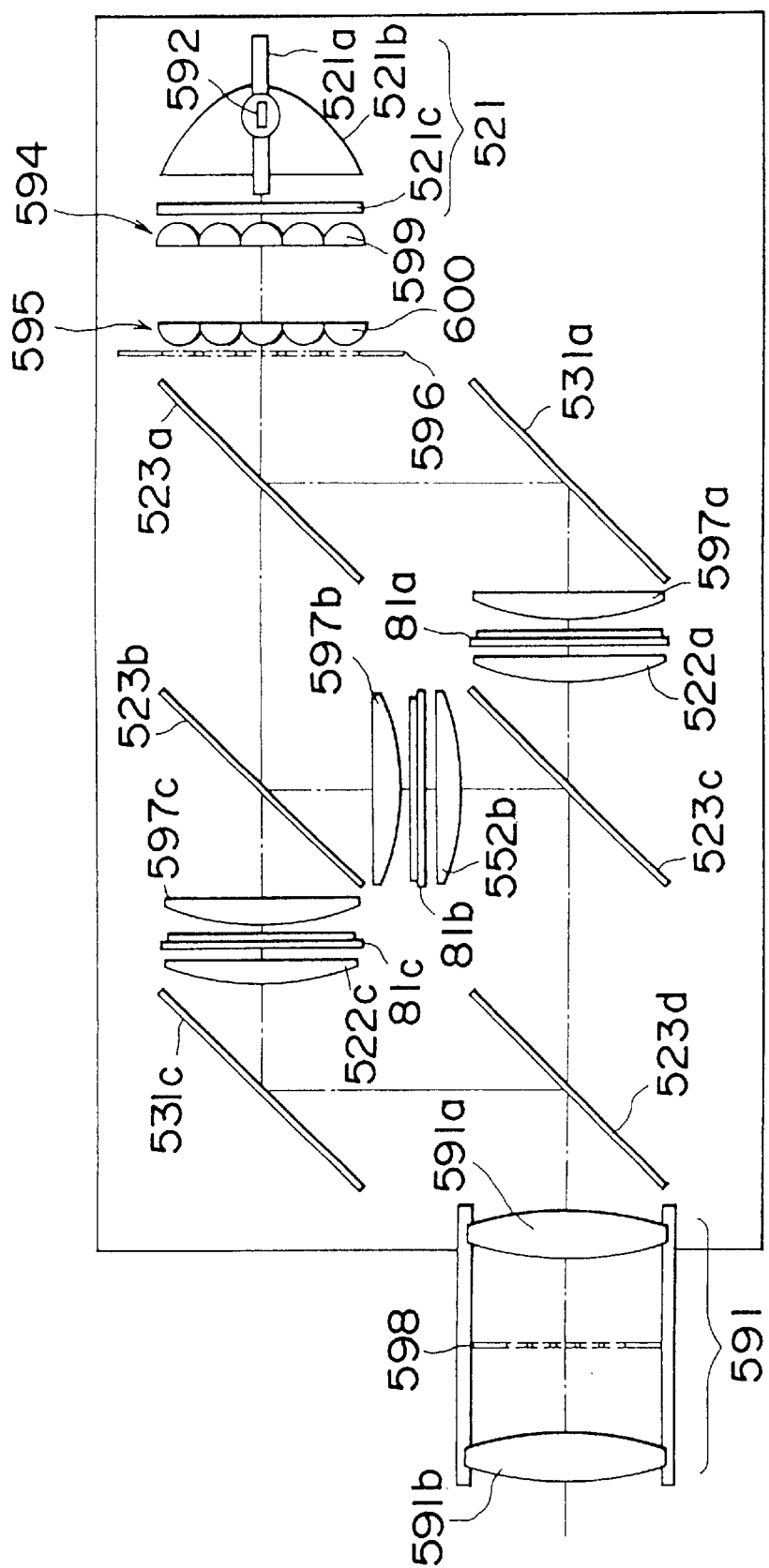
FIG. 85 is a schematic sectional view of a projection tipe display where a color image is displayed by using the arrangement of FIG. 86.

FIG. 85 is an arrangement view of a projection type display device in which three display panels 81 of the present embodiment are used in FIG. 86 to enable the color-image display. A metal halide lamp 521a has a light-emitting member 592 that radiates light containing the three primary colors. Display areas of the polymer dispersion LCD panels 81b, 81c are illuminated by the same procedure as in FIG. 86. However, by the operation of dichroic mirrors 523a, 523b and a plane mirror 531a, the illuminating light is separated into color beams of light of the three primary colors, and led onto the display areas of their corresponding polymer dispersion LCD panels 81.

On the display areas of the individual polymer dispersion LCD panels 81, optical images corresponding to the three primary colors are formed in response to image signals fed from an external source. The projection lens 591 is composed of a front lens group 591a and a rear lens group 591b, and magnifies and projects the optical images of the three primary colors onto the screen. Beams of light outputted from the polymer dispersion LCD panels 81 are synthesized into an optical path by the operation of the dichroic mirrors 523c, 523d and a plane mirror 531c, so that a full-color projected image can be obtained.

A stop 596 on the illuminating light side and a stop 598 on the projection lens side are similar to those as shown in FIG. 89 or 91 with a similar purpose. The output convergent lens 597 and the rear lens group 591b are properly made up so that the stop 596 and the stop 598 have a conjugate relationship with each other. With the arrangement as described above, the projection type display device can provide a high-brightness, high-contrast color display without color reproducibility. The rest of the arrangement has already been described in FIG. 89, and here omitted.

Figure 92:
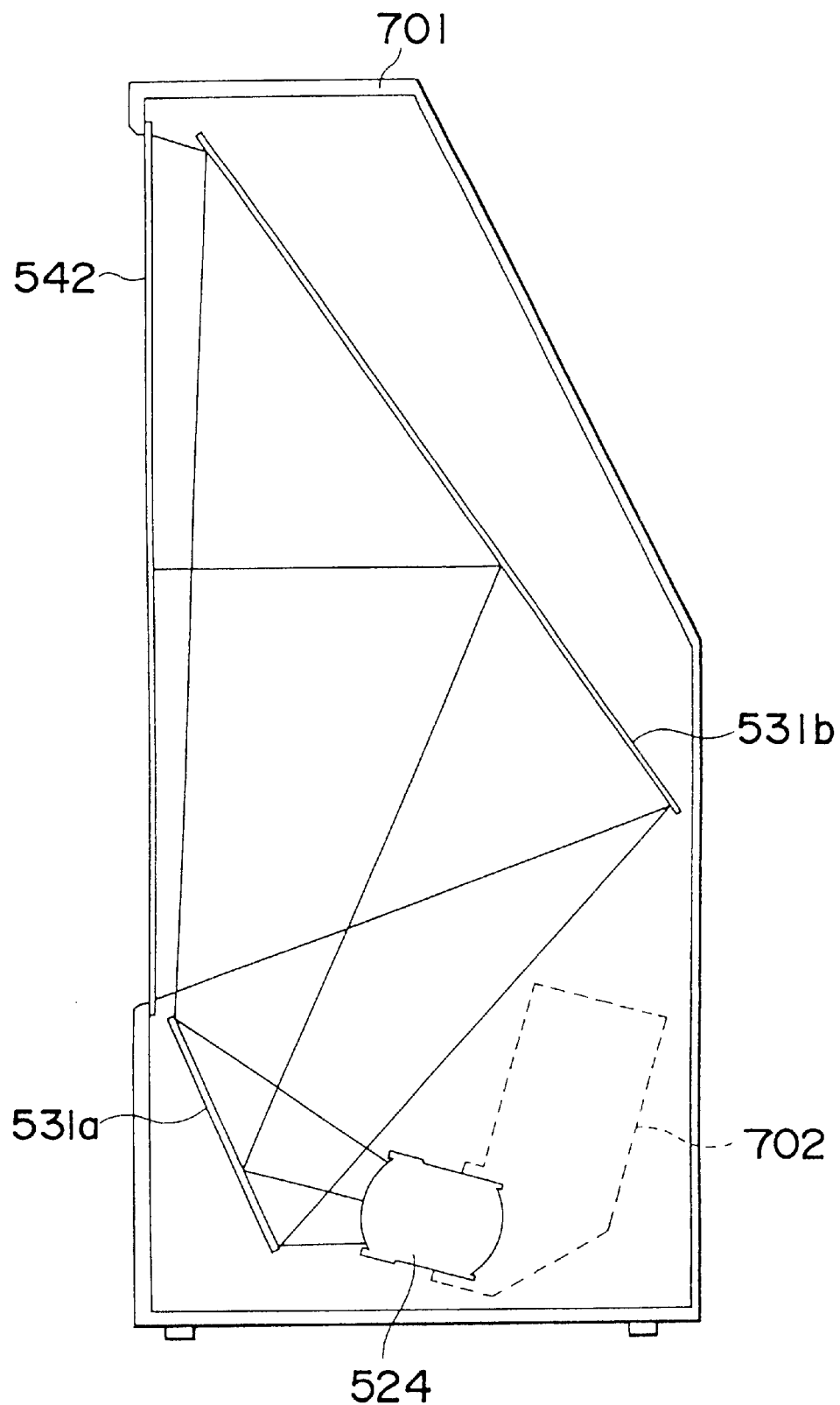
FIG. 92 is a sectional view of a projection type display device.

The above-described projection type display device has been described as a front type in which the screen 542 and the optical block are separated from each other, but is not limited to this. For example, the projection type display device may be of a rear type projection type display device as shown in FIG. 92 in which the screen 542 and the optical block 702 are integrated together. As the optical block, FIGS. 68–70 and the like are of course applicable. Light outputted from the optical block is reflected by the mirrors 531a and 531b and projected onto the screen 542.

Figure 93A:
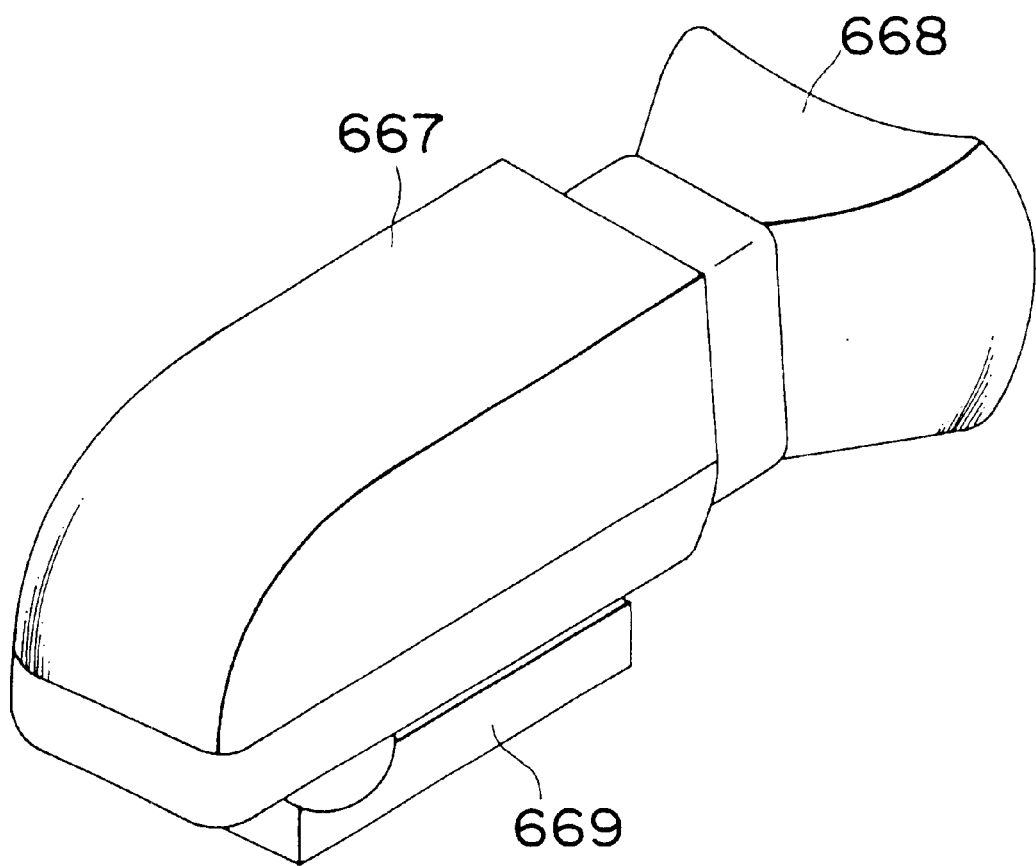
FIGS. 93A and 93B are perspective view and a sectional view of a viewfinder.

The image signal display method of the present embodiment and the display device (display panel) using the same may also be applied to viewfinders to be used as a reproduced image display device of a video camera or the like. The viewfinder refers to those comprising a light-emitting source, an LCD panel, a lens for magnifying an image of the LCD panel, and the like. For example, the viewfinder may be those for use in video cameras as described below, or the structures of the image display section of head mount displays, or the like. FIG. 93A is an appearance view of a viewfinder of the present embodiment. Reference numeral 668 denotes an eyepiece cover, and 669 denotes a metal fitting for mounting onto a video camera. Numeral 667 denotes a body, in which a lens 663, a display panel 81, and the like are contained.

Figure 93B:
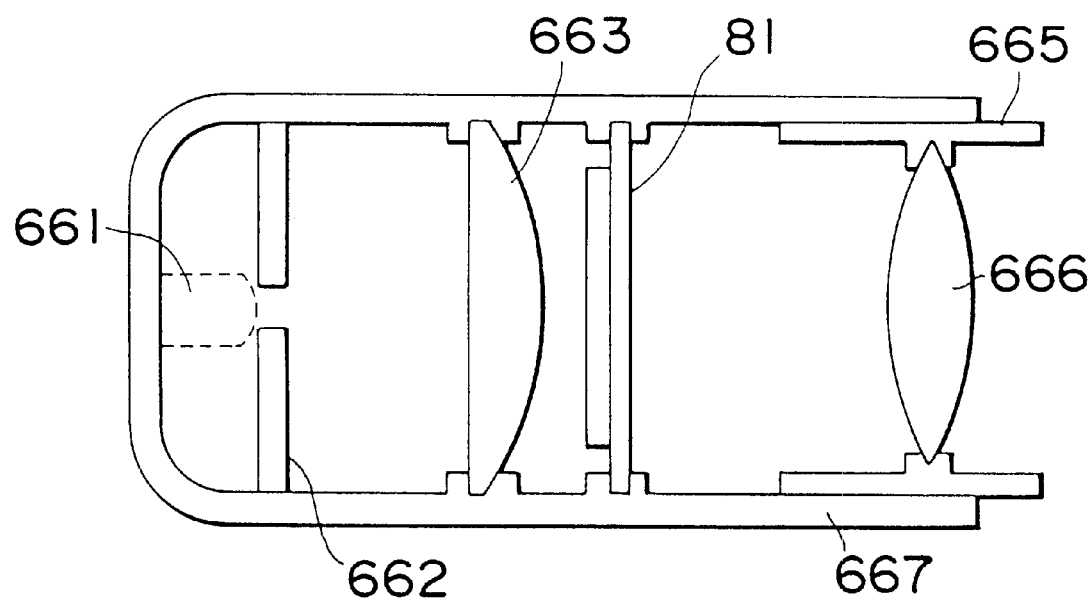

FIG. 93B shows the internal structure of the body 667 as shown in FIG. 93A. Numeral 661 denotes a light-emitting element, 663 denotes a convergent lens, and 666 denotes a magnifying lens.

As an example, the display area of the display panel 81 has a diagonal length of 28 mm, and the convergent lens 663 has an effective diameter of 33 mm and a focal distance of 15 mm. The light-emitting element 661 is disposed close to the focal point of the convergent lens 663. The convergent lens 663 is a plane-convex lens and has the plane directed toward the light-emitting element 661. An eyepiece ring 665 is fitted to an end portion of the body 667. The eyepiece ring 665 has the magnifying lens 666 fitted thereto. The internal surface of the body 667 is colored to black or a dark color for absorbing unwanted light.

Numeral 662 denotes a light-shielding plate with a circular hole in the center. It has a function of reducing the area where light is radiated from the light-emitting element 661. If the area of the hole is increased, the displayed image on the display panel 81 becomes brighter, but lower in contrast. This is due to a worse directivity of incident light despite the increase in the quantity of light incident on the convergent lens 663. When the diagonal length of the display area of the display panel is 28 mm, the area where light is radiated should be 15 mm$^2$ or less, which corresponds to a hole diameter of a pin hole whose diameter is nearly 4 mm. Preferably, the area should be 10mm$^2$ or less. However, if the hole diameter is too small, the directivity of light becomes narrower than necessary such that the display screen is darkened only by a slight shift of the point of view directed to the viewfinder. Accordingly, the hole area should be at least 2 mm$^2$ or more. As an example, it was found that when the hole diameter is 3 mm linear, a brightness of the display screen equivalent to that of the viewfinder using a conventional plane light source can be obtained, where the contrast is also good. The area where light is radiated, or the hole diameter should be construed as being within a range of 0.5 mm to 5 mm. However, this applies to the case in which the diagonal length of the display screen is 28 mm, and longer diagonal lengths would cause the optimum hole diameter to vary in correspondence to the diagonal length.

Light radiated from the light-emitting element 661 at a wide cubic angle is converted into light nearly collimated and narrowed in its directivity by the convergent lens 663, and then incident on the display panel 81 on the counter electrode 88 side. The observer makes contact with an eyepiece rubber 688 to view a displayed image of the display panel 81. That is, the position of the pupil of the observer is generally fixed. On an assumption that all the pixels of the display panel 81 make the light travel straight, the convergent lens 663 is so arranged that the light radiated from the light-emitting element 661 and incident on the effective area of the convergent lens 663, after transmitted by the magnifying lens 666, is entirely incident on the pupils of the observer. Since the lens 666 functions as a magnifying lens, the observer can view the small displayed image of display panel 81 as it has been magnified.

Since the viewfinder is so arranged that the position of the pupil of the observer is generally fixed by the eyepiece cover 668, the light source located on the rear may be narrow in directivity. The conventional viewfinder in which a light box using a fluorescent tube as the light source is used utilizes only the light that travels from an area of the same size as the display area of the display panel into a small solid angle in certain directions, and not the light that travels in the other directions. That is, the light use efficiency is very poor.

In the present embodiment, using a light source with a small light-emitting member, light radiated from the light-emitting member at a wide solid angle is converted into nearly collimated light by the convergent lens 663. As a result, the light outputted from the convergent lens 663 is narrow in directivity. If the point of view of the observer is fixed, even the light narrow in directivity is enough for use in a viewfinder. Smaller size of the light-emitting member naturally causes the power consumption to be reduced. As described above, the viewfinder of the present embodiment takes advantage of the fact that the observer views the displayed image with his/her point of view fixed. Whereas ordinary direct-view LCD devices are required to have a certain angle of view, viewfinders are sufficient for practical use if they allow the displayed image to be observed in a specified direction.

When the convergent lens 663 is of no aberration and has a transmittance of 100%, the brightness of the light-emitting member as viewed through the convergent lens 663 is identical to that of the light-emitting member itself. If the maximum transmittance of the display panel including the color filters, the polarizer, and the aperture ratio for the image is 3%, if the transmittance of the convergent lens 663 is 90%, and if the brightness required as a viewfinder is 15 [ft–L], then the brightness required for the light source is approximately 560 [ft–L]. Examples of the light-emitting element that satisfies these requirements are light-emitting tubes using the light-emitting principle, such as cathode ray tubes and fluorescent tubes, fluorescent light-emitting elements, xenon lamps, halogen lamps, tungsten lamps, metal halide lamps, LEDs, elements which emit light by operation of electrons such as electroluminescence displays (ELs), and those which emit light by itself such as plasma display panel (PDP). Any one of these light-emitting elements may be used as the light-generating means, where among others light-emitting tubes, LEDs, and fluorescent light-emitting elements are optimum in terms of low power consumption, small size, and the capability of white light emission. In particular, the Luna Pastel 07 series manufactured by Minipairo Denki K.K. (light-emitting tubes with diameter 7 mm) are optimum because of less power consumption.

When the voltages applied to pixels are varied, the display panel 81 varies in the degree of light scattering at those pixels. No applied voltage causes the degree of light scattering to be a maximum, and increased applied voltages cause the degree of light scattering to decrease. If light with a narrow directivity is entered to the display panel 81 so that the degree of light scattering is varied, the quantity of light incident on the pupils of the observer from the pixels varies. That is, the brightness of the pixels as viewed from the observer varies, which is utilized to perform the image display.

The display panel 81 has a mosaic color filter (not shown) attached. The pixels are arranged in a delta arrangement, and the number of pixels is about 100,000. The color filter 471 transmits any one of the colors, red, green, and blue. The film thickness for each color may be controlled by the constituent substances of the color filter. The film thickness of the color filter is adjusted in the fabricating process. That is, the thickness is varied for red, green, and blue. The film thickness of liquid crystals on the individual pixels can be adjusted by the film thickness of the color filter according to the color of the color filter. In particular, the polymer dispersion LCD panel has a poor scattering characteristic with respect to light of long wavelengths (red light). Thus, if the thickness of the liquid crystal layer of red pixels is made thicker than that of blue and green pixels, the scattering characteristic can be improved so that the tone of red, green, and blue can be made uniform. That is, the display panel 81 of the present embodiment with the arrangements of FIGS. 47 through 50 may be used.

Where part of the light outputted from the display panel 81 is incident on the pupils of the observer, the rest of the light becomes stray light, making a cause of lowering the contrast of the displayed image. To avoid this problem, the internal surfaces of the body 667 and the eyepiece ring 665 are made black or any dark color for prevention of the reflection of light.

The convergent lens 663 has the plane, i.e., a plane with a larger radius of curvature directed toward the light-emitting element 661. This is intended to make it easier to satisfy the sine condition for good-uniformity in brightness of the displayed image of the display panel 81. It is noted that the convergent lens 663 is not limited to the aforementioned plane-convex lens, but may also be a common regular lens of course.

The focus adjustment can be attained according to the eyesight of the observer by adjusting the degree how the eyepiece ring 665 is inserted into the body 667. In addition, since the position of the eyes of the observer is fixed by the eyepiece cover 668, the position of the point of view will almost never shift during use of the viewfinder. The fixed point of view allows the observer to view a successful image even with a narrow directivity of light to the display panel 81. For more successful views, the direction in which light is radiated from the light-emitting element 661 may be moved toward the optimum direction. For this purpose, preferably, the light-emitting element 661 is additionally provided with a position adjustment mechanism so as to be moved forward or backward or rightward and leftward.

As described above, in the viewfinder of the present embodiment, the light radiated from a small light-emitting member of the light-emitting element 661 at a wide solid angle can be converged by the convergent lens 663 with high efficiency. Therefore, the power consumption of the light source can be reduced to a greater extent, as compared with the case where a backlight of a plane light source using a fluorescent tube is used.

In addition, the display panel 81 has been described in FIGS. 93A and 93B as a polymer dispersion LCD panel for easier description, but is not limited to this. It may be replaced with another in which light is modulated by scattered and transmission of dynamic scattering mode (DSM) liquid crystals or the like. It is also known that ferroelectric liquid crystals cause the scattering phenomenon when the film thickness is relatively thick. Accordingly, ferroelectric liquid crystals may be used. Otherwise, PLZT is known as one that forms an optical image as a change in the light scattered state. The display panel of the present embodiment and the display device using the same includes those above mentioned. Also, since a display panel to which the image signal display method of the embodiment is applied would be accepted, TN LCD panels are also usable.

Figure 94A:
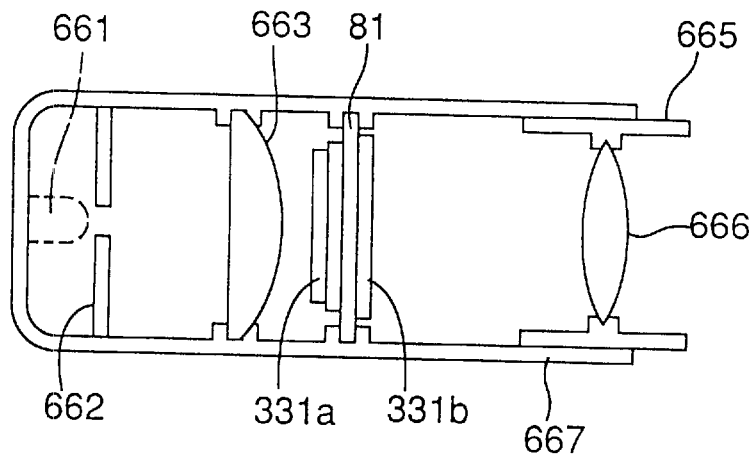
FIGS. 94A, 94B and 94C are sectional views of viewfinders.
Figure 94B:
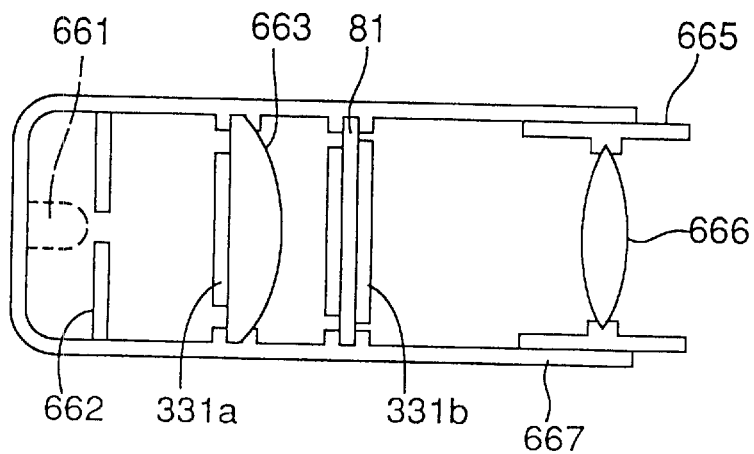
Figure 94C:
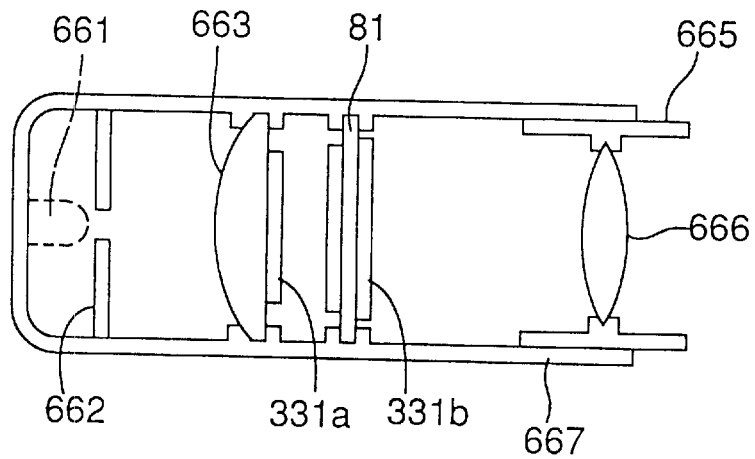

The arrangement using a polarizer is exemplified by one as shown in FIGS. 94A–94C. FIG. 94A shows an example in which a polarizer 331 is arranged at the input/output plane of the polymer dispersion LCD panel. It may of course be considered merely as a TN LCD panel, because the technical concept in the arrangement of FIGS. 94A–94C is unknown and has novelty and improvement.

FIG. 94B shows an arrangement in which a polarizer 331a on the incident side of the LCD panel is bonded to a convergent lens 663. The convergent lens 663 is provided so as to be turnable. That is, by turning the convergent lens 663, the angle of a polarization axis 332 formed by the polarizer 331a on the incident side and a polarizer 331b on the outgoing side can be adjusted. Any angular shift of the polarization axis directly affects the display contrast. Accordingly, it is important to adjust the angle of the polarization axis. Preferably, the convex plane of the convergent lens 663 should be directed toward the light-emitting element 661 as shown in FIG. 94C. The sine condition is deteriorated more or less, but it does not matter for practical use. Collimated light is incident on the polarizer 331a, so that the display contrast is higher than in the case of FIG. 94B.

The above points are described in detail in Japanese Patent Laid-Open Publication HEI 5-241217. The description of this publication is incorporated or inserted herein as it is. The aforementioned patent laid-open publication describes a variety of arrangements. They include, for example, an arrangement of FIG. 3 comprising the stop 31, an arrangement of FIG. 11 in which the body 667 is bent, and an arrangement of FIG. 12 using the Fresnel lens 101.

An advantage primarily common to the display devices of the embodiments is that light penetration through the peripheral portions of the pixel electrodes 151 is prevented whereby the display contrast is substantially improved.

In the display panel of the present embodiment, since the light-shielding film 155 is formed around the pixel electrodes 151 and the like, there is no light penetration through the peripheral portions of the electrodes 151 so that good image display can be attained. Also, since only the ITO electrodes 88 are formed on the opposite substrate 161, there is no need of positioning the black matrix and the like when the opposite substrate 161 and the array substrate 162 are bonded together. As a result, the display panel is easy to fabricate, so that reduction in cost can be expected. Further, there will occur no shift of the black matrix, so that the width of the light-absorbing film 155 can be reduced to a large extent, improving the pixel aperture ratio and enabling high-brightness display. Neither will there occur light penetration around the pixels due to lateral electric fields.

If the light-shielding film 155 is a light-absorbing film, halation of pixels due to scattering of the liquid crystal layers 87 can be prevented, so that the clarity of the image can be improved. Further, since the light-shielding film 155 is formed directly on the switching devices of TFTs 86 or the like, the light that has caused the liquid crystal layers 87 to be scattered will not be incident on the TFTs 86, so neither will there occur the photoconductor phenomenon of the TFTs 86.

Unless the black matrix is formed on the opposite substrate 161 as in the display panel of the present embodiment, polymer components can be fully polymerized when ultraviolet rays are applied to the mixed solution of uncured polymer, which has been injected between the array substrate 162 and the opposite substrate 161, and liquid crystals. The uncured polymer will not remain in the liquid crystal layers 87 under the black matrix, which would occur in the conventional polymer dispersion LCD panel, so that the display panel becomes stable with respect to time variation and good at reliability.

Also, the occurrence of lateral electric field between the gate lines 153 and the pixel electrodes 151 is eliminated by shielding the gate lines 153 at their top with the pixel electrodes. Thus, light penetration through the peripheral portions of the pixels can be prevented. Moreover, areas where the gate lines 153 and the pixel electrodes 151 are overlapped with each other are provided also at positions where the pixel electrodes 151 and the source lines 154 are adjacent to each other, whereby the gate lines 153 are enabled to serve also as a light-shielding film so that the pixel aperture ratio can be improved.

According to the image signal display method of the present embodiment, since image information corresponding to one frame is displayed by two frame periods, input-progressive scanning image signals can be displayed at a speed ½ that when displayed as it is. As a result, even when a wideband (high data rate) progressive scanning image signal such as of personal computers or workstations is displayed on a display that is poor at high-speed display such as a matrix type LCD, there will not occur any deterioration in image quality. That is, it is no longer necessary to divisionally drive the displays as has been necessary in conventional display devices, so that the occurrence of any brightness difference can be prevented.

Also, since the control circuit 36 and the control circuit 37 are selectively activated, the optimum display can be achieved at all times according to the type of the progressive scanning image signal (e.g., whether or not a still image or a motion image).

Further, when the value representing the correlation between adjacent frames of the progressive scanning image signal is equal to or more than a specified value (i.e., a still image), the first display control means is selectively activated. When the value is less than the specified value (i.e., a motion image), the second display control means is selectively activated. Thus, interframe interpolation is performed for a still image so that the vertical resolution can be ensured, while intraframe interpolation is performed for a motion image so that the occurrence of blurs of a motion image can be prevented.

Also, use of polymer dispersion liquid crystals eliminates the occurrence of inverse-tilt domains, while non-use of a polarizer allows a display of two times higher brightness to be attained, compared with the conventional TN LCD panels. As a result, not only the light use efficiency can be improved, but also the conversion of light into heat can be reduced to a large extent, eliminating the possibility that the performance deterioration in the panel may be caused. This is greatly effective when the intensity of light incident on the display panel is on the order of as much as several tens of thousands lux, as in the projection type display device.

Further, the coating of the source lines 154 and the like with the low dielectric film 241 allows an electric field developed from the signal lines and the like to be shielded, and moreover allows the lateral electric field to be prevented and the light penetration around the pixel electrodes 151 to be prevented. Therefore, the display contrast can be improved.

Further, the formation of low dielectric pillars 262 as shown in FIG. 41 allows electric fields due to the signal lines to be shielded to almost the full, so that the light penetration will not occur at all. The low dielectric pillars 262 serve also to define the film thickness of the liquid crystal layers 87. That is, they serve as beads that define the film thickness of liquid crystals. Therefore, it is unnecessary to distribute beads. As a result, there will occur no light penetration around the beads so that good display contrast can be provided. Due to the fact that there is no need of distributing beads on the pixel electrodes 151, an advantage is provided that the light penetration due to the beads will not occur. If the low dielectric films 231 are colored to form light-shielding films as shown in FIG. 25, the occurrence of halation within the liquid crystal layers 87 and the like can be prevented.

If the convex structure as shown in FIG. 51 is provided, light 453a reflected by the interface 455 and returned to the source lines 154 is changed in its traveling direction by the convex portion 411. As a result, there will not occur transmitted light 453b, so that ghosts or the like will not occur. Also, if a lower-layer light-shielding structure is provided as shown in FIG. 52, similar advantages can be obtained.

If a particle-size varied structure is provided as shown in FIG. 84, good display contrast can be attained by providing an optimum mean droplet size with respect to the colors of the color filters. Also, if the source lines 154 and the like are coated with the color filter 471 so as to be electromagnetically shielded, the fabricating processes are simplified because the color filter 471 can be formed only by coating the source lines 154 and the like simultaneously. The color filter 471 is composed of a polymer material and relatively low in dielectric constant, so as to be able to produce effects similar to those of the low dielectric films 231.

If the mean size of droplet liquid crystals on the source lines 154 and the like is arranged to be very small as shown in FIG. 57, they will no longer respond to any applied voltage. The resulting effect is similar to those obtained when low dielectric pillars 262 are formed on the source lines 154 and the like. That is, if the mean droplet size is very small, the liquid crystals will not respond to lateral electric fields, either. Accordingly, there will be no possibility of light penetration through peripheral portions of the pixels. Also, since it is normally in a scattering state, the same effects as when a black matrix is formed can be obtained.

Further, the reflection type display panel as shown in FIG. 59 is good at contrast and high in the pixel aperture ratio by virtue of the thin film thickness of the liquid crystal layers 87, as compared with the transmission type display panel, so that high-brightness display can be attained. Moreover, since there are no obstacles on the rear surface of the display panel, the panel can be easily cooled. For example, the display panel allows the forced cooling or liquid cooling from the rear side to be easily accomplished and also allows a heat sink or the like to be attached on the rear side.

In the display panel of the present embodiment, it has been arranged that a convex structure or lower-layer light-shielding structure is provided to scatter or absorb light reflected by the interface 455 so that ghosts or the like can be prevented. The ghosts or the like can be prevented by bonding a concave lens 391 or a transparent substrate on the light input/output plane of the display panel, and moreover the display contrast can be improved by the secondary scattering prevention effect.

When the polarizer 331 is used, the polarization axis 332 of the polarizer 331 is aligned with the direction in which lateral electric field is generated. Also, the direction in which the lateral electric field is generated is controlled by taking into consideration the drive method. Aligning the polarization axis 332 of the polarizer 331 with the direction in which lateral electric field is generated allows the light penetration through the peripheral portions of the pixel electrodes 151 to be fully prevented, so that high-contrast display can be attained.

Further, in the display. panel of the present embodiment, when the H-inversion drive as shown in FIG. 12 or the column-inversion drive as shown in FIG. 14 is adopted, the direction in which lateral electric field is generated can be defined while the occurrence of flickers can be prevented. Also, in the projection type display device of the present embodiment, when the drive method as described in FIG. 16A is adopted, the flickers can be further prevented so that good image display can be implemented.

Since the projection type display device of the present embodiment has adopted the display panel of the present invention as a light valve, it becomes feasible to realize high-brightness display and to cope with increase in size of the screen above 200 inches or more. Also, since the liquid crystal film thicknesses of the individual display panels are thick and/or the mean size of droplets is optimum according to the wavelengths of R, G, and B light, an image display with good display contrast can be implemented. Moreover, there occurs no light penetration through peripheral portions of the pixels while the white window display and the like are also good.

The viewfinder of the embodiment converts light, which is radiated from a small light-emitting member of the light-emitting element at a wide solid angle, into light nearly collimated and having a narrow directivity by a convergent lens. The resulting light is then modulated by the display panel, so that an image is displayed. Thus, less power consumption as well as less non-uniformity in brightness are involved. Moreover, there will not occur light penetration through peripheral portions of the pixels so that good image display can be implemented.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for displaying image signals for use with an active matrix liquid crystal display device wherein a first X driver is connected to gate signal lines for odd lines and a second X driver is connected to gate signal lines for even lines, said method comprising:

extracting signals of odd lines in progressive scanning image signals in a first frame and applying voltages corresponding to the signals of odd lines to pixels located along odd and even lines in the liquid crystal display device by operating the first and second X drivers in the liquid crystal display device at the same time and holding the voltages at the pixels so that the same image of an odd line in progressive scanning image signals is formed along the odd line and even line consecutive to the odd line in the liquid crystal display device; and extracting signals of even lines in progressive scanning image signals in a second frame, one of the first and second frames being successive to the other, and applying voltages corresponding to the signals of even lines to pixels located along even and odd lines in the liquid crystal display device by operating the first and second X drivers in the liquid crystal display device at the same time and holding the voltages at the pixels so that the same image of an even line in progressive scanning image signals is formed along an even line and an odd line consecutive to the even line in the liquid crystal device;

wherein an image is displayed on the liquid crystal display device in two frame periods and one of said extracting signals of odd lines and extracting signals of even lines is performed after the other thereof is performed.

2. The method according to claim 1, wherein in said extracting signals of odd lines, the signals of odd lines in progressive scanning image signals of the first frame are displayed at the pixels along the odd lines on the liquid crystal display device by extending a time axis, and in said extracting signals of even lines, the signals of even lines in progressive scanning image signals of the second frame are displayed at the pixels along the odd and even lines on the liquid crystal display device by extending the time axis.

3. The method according to claim 1, wherein the display device has effective lines of 960 or more.

4. An apparatus for use in displaying progressive scanning image signals, said apparatus comprising:
- an active matrix liquid crystal display device having gate signal lines;
- a first X driver connected to gate signal lines for odd lines;
- a second X driver connected to gate signal lines for even lines;
- a first extractor operable to extract signals of odd lines in progressive scanning image signals in a first frame, and operable to apply voltages corresponding to the signals of odd lines to pixels located along odd and even lines in said liquid crystal display device by operating said first and second X drivers in said liquid crystal display device at the same time, and operable to hold the voltages at the pixels so that the same image of an odd line in progressive scanning image signals is formed along an odd line and an even line consecutive to the odd line in said liquid crystal display device; and
- a second extractor operable to extract signals of even lines in progressive scanning image signals in a second frame, one of the first and second frames being successive to the other, and operable to apply voltages corresponding to the signals of even lines to pixels located along odd and even lines in said liquid crystal display device by operating said first and second X drivers in said liquid crystal display device at the same time, and operable to hold the voltages at the pixels so that the same image of an even line in progressive scanning image signals is formed along an even line and an odd line consecutive to the even line in said liquid crystal display device;
- wherein one of said first and second extractors operates after the other thereof such that an image is displayed on said liquid crystal display device in two frame periods.

5. An apparatus for use in displaying progressive scanning image signals on a display device, said apparatus comprising:
- a display device operable to display an image as a dot matrix;
- a first display controller operable to extract signals of odd lines in progressive scanning image signals in a first frame and to display the signals of odd lines along odd lines on said display device, and operable to extract signals of even lines in progressive scanning image signals in a second frame successive to the first frame and to display the signals of even lines along even lines on said display device;
- a second display controller operable to extract signals of odd lines in progressive scanning image signals in a first frame and to display the signals of odd lines along odd and even lines on said display device so that the same image of a signal of an odd line in progressive scanning image signals is formed along an odd line and an even line consecutive to the odd line, and operable to extract signals of even lines in progressive scanning image signals in a second frame successive to the first frame and to display the signals of even lines along even lines on said display device so that the same image of a signal of an even line in progressive scanning image signals is formed along an even line and an odd line consecutive to the even line; and
- a selector operable to select one of said first and second display controllers to be activated;
- wherein said selector is operable to activate said first display controller selectively when a correlation value between adjacent frames of the progressive scanning image signals is larger than a predetermined value and to activate said second display controller selectively when the correlation value is not larger than the predetermined value.

6. A projection display apparatus comprising:
- a light source;
- an optical system operable to separate a light generated by said light source along three optical paths for three primary colors of red, green and blue;
- three liquid crystal display devices, provided along the three optical paths, respectively, operable to modulate the light generated by said light source;
- a driver operable to drive said liquid crystal display devices to display progressive scanning image signals; and
- a projector operable to synthesize three lights modulated by said three liquid crystal display devices, respectively, and to project a synthesized light;
- wherein said driver comprises:
  - a first display controller operable to extract signals of odd lines in progressive scanning image signals in a first frame and to apply voltages corresponding to the signals of odd lines to pixels located along odd lines in said liquid crystal display devices and to hold the voltages at the pixels, and operable to extract signals of even lines in progressive scanning image signals in a second frame, one of the first and second frames being successive to the other, and to apply voltages corresponding to the signals of even lines to pixels located along even lines in said liquid crystal display devices and to hold the voltages at the pixels;
  - a second display controller operable to extract signals of odd lines in progressive scanning image signals in a first frame and to apply voltages corresponding to the signals of odd lines to pixels located along odd and even lines in said liquid crystal display devices and to hold the voltages at the pixels so that the same image of an odd line in progressive scanning image signals is formed along an odd line and an even line consecutive to the odd line in said liquid crystal display devices, and operable to extract signals of even lines in progressive scanning image signals in a second frame, one of the first and second frames being successive to the other, and to apply voltages corresponding to the signals of even lines to pixels located along even and odd lines in said liquid crystal display devices and to hold the voltages at the pixels so that the same image of an even line in progressive scanning image signals is formed along an even line and an odd line consecutive to the odd line in said liquid crystal display devices; and a selector operable to select one of said first and second display controllers to be activated;

wherein a phase of signals applied to a line in one of said liquid crystal display devices is reverse to a phase of signals applied to lines in the other liquid crystal display devices.

7. An apparatus for displaying image signals, said apparatus comprising:

an active matrix liquid crystal display device including a first X driver connected to gate signal lines for odd lines and a second X driver connected to gate signal lines for even lines;

a first display controller operable to extract line signals in image signals in a first frame, apply voltages corresponding to the line signals to pixels located along odd lines successively by operating said first X driver in said liquid crystal display device, extract line signals in image signals in a second frame, one of the first and second frames being successive and apply voltages corresponding to the line signals to pixels located along even lines successively by operating said second X driver in said liquid crystal display device;

a second display controller operable to extract line signals in image signals in a first frame, apply voltages corresponding to the line signals to pixels located along odd lines and even lines successively by operating said first and second X drivers in said liquid crystal display device, so that the same image of a line in image signals is formed along an odd line and an even line consecutive to the odd line, and to extract line signals in image signals in a second frame, and apply voltage corresponding to the line signals to pixels located along even lines and odd lines successively by operating said second and first X drivers in said liquid crystal display device so that the same image of a line in image signals is formed along an even line and an odd line consecutive to the even line; and a selector operable to select one of said first and second display controllers.

8. A method for displaying image signals for use with an active matrix liquid crystal display device, comprising:

applying a second voltage V1 of a second polarity to a pixel in a second frame when a first voltage V3 of a first polarity opposite to the second polarity has been applied to a pixel in a first frame consecutive to the second frame, wherein the second voltage has an absolute value V1$a$; and applying a fourth voltage V1 of the first polarity to the pixel in the second frame when a third voltage V3 of the first polarity has been applied to the pixel in the first frame, wherein the fourth voltage has an absolute value V1$b$ and the values V1$a$ and V1$b$ satisfy a following relationship:

$V1a > V1b$.

9. A projection display device comprising:

a light source;

a modulator operable to modulate a light generated by said light source for displaying image signals; and a projector operable to project a display image generated by said modulator;

wherein said modulator includes:

an active matrix liquid crystal display device including a first X driver connected to gate signal lines for odd lines and a second X driver connected to gate signal lines for even lines;

a first display controller operable to extract line signals in image signals in a first frame, apply voltages corresponding to the line signals to pixels located along odd lines successively by operating said first X driver in said liquid crystal display device, and operable to extract line signals in image signals in a second frame, one of the first and second frames being successive to the other, and to apply voltage corresponding to the line signals to pixels located along even lines successively by operating said second X driver in said liquid crystal display device;

a second display controller operable to extract line signals in image signals in a first frame, apply voltages corresponding to the line signals to pixels located along odd lines and even lines successively by operating said first and second X drivers in said liquid crystal display device, so that the same image of a line in image signals is formed along an odd line and an even line consecutive to the odd line, and operable to extract line signals in image signals in a second frame, and apply voltages corresponding to the line signals to pixels located along even lines and odd lines successively by operating said second and first X drivers in said liquid crystal display device so that the same image of a line in image signals is formed along an even line and an odd line consecutive to the even line; and a selector operable to select one of said first and second display controllers.

10. A projection display device comprising:

an active matrix liquid crystal device including a first X driver connected to gate signal lines for odd lines and a second X driver connected to gate signal lines for even lines;

a light source;

a modulator operable to modulate a light generated by said light source for displaying image signals on said active matrix liquid crystal display device; and a projector operable to project a display image generated by said modulator;

wherein said modulator includes:

a first display controller operable to extract line signals in image signals in a first frame and apply voltages of a first polarity corresponding to the line signals to pixels located along (2n−1) and 2n lines in said liquid crystal display device by operating said first and second X drivers in said liquid crystal display device at the same time, wherein n denotes a positive integer, and to hold the voltages at the pixels, and operable to extract line signals in image signals in a second frame successive to the first frame, apply voltage of a second polarity different from the first polarity corresponding to the line signals to pixels located along 2n and (2n+1) lines in the liquid crystal display device by operating said first and second X drivers in the display device at the same time, and to hold the voltages at the pixels; and a second display controller operable to extract line signals in image signals in a third frame successive to the second frame, apply voltages of the second polarity corresponding to the line signals to pixels located along (2n−1) and 2n lines in the liquid crystal display device, hold the voltages at the pixels, and operable to extract line signals in image signals in a fourth frame successive to the third frame, apply voltages of the first polarity corresponding to the line signals to pixels located along 2n and (2n+1) lines in said liquid crystal display device by operating said first and second X drivers in said liquid crystal display device at the same time, and to hold the voltages at the pixels.

11. A projection display device comprising:

an active matrix liquid crystal display device;

a light source;

a modulator operable to modulate a light generated by said light source for displaying image signals on said active matrix liquid crystal display device;

a projector operable to project a display image generated by said modulator, wherein absolute values V1$a$ and V1$b$ satisfy a following relationship: V1$a$>V1$b$; and a voltage applying device operable to apply a second voltage V1 to a pixel in a second frame consecutive to a first frame when a first voltage V3 of a first polarity of one of positive and negative polarities has been applied to a pixel in the first frame, wherein the second voltage V1 has a second polarity opposite to the first polarity and the second voltage has the absolute value V1$a$, and to apply a fourth voltage V1 of the first polarity to the pixel in the second frame when a third voltage V3 of the first polarity has been applied to the pixel in the first frame, wherein the fourth voltage has the absolute value V1$b$.

12. A projection display apparatus comprising:

a light source;

an optical system operable to separate a light generated by said light source along three optical paths for three primary colors of red, green and blue;

three liquid crystal display panels, provided along the three optical paths, respectively, operable to modulate the red, green and blue lights separated by said optical system;

a plurality of first lens arrays each having a plurality of lenses arranged in two dimensions between said light source and at least one of said liquid crystal display panels;

a plurality of second lens arrays each having a plurality of lenses arranged in two dimensions between one of said first lens arrays and one of said liquid crystal display panels; and a plurality of projector lenses each operable to project an image generated by one of said three liquid crystal display panels;

wherein each of said liquid crystal display panels comprises: a first extractor operable to extract line signals in image signals in a first frame and to apply voltages corresponding to the line signals to pixels located along odd lines in a respective liquid crystal display panel, and to extract line signals in image signals in a second frame consecutive to the first frame, and to apply voltages corresponding to the line signals to pixels located along odd lines in the respective liquid crystal display panel; and a second extractor operable to extract line signals in image signals in the first frame, and to apply voltages corresponding to the line signals to pixels located along an odd line and an even line consecutive to the odd line in the respective liquid crystal display panel, and to extract line signals in image signals in the second frame consecutive to the first frame, and to apply voltages corresponding to the line signals to pixels located along an even line and an odd line consecutive to the even line in the liquid crystal display panel.

13. The apparatus according to claim 12, wherein each said liquid crystal display panel comprises a first X driver connected to a (2n)-th gate line, and a second X driver connected to (2n+1)-th gate line, wherein n denotes an integer.

14. The apparatus according to claim 7, further comprising:

a liquid crystal panel comprising an anti-reflection film formed at a surface of said panel to contact with air; and a color filter formed on a substrate of said panel on which pixel electrodes are formed.

* * * * *